(12) United States Patent
Laubach

(10) Patent No.: US 10,817,175 B2
(45) Date of Patent: *Oct. 27, 2020

(54) INPUT DEVICE ENHANCED INTERFACE

(71) Applicant: Intellitact LLC, Beverly Hills, CA (US)

(72) Inventor: Kevin Laubach, Beverly Hills, CA (US)

(73) Assignee: Intellitact LLC, Beverly Hills, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/990,723

(22) Filed: May 28, 2018

(65) Prior Publication Data

US 2018/0275851 A1    Sep. 27, 2018

Related U.S. Application Data

(63) Continuation of application No. 14/493,192, filed on Sep. 22, 2014, now Pat. No. 9,983,788, which is a
(Continued)

(51) Int. Cl.
*G06F 3/0489* (2013.01)
*G06F 3/023* (2006.01)
(Continued)

(52) U.S. Cl.
CPC .......... *G06F 3/0489* (2013.01); *G06F 3/0238* (2013.01); *G06F 3/0482* (2013.01);
(Continued)

(58) Field of Classification Search
CPC .. G06F 3/0489; G06F 3/0238; G06F 3/04892; G06F 3/0485; G06F 3/0482;
(Continued)

(56) References Cited

U.S. PATENT DOCUMENTS 7,154,480 B2   12/2006 Iesaka
7,168,046 B2   1/2007 Kang et al.
(Continued)

OTHER PUBLICATIONS

International Search Report and Written Opinion for PCT/US12/29593, Jun. 13, 2012, 7 pages.

*Primary Examiner* — Ting Z Lee
(74) *Attorney, Agent, or Firm* — Ansari Katiraei LLP; Arman Katiraei; Sadiq Ansari

(57) ABSTRACT

Some embodiments provide an interactive viewer for an input device interface. Specifically, some embodiments provide a Keyboard Enhanced Interface (KEI) system that includes a KEI viewer. The KEI viewer includes multiple graphical keys that correspond to keys of a key based input device. The KEI viewer also includes multiple symbols that identify different output actions and logic for presenting a set of symbols over a set of graphical keys to identify a set of keys of the key based input device that are usable to directly invoke a set of output actions based on an active operational mode of the KEI system. A symbol identifies a particular output action that is directly invocable with a press of a key of the key based input device that corresponds to a graphical key over which said symbol is presented.

18 Claims, 75 Drawing Sheets

Related U.S. Application Data continuation of application No. 13/423,204, filed on Mar. 17, 2012, now Pat. No. 8,843,844.

(60) Provisional application No. 61/465,308, filed on Mar. 17, 2011, provisional application No. 61/465,309, filed on Mar. 17, 2011.

(51) Int. Cl.
*G06F 3/0482* (2013.01)
*G06F 3/0484* (2013.01)
*G06F 3/0488* (2013.01)
*G06F 3/01* (2006.01)
*G06F 3/0485* (2013.01)

(52) U.S. Cl.
CPC ...... *G06F 3/04847* (2013.01); *G06F 3/04892* (2013.01); *G06F 3/04895* (2013.01); *G06F 3/018* (2013.01); *G06F 3/0485* (2013.01); *G06F 3/04886* (2013.01); *G06F 3/04897* (2013.01)

(58) Field of Classification Search
CPC ............. G06F 3/04847; G06F 3/04886; G06F 3/04897; G06F 3/018
See application file for complete search history.

(56) References Cited

U.S. PATENT DOCUMENTS

| | | |
|---|---|---|
| 7,561,145 B2 | 7/2009 | Garside et al. |
| 2003/0201982 A1 | 10/2003 | Iesaka |
| 2005/0149879 A1 | 7/2005 | Jobs et al. |
| 2006/0034043 A1 | 2/2006 | Hisano et al. |
| 2007/0152983 A1 | 7/2007 | McKillop et al. |
| 2008/0066006 A1 | 3/2008 | Kim |
| 2009/0058823 A1 | 3/2009 | Kocienda |
| 2009/0070098 A1 | 3/2009 | Patryshev |
| 2009/0174663 A1 | 7/2009 | Rudd |
| 2010/0085313 A1* | 4/2010 | Rider .................. G06F 3/04886 345/173 |
| 2010/0134420 A1 | 6/2010 | Gluckstad |
| 2010/0235734 A1 | 9/2010 | Ording et al. |
| 2010/0281410 A1 | 11/2010 | Heintze |
| 2010/0313156 A1 | 12/2010 | Louch et al. |
| 2011/0090151 A1* | 4/2011 | Huang .................. G06F 3/0237 345/168 |
| 2011/0199312 A1 | 8/2011 | Okuta |

\* cited by examiner

|     | a | b     | c     |       |       |       |       |
|-----|---|-------|-------|-------|-------|-------|-------|
|     | a | .     | A     |       |       |       |       |
| 1110 | 0 | MOD_a | MOD_A |       |       |       |       |

|     | a | b     | c       | d       | e     |       |       |
|-----|---|-------|---------|---------|-------|-------|-------|
|     | a | .     | b       | B       | A     |       |       |
| 1120 | 0 | MOD_a | MOD_a_b | MOD_a_B | MOD_A |       |       |

|     | a | b     | c       | d       | e       |       |       |
|-----|---|-------|---------|---------|---------|-------|-------|
|     | a | .     | b       | A       | B       |       |       |
| 1130 | 0 | MOD_a | MOD_a_b | MOD_A_b | MOD_A_B |       |       |
|     |   |       |         |         | MOD_A   |       |       |

|     | a | b     | c       | d       | e       | f       | g     |
|-----|---|-------|---------|---------|---------|---------|-------|
|     | a | .     | b       | A       | a       | B       | A     |
| 1140 | 0 | MOD_a | MOD_a_b | MOD_A_b | MOD_a_b | MOD_a_B | MOD_A |

|     | a | b     | c       | d       | e       | f       | g     |
|-----|---|-------|---------|---------|---------|---------|-------|
|     | a | .     | b       | B       | c       | C       | A     |
| 1150 | 0 | MOD_a | MOD_a_b | MOD_a_B | MOD_a_c | MOD_a_C | MOD_A |

|     | a | b     | c       | d         | e         | f       | g       |
|-----|---|-------|---------|-----------|-----------|---------|---------|
|     | a | .     | b       | c         | C         | A       | B       |
| 1160 | 0 | MOD_a | MOD_a_b | MOD_a_b_c | MOD_a_b_C | MOD_A_b | MOD_A_B |
|     |   |       |         |           |           |         | MOD_A   |

Figure 11

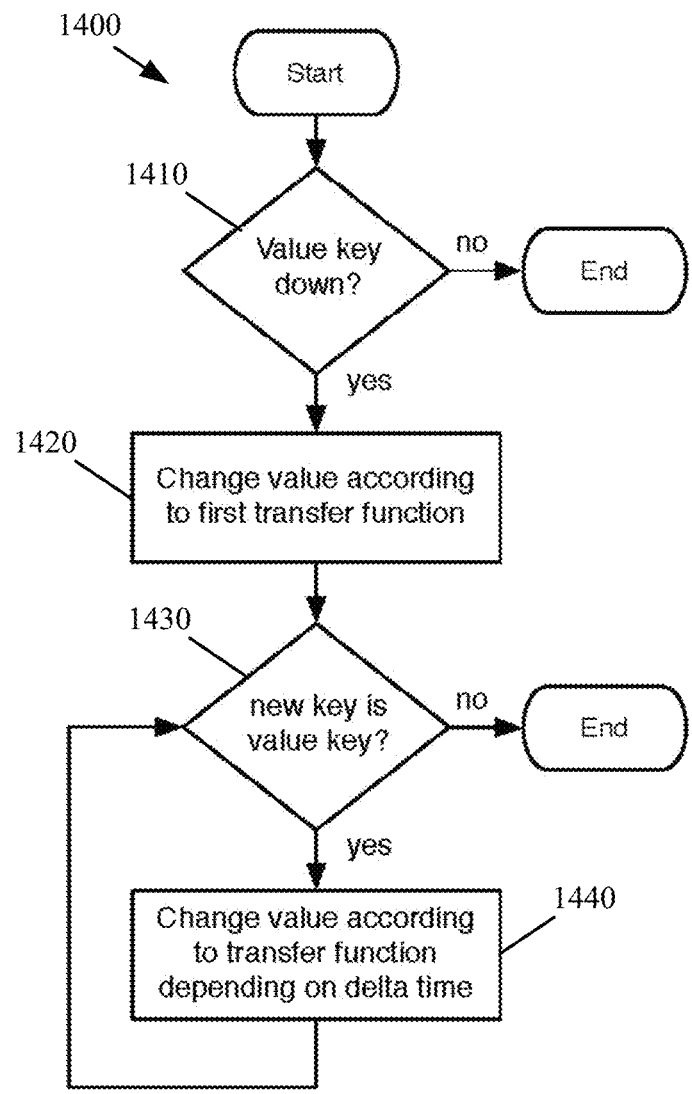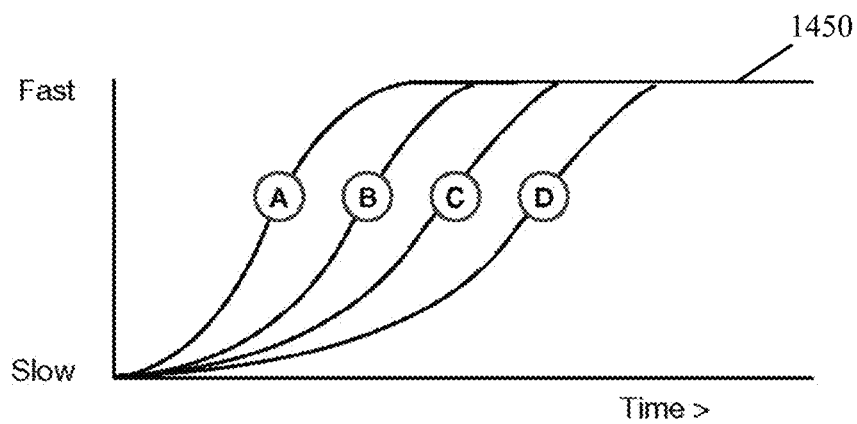
Figure 14

| | before | select word invocation > | after |
|---|---|---|---|
| 1 | ABC | | SEL |
| 2 | ₐdogₐcatₐ | ▶ | ₐ[dog]ₐcatₐ |
| 3 | ₐdogₐcatₐ | ▶ | ₐ[dog]ₐcatₐ |
| 4 | ₐdogₐcatₐ | ▶ | ₐ[dog]ₐcatₐ |
| 5 | ₐdogₐcatₐ | ▶ | ₐdogₐ[cat] |

Figure 22b

| | before | select word |
|---|---|---|
| 1 | ₐantₐhenₐ[dog]ₐcatₐcowₐ | ▶ |
| 2 | ₐantₐhenₐ[dogₐcat]ₐcowₐ | ▶ |
| 3 | ₐantₐhenₐ[dogₐcatₐcow]ₐ | ▶ |
| 4 | ₐantₐhenₐ[dogₐcat]ₐcowₐ | ◀ |
| 5 | ₐantₐhenₐ[dog]ₐcatₐcowₐ | ◀ |
| 6 | ₐantₐ[hen ₐdog]ₐcatₐcowₐ | ◀ |
| 7 | ₐ[antₐhenₐdog]ₐcatₐcowₐ | ◀ |
| 8 | ₐant[ₐhenₐdog]ₐcatₐcowₐ | ▶ |
| 9 | ₐantₐhenₐ[dog]ₐcatₐcowₐ | ▶ |
| 10 | ₐantₐhenₐ[dogₐcat]ₐcowₐ | ▶ |

I shall pass through this world but once. Any good therefore that I can do or any kindness that I can show to any human being, let me do it now. Let me not defer or neglect it, for I shall not pass this way again.

2280 2283

I shall pass through this world but once. Any good therefore that I can do or any kindness that I can show to any human being, let me do it now. Let me not defer or neglect it, for I shall not pass this way again.

2285 2287

I shall pass through this world but once. Any good therefore that I can do or any kindness that I can show to any human being, let me do it now. Let me not defer or neglect it, for I shall not pass this way again.

2290 2293

I shall pass through this world but once. Any good therefore that I can do or any kindness that I can show to any human being, let me do it now. Let me not defer or neglect it, for I shall not pass this way again.

2295 2297

I shall pass through this world but once. Any good therefore that I can do or any kindness that I can show to any human being, let me do it now. Let me not defer or neglect it, for I shall not pass this way again.

Figure 22d

Input Action Aggregator - word bold with mouse

| line | eT | pT | cT | type | move | input event | > | output action | mode | application | document | focus |
|---|---|---|---|---|---|---|---|---|---|---|---|---|
| 1 | .00 | | | | | point | | | PRO | Finder | Home | outline |
| 2 | .00 | 6420 | | ⇆ | 6.2 | move pointer | | dock icon | | | | |
| 3 | 1.03 | | 1.03 | ▼▲ | | left click | | open TextEdit | | | | |
| 4 | 1.03 | 2.10 | | | | | | hand position | ABC | TextEdit | Untitled | text field |
| 5 | 3.13 | - | | ☐ | | ABC_d | | insert text | | | | |
| 6 | 3.39 | .26 | | ☐ | type | ABC_o | | insert text | | | | |
| 7 | 3.61 | .48 | | ☐ | | ABC_g | | insert text | | | | .00 |
| 8 | 3.61 | 1.31 | | | | point | | hand position | | | | .00 |
| 9 | 4.92 | - | | ⇆ | 7.6 | move pointer | | to word start | | | | 1.31 |
| 10 | 7.31 | 2.39 | | ▼ | | left mouse-down | | insert point move | | | | 3.70 |
| 11 | 7.39 | 2.47 | | ⇆ | 0.3 | drag | | to end of word | | | | 3.78 |
| 12 | 8.59 | 3.67 | | ▲ | | left mouse-up | | selection made | SEL | | | 4.98 |
| 13 | 8.89 | .16 | | | | | | | | | | 4.98 | < other (unrelated) events
| 14 | 8.75 | - | | ⇆ | 5.9 | move pointer | | to "Format" menu | | | | 5.14 | may occur after selection
| 15 | 10.33 | 1.58 | | ▼ | | left mouse-down | | disclose menu | | | | 6.72 | is made
| 16 | 10.81 | 2.06 | | ⇆ | 2.6 | drag | | to "Font" menu | | | | 7.20 |
| 17 | 11.93 | 3.18 | | - | | - | | disclose submenu | | | | 8.32 |
| 18 | 11.93 | 3.18 | | ⇆ | 1.5 | drag | | to "Bold item | | | | 8.32 |
| 19 | 13.98 | 5.23 | | ▲ | | left mouse-up | | bold selection | | | | 10.37 |
| 20 | 14.00 | .31 | | | | | | | | | | 10.41 | < other output actions
| 21 | 14.29 | - | | ⇆ | 5.6 | move pointer | | to end of word | | | | 10.68 | may occur on the same
| 22 | 16.22 | 1.93 | | ▼▲ | | left click | | deselect | ABC | | | 12.61 | selection
| 23 | 16.22 | 2.19 | | | | | | hand position | | | | 12.61 |
| 24 | 18.41 | - | | ☐ | type | ABC_spc | | insert text | | | | 14.80 |

Figure 64

Input Action Aggregator - word bold with KEI

| line | eT | pT | cT | type | move | input event | > | output action | mode | application | document | focus |
|---|---|---|---|---|---|---|---|---|---|---|---|---|
| 1 | .00 | | | | | | | | PRO | Finder | Home | outline |
| 2 | .00 | 6420 | - | ☐ | | MOD_f | | - | MOD | | | |
| 3 | .41 | | .41 | ☐ | | MOD_f_sla | | open TextEdit | | | | |
| 4 | .41 | .51 | | | | | | | ABC | TextEdit | Untitled | text field |
| 5 | .92 | - | | ☐ | | ABC_d | | text | | | | |
| 6 | 1.20 | .28 | | ☐ | | ABC_o | | text | | | | |
| 7 | 1.42 | .50 | | ☐ | | ABC_g | | text | | | | .00 |
| 8 | 1.42 | .86 | | | | | | | | | | .00 |
| 9 | 2.28 | - | | ☐ | | MOD_j | | select word | MOD | | | .86 |
| 10 | 2.28 | .98 | | | | | | | | | | .86 |
| 11 | 3.26 | - | | ☐ | | SEL_b | | bold | SEL | | | 1.84 |
| 12 | 3.26 | .71 | | | | | | | | | | 1.84 |
| 13 | 3.97 | - | | ☐ | | MOD_l | | select left | MOD | | | 2.55 |
| 14 | 3.97 | .84 | | | | | | | ABC | | | 2.55 |
| 15 | 4.81 | - | | ☐ | | ABC_spc | | text | | | | 3.39 |

Figure 65

Output Action Database — 6710

| app | count | time | output action | acts on | modifies | other |
|---|---|---|---|---|---|---|
| Numbers '09 | | 1.3 hrs | | | | |
| ▼ | 591 | 26 min | align left | selection | selection | - |
| ▼ | 428 | 18 min | add row above | selection | document | - |
| ▶ | 381 | 32 min | borders - outside | selection | selection | - |
| Word 2010 | | 1.4 hrs | | | | |
| ▶ | 487 | 41 min | review.accept | document | document | - |
| ▶ | 311 | 26 min | review.next change | document | none | - |
| ▶ | 180 | 15 min | file:save | document | none | - |
| Safari | | 2.8 hrs | | | | |
| ▶ | 1186 | 99 min | back | web area | web area | - |
| ▶ | 683 | 57 min | click link | web area | web area | - |
| ▶ | 179 | 15 min | next tab | window | web area | - |

6720, 6730, 6740

Ⓐ Align Left - Output Action Equivalencies

| count | avg | total | modality | path | location | confirm | speak | last invoke |
|---|---|---|---|---|---|---|---|---|
| 342 | .42 | 143.6 | KEI | MOD_spc_s | - | 0 | left | 935318628 |
| 174 | 3.82 | 664.7 | format bar | alignment.left | 439, 88 | 0 | - | 072382850 |
| 73 | .82 | 59.9 | TEI | Loox | - | 0 | left | 003668431 |
| 2 | 5.20 | 10.4 | menu bar | Format:Text | 3 | 0 | - | 313002924 |
| 0 | .61 | 0.0 | KEI | PRO_format_s | - | 0 | left | - |
| 0 | 4.55 | 0.0 | palette | text.text.alignment | 104,130 | 0 | - | - |
| 0 | .83 | 0.0 | key | cmd-lbr | - | 0 | left | - |
| 591 | 2.64 | 1559.3 | | | | | | |

Ⓑ Add Row Above - Output Action Equivalencies

| count | avg | total | modality | path | location | confirm | speak | last invoke |
|---|---|---|---|---|---|---|---|---|
| 219 | .46 | 100.7 | KEI | MOD_spc_i | - | 0 | add above | 951315150 |
| 199 | 4.81 | 957.2 | layout area | header.row | 1 | 0 | - | 420184078 |
| 8 | 5.10 | 40.8 | menu bar | Table:Add Row Above | 1 | 0 | - | 068714419 |
| 2 | 3.77 | 7.5 | ctrl menu | Add Row Above | 3 | 0 | - | 617536086 |
| 0 | .62 | 0.0 | key | opt-uar | - | 0 | - | - |
| 0 | .80 | 0.0 | TEI | UUox | - | 0 | add above | - |
| 428 | 2.59 | 1109.9 | | | | | | |

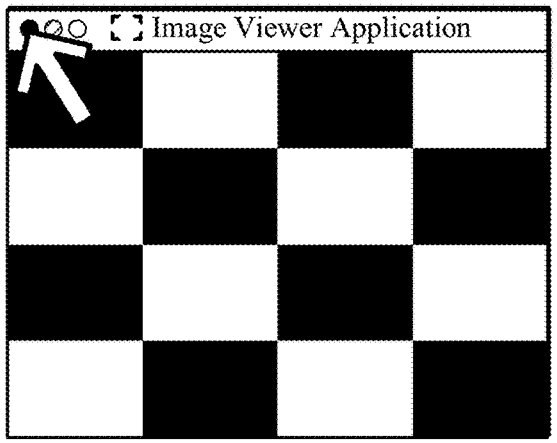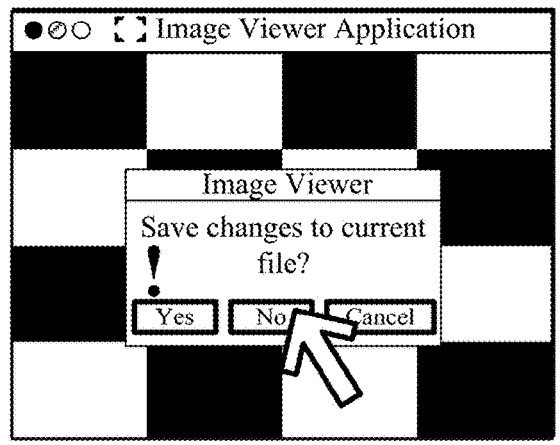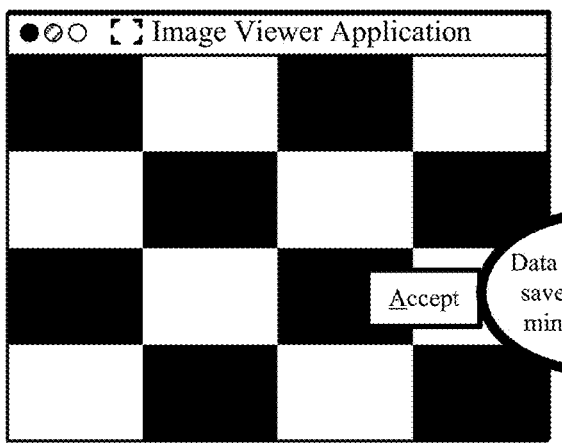
Figure 70

INPUT DEVICE ENHANCED INTERFACE

CLAIM OF BENEFIT TO RELATED APPLICATIONS

This application is a continuation of U.S. Nonprovisional application Ser. No. 14/493,192 entitled "Input Device Enhanced Interface", filed Sep. 22, 2014, and issued as U.S. Pat. No. 9,983,788, which is a continuation of U.S. Nonprovisional application Ser. No. 13/423,204 entitled "Input Device Enhanced Interface", filed Mar. 17, 2012, and issued as U.S. Pat. No. 8,843,844, which claims the benefit of U.S. provisional application 61/465,308, entitled "Keyboard Enhanced Interface", filed Mar. 17, 2011 and U.S. provisional application 61/465,309, entitled "Touch Enhanced Interface", filed Mar. 17, 2011. The contents of application Ser. Nos. 14/493,192, 13/423,204, 61/465,308 and 61/465,309 are hereby incorporated by reference.

TECHNICAL FIELD

The present invention generally relates to user interface enhancements for computer systems and electronic devices.

BACKGROUND ART

The means by which users interact with computer systems and electronic devices has evolved throughout the years. Prior to the graphical user interface (GUI), the keyboard was the primary means for interacting with a computer system. In addition to typing and editing text, the keyboard was used to control other aspects of the computer system by way of a command line interface (CLI).

Through the years, the keyboard changed very little as the computer systems evolved from a CLI to a GUI. Some attempts were made to adapt the keyboard to the GUI environment. For example, keystroke "shortcuts" were introduced to directly invoke various output actions without the need to navigate the spatial selection paradigm of the GUI, whereby navigating the spatial selection paradigm involves mapping movements that are detected using some physical device (e.g., a mouse) to the virtual interface of the GUI in order to interact with the user interface (UI) elements of the GUI. However, these shortcuts were and remain difficult to remember and inconsistent across different applications and platforms. There is often no on-screen indication to remind the user of the shortcuts. Moreover, the "flag" keys (e.g., alt, ctrl, command, etc.) used to invoke these shortcuts are located in non-standardized peripheral positions (e.g., bottom left corner) on different keyboards. Therefore to invoke a keyboard shortcut, the user often performs awkward hand movements and finger extensions or removes one hand from the keyboard hand position in order to reach a flag key that is part of some keyboard shortcut. Further hindrance to the use of keyboard shortcuts is the limited number of flag keys that limits the number of possible keyboard shortcuts and the customizability of these shortcuts.

Consequently, the mouse evolved to become the primary means to navigate the GUI and to invoke output actions. Using the mouse, users can indirectly invoke output actions by moving a mouse pointer to and clicking on various selectable control areas or UI elements they perceive on-screen. Such various selectable control areas or UI elements include icons, menu items, graphical sliders, hyperlinks, and other such interactive graphical elements that are clickable when displayed on-screen. When clicked, each UI element performs an output action such as launching an application, opening a file (e.g., documents, images, videos, audio files, etc.), accessing folders, adjusting a widget, executing scripts, issuing calls to one or more application programming interfaces (APIs) or libraries, and performing other OS, GUI, or application operations.

The current technological shift is moving users towards touchscreen interfaces. Touchscreen interfaces allow users to directly invoke output actions through the UI elements they perceive on-screen. Instead of moving a mouse pointer, users can move their hand and fingers to the location of various UI elements to invoke corresponding output actions.

While intuitive, the mouse and the touchscreen interfaces have various shortcomings that restrict their use. Firstly, the speed by which a user can navigate the GUI and invoke output actions using the mouse or the touchscreen interface is mitigated by the spatial dependence of these input devices. Specifically, users must visually identify a particular UI element before they are able to select and invoke an output action that is associated with the particular UI element. With the mouse, the user identifies a current location of the mouse pointer before identifying a path to the particular UI element. With the touchscreen interface, the user identifies the on-screen location of the particular UI element before moving their hand and fingers to that element, and then invokes an output action that is associated with the particular UI element with a touch gesture.

Subsequent invocation of the same output action requires the same spatial identification steps. Each time the user wants to invoke that output action, the user first has to identify the location of the particular UI element on-screen and then make precise spatially relative movements. As a result, neither the mouse nor the touchscreen interface can leverage muscle memory for repeated invocation of output actions since the actual physical motion is different every time. Without the use of muscle memory, users are unable to quickly and subconsciously recreate a set of operations that invoke output actions. When invoking output actions that are used once or very infrequently (such as clicking on a link in a web browser), memorizing commands to invoke output actions is neither desirable nor beneficial. However, the more an output action is utilized, the more benefit there is in allowing the user to develop and leverage muscle memory so that the tedious and slow spatial identification and precise movement steps can be eliminated.

Secondly, access to a desired output action may be obscured by the implied three dimensional nature and limited screen size of the GUI. For example, a particular UI element that is used to invoke a desired output action may be obscured by one or more application windows, or may be obscured by being located within various menus, graphical ribbons, or folders. Therefore, to access the desired output action, the user has to memorize and navigate through the GUI (e.g., windows, menus, ribbons, folders, etc.) before scanning again to locate the desired output action. Some UI elements such as hierarchical menus require several iterations of this action/disclose/scan cycle. The mouse and touchscreen interface, therefore, often do not provide a direct means to invoke an output action.

A desktop icon may be used as a "shortcut" to invoke an output action (such as opening a document). However, the user still has to identify and move the mouse or hand to the location of the icon before clicking the icon. Additionally, the desktop may quickly be overrun with icons, making identification difficult. Also, the implied three dimensional nature of the GUI may obscure desktop icons with various windows.

Thirdly, mouse and touchscreen interfaces are not well suited for inserting text (typing). As a result, these input devices are often used in conjunction with a physical keyboard. However, alternating between a keyboard and mouse/touchscreen introduces a second layer of spatial recognition. In order to switch to a different input device, the user identifies the physical location of the different input device before switching to that different input device. The physical movement of the hand from the mouse/touchscreen to the keyboard and vice versa introduces delay and creates discontinuity in the use of the computer system. This delay is further exacerbated when moving away from or back to the keyboard as the user loses and must reorient their hand to the precise home position on the keyboard.

Fourthly, the mouse and the touchscreen interfaces are continuous input devices that require fine motor skills. A touchscreen gesture or a mouse click will not invoke the output action for a UI element unless the touchscreen gesture or mouse click/drag occurs within a specifically defined region of the UI element, which may be quite small. In contrast, a key-based input device (e.g., keyboard) provides discrete inputs to the computer system. More specifically, each key of a key-based input device that is pressed provides a discrete input (e.g., entry of an alphanumeric character) to the computer system.

Accordingly, there is a need for further UI evolution. There is a need to enhance the UI to reduce the time, energy, and frustration associated with using a spatial input device in order to invoke frequently used output actions. To improve the efficiency with which the user invokes an output action, there is a need to incorporate muscle memory into the UI. There is also a need to better unify the invocation of output actions with character insertion (typing) so that a single input device can be used as the primary means to invoke output actions as well as inserting characters and thereby minimize or eliminate hand movement. There is a therefore need to provide additional expressivity through a key-based input device so that the discrete inputs of the device can be used both to perform character insertion and invoke a wide variety of output actions without the need to perform constant spatial identification in the GUI.

SUMMARY OF THE INVENTION

It is an object of the present invention to define an apparatus, method, system and computer software product that increases the efficiency and expressivity in the use of key-based input devices by better adapting these input devices for direct output action invocation in addition to performing text insertion. A further object is to provide a user interface in conjunction with the key-based input device which allows the user to discover, remember and customize key output actions, and thus facilitate productive and enjoyable computing device interactions. A further object is to remove barriers which would prevent many users from becoming comfortable using key-based input devices by eliminating the need to memorize confusing, inconsistent and physically awkward key commands or function keys. A further object is to provide key-based input devices with many more layers of functionality than is currently practiced by existing art, and thus enable substantially more control over software applications, as well as the ability to overcome many limitations inherent in existing graphical user interfaces.

To achieve the objects and in accordance with the purpose of the invention, as embodied and broadly described herein, some embodiments provide a device, method, system, computer program product and user interface that provides a Keyboard Enhanced Interface (KEI) system that enhances user interface (UI) functionality of a computer system or electronic device. The KEI system monitors existing user input events (e.g., key-based input device taps, mouse clicks, etc.) and generates enhanced events that can directly invoke a wide range of output actions. In some embodiments, the KEI system includes a KEI engine, a KEI database, and an optional KEI viewer.

The KEI engine analyzes incoming events and the state of various system parameters and generates enhanced events that are passed to the KEI database. The KEI database identifies which output actions are invoked based on one or more enhanced events and system state information it receives. The KEI database also identifies different symbols and widgets for the KEI viewer to display. The KEI viewer provides a dynamic visual reference of the output actions that may be invoked using keys of a key-based input device at any point in time.

To generate the enhanced events, the KEI engine intercepts events that are generated by the operating system in response to input from various hardware devices. These events specify various user actions that are performed using a key-based input device such as a keyboard or other input devices such as a mouse, touchscreen interface, trackpad, stylus, etc.

The KEI engine categorizes the intercepted events by (i) detecting each keyboard key press separately from each keyboard key release and (ii) monitoring the order and timing with which the keyboard keys are pressed and released. The KEI engine analyzes the categorized events with various system state information. The KEI engine monitors system state information such as changes to the frontmost application, the key focus of the frontmost application, and whether a set of characters is selected in a text field of the frontmost application. Based on the categorized events and the analysis, the KEI engine enters one of several operational modes. The KEI engine then generates enhanced events according to the active operational mode and the intercepted events.

In some embodiments, the KEI engine is in a first operational mode when the key focus of the frontmost application is a text field and there are no characters selected within the text field—that is, the text insertion vertical bar is visible. When the first operational mode is active, the enhanced events generated by the KEI engine can be used to insert characters into the text field (i.e., normal typing of text).

In some embodiments, the KEI engine is in a second operational mode when the key focus of the frontmost application is a text field and there are characters selected within that text field. When the second operational mode is active, the enhanced events generated by the KEI engine can be used to invoke a set of output actions that include output actions for manipulating the selected characters without the use of any flag keys (e.g., cmd, ctrl, alt, shift, etc.). The set of output actions may also include other output actions that are accessible when the characters are selected.

In some embodiments, the KEI engine is in a third operational mode when the key focus of the frontmost application is not a text field. When the third operational mode is active, the enhanced events generated by the KEI engine can be used to invoke a set of output actions that are specific to the current state of the frontmost application. Such output actions can be invoked without requiring the use of any flag keys or using the mouse.

Additionally, the KEI engine is in a fourth operational mode when one or more keys of the key-based input device are held down beyond a particular duration. Based on the particular one or more keys that are held down, the KEI system enables access to different sets of output actions. While the particular one or more keys are held down, the KEI engine generates enhanced events that can be used to invoke a specific set of output actions.

The KEI viewer displays a set of graphical keys. In some embodiments, the graphical keys correspond to the keys of the key-based input device. Displayed over some or all of the graphical keys are various symbols and widgets that are identified in the KEI database by the enhanced events and system state information. Each symbol represents an output action that may be invoked using a key of the key-based input device that corresponds to the graphical key over which the symbol is displayed. In some embodiments, a widget includes one or more interactive elements that perform one or more output actions. The interactive elements of the widget may also include areas for text insertion (e.g., text fields). The interactive elements of the widget can be manipulated using one or more keys that correspond to the one or more graphical keys over which the widget is displayed. In some embodiments, a widget provides status information about an application or an application parameter. In some embodiments, a symbol may display a remotely specified symbol(s) and action over one or more graphical keys of the KEI viewer.

The KEI viewer may be displayed or hidden at any time without interfering with the operation of the UI, applications, or the KEI engine. In some embodiments the KEI viewer may be set to automatically appear and hide based on a KEI engine mode, other system state information, or historical usage patterns. Such automatic invocation may also occur after a variable time delay. The operation of the KEI engine is not dependent on the operation of the KEI viewer. Accordingly, keys of the key-based input device may be used to invoke output actions based on the enhanced events that are generated by the KEI engine even when the KEI viewer is not displayed on-screen.

The KEI system is user customizable using drag-and-drop functionality. Users, application developers, and system engineers are able to add symbols and widgets, remove symbols and widgets, and reposition symbols and the widgets to any instance of the KEI viewer. In so doing, users can add and remove output actions. Additionally, users can remap the keys that are used to invoke different output actions.

Some embodiments display graphical links to enhance the visual reference provided by the KEI viewer. The graphical links are displayed between (1) one or more UI elements (e.g., menu items within an expanded menu) of an application and (2) one or more symbols or widgets that are displayed over the graphical keys of the KEI viewer. Specifically, a graphical link is displayed between (1) a particular UI element that can be used to invoke a particular output action and (2) a particular symbol or widget that identifies that the particular output action may be invoked using a key that corresponds to the graphical key over which the symbol is displayed.

In some embodiments, the KEI system automatically generates a mapping to allow output actions for a newly installed application to be invoked by various key presses, key taps, and key releases. In some embodiments, the KEI viewer automatically generates the symbols and the widgets to identify the mapping.

In some embodiments, the KEI system dynamically adapts based on user activity. From the user activity, the KEI system identifies frequently invoked output actions and their timing, behavioral patterns, and user preferences that are analyzed to adapt the KEI system to work more efficiently with a particular user. For example, when the KEI system detects that an output action (or a sequence of output actions) is frequently invoked through the GUI, it identifies or generates a mapping for an output action to a key of the key-based input device and/or notifies the user of this more efficient possibility. Additionally, the KEI system of some embodiments analyzes the activity within a particular application and determines whether additional user confirmation is required to avoid inadvertent output action invocation.

BRIEF DESCRIPTION OF THE DRAWINGS

In order to achieve a better understanding of the nature of the present invention, a preferred embodiment of the Keyboard Enhanced Interface (KEI) system will now be described, by way of example only, with reference to the accompanying drawings in which:

FIGS. 11 and 12 provide a detailed flow diagram that lists various key inputs and timing with which some of the resulting enhanced events are generated by the KEI engine of some embodiments in response.

FIG. 14 presents a process performed by the KEI engine to alter the speed of successively approximated value adjustments which are triggered by one or more keys that are held down beyond a time threshold.

FIGS. 22b, 22c, and 22d illustrate usage details of the block selection functionality of the KEI system in accordance with some embodiments.

FIGS. 64 and 65 list exemplary data in a buffered list that is produced based on the parsing of the aggregated data by the input event aggregator in accordance with some embodiments.

FIG. 67 is a representation of some of the internal data that might be utilized in the output action database of some embodiments and might be presented by the correlation engine through an interface to the user.

FIG. 70 illustrates an example of a confirmation sequence in accordance with some embodiments.

DETAILED DESCRIPTION

In the following detailed description, numerous details, examples, and embodiments of the Keyboard Enhanced Interface (KEI) system are set forth and described. As one skilled in the art would understand in light of the present description, the KEI system is not limited to the embodiments set forth, and the KEI system may be practiced without some of the specific details and examples discussed, or in different permutations. Also, reference is made to accompanying figures, which illustrate specific embodiments in which the invention can be practiced. It is to be understood that other embodiments can be used and structural changes can be made without departing from the scope of the embodiments described in this invention.

The term "keyboard" as used in the description, figures, and embodiments presented herein includes any key-based input device. Some such key-based input devices include a keyboard apparatus with a plurality of keys and virtual touchscreen keyboards with any number of keys that are arranged in a standard "qwerty" layout, other standard layouts (e.g., "azerty" layout), and other nonstandard layouts. In the figures accompanying this document, the keyboard and the KEI viewer are presented with the standard "qwerty" layout.

I. Overview

Figure 1:
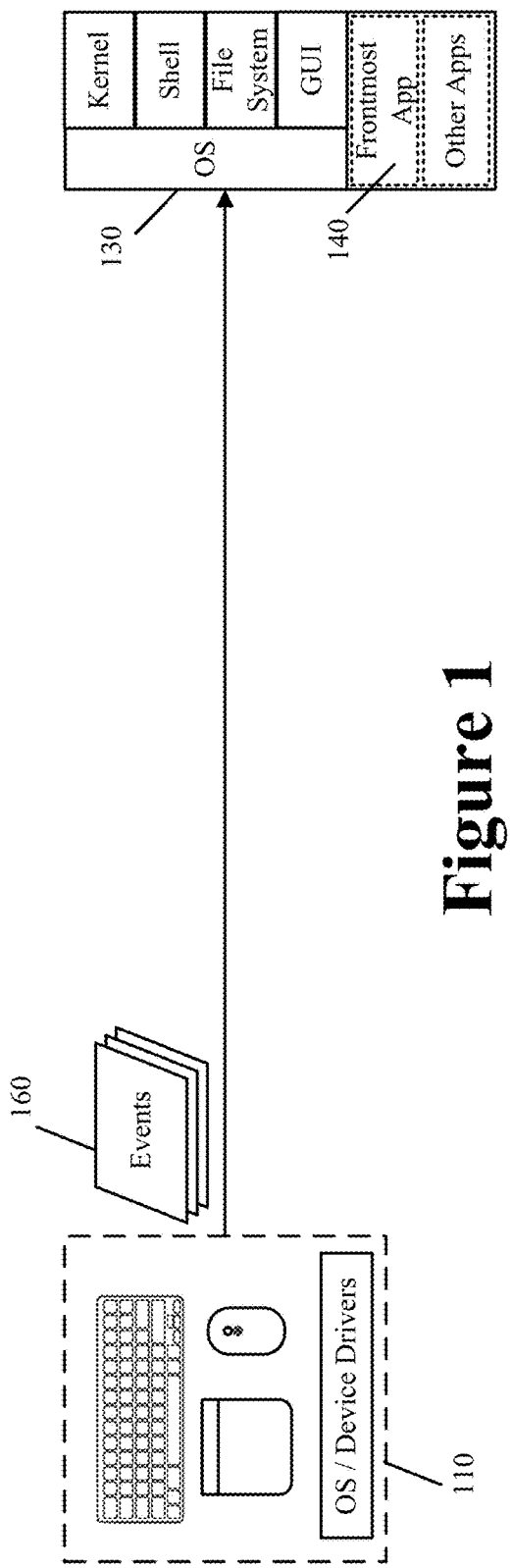
FIG. 1 illustrates UI functionality of a computer system or electronic device.
Figure 2:
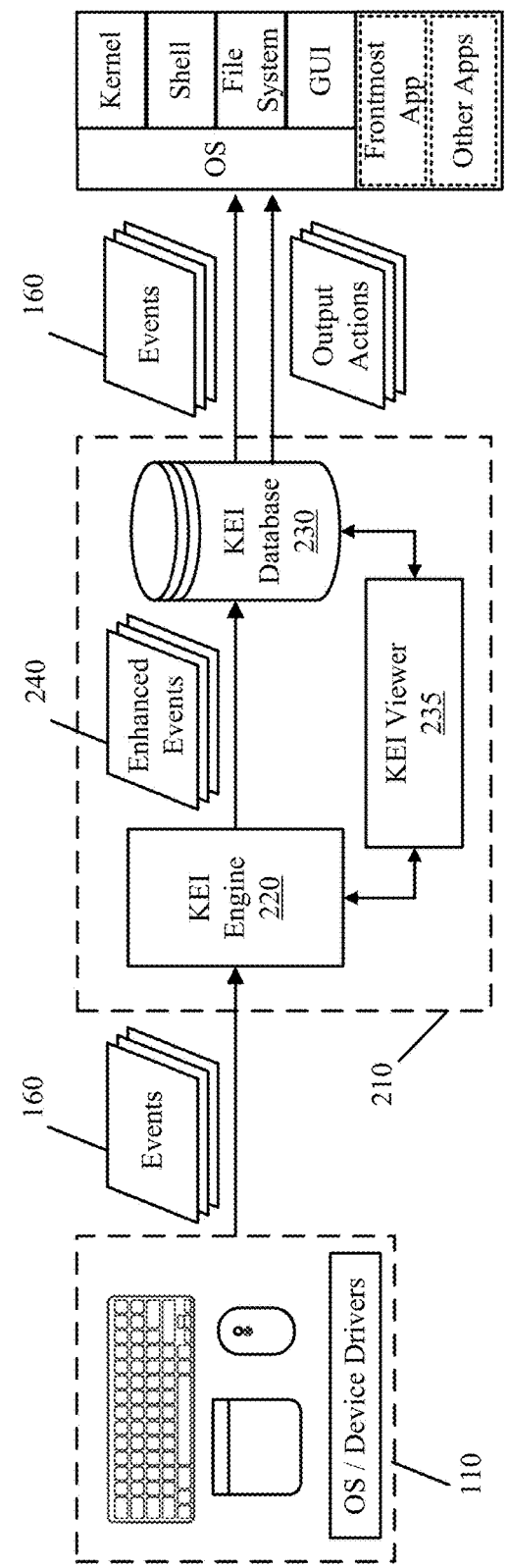
FIG. 2 illustrates enhancing the UI functionality of FIG. 1 with the KEI system of some embodiments.

Some embodiments provide a Keyboard Enhanced Interface (KEI) system that enhances user interface (UI) functionality of a computer system or electronic device. The KEI system provides a dynamically evolving intermediary layer between user interface hardware (i.e., input devices) and operating system (OS) software. Using the KEI system, users can invoke various output actions, navigate a graphical user interface (GUI), and perform text insertion quickly and efficiently with a keyboard. Moreover, users can easily discover and remember key commands, and quickly create mappings between output actions and keyboard keys for later use. FIG. 1 illustrates UI functionality of a computer system or electronic device. FIG. 2 illustrates enhancing the UI functionality of FIG. 1 with the KEI system 210 of some embodiments.

As shown, FIG. 1 includes devices and device drivers 110, OS 130, and frontmost application 140. The devices 110 include a keyboard, mouse, trackpad, keypad, touchscreen tablet, pen based tablet, motion sensors, remote controls, and other devices or interfaces for providing inputs to the computer system or electronic device. User actions that are performed using the devices 110 are converted to events 160 within the computer system or electronic device. These events 160 are generated by various system software that is associated with the devices 110. The system software may include functional components of the OS or device drivers that are associated with the devices 110 as some examples. The OS 130 may also include a window server that dispatches events to appropriate targets (e.g., the frontmost application 140) within the computer system or electronic device. When the window server passes the events 160 to the frontmost application 140, an application event handler of the frontmost application 140 may invoke zero or more application output actions based on the events 160.

In many such computer systems or electronic devices, the events 160 are primarily used to invoke output actions through indirect means. Specifically, the events 160 are issued as a result of user actions that are performed relative to on-screen UI elements instead of the output actions directly. The on-screen UI elements provide graphical representations from which users access the output actions. For example, the user clicks on an on-screen UI element such as a menu item in order to invoke an output action that is associated with the UI element.

Keyboard key presses are user actions that also generate events. In many cases, the keyboard events are ignored by the OS or application event handlers unless (i) a text field of a frontmost application has key focus and a visible text insertion vertical bar, in which case the keyboard events are used to insert characters (type text) or (ii) the keyboard events specify a shortcut key combination that includes various "flag" keys (e.g., ctrl, alt, command, option, shift, etc.). Keyboard events that specify a shortcut key combination are used in some instances to invoke output actions through direct means. For example, when a key press is combined with a press or hold of a flag key, the key press combination specifies a keyboard shortcut for directly invoking an output action (e.g., ctrl-X or command-X to cut a set of characters that is selected). However, most users are unaware of the vast majority of these key press combinations, or do not use the shortcuts because of the inconsistency between applications (e.g., ctrl-B in a web browser application opens a bookmarks window while ctrl-B in a text editing application bolds a set of characters that is selected). A further obstacle that prevents users from using such keyboard shortcuts is the sheer number of shortcuts and the need to memorize the shortcut key combinations in order to effectively use them.

In some embodiments, invoking an output action includes, for example, launching an application, opening a file (e.g., documents, images, videos, audio files, etc.), accessing folders, adjusting a widget, executing scripts, issuing calls to one or more application programming interfaces (APIs) or libraries, and performing other OS, UI, or application operations. In some embodiments, invoking an output action further includes invoking output actions that are associated with UI elements of various applications, windows, views, toolbars, etc. Such UI elements may include any graphical interactive element whose output action can be invoked by clicking or otherwise manipulating the UI element with a keyboard, mouse pointer, or touch when it is displayed on-screen. Some UI elements also accept text insertion.

FIG. 2 illustrates enhancing the UI functionality of FIG. 1 with the KEI system 210 of some embodiments. In some embodiments, the KEI system 210 is integrated as part of the OS, and in some embodiments, the KEI system 210 runs as an application under the OS. The KEI system 210 may be implemented to run on any existing OS (e.g., Apple® OSX, Microsoft Windows®, Linux, etc.). As shown, the KEI system 210 includes KEI engine 220, KEI database 230, and an optional KEI viewer 235. The KEI viewer 235 is described below with reference to FIG. 4.

The KEI engine 220 intercepts events before they pass to the window server or frontmost application event handler. The KEI engine 220 adapts keyboard generated events for the direct invocation of output actions. Specifically, based on the intercepted events and/or system state information, the KEI engine 220 generates enhanced events 240. As will be discussed below, the system state information includes identifying the frontmost application, the key focus of the frontmost application, and whether text is selected in a text field of the frontmost application as some examples. System state information may also include identifying which screen of a multiple screen display or which computer of a multiple computer system has focus.

The enhanced events 240 are passed to the KEI database 230. Based on the enhanced events and/or system state information, the KEI database 230 identifies different output actions that are then directly invoked. In some embodiments, the KEI system 210 may pass existing events 160 to the frontmost application, or the KEI system 210 may create analogous events which are passed to the OS or application event handlers for processing. This may occur in response to enhanced events 240 that do not identify output actions from the KEI database 230.

Figure 3:
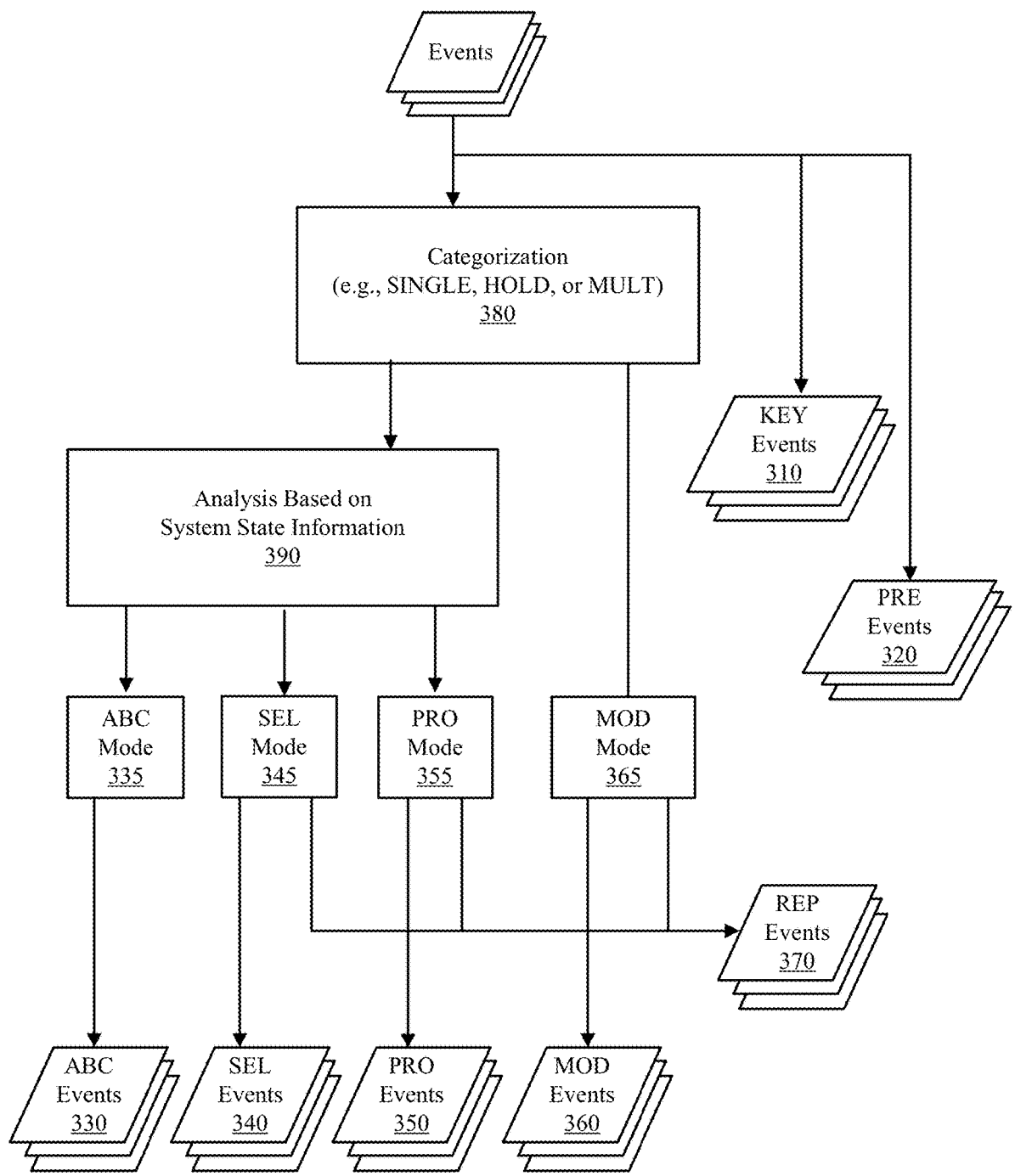
FIG. 3 presents a diagram for generating enhanced events in accordance with some embodiments.

FIG. 3 presents a diagram for generating enhanced events in accordance with some embodiments. The figure includes KEY 310, PRE 320, ABC 330, SEL 340, PRO 350, MOD 360, and REP 370 enhanced events. In some embodiments, a KEY enhanced event 310 is generated for every keyboard key press and key release. The KEY enhanced events mimic actual hardware key presses and key releases and may mirror the input events that are received from the system software.

The PRE events 320 are enhanced events that are optionally generated by the KEI engine based on factors such as an internal state of the KEI engine. The ABC 330, SEL 340, PRO 350, and MOD 360 events are enhanced events that are generated based on an active operational mode of the KEI engine. The operational modes include an ABC operational mode 335, SEL operational mode 345, PRO operational mode 355, and MOD operational mode 365. The KEI engine also generates the REP enhanced event 370 when in the SEL 345, PRO 355, and MOD 365 operational modes.

To determine the active operational mode, the KEI engine categorizes (at 380) the intercepted events by (i) detecting each keyboard key press separately from each keyboard key release and (ii) analyzing the order and timing with which the keyboard keys are pressed and released. In some embodiments, the KEI engine categorizes the keyboard key input events into one of three states: SINGLE, MULT, and HOLD. Based on the categorization, the KEI engine may enter the MOD operational mode 365. To enter the ABC 335, SEL 345, or PRO 355 operational modes, the KEI engine analyzes (at 390) the categorized events in relation to system state information. The KEI engine tracks any change to the frontmost application, the key focus of the frontmost application, whether text is selected in a text field of the frontmost application, and/or any other relevant system state information. Further description for the operational modes is provided below with reference to FIG. 9.

In some embodiments, the KEI engine enters the ABC operational mode 335 when the key focus of the frontmost application is a text field and there are no characters selected within the text field, that is, the text field is ready to accept text input. When the ABC operational mode 335 is active, the KEI system can pass through the existing events to the frontmost application to insert characters into the text field, or the KEI engine can generate analogous events that can be used to insert characters into the text field, or utilize an alternate means, such as a script.

In some embodiments, the KEI engine enters the SEL operational mode 345 when the key focus of the frontmost application is a text field and there are characters that are selected within that text field. When the SEL operational mode 345 is active, the enhanced events 340 generated by the KEI engine can be used to invoke a set of output actions that include output actions for manipulating the selected characters without the use of any flag keys. The set of output actions may also include numerous ways to expand, contract or move the selection, as well as other output actions that are invocable when the characters are selected (e.g., performing a text to speech operation on the selected characters).

In some embodiments, the KEI engine enters the PRO operational mode 355 when the key focus of the frontmost application is not a text field, text area, or UI element that accepts text input. When the PRO operational mode 355 is active, the enhanced events 350 generated by the KEI engine can be used to invoke a set of output actions that are specific to the frontmost application without the use of any flag keys. In some embodiments, when the PRO operational mode 355 is active, the enhanced events 350 can be used to invoke a set of global output actions.

The KEI engine enters the MOD operational mode 365 when one or more keys of the keyboard are held down beyond a particular duration. Based on the particular one or more keys that are held down, the KEI system enables access to different sets of output actions. While the particular one or more keys are held down, the KEI engine generates enhanced events that can be used to invoke the set of output actions, such as launching application, opening files, etc. It should be noted that there are cases when KEI engine may not enter the MOD operational mode, even though more than one key of the keyboard is simultaneously held down. Such cases are described with reference to FIG. 12, specifically at 1250b, wherein text entry keys overlap and ABC remains the active operational mode.

In the manner described above, the enhanced events are used to invoke output actions through direct means. More specifically, there is a direct correspondence between one or more keyboard key presses/releases and the invocation of an output action. Because muscle memory is automatically acquired through repeated use, such output actions can eventually be invoked with negligible mental, visual or physical effort. This is in contrast to the GUI functionality provided by the computer system or electronic device of FIG. 1 wherein an event normally corresponds to the graphical identification and on-screen manipulation of a UI element that identifies an output action and therefore indirectly invokes the output action. In using the enhanced UI functionality provided by the KEI system, users can invoke output actions (i) without the fine motor skills required to select an on-screen UI element to indirectly invoke an output action, (ii) without the delay that is associated with selection of the UI element (i.e., identifying the UI element, navigating to the UI element, and manipulating or touching the UI element), and (iii) without the delay that is associated with moving one's hands away from the keyboard home position (the "asdf" and "jkl;" keys) to operate a mouse, touch a screen, press arrow keys, or press various flag key combinations or function keys. Many of the redundancies, inefficiencies, and frustrations that are associated with the selective operation of existing UIs (e.g., graphical user interfaces) and with existing keyboard shortcuts are therefore eliminated through the functionality that is provided by the KEI system. By adapting the keyboard to serve not only as the primary means to insert characters, but also as the primary means to invoke output actions, the KEI system allows users to develop and utilize muscle memory. In so doing, the KEI system provides a UI that is well suited for frequently invoked output actions whereby output actions can be invoked quickly and with little conscious effort, and without the need for the user to shift mental focus from a directive to a selective mindset.

Figure 4:
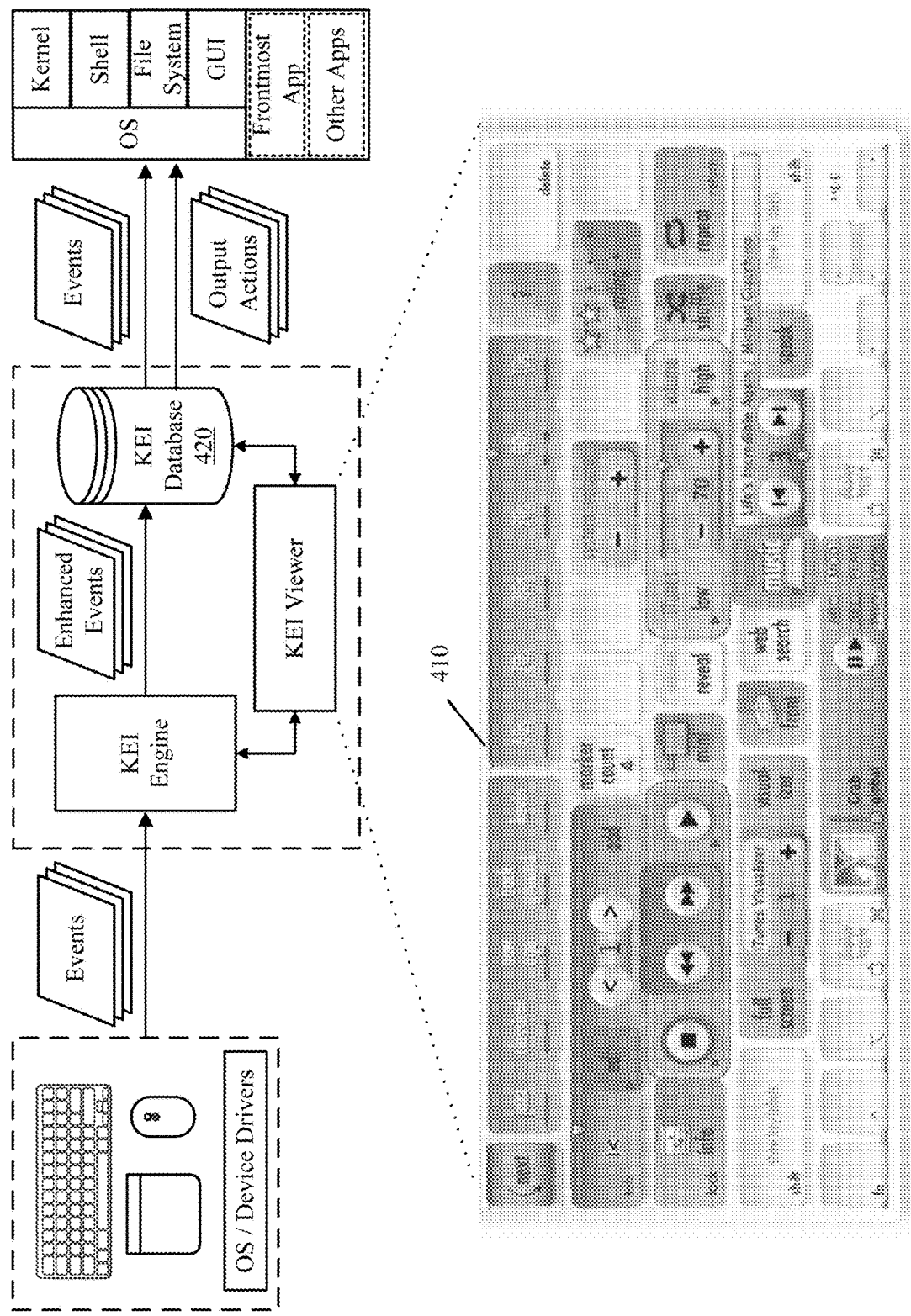
FIG. 4 illustrates the optional KEI viewer of the KEI system in accordance with some embodiments.

FIG. 4 illustrates the optional KEI viewer of the KEI system in accordance with some embodiments. The KEI viewer 410 provides a dynamic visual reference for the output actions that may be invoked using the keyboard keys. Specifically, the KEI viewer 410 displays a set of graphical keys. In some embodiments, the graphical keys correspond to the keys of the keyboard. Displayed over some or all of the graphical keys are various symbols and/or widgets that are provided by the KEI database 420 based on the enhanced events and/or system state information at any point in time.

Each symbol may provide graphical and/or textual descriptions. Audible descriptions may also be associated with a particular graphical key. The descriptions identify an output action that may be invoked using a keyboard key that corresponds to the graphical key over which the symbol is displayed. In some embodiments, a graphical key displays a remotely specified symbol(s) and action over one or more graphical keys of the KEI viewer.

In some embodiments, a widget includes one or more interactive elements that perform one or more output actions. The interactive elements of the widget may also include areas for text insertion (e.g., text fields). The user may manipulate interactive elements of the widget using one or more keyboard keys, or touches that correspond to the one or more graphical keys over which the widget is displayed. Additionally, the user may manipulate interactive elements using the mouse pointer or touch inputs. In some embodiments, a widget provides status information about an application or an application parameter or state. In some embodiments, a widget corresponds to a UI element that exists within the existing UI of an application. In some embodiments, a widget corresponds to a UI element that does not exist within the existing UI of any application, but provides added application or system functionality. In some embodiments, a widget provides control over new functionality for a particular application that has not yet been implemented in the particular application through scripting or any of a variety of means provided by the particular OS.

The KEI viewer may be manually or automatically displayed or hidden at any time without interfering with the operation of the UI, applications, or the KEI engine. The operation of the KEI engine is not dependent on the operation of the KEI viewer. Accordingly, the keyboard keys may be used to invoke output actions using enhanced events of the KEI engine even when the KEI viewer is not displayed on-screen.

Figure 5:
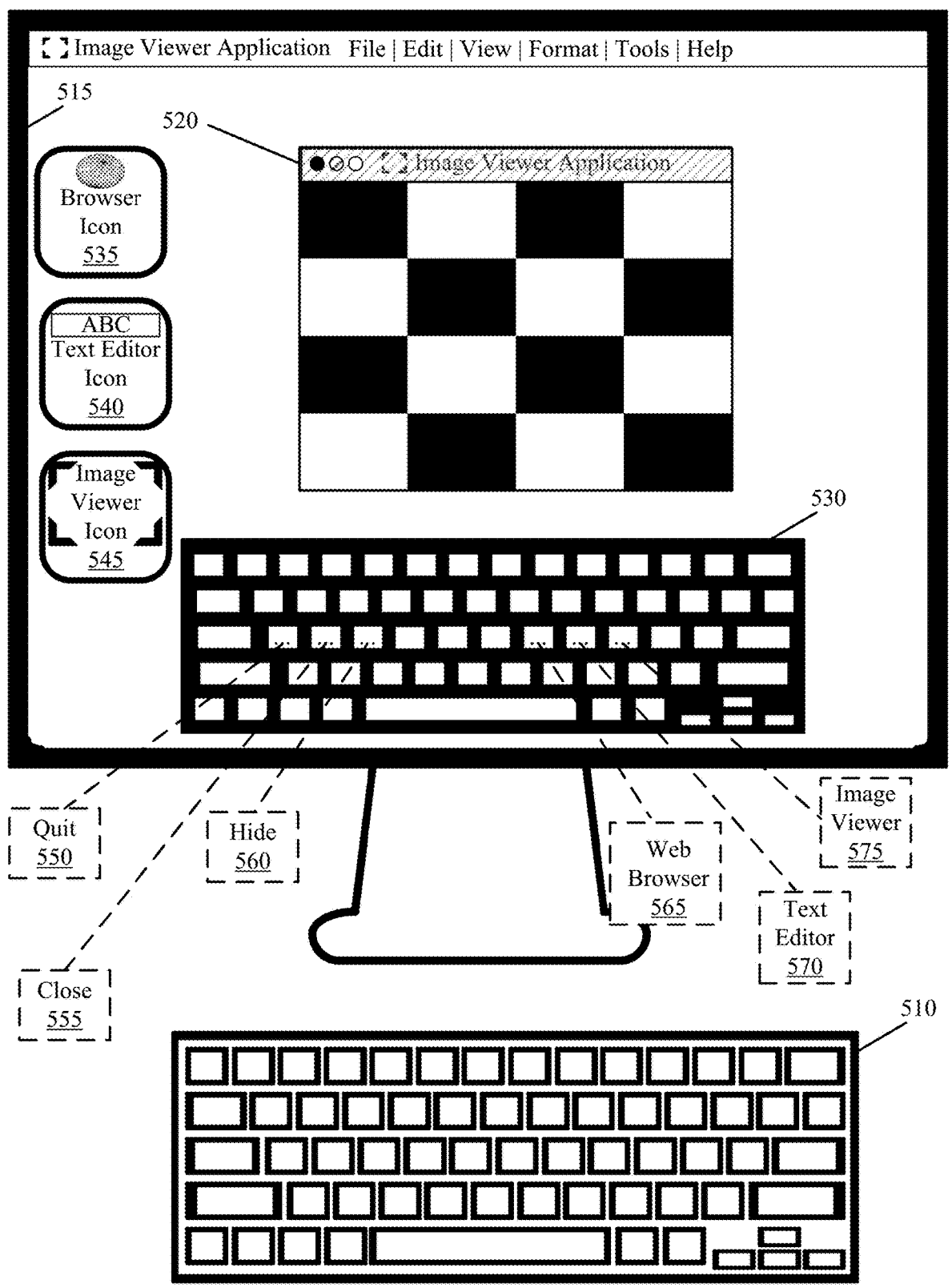
FIG. 5 illustrates operation of the KEI engine in conjunction with the KEI viewer in accordance with some embodiments.

FIG. 5 illustrates operation of the KEI engine in conjunction with the KEI viewer in accordance with some embodiments. The figure includes keyboard 510 and display 515. The display 515 shows frontmost application 520, KEI viewer 530, and application launch icons 535, 540, and 545. The KEI engine is not displayed in the figure, though the KEI engine in this figure and in subsequent figures may include an application or process that is running on the computer system or electronic device or the KEI engine may be incorporated into the system software.

The KEI viewer 530 includes graphical keys that correspond to the keys of the keyboard 510. The KEI viewer 530 displays symbols 550-575 over some of the graphical keys. The symbols 550-575 identify the output actions that may be invoked using the keyboard keys that correspond to the graphical keys over which the symbols 550-575 are displayed. For example, the symbol 565 identifies that a web browser application may be launched using the "J" key. This output action produces the same result as when the user navigates to the web browser launch icon 535 on the desktop and performs a double click over the icon 535 with the mouse. However, by using the enhanced functionality provided by the KEI system, the web browser application may be launched using direct means (i.e., keyboard key press) instead of indirect means whereby the user first identifies the icon 535, then navigates an on-screen pointer to the icon 535 before double clicking on the icon 535 to launch the web browser application. With the enhanced functionality provided by the KEI system, the user is able to invoke the output action without operating a separate spatial dependent device (e.g., mouse or touchscreen). The user's hands remain on the keyboard at all times thereby reducing time, errors, fatigue, and frustration that result from frequent hand repositioning.

From the KEI viewer 530 display, the user can quickly determine which keyboard keys can be used to invoke which output actions. Accordingly, the user does not have to memorize the key presses that invoke the output actions. However, through repeated use, the user is able to automatically take advantage of muscle memory. The same key presses can be repeated to invoke the same output actions. Over time, therefore, the user can invoke output actions without first referencing the KEI viewer.

In addition to or instead of displaying the mapping of output actions to keyboard keys, the symbols of the KEI viewer can be used to display characters or symbols of different languages so that the keyboard keys can be adapted to perform different language character or symbol insertion. For example, the physical keyboard may include characters or symbols of the English alphabet, but the KEI viewer can display Japanese characters, which may include multiple sets such as hiragana, katakana, kanji, and romaji, over the graphical keys. In this example, keyboard key presses will cause the Japanese character displayed over the corresponding graphical key of the KEI viewer to be inserted into a text field that has focus. In some cases, the language of the focused element (e.g., text field) may vary, in which case the KEI system automatically causes the KEI viewer to present the set of characters for insertion which are appropriate for the language of the focused element. For example, when the focused element is a text field containing French text, the TEI viewer presents the set of characters for that language which includes accented characters.

In some embodiments, the KEI engine operates independent of the KEI viewer such that the output actions identified by the symbols 550-575 are still invocable even when the KEI viewer is not displayed on-screen. In some embodiments, users can specify settings that control if and when the KEI viewer is displayed. For example, the KEI viewer is displayed when a first operational mode is active and is not displayed when a second operational mode is active. As another example, users can specify the KEI viewer to display 1 second after a first operational mode becomes active and 2 seconds after a second different operational mode becomes active.

Figure 6:
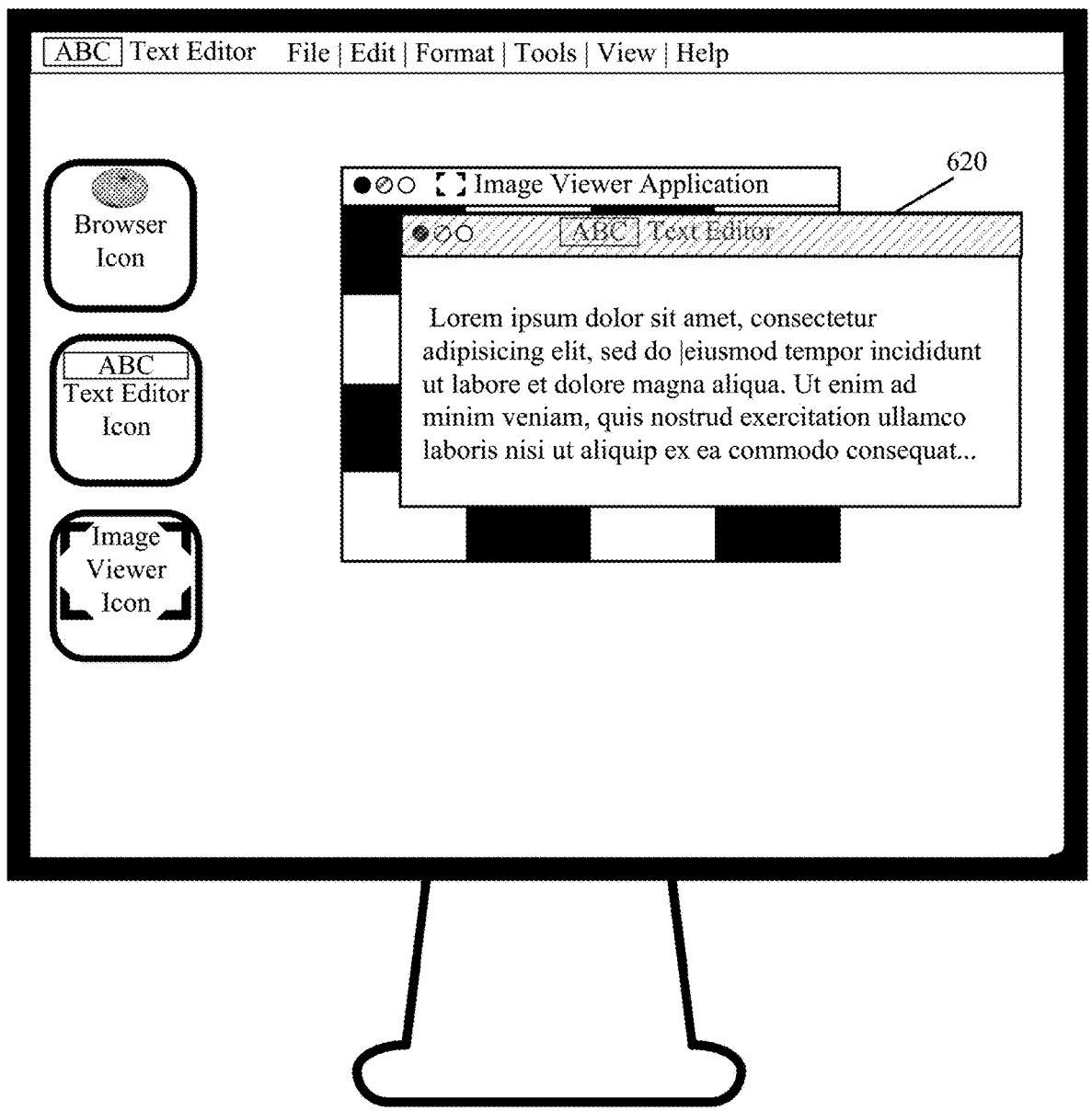
FIG. 6 illustrates using the functionality of the KEI engine to invoke an output action without the KEI viewer being displayed on-screen in accordance with some embodiments.

FIG. 6 illustrates using the functionality of the KEI engine to invoke an output action without the KEI viewer being displayed on-screen in accordance with some embodiments. In this figure, the KEI viewer is not displayed. However, the KEI engine runs in the background to provide access to the output actions that were shown in FIG. 5. Accordingly, when the user taps the "K" keyboard key 610 (as denoted by the horizontal lines), the KEI engine generates the enhanced event that results in the text editor application 620 being launched or brought frontmost.

Figure 7:
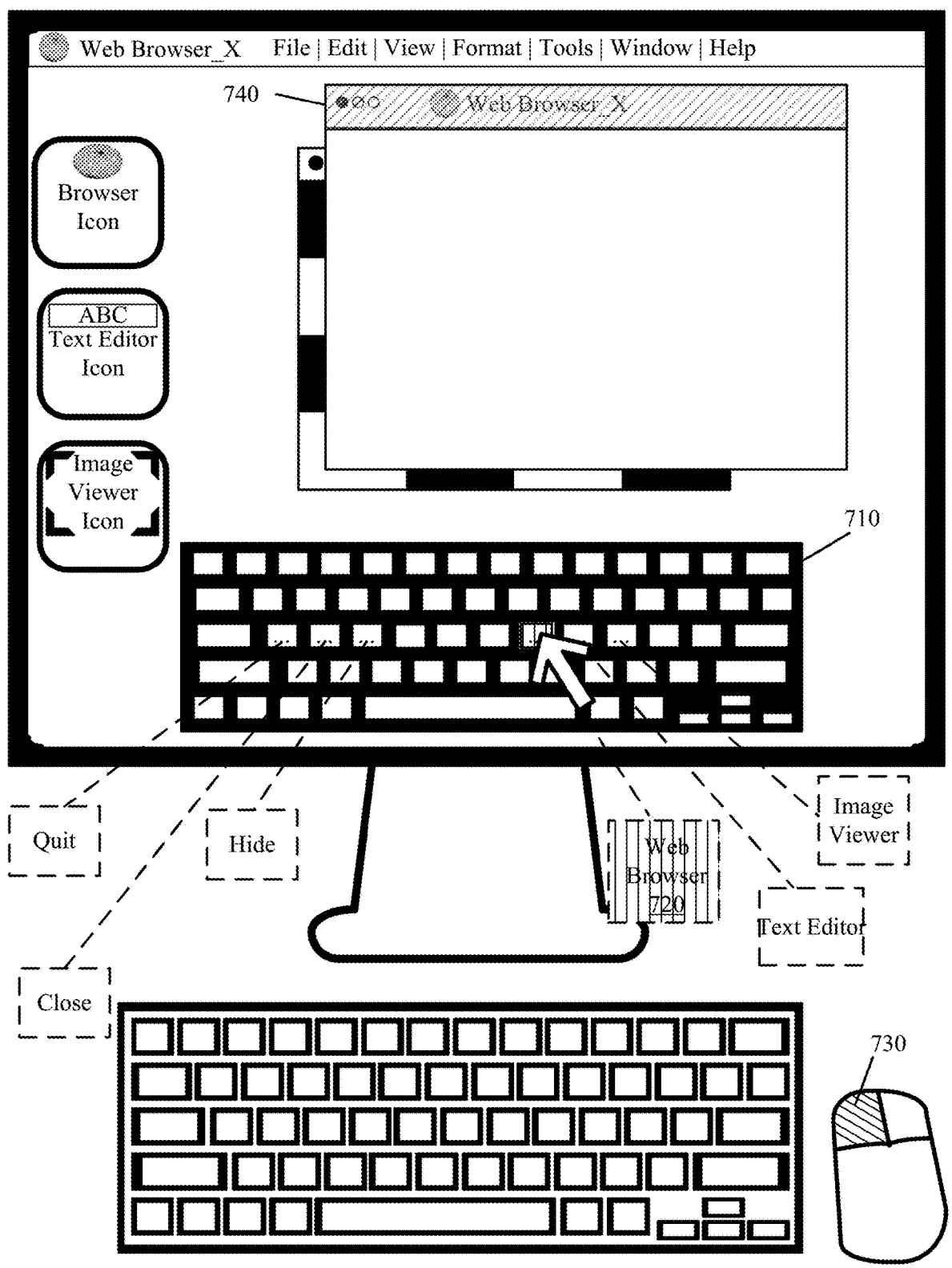
FIG. 7 illustrates invoking an output action by performing a mouse click on a symbol that is displayed over a graphical key of the KEI viewer in accordance with some embodiments.

In some embodiments, other input devices besides the keyboard may be used to invoke output actions. FIG. 7 illustrates invoking an output action by performing a mouse click 730 on a symbol 720 that is displayed over a graphical key of the KEI viewer 710 in accordance with some embodiments. Specifically, the mouse pointer is moved over the symbol 720. Next, the left mouse button is clicked 730 (as denoted by the diagonal lines) once the pointer is positioned over the symbol 720.

The symbol 720 identifies the output action for launching the web browser application 740. Accordingly, when the symbol 720 is clicked, the KEI engine generates the enhanced event that results in the web browser application 740 being launched or brought frontmost.

In some embodiments, when the web browser application 740 is already running in the background, clicking the symbol 720 or tapping the "J" keyboard key that is identified by the symbol 720 causes the web browser application 740 to become frontmost. In some embodiments, when the web browser application 740 is already frontmost, clicking the symbol 720 or tapping the "J" keyboard key hides or minimizes the web browser application 740.

In some embodiments, the KEI system is adaptable to operate in different computing environments. The different computing environments include different operating systems, GUIs, and device form factors. The different computing environments may also include computing devices that have the same OS, GUI, and form factor but that have different installed sets of applications. Accordingly, the KEI system is operable with laptop computers, desktop computers, tablet computing devices, smartphones, portable digital assistants (PDAs), game consoles, media centers, remote controls, and any other computing device with a processor and an input device or input interface for interfacing with the computing device.

Figure 8:
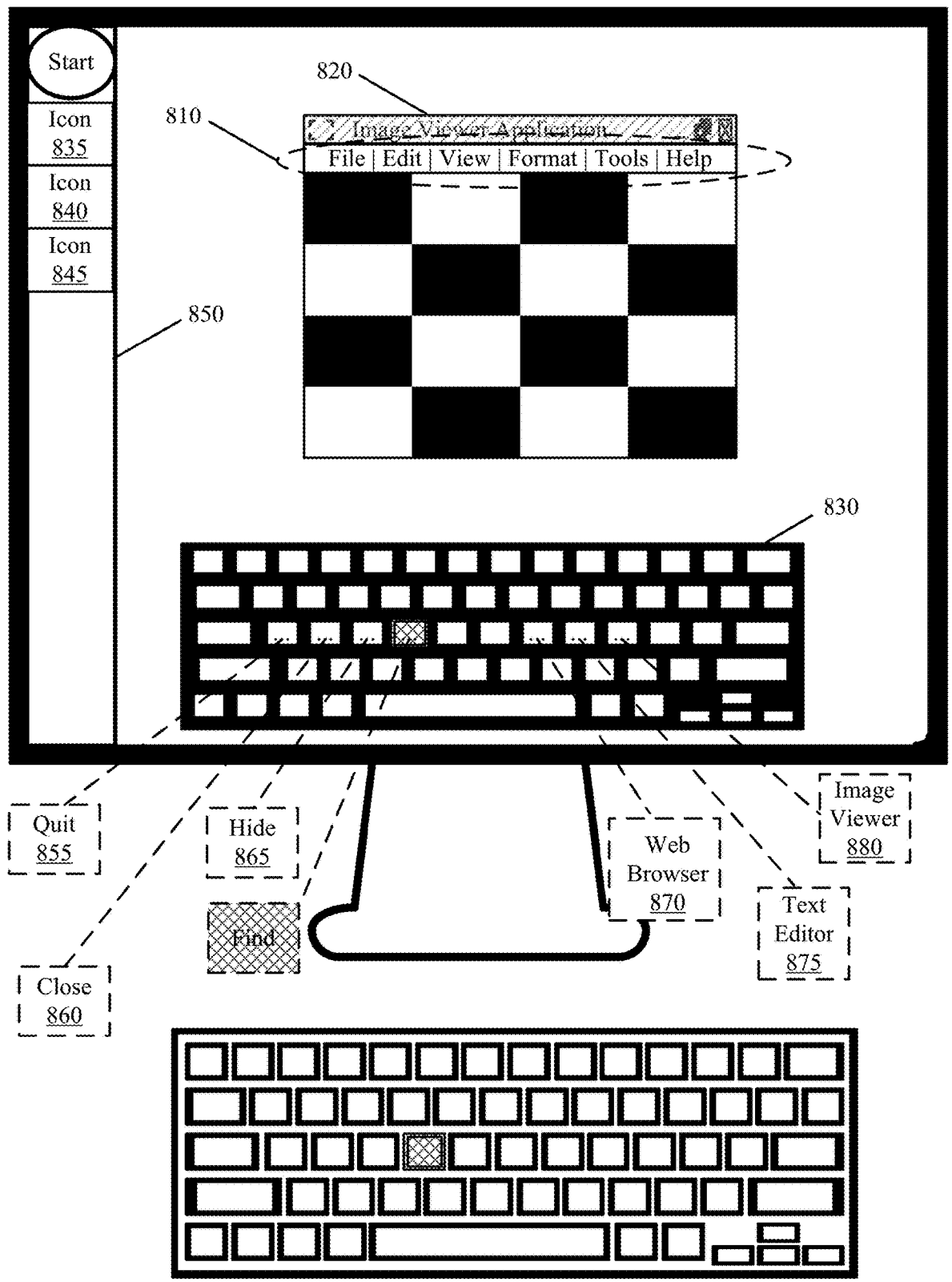
FIG. 8 illustrates operation of the KEI system within a computing environment that is different than that of FIG. 5 above.

FIG. 8 illustrates operation of the KEI system within a computing environment that is different than that of FIG. 5 above. In this computing environment, the application menus 810 for application 820 are included within the window of the application 820 and the launch icons 835-845 are located within a taskbar 850. However the KEI system functionality remains the same. The output actions that are identified by the symbols 855-880 are still invoked using the corresponding keyboard keys.

The subsequent figures are illustrative of a particular device form factor, OS, set of applications and GUI for the sake of clarity and simplicity. However, any device form factor, OS, set of applications, or GUI may be used in conjunction with the KEI system without impacting the KEI system features and the KEI system functionality described hereafter.

II. KEI Engine

In some embodiments, the KEI engine generates enhanced events based on (i) the active operational mode of the KEI engine and/or (ii) system state information. The enhanced events and system state information are then used by the KEI database to (i) identify and invoke different output actions, (ii) determine the set of symbols and widgets for the KEI viewer to display and (iii) any other pertinent data for the identified enhanced event, such as audio feedback or speech synthesis confirmation.

A. Operational Modes

Figure 9:
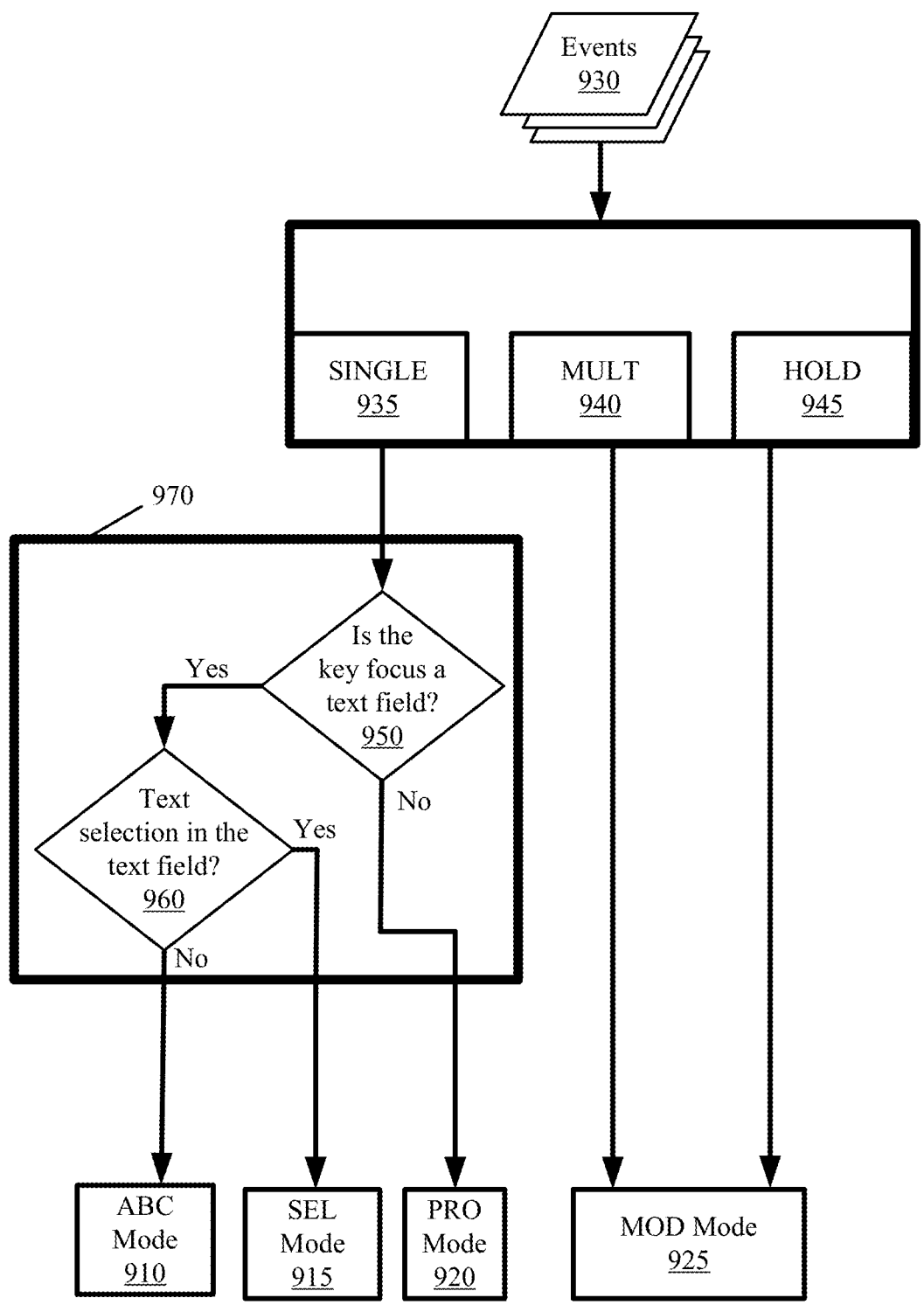
FIG. 9 presents the various operational modes and presents a flow diagram for generating the various enhanced events in accordance with some embodiments.

FIG. 9 presents the various operational modes and presents a flow diagram for generating the various enhanced events in accordance with some embodiments. As noted above, the operational modes include: (1) ABC operational mode 910, (2) SEL operational mode 915, (3) PRO operational mode 920, and (4) MOD operational mode 925. The KEI engine may specify additional or fewer operational modes and different nomenclature may be used to reference the operational modes.

Generating the enhanced events for the operational modes is a multistage process. The first stage analyzes events 930 that are intercepted from the system software. The events 930 include input events that identify which keys of the keyboard are pressed and which keys are released. In addition to tracking which keys are pressed and released and their timing, the KEI engine tracks the duration each key is held down and tracks the timing relationships between all key activity and interaction. Timers are used to track these timing relationships. In some embodiments, the KEI engine categorizes the keyboard keys specified by the input events into one of three states: SINGLE 935, MULT 940, and HOLD 945.

The KEI engine categorizes input events that are issued using a normal key tap to the SINGLE 935 state. A normal key tap involves a key press and release of the same key before a particular time threshold is satisfied, and in the absence of any other key being down. In some embodiments, the time threshold is defined as a duration that if exceeded will cause the threshold to be satisfied. Accordingly, the KEI engine receives a first input event to indicate that a particular key is pressed and a second input event to indicate that the particular key is released. By monitoring the timing between the events, the KEI engine determines whether the particular key is held down beyond a particular time threshold. In some embodiments, the particular time threshold is 300 milliseconds (ms). As one skilled in the art would understand in light of the present description, the particular time threshold can be greater or less than 300 ms in some other embodiments. In some embodiments, the KEI engine adapts the particular time threshold according to the average time it takes for a user to issue a key tap and/or other factors and user preferences. When performing key taps, some users hold the keys down longer than other users. For users that perform longer key taps (i.e., the keys are held down longer for each tap), the KEI engine may increase the particular time threshold to be greater than 300 ms. For users that perform quicker key taps, the KEI engine may decrease the particular time threshold to be less than 300 ms. In some embodiments, the KEI engine also monitors key presses to detect reversal of unintended actions and adjust timings to minimize reoccurrence of such unintended actions (as described below in the section entitled "Assistive Operation").

The KEI engine categorizes a key that is held down beyond the particular time threshold (i.e., 300 ms) before being released to the HOLD 945 state. In some embodiments, a key press that occurs in conjunction with another key that has been held down beyond the particular time threshold is categorized to the MULT 940 state. Keys that are categorized to the MULT 940 state or the HOLD 945 state are used by the KEI engine to generate enhanced events in the MOD operational mode 925.

Figure 10A:
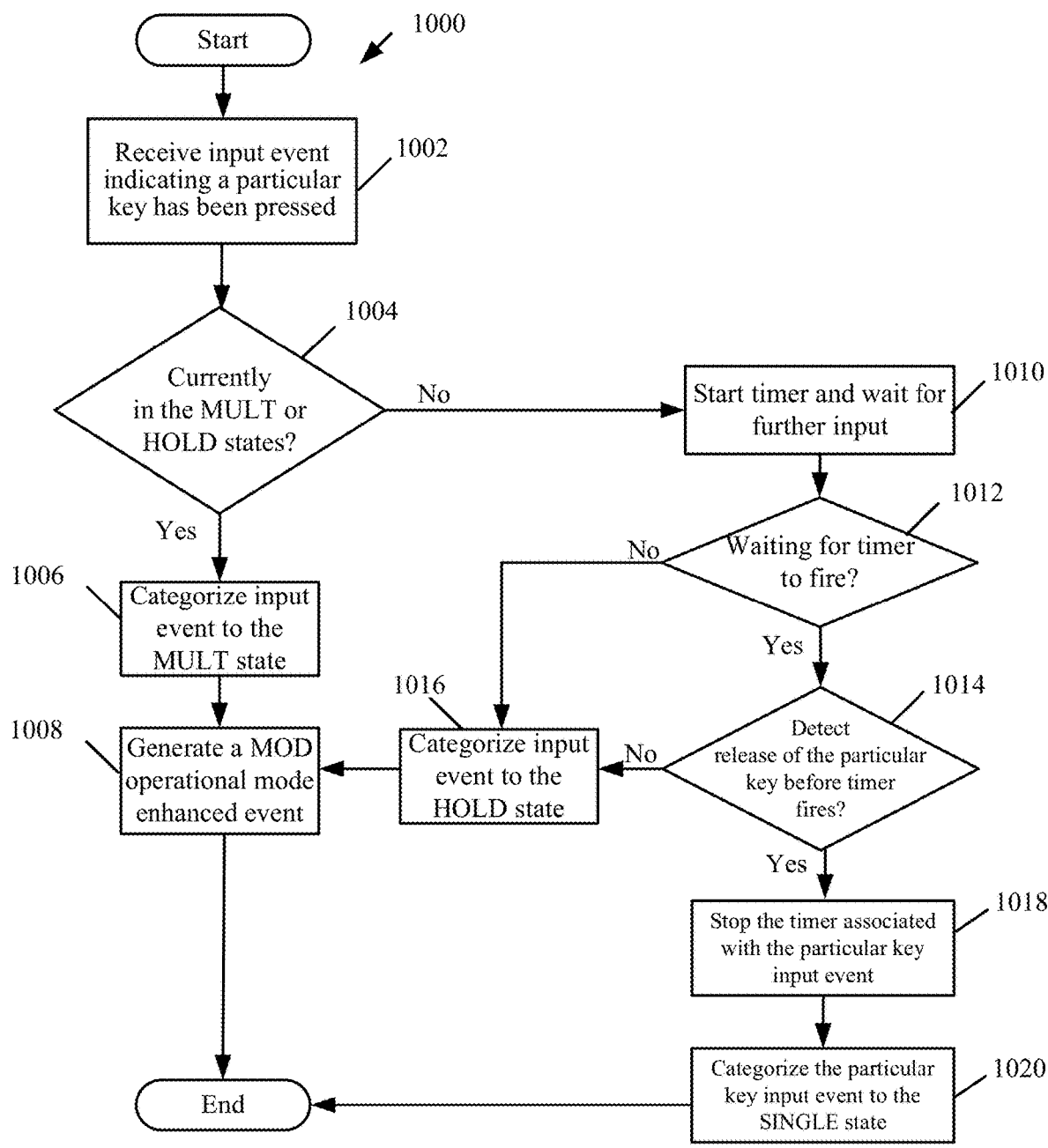
FIG. 10a presents a process performed by the KEI engine to categorize keys identified by the KEY events to the SINGLE, HOLD, and MULT states in accordance with some embodiments.

FIG. 10*a* presents a process 1000 performed by the KEI engine to categorize keys identified by the KEY enhanced events to the SINGLE 935, MULT 940, and HOLD 945 states in accordance with some embodiments. The process 1000 begins when the KEI engine receives (at 1002) an input event that indicates a particular key has been pressed.

The process determines (at 1004) whether the received event can be categorized to the MULT state. The received event is categorized to the MULT state when at least one previously issued input event is categorized to and remains in either the HOLD state or the MULT state. When a previously issued input event remains in the HOLD state or the MULT state, the newly received input event will be categorized (at 1006) with the previously issued input event(s) to the MULT state. Consequently, the KEI engine generates (at 1008) a particular MOD operational mode enhanced event that is associated with the input events in the MULT state. Otherwise, the process starts (at 1010) a timer for the received input event and then waits for further input. As will be shown in FIG. 10*b*, the further input can include waiting for the timer to fire, receiving an input event for another key being pressed, or receiving an input event for the particular key being released. The timer fires when the press of the particular key is retained beyond the particular time threshold that is specified for the HOLD state. When the further input is a different key press other than that of the particular key, the process 1000 is restarted using the input that is the different key press, and the combined key presses (i.e., the particular key and other key presses) are categorized (at 1006) to the MULT state. Otherwise, the process determines (at 1012) if the further input is the timer firing or determines (at 1014) if the further input is the particular key being released.

When the further input is the timer firing, the process categorizes (at 1016) the input event that is associated with the particular key being pressed to the HOLD state and the process generates (at 1008) an enhanced event for the particular MOD operational mode that is associated with the received event in the HOLD state. The MOD operational mode remains active so long as any key remains held down.

When the further input is the particular key being released before the timer firing, the process stops (at 1018) the timer that is associated with the particular key and categorizes (at 1020) the input event to the SINGLE state. In some embodiments, the timer and order in which input events are issued is monitored to detect reversal of unintended actions and adjust timings to minimize reoccurrence of such unintended actions as noted in the section below entitled "Assistive Operation". Also, in some embodiments, there may be more than one timer utilized, so that further states can be categorized. For instance, within a very short time such as 20 ms, events may be considered to be essentially simultaneous and categorized as MOD, and within a longer but still short amount of time such as 50 ms the events may be categorized as ABC (if ABC is already the current active mode of the KEI engine).

Figure 10B:
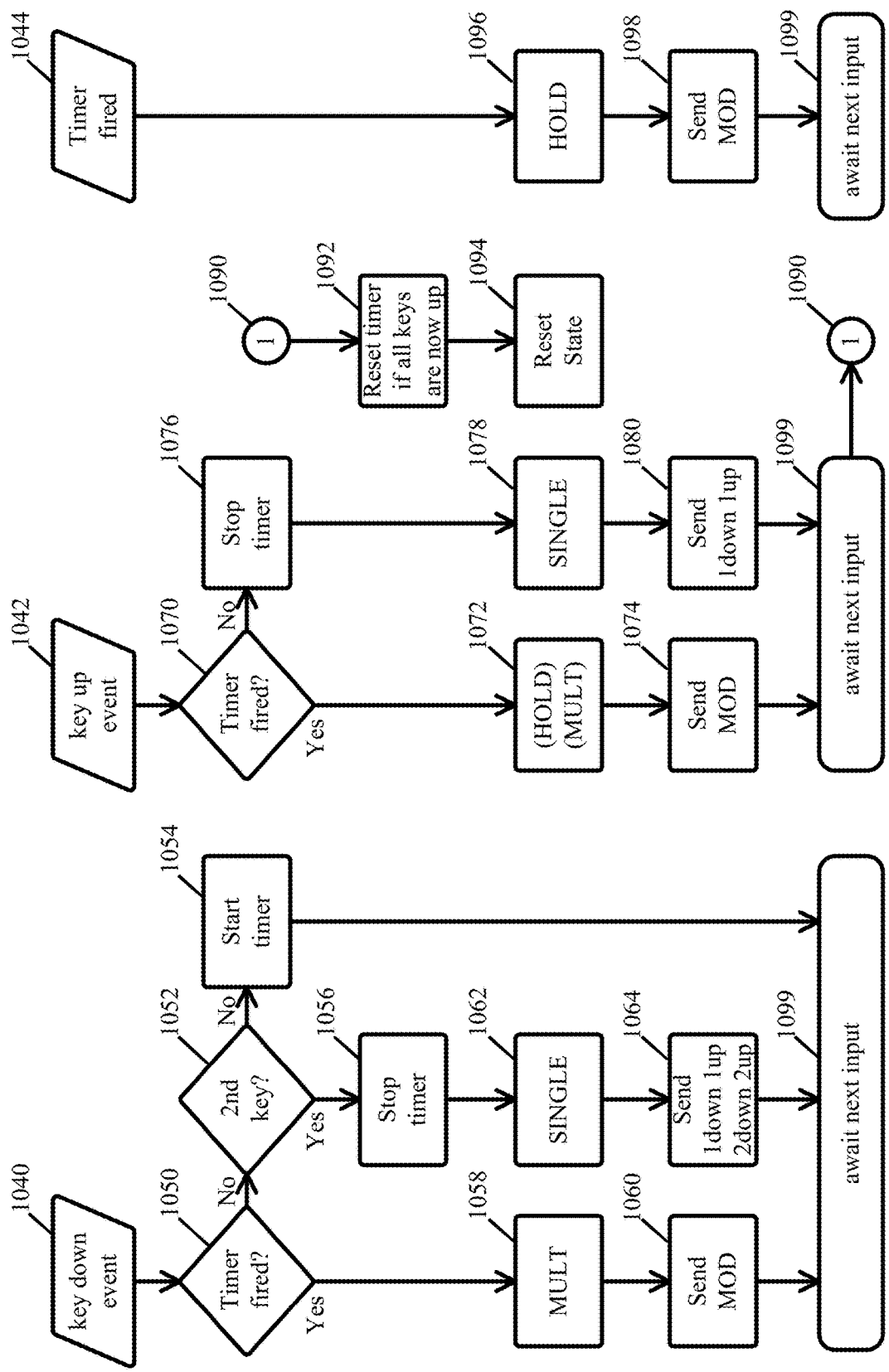
FIG. 10b provides further detail for categorizing input events to one of the SINGLE, HOLD, or MULT states in accordance with the process described with reference to FIG. 10a above.

FIG. 10*b* provides further detail for categorizing input events to one of the SINGLE 935, MULT 940, or HOLD 945 states in accordance with the process described with reference to FIG. 10*a* above. The KEI Engine receives an input indicating either a key press (at 1040), a key release (at 1042), or a timer fire (at 1044). A timer fire input is received when a particular time threshold associated with a particular key press is reached and the timer has not been previously stopped (at 1056) by a subsequent additional key press (at 1052) or stopped (at 1076) by a subsequent key release of the particular key press that was received (at 1040).

When a particular key press input is determined (at 1040), the timer state is examined (at 1050) and if the timer has fired, the KEI engine categorizes (at 1058) the particular key press input to the MULT state. Thereafter, the KEI engine enters (or retains) the MOD operational mode, and the key down event that was just received (at 1040) is sent (at 1060) as a MOD enhanced event. The KEI engine then awaits (at 1099) further input. If the timer has not fired (at 1050), a determination (at 1052) is made whether a second key press exists. If only the one particular key press exists, the process starts (at 1054) the timer and awaits (at 1099) further input. If a second key press exists, the process stops (at 1056) the timer and the KEI engine categorizes (at 1062) the inputs to the SINGLE state. Thereafter, four distinct enhanced events are sent (at 1064); (1) the 1st key down event which was previously received (at 1040), (2) a generated key up event that corresponds to the 1st key down event, (3) the 2nd key down event which was just received (at 1040), and (4) a generated key up event that corresponds to the 2nd key down event. These four enhanced events are sent sequentially in a speed that has been determined to be appropriate for the OS and host hardware device. The enhanced events are categorized as ABC, SEL, or PRO enhanced events according to the second stage of analysis as referenced below at 970 of FIG. 9. The enhanced events will be sent by the KEI engine to the KEI database to trigger matching output actions. The KEI engine then awaits (at 1099) next input.

It should be noted that in rare cases where the user is not releasing keys quickly, there may be three or more keys simultaneously depressed for brief periods of time. Key down events that are received when there are already two or more keys down are treated as a 2nd key at 1052 and categorized to the SINGLE state (at 1062), except that the four enhanced events are not sent at 1064. Instead, the single received key down event (at 1040) is sent as ABC, SEL or PRO enhanced events according to the second stage of analysis (970) referenced above. Similarly, a key up event that occurs when there are already two or more keys down and the timer has not fired (at 1070) is categorized (at 1078) to the SINGLE state, but just the single received key up event (at 1042) is sent (at 1080) as an ABC, SEL, or PRO enhanced event.

In some embodiments, simultaneous key presses that occur while in the SINGLE state are disallowed when the second stage of analysis (970) determines that SEL or PRO operational mode is active. This is because unlike when typing characters, commands (that would be issued in the SEL or PRO operational modes) are normally not typed in an overlapping manner. In some embodiments, the KEI engine also disallows very rapid command input in the SEL and PRO operational modes, especially after there has been a period of keyboard inactivity, or the commands are not related (e.g., up, down, left, right).

When a particular key release input is determined (at 1042), the timer state is examined (at 1070). After it has been determined (at 1070) that the timer has previously fired, the KEI engine will be in either the HOLD state (previously set at 1096) or the MULT state (previously set at 1058). This is shown (at 1072) in parenthesis, because the state does not need to change. Both the HOLD state and the MULT states result in the KEI engine entering or retaining the MOD operational mode, and sending (at 1074) a MOD enhanced event. If the timer has not fired, the timer is stopped (at 1076) to prevent the timer from firing and the KEI Engine categorizes (at 1078) input(s) to the SINGLE state. Thereafter, two distinct enhanced events are sent (at 1080); (1) the 1st key down event which was previously received (at 1040), and (2) the key up event that was just received (at 1042). Depending on the second stage of analysis (970), the appropriate operational mode is set, and these two enhanced events will be sent as ABC, SEL or PRO enhanced events. The KEI engine then awaits (at 1099) further input.

After the operational mode is established and the enhanced events are sent (at either 1074 or 1080), an additional step is required (at 1090) to test whether all keys are now up. If so, the timer is reset (at 1092) to the un-fired state, and the state is also reset (at 1094) and therefore no longer valid. In other words, further key up, key down, and timer activity will be required before a state can be re-established. In some embodiments, the MOD operational mode is exited because there are no keys down, and the operational mode that was in effect prior to the MOD operational mode (ABC, SEL or PRO) is re-established (as described below in Section III D).

When a timer fire is determined (at 1044), the corresponding key press that started the time is categorized (at 1096) to the HOLD state. Thereafter, the MOD operational mode is entered, and the previous key down event (at 1040) that started the timer (at 1054) is sent as a MOD enhanced event (at 1098). The KEI engine then awaits (at 1099) further input.

Reference is now made back to FIG. 9 to discuss the KEI engine entering the various operational modes (ABC 910, SEL 915, PRO 920, and MOD 925) based on the above categorization of inputs to one of the three states: SINGLE 935, MULT 940, and HOLD 945. When the SINGLE state is active (i.e., the KEI engine categorizes one or more inputs to the SINGLE state), a further evaluation of the system focus (at 950 and 960) by the KEI engine determines which of the three operational modes ABC (910), SEL (915) or PRO (920) will generate an enhanced event. Further, when the MULT state (940) or HOLD state (945) is active, the operational mode is determined to be MOD (925).

As was noted above, generating an enhanced event for an input event that is categorized to the SINGLE state requires a second stage of analysis (970). As shown in FIG. 9, the second stage of analysis (970) is dependent on various system state information. In some embodiments, the system state information includes identifying the frontmost application, the key focus of the frontmost application, and whether the key focus is a text field with a set of selected characters.

In some embodiments, the KEI engine acquires the system state information by executing appropriate API calls when the KEI system is initialized. The API calls cause the OS to push requested system state information to the KEI system whenever the requested system state information changes. In some embodiments, the OS does not push any system state information to the KEI engine. Rather, the KEI system periodically monitors the frontmost application, the key focus within the frontmost application, and whether the key focus is a text field with a set of selected characters, among other relevant state information as required.

In FIG. 9, the KEI engine determines (at 950) whether the key focus of the frontmost application is a text field. When the key focus of the frontmost application is not a text field or it is otherwise determined that text input is not valid, the KEI engine enters the PRO operational mode 920. When the PRO operational mode 920 is active, the KEI engine may generate enhanced events that can be used to invoke a set of output actions that are specific to a particular state of the frontmost application. In some embodiments, the set of output actions for the PRO operational mode for the frontmost application is provided by the application developer when the application is installed. Users can also customize the output actions for the PRO operational mode of each application as is described in KEI customizations section below.

When the key focus of the frontmost application is a text field, the KEI engine next determines (at 960) whether characters are currently selected within the text field. When characters are selected, the KEI engine enters the SEL operational mode 915. When the SEL operational mode 915 is active, the KEI engine generates enhanced events that can be used to invoke a set of output actions that include output actions for manipulating the selected characters (e.g., bold, italicize, etc.) without the use of any "flag" keys (e.g., ctrl, alt, command, option, shift, etc.). The enhanced events may also contract, expand, or move the selection, or invoke other output actions that are not be related to the manipulation of the selected characters (e.g., reading the selection with the text to speech function).

When no characters are selected within a focused text field, the KEI engine enters the ABC operational mode 910. When the ABC operational mode 910 is active, the KEI engine passes through the intercepted events or generates one or more enhanced events that can be used to insert characters in the text field.

B. Enhanced Events

In some embodiments, the enhanced events generated by the KEI engine include a KEY enhanced event, an optional PRE enhanced event, an ABC/SEL/PRO/MOD enhanced event that is generated based on the active operational mode, and an optional REP enhanced event.

i. KEY Enhanced Event

The KEI engine generates the KEY enhanced event with every key press and every key release. Specifically, the KEY enhanced events mimic actual hardware key presses and key releases. In some embodiments, the KEY enhanced event is used when certain keyboard keys are used to invoke certain output actions irrespective of the active operational mode or other parameters.

The examples below present various KEY enhanced events that are generated by the KEI engine. When the "A" key is pressed, the KEI engine generates the KEY enhanced event:

$$KEY\_a \quad (1)$$

When the "A" key is released, the KEI engine generates the KEY enhanced event:

$$KEY\_A \quad (2)$$

A lower case character within the KEY enhanced event indicates that a key has been pressed and an upper case character indicates that the key has been released.

ii. ABC/SEL/PRO/MOD Enhanced Event

A second enhanced event that is generated by the KEI engine is the ABC/SEL/PRO/MOD enhanced event. The format of this enhanced event is based on the active operational mode. As described above, the ABC, SEL, and PRO operational modes become active based on system state information that identifies at least the frontmost application, whether the key focus of the frontmost application is on a text field, whether characters are selected within the text field, and other factors such as the examples illustrated in FIGS. 11 and 12. The MOD operational mode overrides the ABC, SEL, and PRO operational modes and becomes active based on user inputs that are categorized to the HOLD or MULT states.

When the ABC operational mode is active, the KEI engine generates an ABC enhanced event for each key press and each key release. For example, pressing and releasing the "A" and "E" keys generate the ABC enhanced events:

$$ABC\_a \quad (3)$$

$$ABC\_A \quad (4)$$

$$ABC\_e \quad (5)$$

$$ABC\_E \quad (6)$$

Additionally, the ABC enhanced event format identifies "flag" keys using numerals that precede the character. Therefore, when the user presses and holds down the shift key and presses the "A" key, the KEI engine generates the KEY enhanced event:

$$ABC\_1a \quad (7)$$

The number "1" preceding the letter "a" indicates that the "shift" key was down when the "A" key is pressed. The shift key is one of several "flag" keys. Other flag keys include the "ctrl", "alt", "option", and "command" keys of the keyboard. Each flag key is denoted by a different numeral in the ABC enhanced event. In some embodiments, the information within the ABC enhanced event is ordered such that the flag keys are presented in numeric ordering. Pressing and holding down the "ctrl" key denoted by the number "2" before pressing and holding down the shift key with the "Z" key generates the ABC enhanced event:

$$ABC\_12z \quad (8)$$

In some embodiments, when one or more flag keys are held down and an additional non-flag key is tapped, the KEI engine generates an ABC message even when the KEI engine is in the SEL or PRO operational mode. This enables the user to issue a command using traditional flag key combinations which may already be ingrained in their muscle memory.

In some embodiments, the KEI engine does not self-generate ABC enhanced events. Instead, the KEI engine passes the input events that are intercepted from the OS through to the window server or frontmost application event handler, just as though the KEI system was not installed. In this manner, the KEI system has no apparent affect on how applications perform normal character insertion or execute flag key commands.

When the SEL operational mode is active, the KEI engine normally generates a SEL enhanced event for each key press and each key release. For example, pressing and releasing the "W" key generates the SEL enhanced events:

$$SEL\_w \quad (9)$$

$$SEL\_W \quad (10)$$

When the PRO operational mode is active, the KEI engine normally generates a PRO enhanced event for each key press and each key release. For example, pressing and releasing the "N" key generates the PRO enhanced events:

$$PRO\_n \quad (11)$$

$$PRO\_N \quad (12)$$

When the MOD operational mode is active, the KEI engine generates a MOD enhanced event that accounts for the order in which keys are pressed. The KEI engine generates a MOD enhanced event when a particular key is held down beyond the particular time threshold that categorizes the key to the HOLD state. The KEI engine also generates MOD enhanced events when one or more subsequent keys are pressed when the MOD operational mode is already specified by a key that has been held down beyond the particular time threshold. The MOD enhanced events below illustrate a sequence of key presses, holds, and releases and the corresponding MOD enhanced events:

| | | |
|---|---|---|
| "M" is held down beyond the time threshold-> | MOD_m | (13) |
| "M" remains held and "B" is pressed-> | MOD_m_b | (14) |
| "M" remains held and "B" is released-> | MOD_m_B | (15) |
| "M" remains held and "C" is pressed -> | MOD_m_c | (16) |
| "M" and "C" remain held and "D" is pressed-> | MOD_m_c_d | (17) |
| "M" and "D" remain held and "C" is released-> | MOD_m_C_d | (18) |
| "D" remains held and "M" is released-> | MOD_M_C_d | (19) |
| All keys are released-> | MOD_M_C_D, MOD_M_C, and MOD_M | (20) |

As shown, the MOD enhanced events track the key press ordering. Keys that are released are removed only when they are the last key designated in the MOD enhanced event. Otherwise, the released key is denoted by an uppercase letter and the key is subsequently removed when it becomes the last key in the MOD enhanced event.

In some embodiments, when the MOD operational mode first becomes active from a different operational mode (ABC, SEL, or PRO), the KEI engine generates a MOD_start enhanced event. When all keys are released, the KEI engine generates a MOD_end enhanced event. In some embodiments, the MOD_start and MOD_end messages are used to update the display of the KEI viewer with the symbols and widgets of the active MOD operational mode or to revert the symbols and widgets to a previous ABC, SEL, or PRO operational mode when the MOD operational mode is exited.

iii. Chord

In some embodiments, pressing two or more keyboards keys at essentially the same time (i.e., within 10 or fewer milliseconds of each other) causes the KEI engine to generate a "chord" designation which treats the keys as a single entity within a MOD enhanced event. A chord is designated as a sequence of letters in combination that identify which keys were pressed together. The chord designation within a MOD enhanced event can be used to invoke different output actions than when pressing the two or more keys in combination but not at the same instance in time. For example, when the "A" key is held down to enter the MOD "A"

operational mode and the "J" and "K" keys are simultaneously pressed, the KEI engine generates the following enhanced event:

$$\text{MOD\_}a\_jk \quad (21)$$

This is in contrast to holding the "A" key down to enter the MOD "A" operational mode, pressing the "J" key, and pressing the "K" key at least 10 ms after pressing the "J" key. In this instance, the KEI engine generates the enhanced event:

$$\text{MOD\_}a\_j\_k \quad (22)$$

Entries in the KEI database can be specified so that different output actions are invoked when the enhanced event (21) is generated than when the enhanced event (22) is generated. In some embodiments, the time threshold for determining near simultaneous presses is user or system adjustable to be greater or less than 10 ms, and may change dynamically.

When a chord designation has been determined, the keys that make up the chord are always represented in alphabetical order. This standardizes the identification of output actions in the KEI database. It should also be noted that if a chord designation as been determined, the MOD operational mode is entered without the need to first determine if the keys are held beyond a time threshold in some embodiments.

iv. REP Enhanced Event

In some embodiments, the REP enhanced event facilitates a many-to-one output action to keyboard key mapping whereby multiple output actions may be invoked using the same particular keyboard key. The REP enhanced event is generated subsequent to SEL/PRO/MOD enhanced events in some embodiments.

Prior to issuing the REP enhanced event, the KEI engine detects the number of times a particular key is tapped in rapid succession. In some embodiments, REP detects up to five taps of a particular key in rapid succession. The KEI engine generates the REP enhanced event when the particular key is not tapped within a particular duration of a prior tap or the sequence of taps of the particular key is interrupted by another key press or release.

In some embodiments, each tap of a particular key that is issued within 200 ms of a prior tap of the particular key is included within the REP enhanced event. When another key is pressed or released, or the 200 ms duration expires, the KEI engine generates the REP enhanced event to indicate the number of times the particular key was tapped in succession. Furthermore, a REP may be completed with the particular key being held down or with the particular key being released. A different enhanced event is generated based on how the tap is completed. For example, when the "Q" key is tapped once and released within 200 ms, the KEI engine generates the REP enhanced event:

$$\text{REP1\_}Q \quad (23)$$

When the "Q" key is tapped once and then pressed again and held down, with each key press or release occurring within 200 ms of a prior key press or release, the KEI engine generates the REP enhanced event:

$$\text{REP2\_}q \quad (24)$$

When the "Q" key is tapped three times with each tap occurring within 200 ms of a prior tap and the third tap is released at the completion of the tap, the KEI engine generates the REP enhanced event:

$$\text{REP3\_}Q \quad (25)$$

v. Optional PRE Enhanced Event

The KEI engine may also generate optional PRE enhanced events depending on the key being pressed, the active operational mode, system state information, or other factors such as an internal state of the KEI engine. Specifically, the KEI engine may include various rules for generating the PRE enhanced event. The enhanced event format is similar to the format of the above enhanced events and may include additional modifiers. For example, a rule may be defined whereby the KEI engine generates optional PRE enhanced events when one or more operational modes map symbols for a numeric keypad to a common set of keyboard keys. For all such operational modes, the "I", "O", "P", "K", "L", ";", ",", ".", and "/" keyboard keys may be used to issue numbers 0-9 from a numeric keypad. The PRE enhanced events allow the KEI engine to generate a common set of enhanced events for the numeric keypad functionality irrespective of the active operational mode. In so doing, the same output actions in the KEI database can be invoked, which supersedes of the operational mode from which the numeric keypad functionality is accessed. Therefore, pressing the "I" keyboard key, when an operational mode that maps a numeric keypad to the keyboard keys is active, generates the PRE enhanced event:

$$\text{PRE\_numeric\_}i \quad (26)$$

vi. Enhanced Event Generation

Figure 12:
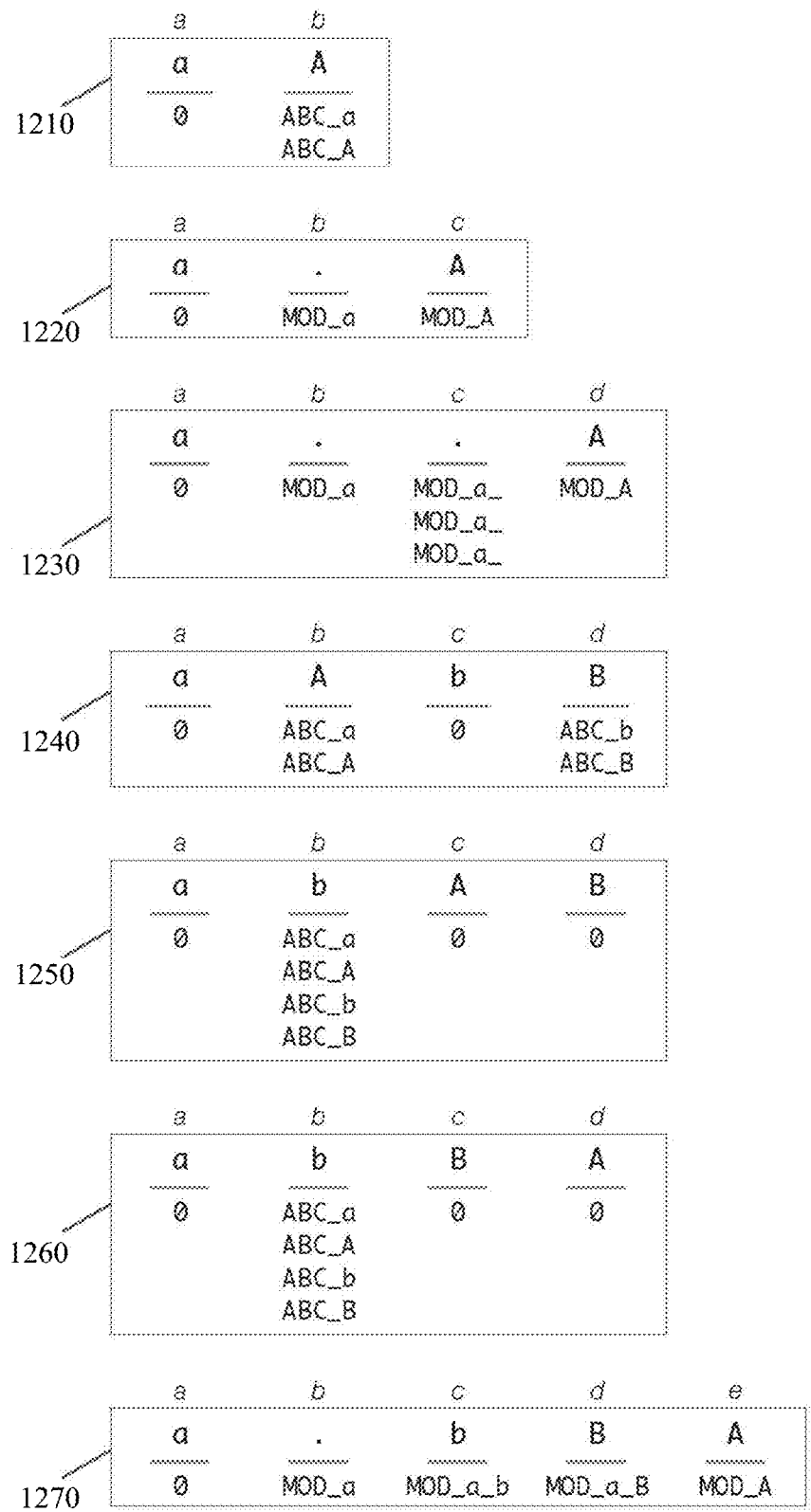

FIGS. 11 and 12 provide a detailed flow diagram that lists various key inputs and timing with some of the resulting enhanced events that are generated by the KEI engine of some embodiments. In FIG. 11, the top characters in each of the boxes 1110-1160 represent a key that was either depressed or released, or a "." to indicate some passage of time. The lower row in each of the boxes 1110-1160 indicates specific enhanced events that are generated by the KEI engine in response to the key presses or releases. To reference each of the inputs or passage of time, a character is displayed above each of the boxes 1110-1160.

At 1110a, the lower case character "a" denotes that the "A" key is pressed, and the 0 in the lower row indicates that no enhanced event was generated. At 1110b the "." represents the passing of some amount of time wherein the "a" key remains pressed. The lower row shows that a MOD operational mode was entered, and a corresponding MOD key enhanced event was generated. At 1110c, the upper case character "A" denotes that the "A" key has been released, and the lower row shows the corresponding MOD enhanced event that was generated. It should be noted that other enhanced event messages in some preferred embodiments would be generated in addition to those listed in these figures, such as the KEY, PRE, and REP messages, as well as MOD_start and MOD_end messages described above. These other messages are not included in this figure for the sake of clarity, and so that some relevant differences may be highlighted.

At 1120, steps a and b are identical to steps a and b of 1110. However, at 1120c the "B" key is pressed (denoted by the lower case character "b") while the "A" key remains down. This causes the KEI engine to issue the listed MOD_a_b enhanced event representing those two keys. At 1120d, the "B" key is released and the enhanced event reflects this as shown by the upper case "B". Finally at 1120e, the "A" key is released and the corresponding enhanced event is sent.

Steps 1130 are similar to steps 1120, except that the "A" key was released before the "B" key. This is shown at 1130d where the "A" character is capitalized reflecting a key up state, and the lower case "b" character reflects that the "B" key is still in the down state. At 1130e, when the "B" key is finally released, the corresponding enhanced event is generated, along with another enhanced event indicating the up state of the previously released "A" key. This ability of the KEI engine to account for each level of key down precedence allows for a vastly simpler database implementation, because there is a unique and guaranteed up enhanced event for any preceding down enhanced event. For example, if the KEI system enters a specific operational mode in response to the "MOD_a" enhanced event, the corresponding exit of that mode can be implemented in response to a single "MOD_A" enhanced event, without the need to monitor all intervening enhanced events.

1140 illustrates (in steps d and e), that the original key that invoked the MOD mode can be released and repressed, as is reflected in the upper and lower case representations of that key. It should be noted that even when the "A" key is up, the spelling of the enhanced message does not truncate that letter from the spelling of the message due to the fact that a subsequent key (the "B" key) is still down.

At 1150d, the "B" key is released Unlike at 1140d, the "B" key was the latest key pressed, and so it can be removed from the spelling of the enhanced message. This can be seen at 1150e, where the "B" key is not included in the enhanced event when a new key (the "C" key) is depressed.

1160 is illustrative of a situation where three keys are held down simultaneously as is the case at step 1160d. It can be seen at step 1160e, that the "C" key is removed from the enhanced event since it was the last pressed key, unlike at step 1160f where the "A" key is not removed from the enhanced event because it was pressed prior to the still-pressed "B" key. The hierarchy of key press order is always reflected in the spelling of the enhanced event message, in order to facilitate KEI database lookups that uniquely correspond to a wide variety of key sequence combinations that are likely to be useful in real-world implementations.

As in FIG. 11, the top characters in each of the boxes 1210-1270 of FIG. 12 represents a key that was either depressed or released, or a "." to indicate some passage of time. The lower row in each of the boxes 1210-1270 indicates specific enhanced events that are generated by the KEI engine in response to the key presses or releases. 1210 illustrates the common use case of a key-based input device to insert text into a text field. At 1210, the "A" key is pressed, as is indicated by the lower case "a" at 1210. In certain preferred embodiments, there are no additional enhanced events generated by the KEI engine at this instant in time, as is indicated by the "0" in the lower row at 1210. When the "A" key is released, as is indicated at 1210b by the upper case "A" character, the generated enhanced event shown in the lower row at 1210b shows that the "ABC_a" enhanced event will be sent to the KEI database. The KEI database in this case will identify a matching method that will cause the lower-case "a" character to be inserted into the currently focused text field. A corresponding key-up event is also generated, in case this event is expected in an application, though this is usually not the case.

To illustrate the KEI Engine process of example 1210, refer to FIG. 10b. The "A" key is pressed and the KEI Engine registers (at 1040) the key press. The timer has not been started and as a result has not fired (at 1050). There is no second key press (at 1052) so the process starts (at 1054) the timer and waits (at 1099) for a subsequent input. Next, the "A" key is released within a particular time threshold and the release is registered (at 1042) before the timer has fired, resulting in an evaluation (at 1070) that stops (at 1076) the timer and results in the KEI Engine entering (at 1078) the SINGLE state. Next, the process determines (at 1087) if there are any existing non-released key presses to either reset (at 1089) the timer when there are none or to await (at 1099) further input.

At 1220a, the same key is pressed, but unlike at 1210a, the key is held beyond a particular time threshold, as indicated by the "." At 1220b. This time delay is quantified by the KEI engine, which enters a specific MOD operational mode after a certain time threshold has expired. The resulting enhanced event that is generated is depicted at 1220b in the lower row as the "MOD_a" enhanced event, which is passed to the KEI database wherein the appropriate instructions are identified so as to enter this particular MOD mode. Sometime later, at 1220c, the "A" key is released, which causes the MOD mode to be exited.

To illustrate the KEI Engine process of example 1220, refer again to FIG. 10b. The "A" key is pressed and the KEI Engine registers (at 1040) the key press. The timer has not been started and as a result has not fired (at 1050). There is no second key press (at 1052) so the process starts (at 1054) the timer and waits (at 1099) for a subsequent input. After the particular time threshold, the timer fires (at 1044) and the KEI engine enters (at 1096) the HOLD state and waits (at 1099) for a subsequent input. Next, the "A" key is released and the release is registered (at 1042) after the timer has fired, resulting in an evaluation (at 1070 and 1087) that all keys are now released and the timer is reset to "not fired" (at 1089) and the KEI Engine waits (at 1099) for the next input.

1230 illustrates how the KEI engine, in some embodiments, responds if the key pressed (at 1230) is held beyond a particular time threshold, as denoted at 1230c by an additional "." character. The resulting enhanced event can be seen in the lower line at 1230c which shows that an additional underscore character has been added to the spelling of the enhanced event. If the KEI database identifies a matching entry, the corresponding output action(s) will be effectuated. Additionally, the KEI engine may be programmed to continue to generate this enhanced event as long as the key or keys remain pressed as described below with reference to MOD repeats. An example of this might be the repeated invocation of a key such as a down arrow key, to continue scrolling down to select lower rows in a spreadsheet application. At 1230d, it can be seen that the "A" key is finally released, which is indicated by the upper case "A" character in the resulting generated enhanced event message.

1240, like 1210, is illustrative of common "typing" activity, which is depicted here as the insertion of the letter "a", followed by the insertion of the letter "b". It should be noted that unlike existing techniques in the art, there is no output generated at 1240a or 1240c, but instead the normal text insertion functionality is generated by the release of the keys, as can be seen by the enhanced event generated at 1240b and 1240d. By delaying the issuance of the ABC enhanced event, the KEI engine is able to first ascertain if a key or keys will be held beyond a certain time threshold, and if so, confer a different meaning to subsequent key motions (e.g., enter a MOD operational mode). This methodology allows for the issuance of non-textual messages, or output actions, while utilizing the same alpha-numeric keys that are used for normal textual input tasks. This distinction is depicted in the difference that can be seen between 1220b, wherein the time delay confers a second meaning to the depressed key, and 1240b, wherein the release of the key is within a certain time threshold, and as such generates a normal text insertion message.

In normal "typing", sometimes the issuance of the following key can be preceded by the release of the prior key. Such a case is presented at 1250, wherein the "B" key is pressed (at 1250*b*), prior to the release of the preceding "A" key, which is still down and not released until sometime later (at 1250*c*). As noted in earlier examples, no additional output is generated at 1250*a*, but at 1250*b* both the "a" character and the "b" character insertion enhanced events are issued. The subsequent releases of these two keys (at 1250*c* and 1250*d*) do not generate any additional enhanced events (other than those already mentioned above).

To illustrate the KEI Engine process of example 1250, refer again to FIG. 10*b*. The "A" key is pressed and the KEI Engine registers (at 1040) the key press. The timer has not been started and as a result has not fired (at 1050). There is initially no second key press (at 1052) so the process starts (at 1054) the timer and waits (at 1099) for a subsequent input. The "B" key is then pressed within a particular time threshold so the timer has not fired (at 1050), and the "B" key, representing a second key press results in an evaluation (at 1052) that stops (at 1056) the timer and results in the KEI Engine entering (at 1062) the SINGLE state. When, subsequently, either the "A" or the "B" key is released the KEI Engine registers (at 1042) a key release, determines (at 1070) that the timer has not fired, stops (at 1076) the timer which is redundant in this case, remains (at 1078) in the SINGLE state, and determines (at 1087) if there are any existing non-released key presses to either reset (at 1089) the timer when there are none or to await (at 1099) further input. As one skilled in the art would recognize, the order in which the "A" and "B" keys are released does not change the outcome of this process.

For the sake of comparison, 1270 depicts the same key motion sequence listed at 1260, the difference being the time of the issuance of the "B" key. At 1270, there is a time delay which is depicted by the "." character at 1270*b*, which causes the KEI engine to interpret subsequent keys in the MOD mode, until all keys are up and such re-evaluation begins anew. This contrasts with 1260, wherein the "B" key is depressed before a particular time threshold elapses, and therefore the KEI engine interprets subsequent keys to be in the ABC mode until all keys are released.

C. Output Action Invocation Based on Enhanced Events

The KEI generated enhanced events are passed to the KEI database. The KEI database utilizes the enhanced events in addition to or independent of system state information to identify and invoke various output actions. The KEI database stores code, scripts, instructions, function calls, API calls, library calls, indirect or direct invocation of a UI element through an application or GUI, or OS system calls for invoking the output actions. In some embodiments, the KEI database contains an execution engine that executes any identified output actions based on the enhanced events and/or system state information. For example, the execution engine executes the system call "C:\Programs\TextEditApp_X.exe-o file.txt" to invoke an output action that is identified by a particular enhanced event when a particular operational mode is active. The system call opens a document "file.txt". In some embodiments, the KEI database passes information back to the KEI engine to execute any identified output actions.

In some embodiments, the KEI database categorizes the output actions hierarchically to define a functional scope for each output action. Each output action may be categorized to an overlay functional scope, application functional scope, or global functional scope. The different functional scopes allow the same enhanced event to identify and invoke different output actions based on system state or other relevant information. For example, different output actions can be categorized to different overlay scopes for the same frontmost application such that the same enhanced event invokes different output actions depending on which field within the frontmost application has key focus. As another example, different output actions can be categorized to different application scopes for different frontmost applications such that the same enhanced event invokes different output actions when a first application is frontmost than when a second application is frontmost.

In some embodiments, the KEI system executes API calls that cause the OS to provide system state information to the KEI engine. In some embodiments, the system state information includes identifying changes to the frontmost application and various states within the frontmost application. In some embodiments, an identified state would be when a field within the frontmost application has key focus or when another UI element has key focus. Based on the system state or other relevant information, an enhanced event can be used to access and invoke a particular output action at a particular functional scope. For example, the PRO_x enhanced event may (i) invoke a first output action that is categorized to the application scope for a first application when the first application is frontmost and (ii) invoke a second output action that is categorized to the application scope for a second application when the second application is frontmost.

In some embodiments, the generated enhanced events are passed to the KEI database where they are first used to identify output actions at the overlay functional scope when an overlay functional scope is specified from the system state information. When an output action is not identified by an enhanced event at the overlay functional scope, the enhanced event is next used to identify an output action at the application functional scope when an application functional scope is specified from the system state information. Otherwise, the enhanced event is used to identify an output action at the global functional scope. When a matching enhanced event is identified at any of the functional scopes, the corresponding output action or actions are invoked at the first such functional scope. If the enhanced event does not identify an output action at any functional scope, the enhanced event is ignored and no operation is performed as a result of that enhanced event. Accordingly, any output action of the computer system or device can be invoked at any time irrespective of which UI element (e.g., button, view, field, toolbar, etc.) has key focus.

It should be noted that each key press may generate multiple enhanced events. In some such embodiments, one or more of the enhanced events may identify and invoke different output actions at various functional scopes and the other enhanced events that do not identify an output action are ignored or are passed to an OS or frontmost application event handler. For example, when the KEI engine is in the PRO mode, a set of enhanced events are generated based on a single tap of the "Y" key. These enhanced events include the KEY_y, KEY_Y, PRO_y, PRO_Y, and REP1_Y enhanced events. The PRO_Y enhanced event may invoke an output action at the application functional scope of the KEI database when a first application is frontmost while the other enhanced events do not identify any output actions at any functional scopes and the REP1_Y enhanced event may invoke an output action at the global functional scope of the KEI database when a second application is frontmost while the other enhanced events do not identify any output actions.

In some embodiments, continued holding of the same one or more keys may be used to invoke different or modified output action behavior. In some such cases, the KEI engine generates a first enhanced event when the one or more keys are held beyond a time threshold as per the above described MOD enhanced event generation. This first enhanced event passes to the KEI database where it identifies an entry that returns a set of parameters to the KEI engine and optionally performs a first output action. The KEI engine uses the set of parameters to determine the rate at which subsequent enhanced events are reissued when the same one or more keys remain held down. The parameters may include a delay parameter, an initial speed, a ramp parameter, and a final speed.

In some embodiments, the delay parameter specifies how long to wait before issuing the first repeat enhanced event. Accordingly, the KEI engine sets a timer while the one or more keys remain held down. When the timer expires, the KEI engine issues the repeat enhanced event. The repeat enhanced event may be formatted differently than the first issued enhanced event to access different or modified output action behavior. For example, the initial enhanced event for when the "Z" key is held down is formatted as "MOD_z" and subsequent repeat enhanced events are formatted as "MOD_z_". In this example, the repeat enhanced event includes an extra underscore character such that the enhanced event is matched against a different entry in the KEI database that may specify different or modified output action behavior. The representations of the enhanced events above are shown for illustrative purposes. Accordingly, different representations may be used without affecting the functionality or output of the KEI system.

The initial speed, the ramp parameter, and the final speed affect the frequency with which the repeat enhanced event is reissued over time. Specifically, the initial speed and the final speed set minimum and maximum rates at which the repeat enhanced event is reissued and the ramp parameter is a time value that determines how quickly the initial speed ramps to the final speed. This can include increasing or decreasing the frequency with which the repeat enhanced events are reissued.

Such functionality enables the KEI system to perform continuous text insertion that increases the frequency of character insertion based on how long a particular key is held down. As another example, such functionality enables the KEI system to perform continuous text selection that increases the frequency with which a character, word, line, or paragraph is selected based on how long a particular key is held down.

It should be noted that different output actions may have different repeat parameters (i.e., delay parameter, initial speed, ramp parameter, and final speed) whereby enhanced events for a first output action are repeated according to a first set of repeat parameters and enhanced events for a second output action are repeated according to a second set of repeat parameters. Such differing behavior is desirable to adjust the rate of output action invocation based on an intended use. For example, selecting text on a character by character basis is normally more time consuming than selecting text on a line by line basis. Accordingly, some embodiments provide repeat parameters with a faster final speed and faster ramp parameter for output actions that select text on character by character basis than for output actions that select text on a line by line basis.

In some embodiments, when multiple keys are pressed beyond a time threshold and according to parameters that are sent from the KEI database as described above, repeating enhanced events are issued for more than one of the keys simultaneously. This allows, for instance, continuous adjustment of one parameter by holding a key with a right hand finger while simultaneously continuously adjusting a parameter by holding a key with a finger of the left hand.

Key-based input devices may be used to change values of various parameters or attributes of the frontmost application or other system setting. For example, an application may provide for the minus and plus keys to change the zoom level of a displayed web page. This works well for situations such as this where the range of values is not great.

As another example, an application may provide for left and right arrow keys that adjust the range value of the selection within a text field (i.e., move the cursor left and right). If the insertion beam is at the beginning of a line and the user needs to move it toward the end of the line, the user would need to press the right arrow key quite a few times in succession—which can be laborious and frustrating. Alternatively, using existing methods in the art, the user could hold down the right arrow key and wait for some amount of time, and then the right arrow key would automatically be re-invoked at some preset speed until the user releases the right arrow key.

It is difficult or impossible to release the key at exactly the desired value, especially if the repeat rate is high. If the repeat rate is low, however, it may be faster for the user to just manually repress the key quickly. If the user releases the key too quickly, the user must either press and hold the right arrow key again, or manually add any remaining adjustments one at a time. As well, if the user holds the key too long, the value of the cursor setting will "overshoot" the desired value, and the user must use the left arrow key repeatedly until the value is correct.

Many users are not comfortable with this method, and will reach for the mouse each time an insertion pointer move is necessary, or they may make an assessment each time as to whether to use the keys or the mouse. The capabilities of the KEI system seek to remove this continual background distraction by utilizing techniques that make value selections much easier and more intuitive when using key-based input devices.

Figure 13:
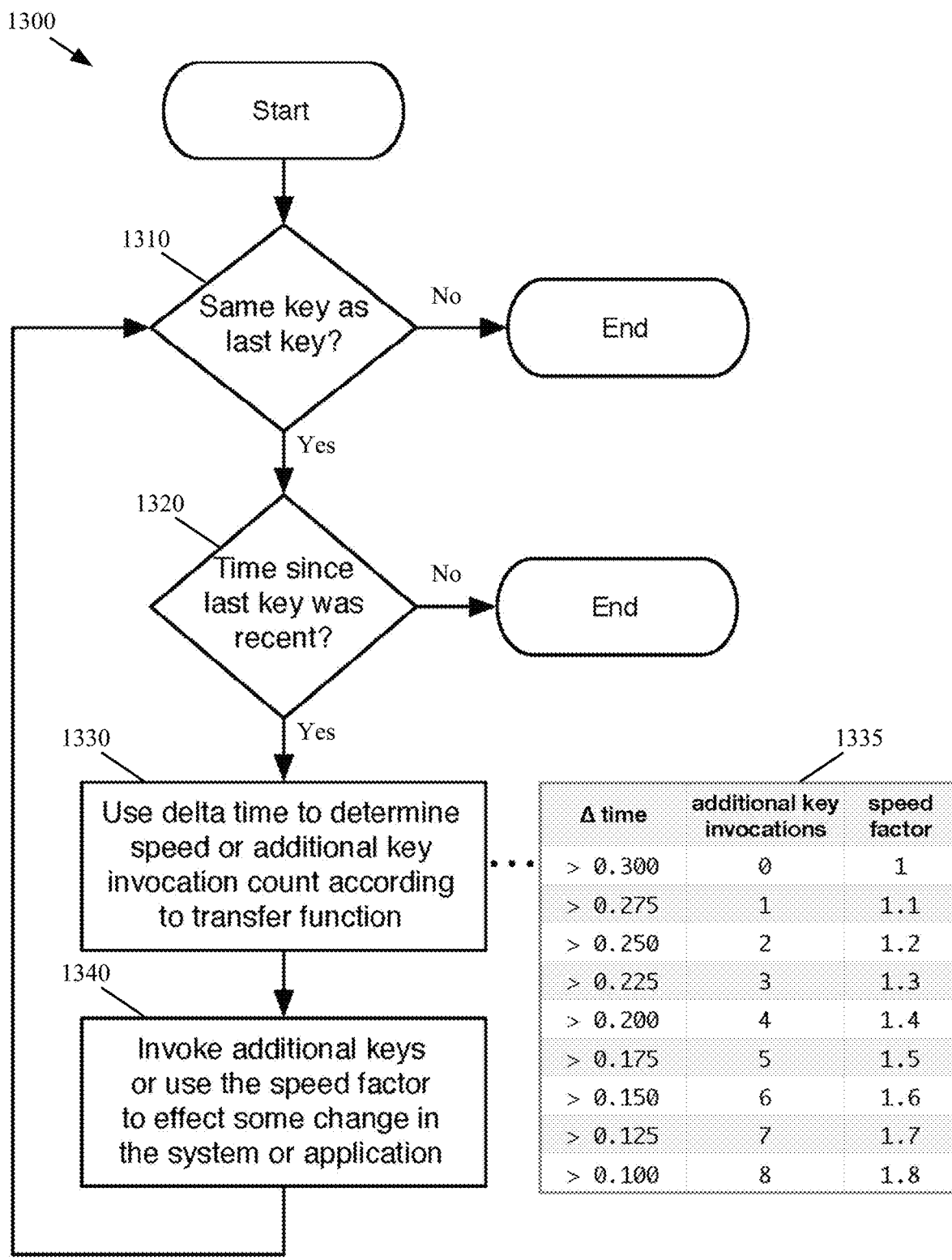
FIG. 13 presents a process performed by the KEI engine to automatically adjust the speed factor bias when invoking successive key presses to effect value changes in accordance with some embodiments.

In some embodiments, the KEI engine automatically adjusts output action behavior using a speed factor bias that is based on successive key presses. FIG. 13 presents a process 1300 performed by the KEI engine to automatically adjust the speed factor bias when invoking successive key presses to effect value changes in accordance with some embodiments. For example, if the right arrow key is used to advance the cursor to the next character, and the user is pressing the right arrow key in rapid succession, the process 1300 speeds the rate at which the cursor moves to the right. The user can control the speed of the cursor movement by varying the speed of the repeated keystrokes.

The process 1300 starts by checking (at 1310) to see if the new key press is the same as the last key press. For example, if the preceding key press was the down arrow key, and the new key press is the down arrow key, then the process continues. Next, the process checks (at 1320) to see if the preceding key press was invoked within a time threshold, such as 300 ms, and if so, the process continues.

The process next calculates (at 1330) the time delta between the current and the previous key-press, and uses that value as a basis for a transfer function which returns (i) additional key press actions to invoke, and/or (ii) a speed factor value.

FIG. 13 includes a listing 1335 of one such transfer function. The delta time column represents the input in milliseconds. If, for example, the delta time is 230 ms, the first test that would pass is the greater than 0.225 row, which yields 3 for the first type, and 1.3 for the second type. In other embodiments, the delta time is utilized in a mathematical equation which produces the desired first or second type of output. In this way, a liner or non-linear equation can provide the desired result without the use of tables.

The process then utilizes (at 1340) the resultant value to either cause additional key invocations, or to use the speed factor to change a value that the KEI engine uses to communicate the values to the system or an application or process.

In some embodiments, the velocity with which a key is pressed can be used to modify output action behavior. Some such embodiments operate in conjunction with modified hardware that has the capability to detect when the key leaves the up state in addition to the normal indication of the down state when the key is fully pressed. By measuring the time from when a key reaches the down state from the up state, the KEI engine can modify the behavior of the output action that is invoked as a result of the key being pressed. As one example, pressing the "F" key while holding down the "M" key invokes an output action that performs a "fast-forward" operation for a media player application. The KEI engine can modify the behavior of the fast-forward output action by invoking the output action with a particular fast-forward parameter value based on the velocity with which the "F" key is pressed. Therefore, if the "F" key is pressed within 5 milliseconds then the output action is performed with a 10× fast-forward parameter value, if the "F" key is pressed within 5-10 ms then the output action is performed with a 4× fast-forward parameter value, and if the "F" key is pressed slower than 10 ms then the output action is performed with a 2× fast-forward parameter value. The velocity can be appended to the enhanced event (e.g., MOD_m_f 10) or passed as a separate enhanced event (e.g., VEL_0.10). In some embodiments, a velocity up message can be sent as well, such that the time from the key being depressed to the time that the key is in the up position is quantified and used as the basis for an enhanced event as detailed above. Furthermore, other physical methods of determining the velocity of a key are envisioned by the present invention, such as a device which is capable of continuously determining the position of the key as it moves from the up state to the down state, or a device with pressure sensitivity which is capable of estimating velocity by measuring a series of pressure changes.

In some embodiments, the KEI database utilizes the enhanced events in addition to events for mouse movements, mouse clicks, or other device outputs (e.g., trackpad outputs) to identify and invoke various output actions. In some such embodiments, an enhanced event identifies an entry within the KEI database that include one or more rules for processing mouse movement events, mouse click events, etc. Accordingly, other input devices can be used to augment the KEI system functionality. For example, the KEI engine may provide access to a particular radial UI element (e.g., system volume) when a MOD_r enhanced event is issued and the corresponding output action that is identified by the MOD_r enhanced event in the KEI database may specify a rule that processes subsequent mouse movement to adjust the radial UI element.

A further technique to assist the user with key-based value changes is illustrated in FIG. 14, which represents a process 1400 performed by the KEI engine to alter the speed of successively approximated value adjustments which are triggered by one or more keys that are held down beyond a time threshold. The process 1400 starts when the KEI engine determines (at 1410) that a value key is being held down. If so, the speed of the value change accelerates (at 1420) according to a first transfer function 1450a. Whenever the value key is released, the value changing immediately stops. The process then waits to detect (at 1430) if the next key press is also a value adjust key. If the key is not a value adjust key, the process ends.

If the subsequent key press is a value adjust key, then value adjustment resumes, but this time the transfer function that controls the acceleration of the value adjustment is determined (at 1440) by the difference in time between the release of the previous value adjust key and the new value adjust key. For example, if the user releases the right arrow key and then quickly re-presses the right arrow key, the value changing would continue, though at a slower rate as indicated in transfer curve 1450b. The user can therefore slow the rate by simply releasing and re-pressing the same key.

Furthermore, if the time between the release of the prior arrow key and the re-press of the key is a greater amount of time, then the controlling transform function may be represented at 1450d. This takes advantage of the user's natural tendency to slow repeated presses as the desired value becomes closer. The user automatically learns and refines this control capability through repeated use.

It should be noted that there is usually a corresponding down value key for each up value key. In the preceding example, the left arrow key would also be considered a value adjustment key and would be identified as such. There may be one, two or more keys that all adjust the same value. Also, the selecting of the transfer function at step 1420 may be influenced by which one or more of the value adjustment keys are being pressed.

When utilizing the KEI system in the MOD mode, there may be more than one key pressed simultaneously, and such cases may also influence the transfer characteristic that is chosen in step 1420. In some embodiments, other value change parameters, such as a delay time before incremental value change begins, can be varied at step 1420. In some embodiments, the value change is sent in a special enhanced event to the KEI database which may respond by sending specific messages to the system or application, so that subsequent values can be directly set, without the need for each intervening incremental change.

D. Enhanced Events for the KEI Viewer

The KEI database also stores the symbols, widgets, and mapping of the symbols and widgets to the graphical keys of the KEI viewer. In some embodiments, the group of relevant symbols, widgets, and mappings are identified from the KEI database based on the KEI engine generated enhanced events and/or the system state information. For instance, the group of symbols, widgets, and mappings for a particular MOD operational mode can be identified from a particular MOD enhanced event without reference to system state information whereas the system state information is used in conjunction with a PRO enhanced event to identify the group of symbols, widgets, and mappings that are relevant to a particular frontmost application when the KEI system is in the PRO operational mode. In some embodiments, the KEI database identifies and provides the relevant information to the KEI viewer as the enhanced events and system state information changes.

E. KEI Engine Monitoring Window

Figure 15:
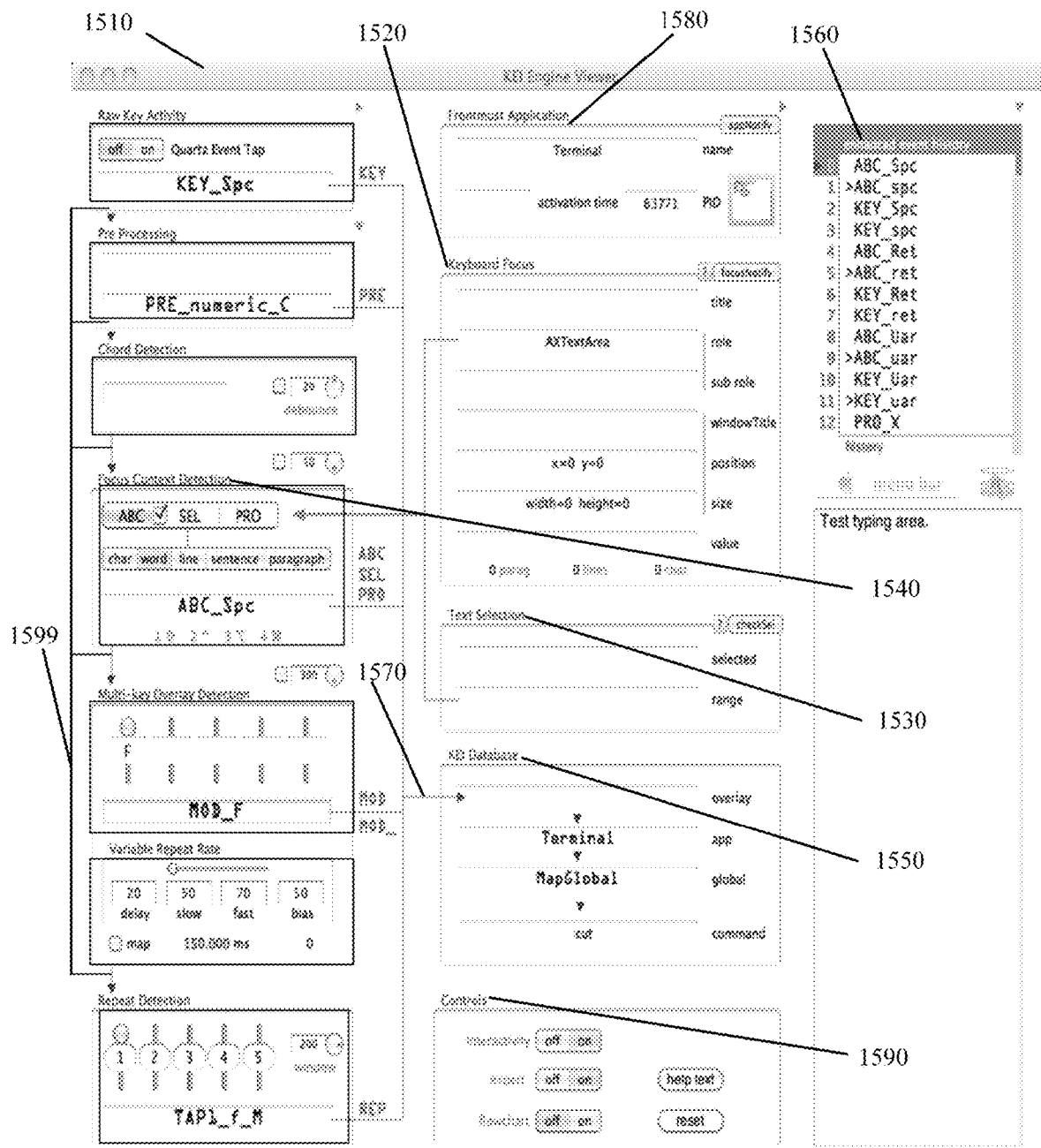
FIG. 15 illustrates the KEI engine monitoring window in accordance with some embodiments.

Some embodiments provide a monitoring window for the KEI engine to interactively display the process of creating enhanced events. FIG. 15 illustrates the KEI engine monitoring window 1510 in accordance with some embodiments. From this window 1510, the relationships between the previously disclosed enhanced messages and modes can be seen by the arrows that interconnect various named groups.

For example, it can be seen that the "Keyboard Focus" group 1520 and the "Text Selection" group 1530 supply input to the "Focus Context Detection" group 1540, which highlights a resulting operational mode, and, in the case of the SEL mode, the saved or detected block length of the currently focused text field. These groups 1520 and 1530 also display some of the system state information that is monitored or otherwise obtained by the KEI engine.

Another system of arrows 1570 connect various groups on the left side of the window to the "KEI Database" group 1550 near the lower middle, which shows the enhanced event being delivered to the KEI Database 1550, wherein entries for the three functional scopes (i.e., overlay functional scope, application functional scope, and global functional scope) are checked, in order to determine if a match is found. If there is a match, a textual representation of the identified output action is listed. In the upper right of the window 1560, the scrolling history of enhanced messages and resulting output actions is shown in some embodiments. Below that are indicators for whether a menu item is currently displayed, and another icon which indicates if the pointer has moved to a remote screen.

The arrows 1599 along the leftmost side of the window show how the order of the generated enhanced events propagate from the top group to the bottom group. Not shown in this figure is the ability of the arrows to interactively highlight and bypass blocks in order to more accurately reflect the inner workings of the KEI Engine of some embodiments. The top middle group 1580 indicates the name of the frontmost application, its icon, the time of its activation, etc. The group 1590 provides controls for various functions of the KEI engine monitor.

III. KEI System Operation

A. ABC

Figure 16:
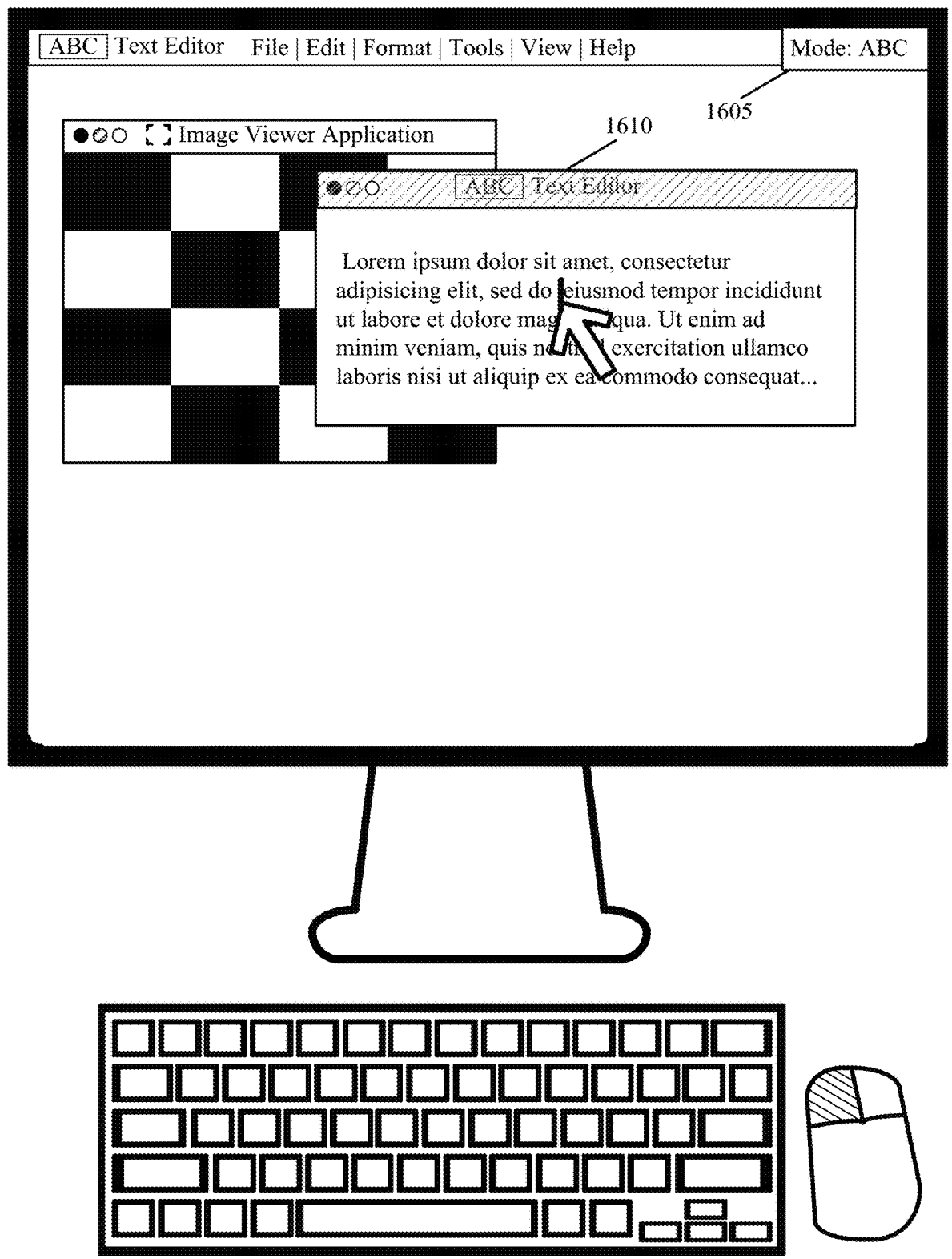
FIG. 16 illustrates operation of the KEI engine when the ABC operational mode is active in accordance with some embodiments.

FIG. 16 illustrates operation of the KEI engine when the ABC operational mode is active in accordance with some embodiments. In this figure, the user causes the KEI engine to enter the ABC operational mode by positioning the mouse pointer over the text field of application 1610 and performing a left mouse button click to place a text insertion vertical bar within the text field. The result of the user action causes a change in the system state information. Specifically, from the system state information, the KEI engine identifies that the key focus is a text field. Additionally, from the system state information, the KEI engine identifies that there are no characters selected in the text field. As a result in these changes to the system state information, the KEI engine enters the ABC operational mode as shown by the indicator box 1605. In some embodiments, the KEI viewer contains an option to avoid presenting the KEI viewer when the ABC operational mode is active.

Figure 17:
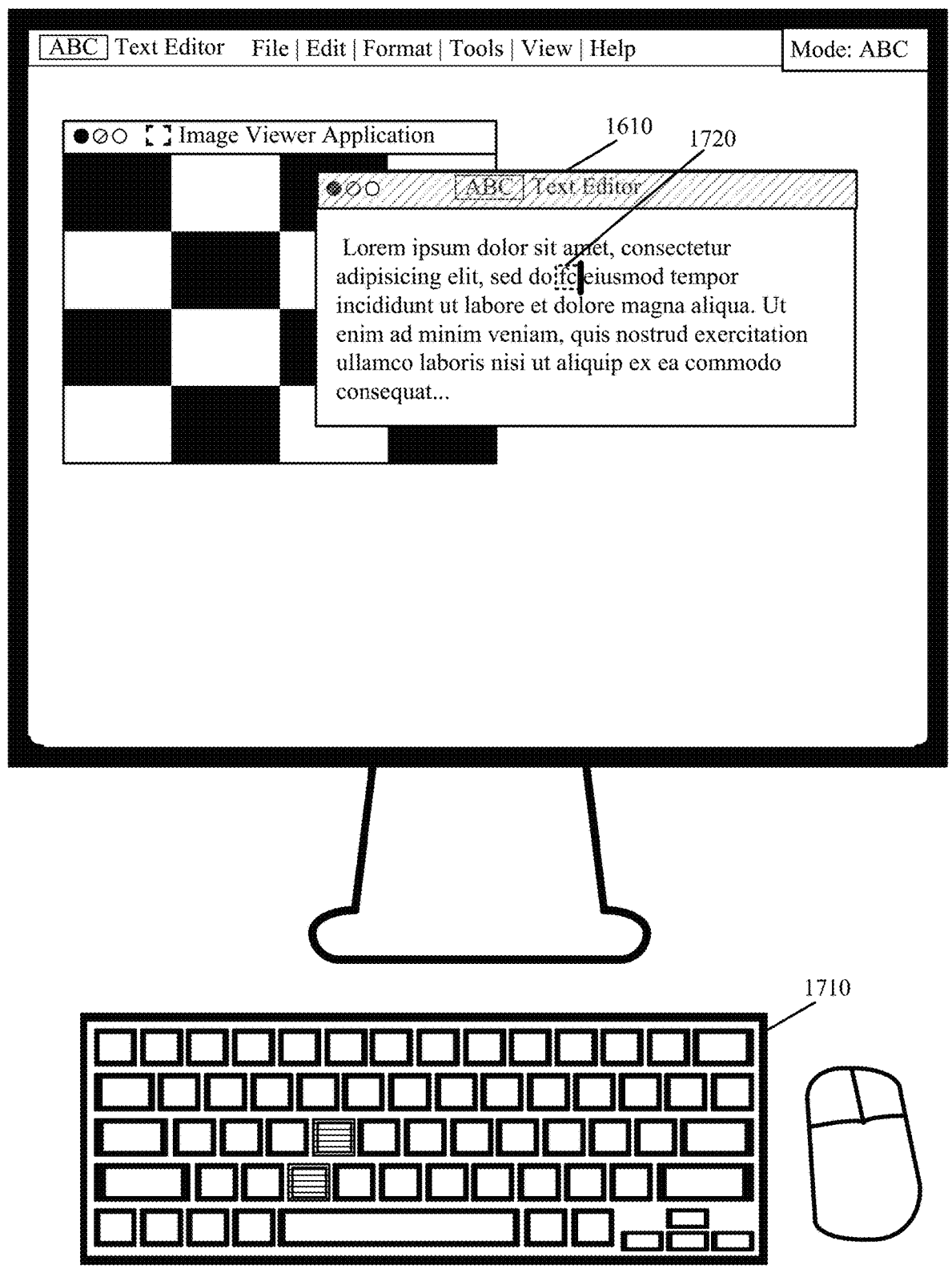
FIG. 17 illustrates using taps of the "F" and "C" keys of the keyboard to insert characters in the text field of an application.

The keyboard keys can be used to insert characters in the text field. As shown in FIG. 17, taps of the "F" and "C" keys of the keyboard 1710 insert characters 1720 in the text field of the application 1610. In response to the tapping of the "F" and "C" keyboard keys, the KEI engine generates various ABC enhanced events that cause the corresponding characters to be inserted in the text field.

When in ABC mode, the KEI engine passes the intercepted events or enhanced events that are generated by the KEI engine to the frontmost application event handler. The frontmost application receives the events and converts the events to characters that are inserted in the focused text field.

B. SEL

Figure 18:
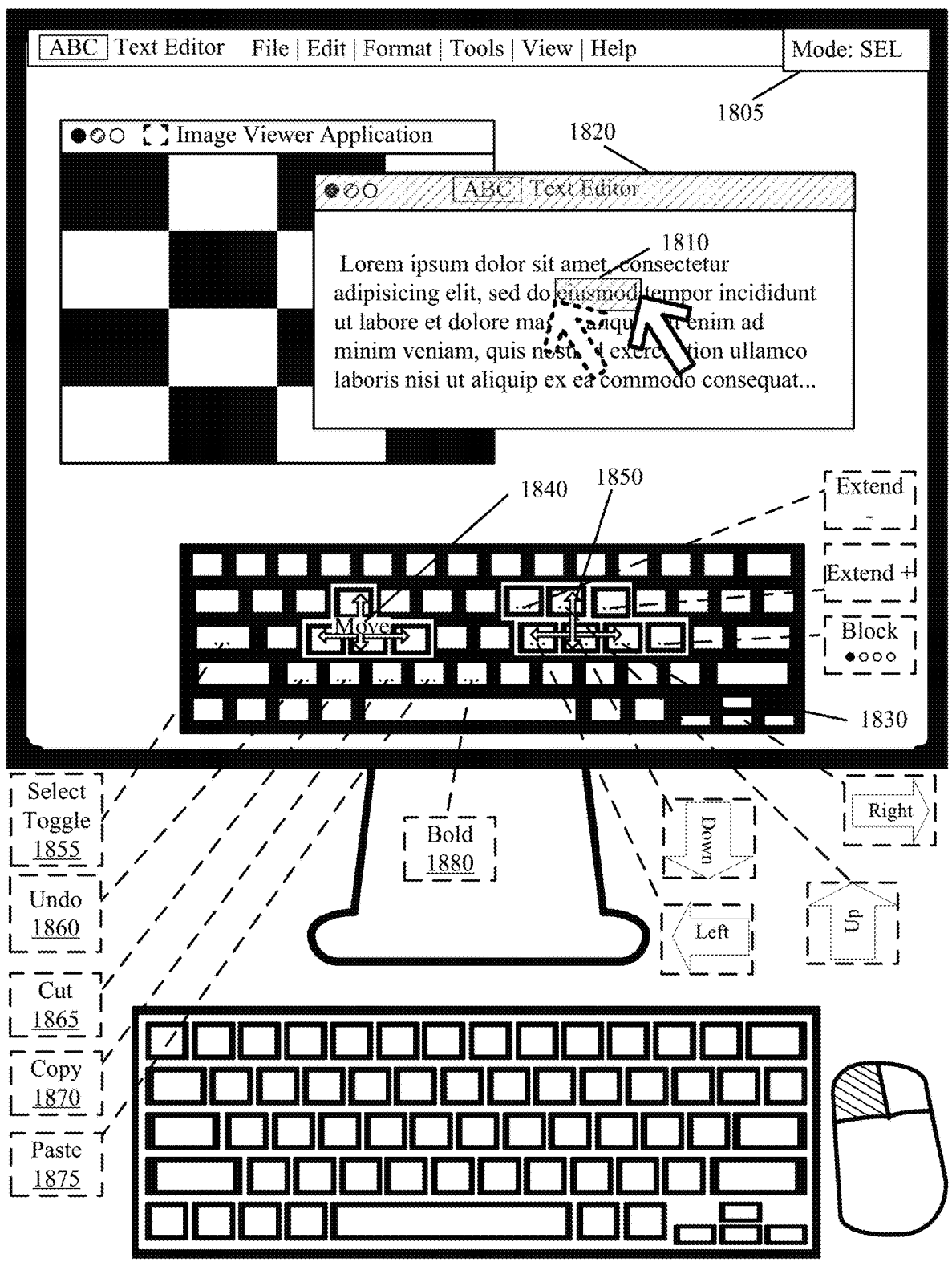
FIG. 18 illustrates operation of the KEI engine and the KEI viewer when the SEL operational mode is active in accordance with some embodiments.

FIG. 18 illustrates operation of the KEI engine and the KEI viewer 1830 when the SEL operational mode is active in accordance with some embodiments. As shown, a left mouse click and drag is used to select a set of characters 1810 within the text field of the frontmost application 1820. As above, the result of the user action causes a change in the system state information. Specifically, from the system state information, the KEI engine identifies that the key focus of the frontmost application 1820 is a text field and that one or more characters are selected 1810 within the text field. As a result of these changes to the system state information, the KEI engine enters the SEL operational mode as shown by the indicator box 1805.

When the SEL operational mode is active, the keyboard keys can be used to invoke a set of output actions that include manipulating the set of characters that is selected 1810 without the use of the mouse or any "flag" keys (e.g., ctrl, alt, command, option, shift, etc.). In some embodiments, some keyboard keys can be used to invoke other actions that are unrelated to the manipulation of the set of characters that are selected 1810. For example, some keyboard keys can be used to perform a text to speech operation of the selected characters.

The KEI viewer 1830 displays symbols and widgets 1840-1880 to identify the output actions that may be invoked and the keys that invoke the output actions when the SEL operational mode is active. In some embodiments, different output actions are invocable and different symbols and widgets are displayed on the KEI viewer depending on which application is frontmost or which text field has key focus.

The output action identified by each symbol or widget may be invoked by tapping the keyboard key that corresponds to the graphical key of the KEI viewer 1830 over which the symbol or widget is displayed. For example, tapping the "B" key (with no flag keys), bolds the set of characters that is selected 1810.

In some embodiments, the KEI system provides output actions that have not been implemented within the application 1820. These custom output actions may be used to enhance the functionality of existing applications without modifying the applications. The custom output actions may include (i) an output action that exists in the system, but that is not used by the application 1820 (e.g., a system zoom output action that enlarges displayed text) or (ii) an output action that did not previously exist in the system, but for which code has been written as part of the KEI system to implement a specific function for the application 1820.

Figure 19:
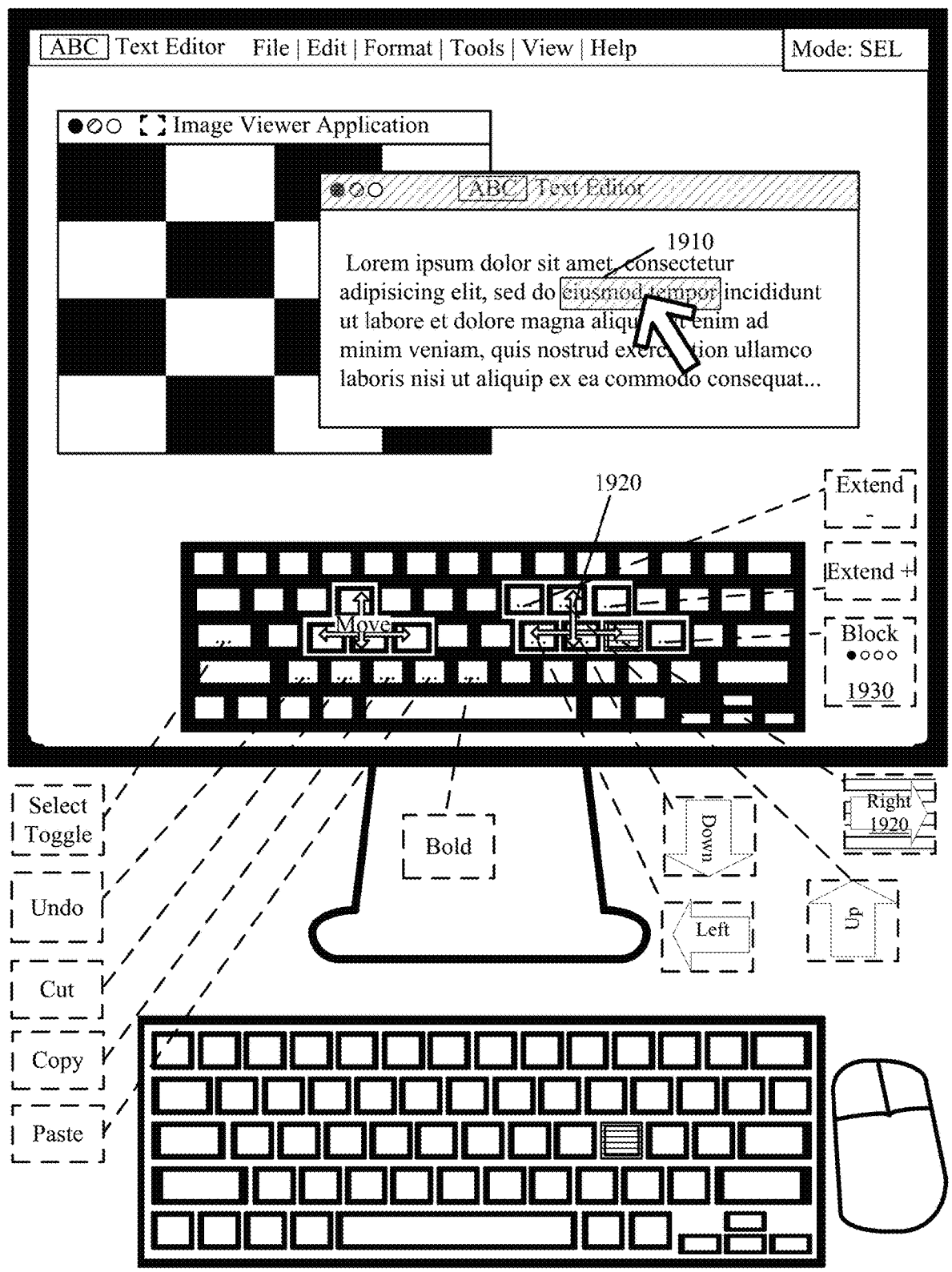
FIG. 19 illustrates invoking an output action that extends the set of characters that is selected to the next word that is to the right of the text selection of FIG. 18.
Figure 20:
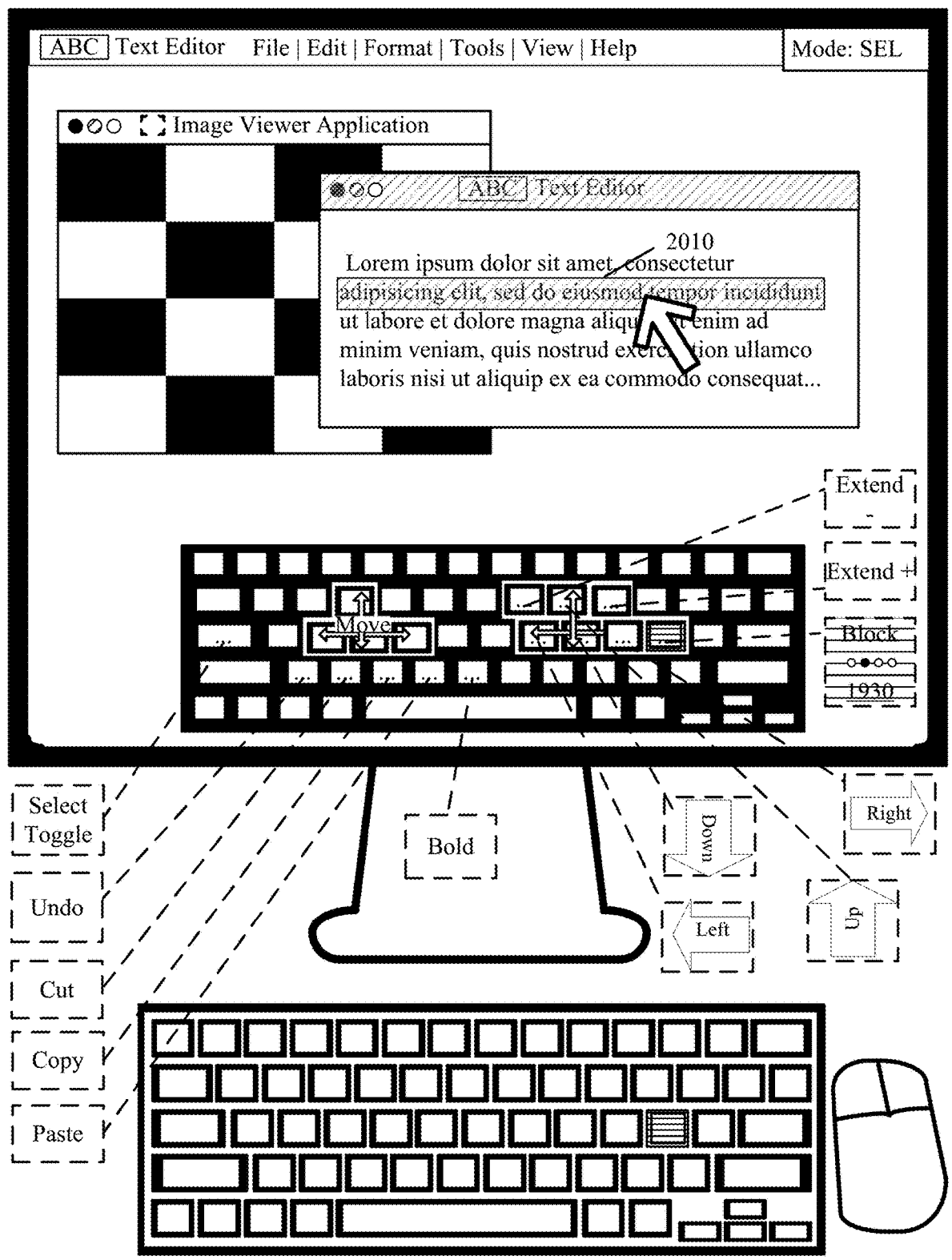
FIG. 20 illustrates using keys to invoke an output action that extends the set of characters that is selected to the complete line.

FIGS. 19 and 20 illustrate custom text manipulation output actions that are provided by the KEI system but that have not been implemented in the application. Specifically, FIGS. 19 and 20 illustrate varying the number of selected characters using keyboard keys in accordance with some embodiments.

FIG. 19 illustrates invoking an output action that extends the set of characters that is selected to the next word that is to the right of the text selection 1810 of FIG. 18. FIG. 20 then illustrates using the same keys to invoke an output action that extends the set of characters that is selected to the complete line.

To do so, the KEI engine provides an output action that is dependent on the block setting widget 1930. The block setting widget 1930 adjusts how much the set of characters that is selected is extended or contracted when the output actions associated with the directional selection symbols 1920 are invoked.

The block setting widget 1930 contains four settings that specify extending or contracting the text selection by a word, line, sentence, or paragraph. In FIG. 19, the block setting widget 1930 is set to the "word" setting as shown by the first shaded dot in the widget 1930. The user invokes the output action associated with the right select symbol by tapping the "L" key. The set of characters that is selected 1810 is extended to the next word to the right as shown by the text selection 1910 in FIG. 19.

In FIG. 20, the user changes the setting for the block setting widget 1930 by tapping the ";" keyboard key that corresponds to the graphical key over which the widget 1930 is displayed. Each tap of the ";" key cycles through a different setting of the block setting widget 1930. From the "word" setting of FIG. 19, a single tap of the ";" key changes the widget 1930 setting from "word" to "line" as shown by the modified shaded dot in the widget 1930 of FIG. 20.

Changing the setting for the block setting widget 1930 from "word" to "line" causes the KEI engine to expand the text selection to the line 2010. A subsequent tap of the keyboard key that corresponds to the output action for the directional select symbol extends the text selection 2010 to another line (e.g., above or below) based on the direction of the directional select symbol that is tapped.

The KEI engine performs sentence-by-sentence text selection when the ";" key (i.e., block setting widget 1930) is tapped again, and paragraph-by-paragraph text selection when the ";" key is tapped when the block setting widget 1930 is in the "paragraph" setting. In this manner, a user can on-the-fly adjust the amount of text that is selected by each key tap, where the key tap invokes the output action for the directional select symbols.

In some embodiments, the KEI engine automatically extends or contracts the text selection when the setting for the block setting widget changes. The KEI engine does so by keeping track of the position of the insertion beam and a range of characters that are selected for each of the selection settings. In some embodiments, each range of characters is initially determined based on the current position of the insertion beam. For example, the range of characters that are associated with a word selection setting are determined based on the set of characters that are associated with the word in which the insertion beam is positioned or adjacent to and the range of characters that are associated with a line selection setting are determined based on the set of characters that are associated with the line in which the insertion beam is located. Then when switching between the different block settings, the KEI engine selects a different range of characters that correspond with the current block setting. In some instances, a selection is made away from the current position of the insertion beam. In such instances, the position of the insertion beam does not fall within the range of characters for the block setting. Therefore, when switching from a larger block setting to a smaller block setting (e.g., paragraph to word, line, or sentence), the KEI engine selects the first range of characters from the selection of the preceding block setting that correspond to the current block setting. For example, when a full paragraph is selected and the block setting changes to a word selection, the KEI engine selects the first word of the paragraph when the position of the insertion beam is not within the previously selected paragraph.

In some embodiments, the KEI engine does not change the size of the text selection when the setting of the block setting widget changes. In some such embodiments, the KEI engine does not change the size of the text selection until the user invokes the output action associated with the directional select symbols.

In some embodiments, the KEI engine maintains a block setting and their selections for each text field of each window of every running application. Accordingly, the block setting is not lost when a user switches between text fields of the same application or different applications. In some embodiments, the block setting information is saved when a text field or corresponding application is closed. In some such embodiments, the block setting and selection data is restored the next time the text field has key focus.

Figure 21:
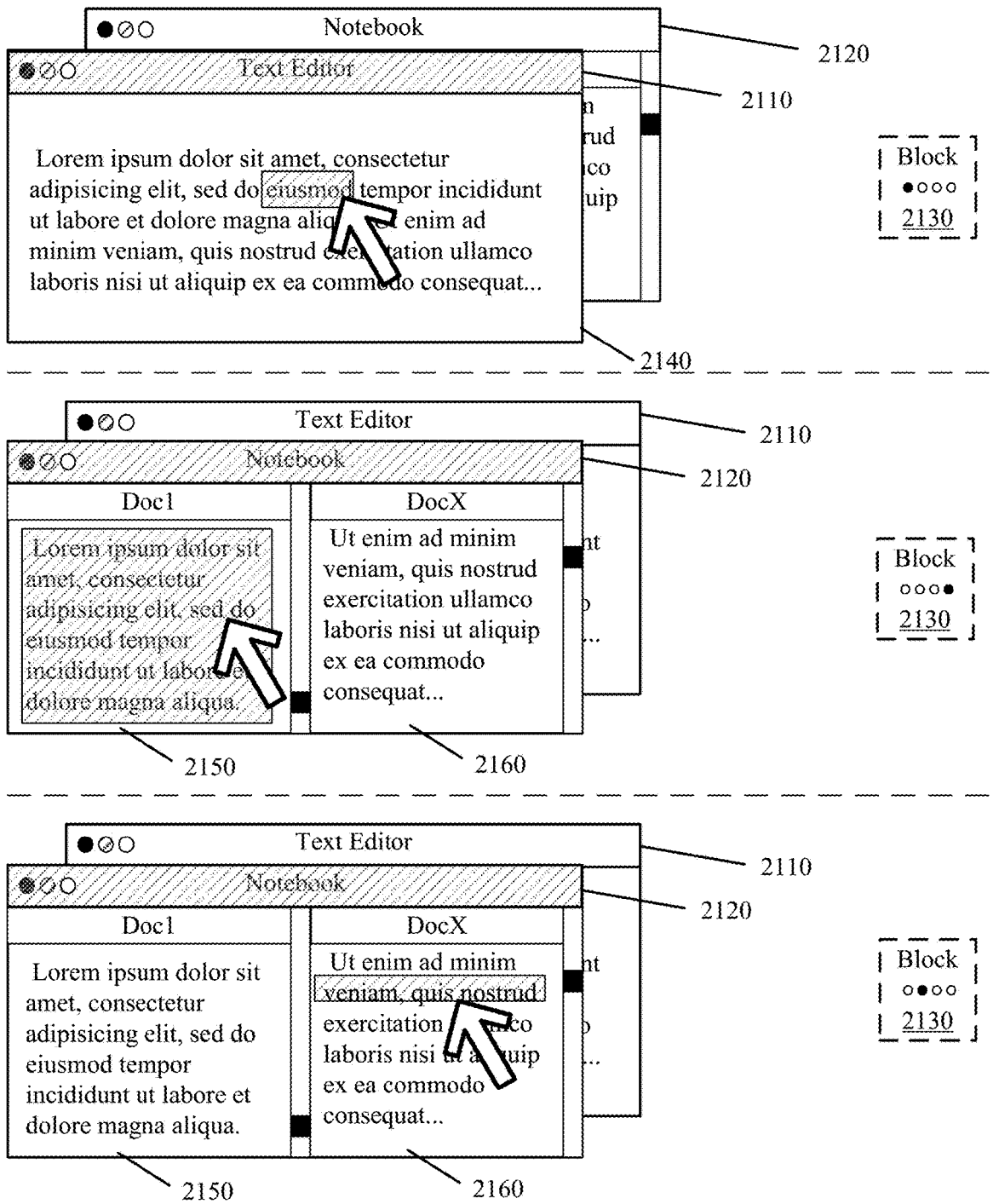
FIG. 21 illustrates different block settings for different text fields that have key focus in accordance with some embodiments.

FIG. 21 illustrates different block settings for different text fields that have key focus in accordance with some embodiments. Specifically, FIG. 21 illustrates two applications 2110 and 2120 and the setting for the block setting widget 2130 when different text fields 2140, 2150, and 2160 of the applications 2110 and 2120 have key focus.

The first application 2110 includes a single text field 2140 and when the text field 2140 has key focus, the block setting widget 2130 had been set to the "word" setting. In this figure, when the key focus changes to the first text field 2150 of the second application 2120, the block setting widget 2130 is set to the "paragraph" setting. Lastly, when the key focus changes to the second text field 2160 of the second application 2120, the block setting widget 2130 reverts to the "line" setting. When the key focus changes back to the first text field 2150 of the second application 2120, the block setting widget 2130 is set back to the "paragraph" setting and when the key focus changes back to the text field 2140 of the first application 2110, the block setting widget 2130 is set back to the "word" setting. In some embodiments, the data for the block setting widget for each text field of each application is stored within the KEI database.

Figure 22A:
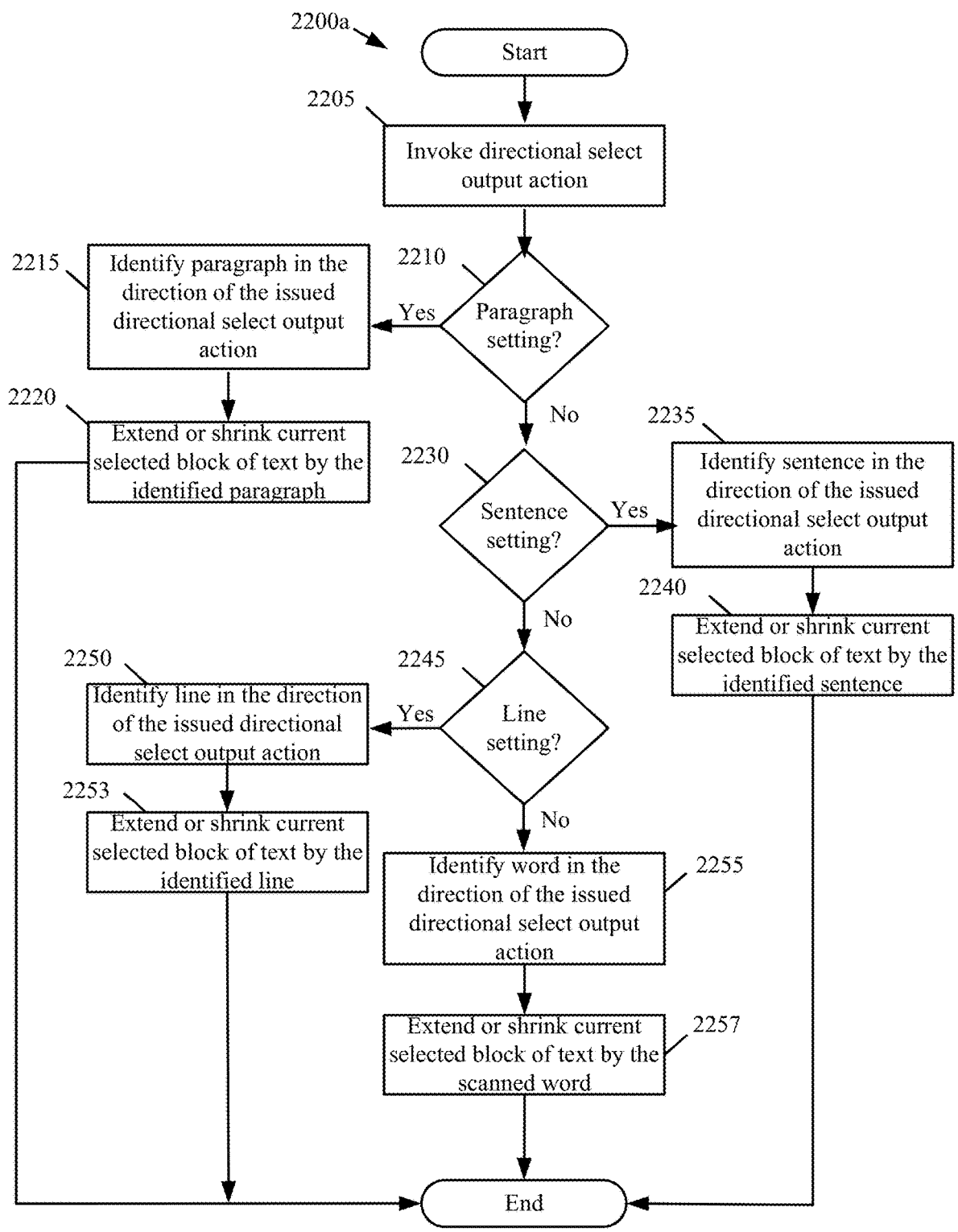
FIG. 22a presents a process performed by the KEI engine to implement the output actions for the directional selection symbols in conjunction with the block setting of the block setting widget in accordance with some embodiments.

FIG. 22a presents a process 2200a performed by the KEI engine to implement the output actions for the directional selection symbols in conjunction with the block setting of the block setting widget in accordance with some embodiments. The process 2200a begins when a user invokes (at 2205) an output action associated with a directional select symbol. In some embodiments, the process 2200a begins when the setting of the block setting widget changes.

The process 2200a determines whether the block setting widget is in the paragraph setting mode (at 2210), sentence setting mode (at 2230), line setting mode (at 2245), or word setting mode. When the paragraph setting mode is selected, the process identifies (at 2215) a paragraph in the direction of the directional select output action. In some embodiments, identifying the paragraph involves scanning the characters from the current position of the selected characters (e.g., the last character that was selected in the current selected block of text) to identify a paragraph break or tab indentation in the direction of the directional select output action. The process then extends or contracts (at 2220) the current selected set of characters by the identified paragraph, and the process ends.

When the sentence setting mode is selected, the process identifies (at 2235) a sentence in the direction of the directional select output action. In some embodiments, identifying the sentence involves scanning the text from the current position of the selected set of characters to identify a punctuation mark (e.g., question mark, exclamation mark, period, etc.) in the direction of the directional select output action. The process then extends or contracts (at 2240) the current selected set of characters by the identified sentence, and the process ends.

When the line setting mode is selected, the process identifies (at 2250) the beginning or end of a line from the current position of the selected set of characters. The process then extends or contracts (at 2253) the current selected set of characters by the identified line, and the process ends. Lastly, when the word setting mode is selected, the process identifies (at 2255) the next word in the direction of the directional select UI output action. The process then extends or contracts (at 2257) the current selected set of characters by the identified word, and the process ends.

In some embodiments, when the text selection is first extended in one direction and the text selection is then contracted in the opposite direction, the KEI engine contracts the text selection back to the original text selection. The KEI engine retains the original text selection even when the direction with which the text selection is extended reverses.

FIGS. 22*b*, 22*c*, and 22*d* illustrate in detail usage the block selection functionality of the KEI system in accordance with some embodiments. In some embodiments, the SEL mode may be entered from the ABC mode by holding down a key that selects an enclosing or adjacent word in a leftward or rightward direction relative to the current cursor placement. For instance, holding the "J" key causes the word to the left of the cursor to become selected when the cursor is positioned outside but directly adjacent to the word, and holding the "L" key causes the word to the right of the cursor to become selected when the cursor is positioned outside but directly adjacent to the word. If the cursor is within a word, holding either the "J" or "K" key causes the enclosing word to be selected. FIG. 22*b* illustrates this capability by showing example text on the left which contains a cursor which is positioned between certain characters, and the same text on the right with a range of characters selected in response to the invocation of a rightward directional word selection. In this and the following FIG. 22*c*, for purposes of clarity, spaces are indicated by an upward carat symbol at the baseline of the text. As can be seen in line 1 (see 2260) of FIG. 22*b*, the mode of the KEI engine starts in ABC mode, and changes to SEL mode after the text is selected by the directional word selection output action.

Line 2 (see 2265) of FIG. 22*b* shows that the cursor is positioned between the "d" of the text "dog", and the space that precedes the word. As can be seen on the right side of line 2, the entire word "dog" is selected after the directional word selection operation is complete. Similarly, line 3 shows that the cursor's original position is between the "d" and "o" characters, yet the resultant selection is the same. When the cursor is positioned within a word, that enclosing word is selected by the directional word selection output action. Furthermore, as can be seen in line 4, when the initial placement of the cursor is at the end of the word, the rightward word selection still results in the word being selected which the cursor abuts. When the cursor is on the other side of the space, as shown in line 5, the cursor abuts the word "cat", and as a result the word "cat" is selected, as can be seen on the right side of line 5.

It can be seen that the result of the word selection output action illustrated above, whether in a rightward or leftward direction, results in one or more characters being selected, and as such, the KEI engine switches to the SEL mode. This enables, in some embodiments, the keyboard keys to be used to manipulate or otherwise utilize the selected text without the need for flag key combinations. For instance, a "copy" output action may be invoked, in some embodiments, by tapping the "C" key—without the need to first press and hold the "command" or "control" key. Similarly, the user may tap another key to hear the selected text spoken, another key to look up a definition or do a web search, etc.

In addition to keys that act on the current selection, other keys in the SEL mode may modify the range of the selection—that is, the starting and ending characters of the selection. This gives the user the capability to move the selection, for instance, to the next word, or to extend the selection to include several words. FIG. 22*c* illustrates the capability of some embodiments to expand and shrink the selection on a word by word basis. In some embodiments, this is in response to the user tapping certain keys while in the SEL mode.

Line 1 of FIG. 22*c* (see 2270) lists several words separated by spaces, with the word "dog" being selected. In response to a rightward word extension output action depicted on the right side of line 1, the selection is extended as shown below in line 2 and two words are selected. A similar rightward extension results in the selection depicted in line 3 and three words are selected. When a subsequent leftward extension occurs, the resulting selection depicted shows that the leading edge of the selection contracts to the left, and the selection includes the space following the last word of the selection. Another leftward extension shows on line 5 a similar result wherein one word and the space following it are selected.

Because an expanding selection does not include an adjacent space, and a contracting selection does include an adjacent space, this gives the user an easy way to either select or not select an adjacent space as appropriate to their need. For instance, if the user needs to delete the word "dog" and the space adjacent, the user can, in some embodiments, extent right and then extend left to easily make the correct selection before issuing the delete output action.

Next, it can be seen that when a single word is selected, as in line 5, and a leftward extension is invoked, the selection expands in the leftward direction as shown in line 6. If the leftward expansion of line 5 had instead collapsed the selection to a cursor preceding the "d" character, the SEL mode would not be maintained, which would not be desirable in most cases. The preferred result, shown in line 6 maintains a selection, and as such the KEI engine remains in the SEL mode. Lines 7 thru 10 of FIG. 22*d* illustrate the results of further leftward and rightward expansion output action invocations.

FIG. 22*d* provides a further illustration of the block setting cycling function of some embodiments. A paragraph of the same sample text is shown five times, each illustrating the selection range changes that result from cycling the block size output action. At 2275, three words 2277 are selected, and the block setting is in the "word" mode. The next invocation of the block function, the result of which is depicted at 2280, cycles to the "line" mode, which results in the selection of a single line of text 2283. In some embodiments, the line that includes the first character of the "word" selection (2277) is used to determine which line will be selected. For example, if the "word" block selection spanned multiple lines, the resulting "line" block selection would therefore be the first or top line of the "word" block selection.

2285 depicts the result of cycling the block selection to the "sentence" setting to select the sentence 2287. In some embodiments, the basis for determining which sentence to select is not necessarily the previous "line" block setting, but again the first character of the "word" setting (2277) is used to ensure that the original "word" selection is included in the new "sentence" selection. This does not apply if the "line" block setting was subsequently moved up or down such that the newly selected line no longer contains the "word" block selection. In such a case, the first word of the new line is used to determine which sentence to select in some embodiments.

At 2290, all the text of the paragraph is selected (see 2293) as would be the result when cycling the block setting to "paragraph" from the previous "sentence" block selection at 2285. In some embodiments, if several sentences were selected which span two or more paragraphs preceding the cycling to the "paragraph" block setting, the paragraph which contains the first sentence is selected when switching to the "paragraph" block selection mode.

2295 depicts the cycling ability of some embodiments wherein the "paragraph" block mode cycles back to the "word" block mode. It can be seen that the same three words of the original "word" block selection as shown at 2275 has been memorized and is now re-established (see 2297). In some embodiments, if the "paragraph" block has been moved such that it no longer contains the words of the original "word" block selection, the first word of the first paragraph becomes the new "word" block selection.

In some embodiments, the scroll position of the text field changes in response to movement or expansion/contraction of the selection in the various block modes so that the user can see not only the selection, but also adjacent unselected text as well. For example, when the "paragraph" block selection mode is active, the user may tap certain keys in the SEL mode such as the "I" key to move to the previous paragraph, and the "K" key to move to the next paragraph. When moving down, the text field scrolls if necessary so that the bottom line of the selection remains within the visible area of the scrolling field. Also, a portion of unselected text following the selection is brought into view by additional scrolling if necessary. In some embodiments, the amount of visible unselected text remains more or less consistent as the block selection movement progresses. The same scrolling actions apply when movement occurs in the upward direction, that is, the top line of the selection is maintained within the view, as well as some amount of unselected text above that selection.

Figure 23:
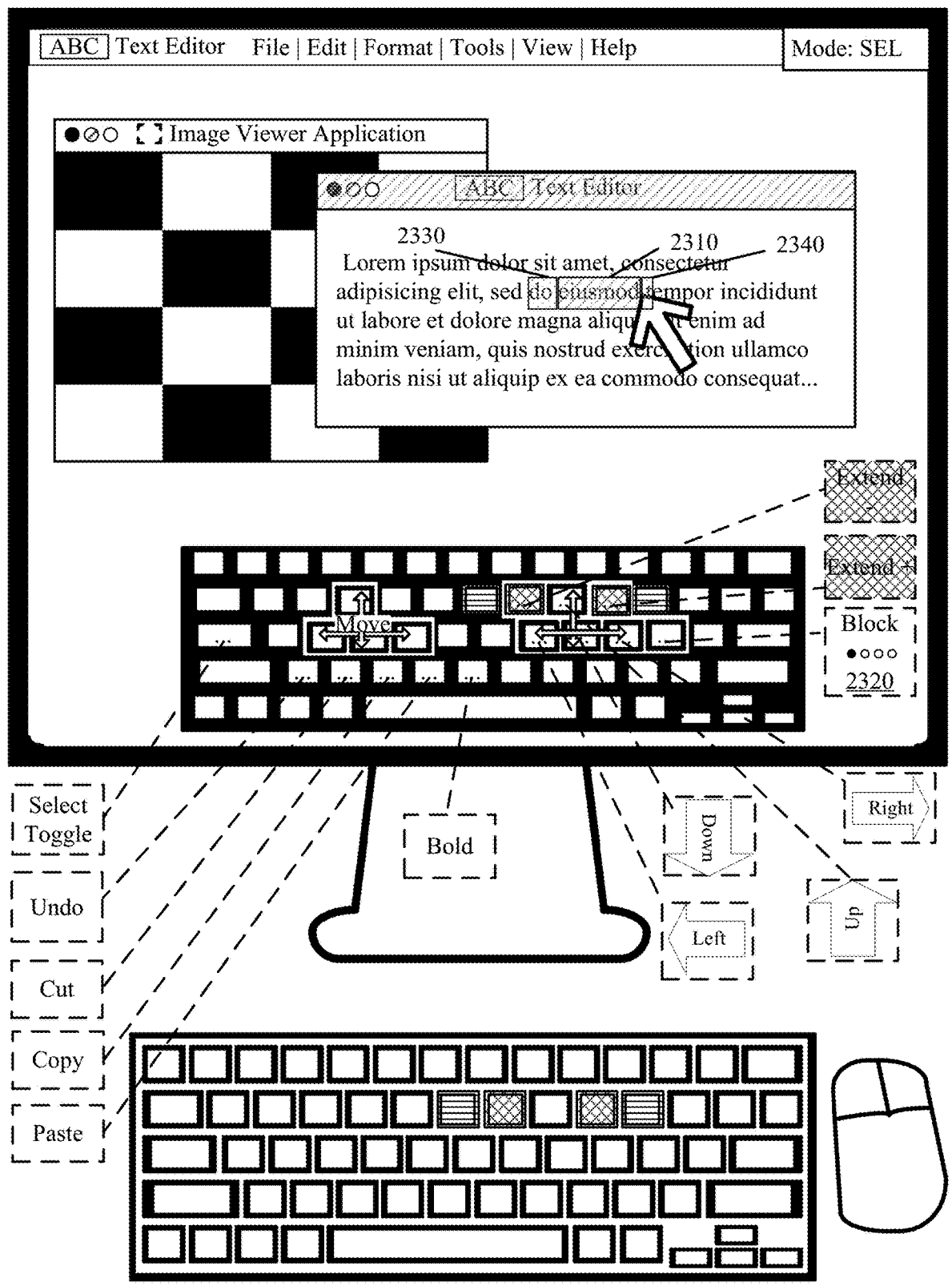
FIG. 23 illustrates using the KEI engine to perform bidirectional extension of a selected set of characters in accordance with some embodiments.

In some embodiments, it is possible to extend and contract the right or left side of the selection by any block size (character, word, line, sentence, or paragraph). FIG. 23 illustrates using the KEI engine to perform such bidirectional extension and contraction of a selected set of characters in accordance with some embodiments. The figure illustrates an initial set of characters 2310 that is selected. The block setting widget 2320 is set to the "word" setting such that tapping the "L" key (i.e., right select symbol) extends the selected set of characters 2310 by a word to the right. However, holding the "O" key (i.e., the "Extend +" symbol) and tapping the adjacent "P" key extends the selected set of characters 2310 one character to the right and tapping the "I" key allows the user to contract the selected set of characters 2310 one character from the rightmost edge of the selection. Similarly, holding the "U" key (i.e., the "Extend −" symbol) and tapping the adjacent "Y" key extends the selected set of characters 2310 one character to the left and tapping the "I" key allows the user to contract the selected set of characters 2310 one character from the leftmost edge of the selection.

In this figure, the user first holds the "U" key down (as denoted by the overlapping crossing lines) and taps the "Y" key three times (as denoted by the horizontal lines) in order to extend the selected set of characters 2310 three characters to the left 2330. The user next holds the "O" key down and taps the "P" key twice in order to extend the selected set of characters 2310 two characters to the right 2340.

The KEI engine performs bidirectional character selection by identifying the first character position (i.e., leftmost position) and the last character position (i.e., rightmost position) for a set of selected characters. When the output action to extend the selected set of characters one character to the right is invoked, the KEI engine extends the selected set of characters from the last character position. When the output action to extend the selected set of characters one character to the left is invoked, the KEI engine extends the selected set of characters from the first character position.

Additional functionality provided by the KEI engine allows for easily identifying the position of the insertion beam when navigating a text field. The functionality enhances traditional arrow key navigation of a text field by selecting a block of characters when advancing the insertion beam past that block of characters and removing the selection of that block of characters when advancing the insertion beam past another block of characters. When the insertion beam is advanced by one word based on a directional key tap, the KEI engine selects the word that the insertion beam advances over and removes selection of that word once the insertion beam is moved. The selection is retained so long as the directional key is held down. Once the directional key is released, the insertion beam is moved and the selection is removed. The temporary selection allows a user to readily identify where the position of the insertion beam is in a text field.

Such functionality may be incorporated in a SEL operational mode of the KEI system or as part of an "Alpha" pseudo-operational mode that operates similar to a MOD operational mode as described below. In some embodiments, the Alpha pseudo-operational mode is activated by holding down a particular keyboard key (e.g., the "A" key) beyond a specified duration. Holding the particular key down enables access to a set of output actions through a set of keyboard keys that provide the above described insertion beam position indication. Accordingly, holding the particular key down changes the display of the KEI viewer to identify which keyboard keys can be used to move the position of the insertion in a text field with the functionality described above.

Further enhancements include retaining the selection while navigating the text field using the Alpha pseudo-operational mode. To select a word when navigating a text field using the Alpha pseudo-operational mode, a user (i) holds down a first key to access the Alpha pseudo-operational mode, (ii) presses down a second key as indicated in the Alpha pseudo-operational mode KEI viewer display to select a range of characters, and (iii) releases the first key before releasing the second key to maintain the selection of the range of characters.

Further enhancements include saving the selection for subsequent reselection with a single key press. Once a selection is made, the selection can be saved for subsequent reselection by pressing a holding a third key beyond a specified duration. Once saved to the third key, that same range of characters can be selected at any time by tapping the third key.

C. PRO

Figure 24:
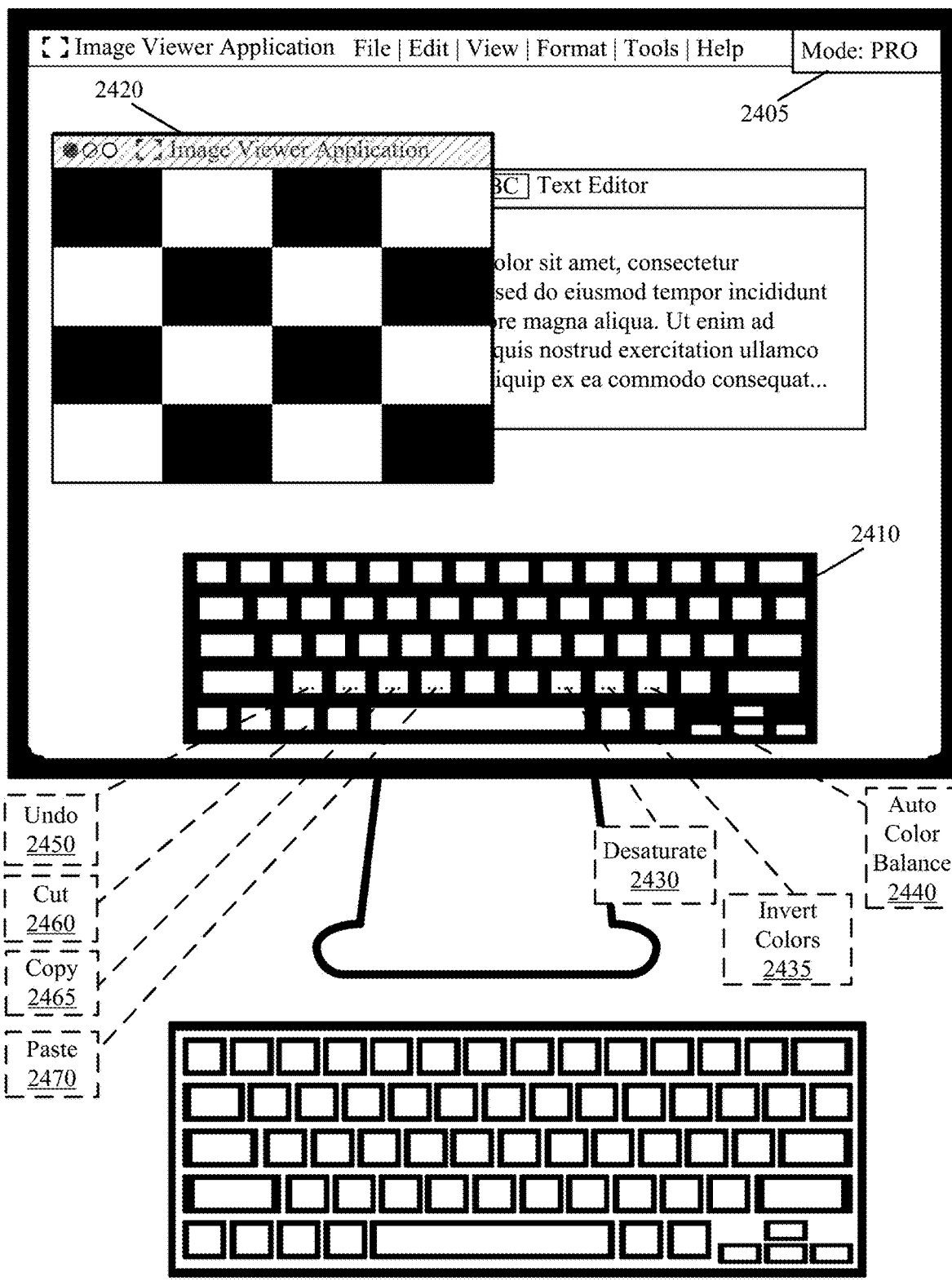
FIG. 24 illustrates operation of the KEI engine and the KEI viewer when the PRO operational mode is active in accordance with some embodiments.

FIG. 24 illustrates operation of the KEI engine and the KEI viewer 2410 when the PRO operational mode is active in accordance with some embodiments. In this figure, from the system state information, the KEI engine identifies that the image viewing application 2420 is frontmost and that the key focus of the image viewing application 2420 is not a text field. Consequently, the KEI engine enters the PRO operational mode as shown by the indicator box 2405.

When the PRO operational mode is active, the keyboard keys can be used to invoke a set of output actions that perform application specific functionality. Accordingly, the set of output actions vary depending on which application is frontmost even though the same operational mode (i.e., PRO) may be active. In some embodiments, the PRO operational mode can also provide access to a set of global output actions.

In this figure, the KEI viewer 2410 displays symbols 2430-2470 to identify the output actions that may be invoked when the PRO operational mode is active and when the application 2420 is frontmost. Based on the system state information, the KEI database identifies the symbols 2430-2470 that are then provided to the KEI viewer. The KEI viewer 2410 displays the symbols 2430-2470 over the graphical keys that correspond to the keyboard keys that can be used to invoke the output actions identified by the symbols 2430-2470.

As shown, the symbols 2430-2440 identify output actions that are application specific, such as the desaturate output action, the color inversion output action, and the auto color balance output action. Additionally, the symbols 2450-2470 identify general output actions such as the undo, cut, copy, and paste output actions.

Through the KEI engine, users can invoke application specific output actions without navigating menus of the application 2420 and without memorizing flag key press combinations that execute keystroke shortcuts. Furthermore, the KEI viewer 2410 provides a visual reference that identifies which output actions may be invoked by which keyboard keys, so that the user does not have to memorize specialized keys that are specific to the application 2420.

Figure 25:
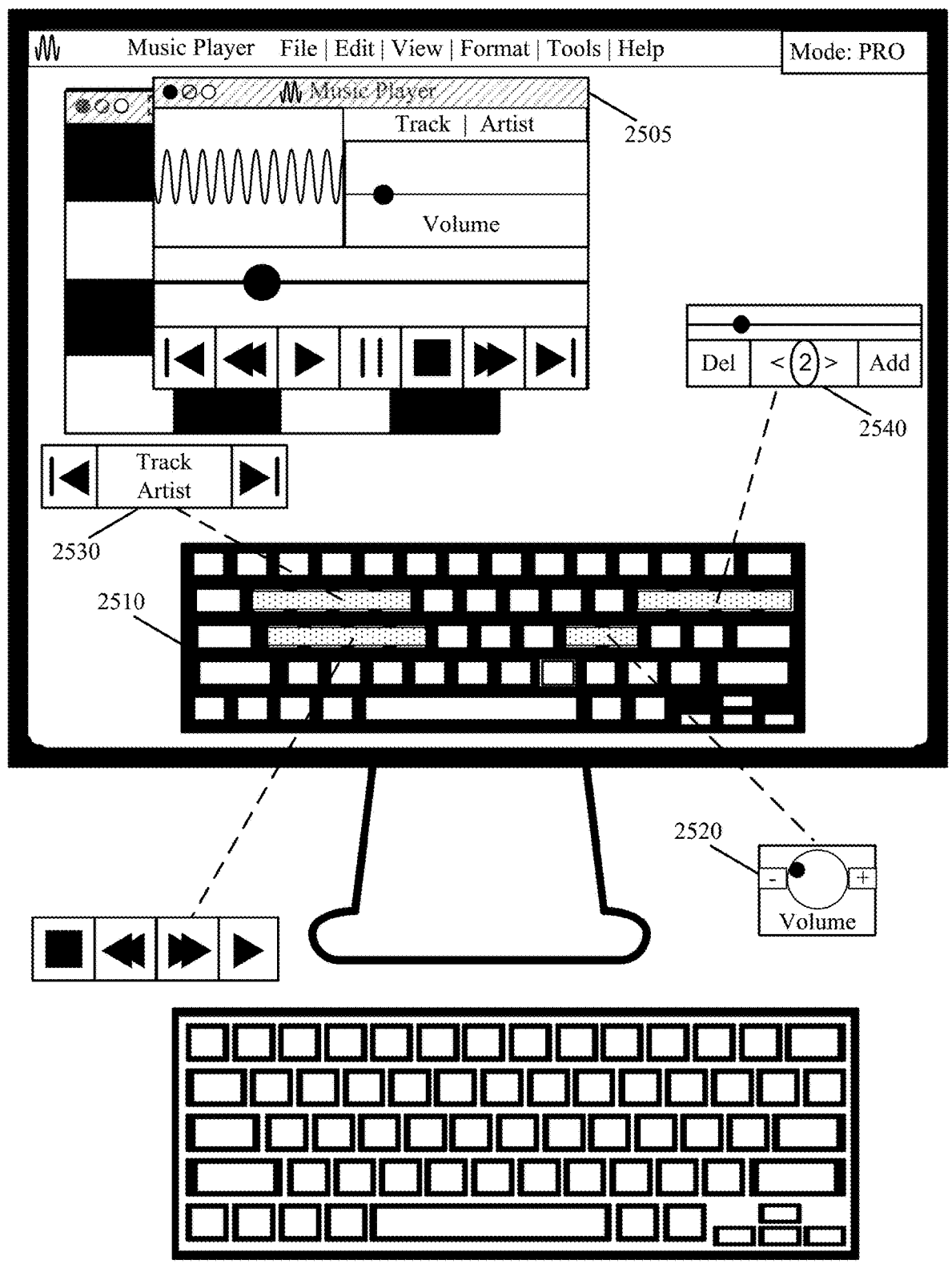
FIG. 25 illustrates the KEI viewer display when the frontmost application changes from the image viewing application of FIG. 24 to a music player application and the KEI engine is still in the PRO operational mode.

When the frontmost application changes, the system state information changes. As a result, a different set of symbols and widgets are identified by the KEI database. Therefore, the KEI viewer 2510 retrieves and displays the different set of symbols. FIG. 25 illustrates the KEI viewer 2510 display when the frontmost application changes from the image viewing application 2420 of FIG. 24 to a music player application 2505 and the KEI engine is still in the PRO operational mode.

As shown, the symbols and widgets (e.g., 2520, 2530, and 2540) that are displayed over the graphical keys of the KEI viewer 2510 now identify the invocable output actions for the music player application 2505. Accordingly, the user is able to control the music player functionality using the keyboard keys without having to interact with the UI elements of the music player application 2505.

In some embodiments, the widgets displayed over the graphical keys of the KEI viewer 2510 provide status information. For example, the KEI viewer 2510 displays a rotary volume widget 2520 that identifies the current volume level of the music player application 2505. The rotary volume widget 2520 also allows control over the volume level. Specifically, the widget 2520 is mapped over two graphical keys of the KEI viewer 2510. In this figure, the graphical keys correspond to the "K" and "L" keyboard keys. These keys can therefore be used to increase or decrease the volume of the music player application 2505.

As another example, widget 2530 spans four graphical keys (i.e., the "Q", "W", "E", and "R" graphical keys) of the KEI viewer 2510. The widget 2530 displays the name of the current track and artist name over the "E" and "W" graphical keys and the "Q" and "R" graphical keys identify output actions for changing the playing track using the corresponding "Q" and "R" keyboard keys.

In this figure, the KEI viewer 2510 also includes custom widget 2540 for the music player application 2505. The custom widget 2540 invokes application specific output actions that have not been implemented in the application 2505. In this manner, the KEI system enhances the music player application functionality without modifying the music player application.

The custom widget 2540 includes add, delete, and access elements that can be used to insert, delete, and access track markers. The track markers enhance the functionality of the music player application 2505 by creating "bookmark" locations within an audio track.

A marker is inserted at a current location within the audio track by tapping the "\" keyboard key. The tapping of the "\" key invokes the add marker element of the widget 2540. Markers that have been inserted into the track can then be accessed using the "<" and ">" access elements of the widget 2540. The "[" keyboard key invokes the previous marker access element and the "]" keyboard key invokes the next marker element. When a marker is accessed, the position of the audio track jumps to the exact location of the marker within the audio track. In this manner, favorite audio segments can be replayed at any time using the track markers of some embodiments.

The widget 2540 displays the number of markers that are assigned to the currently playing track and provides a delete element to remove an inserted marker. In some embodiments, the KEI engine stores the marker information within the extended attributes or metadata of the audio file. In some other embodiments, the KEI engine stores the marker information and other application information within the KEI system database.

The custom functionality is implemented using one or more output actions that are stored within the KEI database and accessible from the MOD "M" operational mode. The output actions specify various scripts, code, instructions, system and API calls that perform the add, delete, and access marker functionality.

i. Enhanced PRO Mode

In the above described figures, the KEI engine enables access to a particular set of output actions for each frontmost application when the PRO operational mode is active. However, in some embodiments, the KEI engine enables access to different sets of output actions for a given frontmost application when the PRO operational mode is active. Specifically, the KEI engine enables access to different sets of output actions for a given application based on system state information and/or a certain state of the application.

An application may include different views or UI elements with which a user can interact. These may include different windows, views, text fields, outline areas, lists, tables, web areas, etc. some of which may be given key focus through user actions. As the key focus cycles between the different elements, the KEI engine may enable access to different output actions based on the detected changes in the key focus as represented in the system state information. Therefore, the KEI engine may enable access to a first set of output actions when the system state information identifies that a first text field has key focus in a given application while enabling access to a second set of output actions when the system state information identifies that a second text field in the given application has key focus.

Additionally or alternatively, the KEI engine may enable access to different sets of output actions in a particular field based on different states of the particular field. The different states may be determined passively or actively by the KEI engine by monitoring user actions, data, user preferences, and other information that are related to the particular field. For example, when a user clicks on a first tool in a toolbar, the KEI engine detects that user action and enables access to a first set of output actions that are related to the first tool and when the user clicks on a second tool in the toolbar, the KEI engine detects that user action and enables access to a second set of output action that are related to the second tool. As another example, data that is displayed within a particular field may include tags that cause the KEI engine to enable access to different sets of output actions. Such data is referred to as KEI data. In some embodiments, KEI data is embedded within web content, data from files that are open within a frontmost application, metadata of a file, extended attributes of a file, or remotely acquired data.

The KEI data specifies the symbols and widgets for the KEI viewer, the mapping of the symbols and widgets to the graphical keys of the KEI viewer, the output actions associated with the symbols and widgets, and the mapping of the output actions to the keyboard keys. In the example of the web browser application, the symbols, widgets, output actions, and mapping may be embedded in HyperText Markup Language (HTML) tags of website code. The example below illustrates incorporating KEI data within HTML code using tags in accordance with some embodiments:

```
<KEIObject Link1>
<KEISymbol SRC="http://www.sample.com/symbol1.gif" ALT="Symbol1"/>
<KEIMap Symbol1="K"/>
<KEILink SRC="http://www.linktosite.com"/>
</KEIObject>
```

In the above example, the different HTML tags specify a KEIObject. The KEIObject includes (1) a KEISymbol tag for specifying an image to display as a symbol on the KEI viewer, (2) a KEIMap tag for specifying the mapping of the symbol to the "K" keyboard key and the "K" graphical key, and (3) a KEILink tag for specifying the output action hyperlink that is invoked when the "K" keyboard key is pressed or the "K" graphical key is clicked using a mouse. Other data, such as audio confirmation cues, etc., may also be embedded in the KEIObject.

Figure 26:
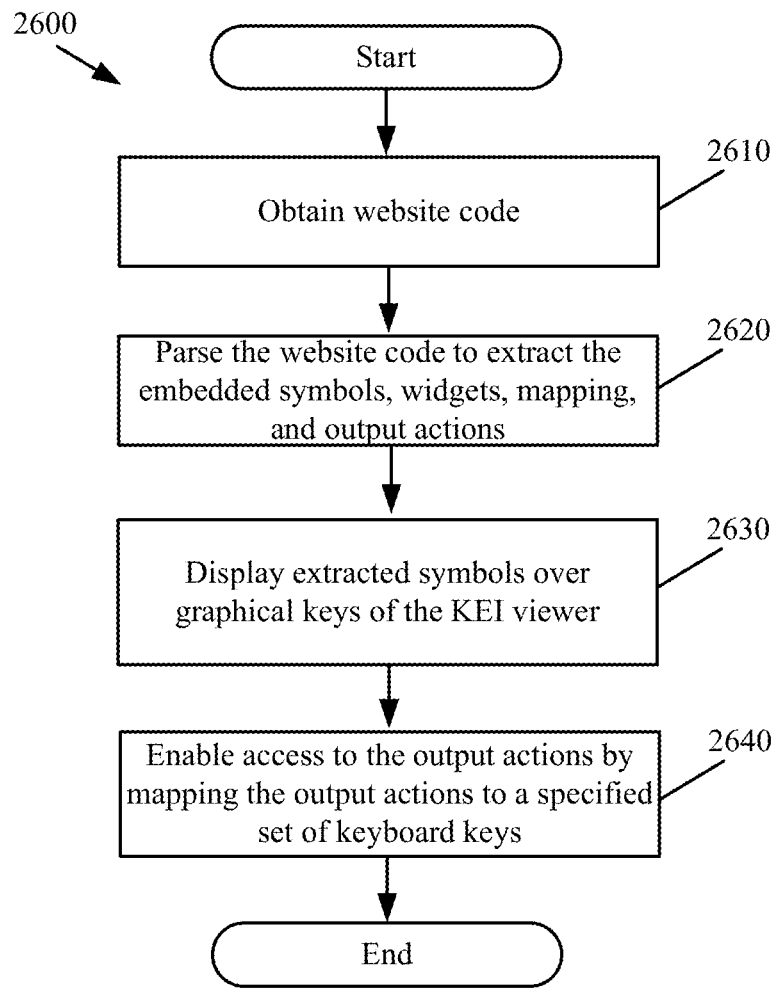
FIG. 26 presents a process for enabling access to a set of output actions based on remotely acquired data in accordance with some embodiments.

FIG. 26 presents a process 2600 for enabling access to a set of output actions based on remotely acquired data in accordance with some embodiments. The process 2600 begins when the KEI engine is in the PRO operational mode and the web browsing application is frontmost.

The process obtains (at 2610) the website code that is displayed within the browser application. The process gains access to the code using the Document Object Model (DOM). The process parses (at 2620) the website code to identify the KEI data tags from which the embedded symbols, widgets, mapping, and output actions are extracted. To extract the graphics and/or sounds for the symbols or widgets, the process may have to issue a request through the network in order to receive the graphics and/or sounds from a remote server. For example, when the embedded code specifies: <KEISymbol SRC="http://www.sample.com/symbol1.gif" ALT="Symbol1"/>, the process obtains the symbol for the KEI viewer by downloading the symbol1.gif image from the www.sample.com domain.

The process displays (at 2630) the extracted symbols over the specified graphical keys. In some embodiments, the process scales the symbols in order for proper display over the one or more graphical keys of the KEI viewer. The process enables (at 2640) access to the output actions by mapping the output actions (e.g., embedded hyperlinks) to the specified keyboard keys such that a press of a specified keyboard key invokes a corresponding output action. This allows users to invoke various hyperlinks of a particular website without having to move the mouse pointer through the website in order to click on the hyperlink. In addition to hyperlinks, the output actions may include other content such as commencing playback of streaming audio or video, launching applications or applets, or any variety of output actions.

In some embodiments, the KEI engine creates a record within the KEI database to store an output action that is specified within KEI data. As before, the enhanced events that are generated by the KEI engine in conjunction with the system state information are used to identify and invoke the output actions from the KEI database.

ii. Advertisements

Through the KEI data, the graphical keys of the KEI viewer can be used as a graphical medium with which to display one or more advertisements. In some such embodiments, the KEI data specifies one or more advertisements to display over one or more graphical keys of the KEI viewer. Specifically, the KEI data (i) includes links to download the advertisements from one or more remote advertising servers, (ii) specifies the one or more graphical keys of the KEI viewer over which to display the advertisements, and (iii) specifies the output actions that are associated with the advertisements. When invoked, an output action that is associated with a particular advertisement can direct the user to a website that is associated with a particular good or service that is being advertised. To invoke the output action, the user taps a keyboard key that corresponds to a graphical key over which the advertisement is displayed. In this manner, the user can invoke a hyperlink that is associated with an advertisement directly from the keyboard without having to point and click on the advertisement with a mouse. Moreover, the advertisements can be used to promote products, features, or enhancements for goods and services of a particular content provider when viewing a website of the particular content provider or when interacting with an application of the particular content provider that is frontmost. The advertisements may include advertisements that span one or more graphical keys such as banner advertisements. The advertisements may include animations, graphics, text, audio, or zipper text (described below with reference to FIG. 57).

In some embodiments, the KEI data allows for dynamic advertising by leveraging the functionality of a remote advertisement service. The remote advertisement service automatically provisions different advertisements over one or more of the KEI viewer graphical keys based on prior user behavior, demographics, etc. Some such remote advertisement services that are well known in the art include AdSense and DoubleClick. Accordingly, in some embodiments, the KEI data provides links to and specifies parameters for downloading advertisements from the remote advertisement service.

Figure 27:
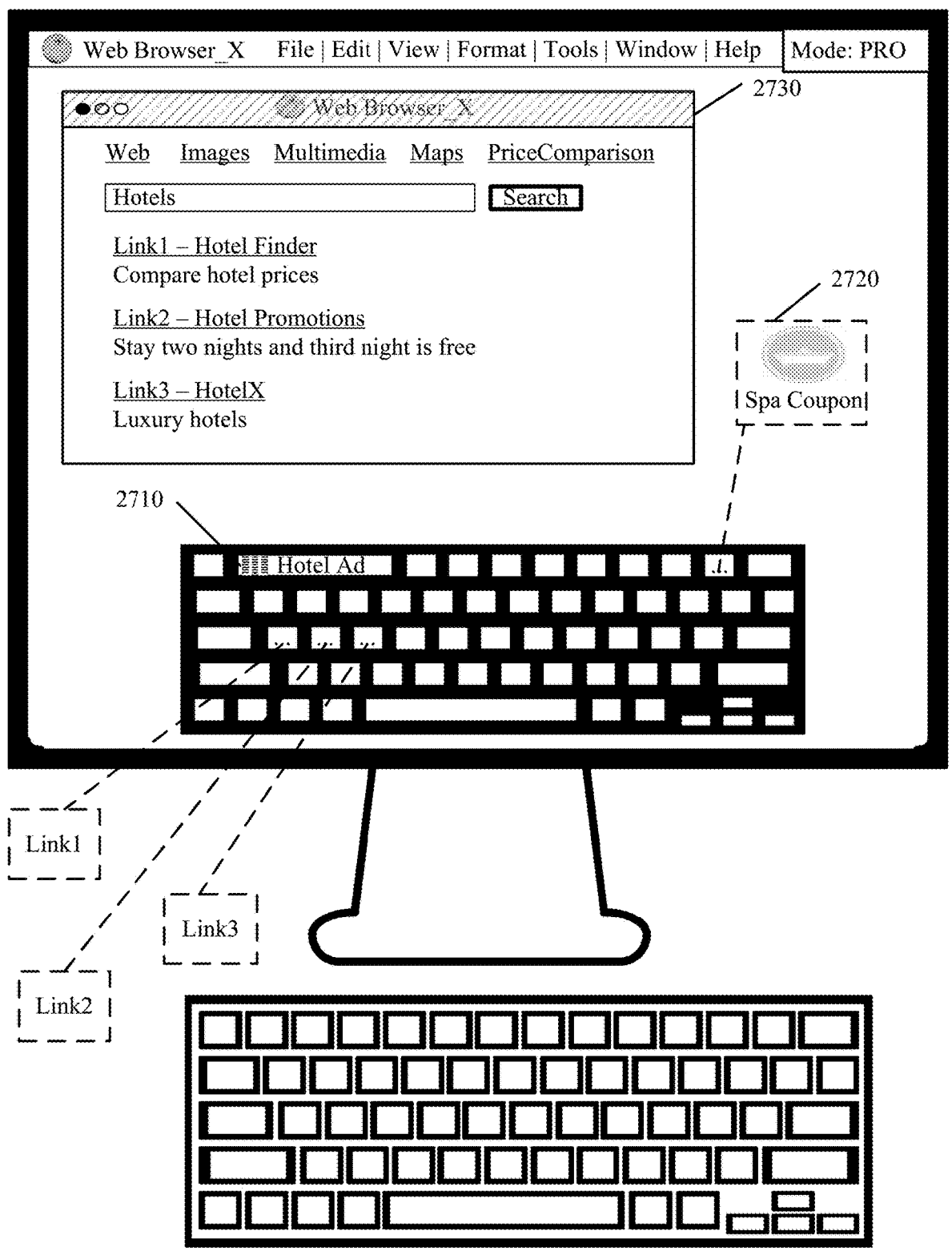
FIG. 27 illustrates the KEI viewer displaying advertisements over a set of the graphical keys in accordance with some embodiments.

FIG. 27 illustrates the KEI viewer displaying advertisements 2710 and 2720 over a set of the graphical keys in accordance with some embodiments. The advertisements 2710 and 2720 may be embedded using KEI data tags in the website content that is currently being displayed in the web browser application 2730. Moreover, the advertisements 2710 and 2720 may be dynamically provisioned by a remote advertisement service or may be specified using the embedded tags to be related to the currently displayed website content. For example in this figure, the user has performed a search for hotels in the web browser application 2730. Accordingly, the advertisements 2710 and 2720 that are displayed over the graphical keys of the KEI viewer are related to the local hotel search results.

In this figure, the advertisement 2710 spans three graphical keys of the KEI viewer and the advertisement 2720 is displayed over a single graphical key. Content providers may charge advertisers different fees based on the number of graphical keys over which an advertisement is displayed, thereby providing the advertiser a larger on-screen presence. Furthermore, content providers are able to charge advertisers (1) a first fee to display an advertisement over one or more of the graphical keys, (2) a second fee when the hyperlink that is associated with the advertisement is invoked, and (3) a third fee when a purchase is made as a result of traffic being directed to the advertiser's website based on an advertisement that was invoked from the KEI system.

Figure 28:
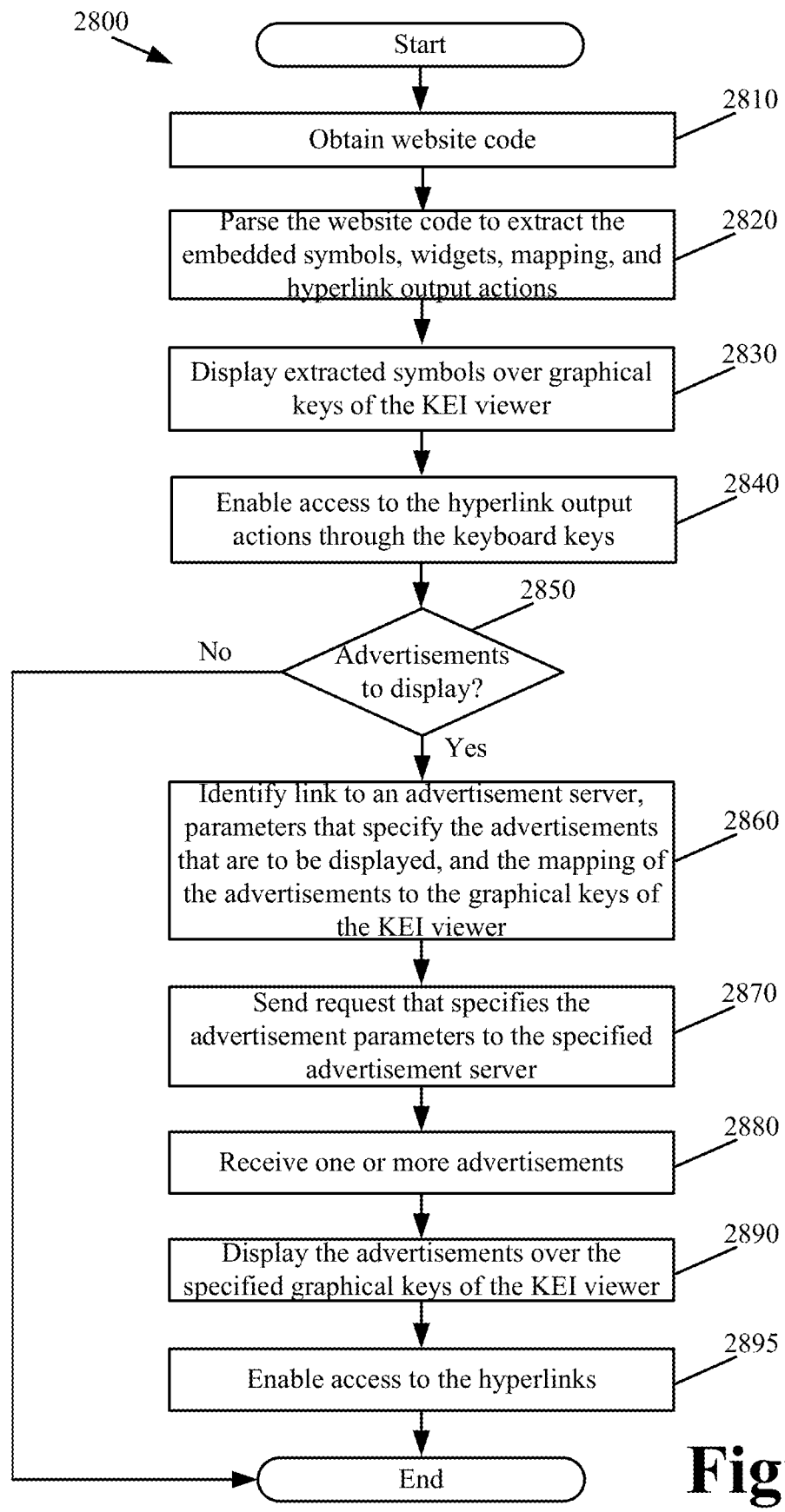
FIG. 28 presents a process for displaying one or more advertisements over the graphical keys of the KEI viewer in accordance with some embodiments.

FIG. 28 presents a process 2800 for displaying one or more advertisements over the graphical keys of the KEI viewer in accordance with some embodiments. The process 2800 begins when the KEI engine is in the PRO operational mode and a website is loaded in a web browser application that is frontmost.

As in FIG. 26, the process obtains (at 2810) the code for the website that is displayed within the browser application. The process parses (at 2820) the website code to extract the embedded symbols, widgets, mapping, and output actions. The process displays (at 2830) the extracted symbols over the specified graphical keys and enables (at 2840) access to the output actions by mapping the output actions to a specified set of keyboard keys that correspond to the graphical keys over which the symbols are displayed. When parsing the website code, the process also determines (at 2850) whether any advertisements are to be displayed over the graphical keys of the KEI viewer. When no advertisements are specified, the process ends. Otherwise, the process identifies (at 2860) from the KEI data a link to an advertisement server that stores the advertisements, zero or more parameters that specify the one or more advertisements that are to be displayed, and zero or more graphical keys of the KEI viewer over which to display the advertisements. The process sends (at 2870) a request that specifies the advertisement parameters to the specified advertisement server. The process receives (at 2880) the one or more advertisements. The process displays (at 2890) the advertisements over the specified graphical keys of the KEI viewer, enables (at 2895) access to the hyperlinks based on the specified output actions, and the process ends.

Processes 2600 of FIG. 26 and 2800 of FIG. 28 have been described relative to KEI data that is present within website content. However, KEI data may be included within the data of various files, the metadata of various files, from an application database, or other remote data stores.

iii. Symbol Convention

To leverage the user's muscle memory, some embodiments use symbol conventions across websites that include similar hyperlinks. Each symbol convention provides a shared set of symbols that are displayed over the same graphical keys of the KEI viewer thereby allowing a related set of output actions to be invoked using the same keyboard keys. In this manner, when a user visits different websites that have similar hyperlinks or functionality, the user can access the hyperlinks or functionality using a common set of keyboard keys and thereby avoid having to locate the hyperlink location on the website or corresponding symbol position on the KEI viewer.

Figure 29:
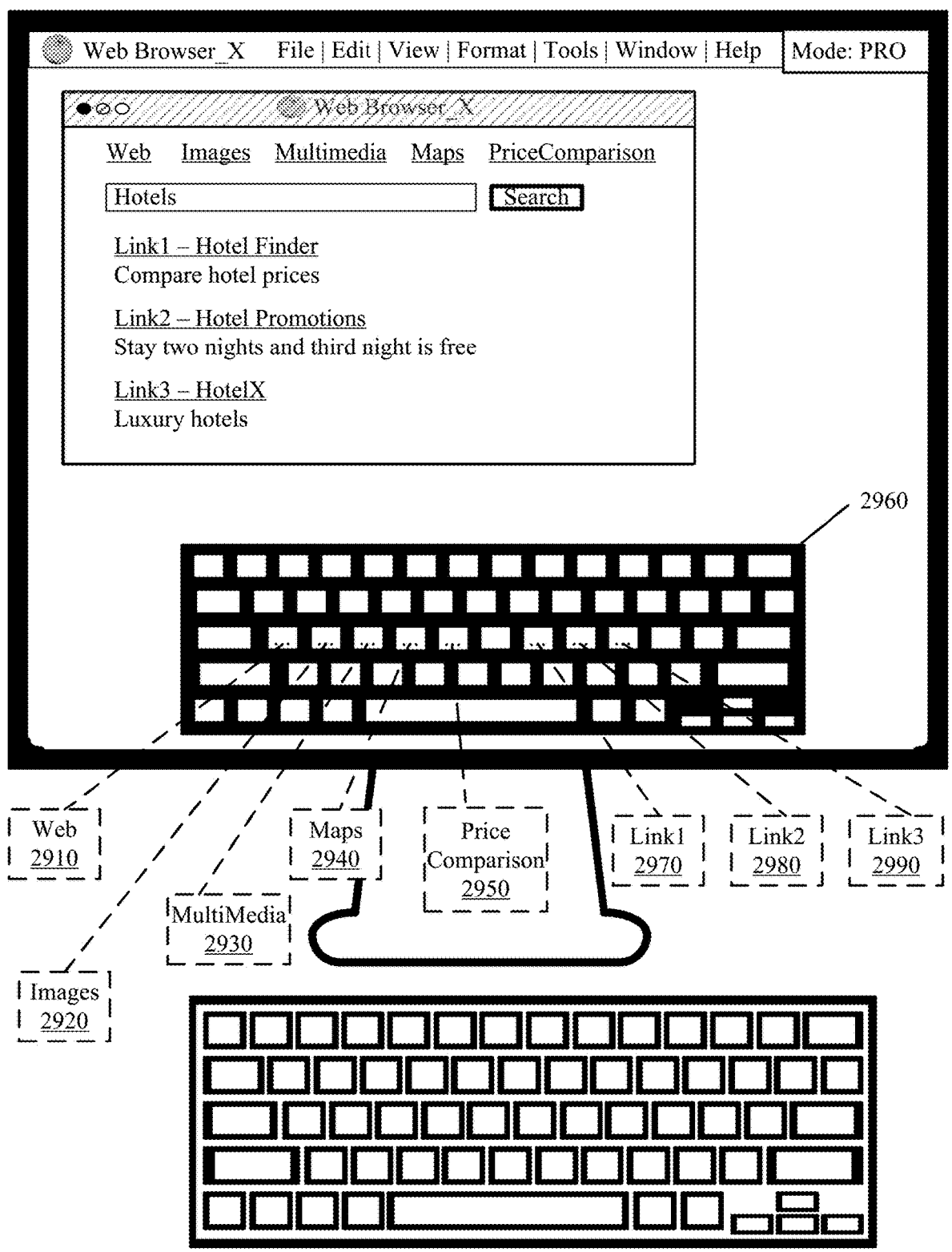
FIG. 29 illustrates a symbol convention for multiple search engine websites in accordance with some embodiments.

FIG. 29 illustrates a symbol convention for multiple search engine websites in accordance with some embodiments. The symbol convention includes symbols 2910, 2920, 2930, 2940, and 2950 that are displayed over the graphical keys of the KEI viewer 2960. The symbols 2910-2950 identify hyperlinks that are common to different search engine websites. For example, the symbol 2910 identifies a hyperlink for performing web searches, the symbol 2920 identifies a hyperlink for performing image searches, the symbol 2930 identifies a hyperlink for performing multimedia searches, the symbol 2940 identifies a hyperlink for performing map searches, and the symbol 2950 identifies a hyperlink for performing price comparison searches. This symbol convention provides users with a predefined set of keyboard keys that access similar search engine functionality irrespective of the search engine site. Users invoke the output actions that are identified by the symbols 2910-2950 by pressing the keyboard key that corresponds to the graphical key over which the symbols 2910-2950 are displayed.

In addition to the symbol convention symbols 2910-2950, the KEI viewer 2960 also displays symbols for other embedded links of the website. In this figure, the symbols 2970, 2980, and 2990 identify search result links that the user can directly invoke from the keyboard keys that correspond to the graphical keys over which the symbols 2970-2990 are displayed.

Another example includes a symbol convention that is used by various e-commerce retailers. In this example, the symbol convention may include symbols for a shopping cart, store locator, product search, and contact information. Depending on the retailer, the hyperlinks that are associated with each of the symbols link to different destinations. However, the functionality provided by each of the destinations is the same (e.g., shopping cart, store locator, etc.) for the different retailers and therefore users can access this common functionality through a common set of keyboard keys. Users can therefore quickly navigate through different websites without the need to search for and click on frequently accessed and common hyperlinks.

Each symbol convention is associated with a unique identifier. A content provider specifies a particular symbol convention by embedding a tag that specifies a particular unique identifier in the KEI data (e.g., <KEISymbConv=1234>). For each unique identifier, the KEI database stores a set of symbols, widgets, and mapping of the symbols and widgets to the KEI viewer graphical keys. Therefore, when an HTML tag identifies a unique identifier for a particular symbol convention, the KEI database can retrieve and pass the associated symbols, widgets, and mappings to the KEI viewer. In addition to the unique identifier, the content provider also provides the output actions for each of the symbols in a particular symbol convention by embedding the output actions in the content using the KEI data tags. Accordingly, the symbols 2910-2950 for the symbol convention of FIG. 29 can be made to link to different destinations when KEI data tags in different search engine websites specify the same symbol convention.

In some embodiments, the symbol conventions are hierarchically structured whereby the symbols, widgets, and mappings of a particular symbol convention change as different hierarchical levels are accessed. The different hierarchical levels may represent URL paths, sub-domains within a domain, hyperlinks within an ordered set of hyperlinks, folders within a folder hierarchy, etc. For example, a content provider specifies a first hierarchical level of a particular symbol convention when a user first accesses a landing page of a shopping website (www.store.com). This first hierarchical level includes a first set of symbols (e.g., shopping cart, my account, and weekly specials) that are presented using the KEI viewer. As the user selects hyperlinks from the landing page to access different related sites of the shopping website (e.g., www.store.com/weeklyspecials), different hierarchical levels of the particular symbol convention are accessed. At each hierarchical level, certain symbols, widgets, and mappings are reused (e.g., shopping cart and my account) and other symbols, widgets, and mappings may be hidden or added. By hierarchically organizing the symbol convention, the KEI system can reuse certain symbols, widgets, and mappings without having to redundantly store these symbols, widgets, and mappings in the KEI database. Instead, the KEI database can store one instance of the symbols, widgets, and mappings that are associated with a particular symbol convention. Then for each hierarchical level, the KEI database stores which of those symbols, widgets, and mappings are used at each of the hierarchical levels.

The primary function of the PRO operational mode is to interactively provide single-key output action shortcuts in a consistent manner across all applications on the user's computer. It should be noted that a small minority of existing applications allow users some ability to invoke simple output actions (i.e., tool selection) with single keyboard key taps without the use of a flag key in combination with those single key taps. However, such single-key output action invocation functionality is specific to the application and is provided by the developer of that application. Accordingly, there are no common usage paradigms across different applications. For example, the outline view in a file browsing application operates with the same single-key commands as the outline view embedded into a dialog box. Thus the user knows, by context, how to operate various conventions within the operating system. Stated differently, the PRO mode of the KEI system provides unique and novel single-key functionality system-wide, across all applications, which enhances efficiency and lowers the cognitive burden on the user.

Further distinguishing the present invention from per-app single-key prior art is the integration of the PRO operational mode with the KEI viewer. Because the KEI viewer is available system-wide and works consistently for every application, the user is provided an easy and quick reference as to which keys can be used to invoke which output actions. This is unlike the prior art where the user would need to refer to documentation specific to the application, explore the menu selections for the application, or use a trial-and-error approach to determine whether any output actions can be invoked with single keys and, if so, which keys are usable to invoke the output actions. The KEI viewer also makes it clear when the PRO operational mode is active by automatically invoking and dismissing the windowless display of the KEI viewer.

Furthermore, the PRO operational mode of the KEI system is not limited to a single context within an application. For example, in a word processing application, single-key shortcut functionality may be desired when editing text, and different single-key functionality may be desired when reviewing or highlighting text. Such changing of context can be done manually by the user, or in some cases is done automatically, based on various system state parameters such as the UI element that has key focus or the URL of the frontmost document. For example, an outline editor application might contain two distinct modes, one for entering text, and another for navigating and organizing the outline. The user can toggle between these modes by tapping a key (e.g., the "caps lock" key), which enables and disables the PRO operational mode. Stated more precisely, the user may enter text into a particular element of the outline in the ABC operational mode, then, by tapping a designated key, toggle to the PRO operational mode to easily select and move elements of the outline, then toggle back to the ABC mode by tapping the designated key again. Examples of the PRO operational mode context changing automatically have been described above with reference to the section entitled "Enhanced PRO mode".

Additionally, the PRO operation mode of the KEI system incorporates the tap functionally of the KEI system, so that, for example, double-tapping the key of a single-key command invokes a secondary function. For example, in a movie viewing application tapping the "F" key may cause the movie to play. Double tapping the "F" key may cause the movie to toggle full-screen mode. For these and other reasons, the PRO operational mode of the KEI system offers functionality that is distinct from the application specific single-key shortcuts present in the prior art.

D. MOD

The user can override the ABC, SEL, and PRO operational modes at any time by holding down a key beyond the requisite HOLD state time threshold. Based on which key or keys are held down, a different MOD operational mode becomes active with each MOD operational mode enabling access to a set of output actions that are associated with the key or keys that are held down. The KEI viewer provides the visual reference for the set of output actions based on the key or keys used to enter a particular MOD operational mode.

For example, holding down the "M" key causes the KEI engine to enter the MOD operational mode. Additionally, the KEI engine enables access to a first set of output actions that are associated with the holding down of the "M" key. To invoke an output action in the first set of output actions, the user continues to hold down the "M" key and taps another key for which an output action is provided.

By way of another example, when the user holds down the "E" key (instead of the "M" key), the KEI engine enters a different MOD operational mode and enables access to a second set of output actions that are associated with the holding down of the "E" key. To invoke an output action in the second set of output actions, the user continues to hold down the "E" key and taps another key for which an output action is provided.

In some embodiments, the holding down of a particular key or keys enables access to output actions for a particular application that may not be frontmost. For example, holding down the "M" key enables access to output actions of a music player application and holding down the "E" key enables access to output actions of an email application even when the music player application and the email application are not frontmost.

Internally, the KEI engine generates different enhanced events depending on which key or keys are held down. For example, holding down the "M" key generates the MOD_start and the MOD_m enhanced events. Tapping the "J" key while continuing to hold down the "M" key generates the MOD_m_J enhanced event. Releasing the "M" key generates the MOD_M and MOD_end enhanced events. As described elsewhere, REP enhanced events are also sent when in SEL, PRO, or MOD modes.

Through the MOD operational mode, users have access to and may invoke output actions that may be outside the scope of the frontmost application. Users can thereby invoke output actions for background applications, minimized applications, utilities, scripts, etc. By releasing the key that was held, the KEI engine returns to the previous operational mode from which output actions for the frontmost application continue to be invoked.

The MOD operational mode allows for quicker and more efficient invocation of output actions of background applications than the GUI. For instance, to invoke an output action for a particular background application using the GUI, the user navigates to an icon of the particular background application. The user clicks on the icon to make the particular background application frontmost. The user then navigates to a menu or toolbar that contains the UI element that invokes a desired output action. The user must then navigate to the UI element which returns to the previous application to resume operations within that application.

In some embodiments, the user holds a key that accesses output actions of a particular background application. The display of the KEI viewer automatically changes to provide a visual reference for the output actions of the particular background application including application state information (e.g., current volume, mute on/off, etc.). The user identifies a keyboard key that invokes the desired output action by referencing the symbols or widgets of the KEI viewer. The user then invokes the desired output action by tapping the identified keyboard key.

In this way, users are able to directly invoke output actions without having to selectively navigate the GUI. Repeated invocation of the same output action ingrains the required key presses in the user's muscle memory so that each subsequent invocation can be made faster and without the need to refer to the KEI viewer.

Figure 30:
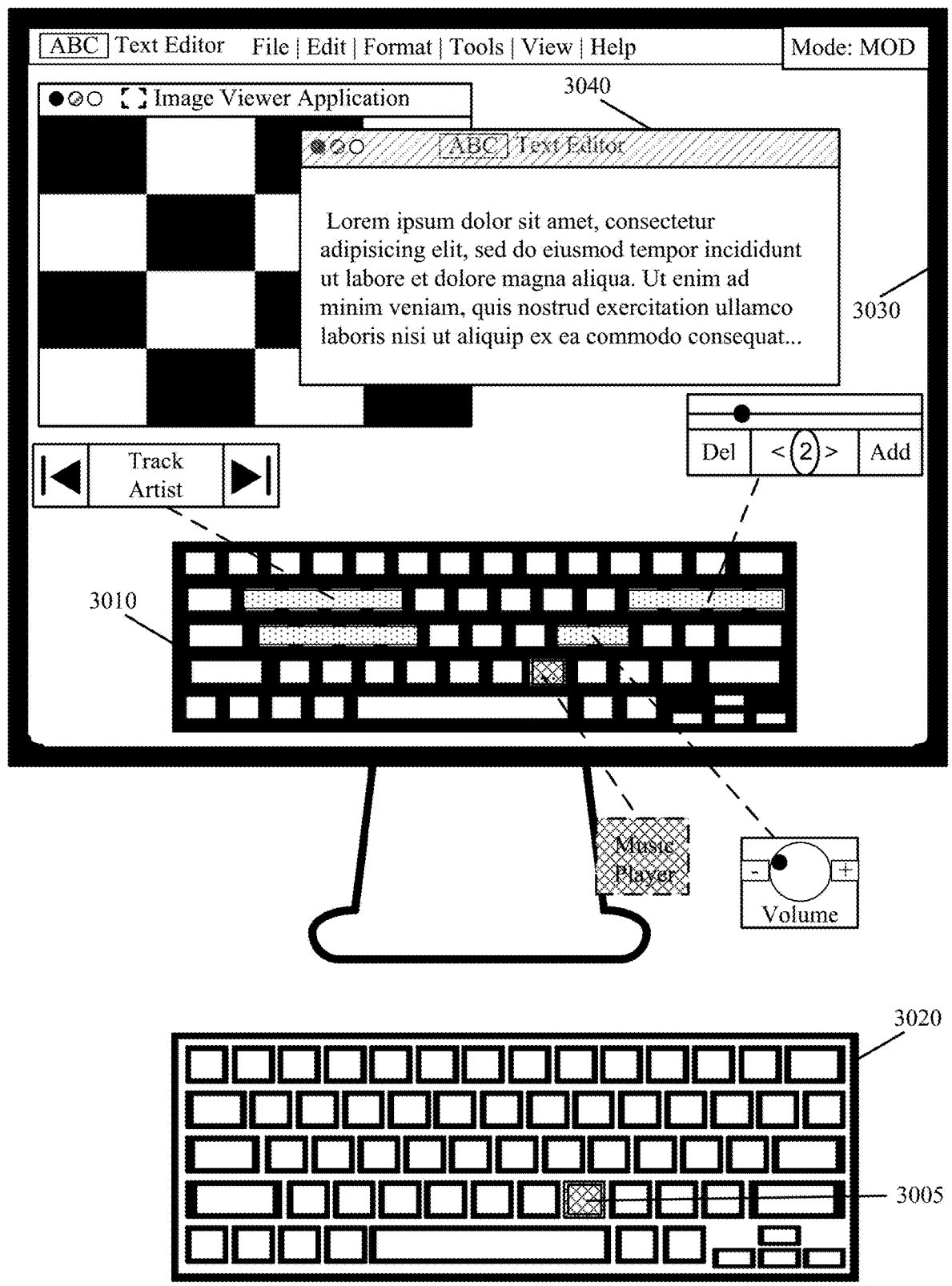
FIG. 30 illustrates using the KEI engine functionality to invoke output actions for a background application in accordance with some embodiments.

In accordance with some embodiments, FIG. 30 illustrates using the KEI engine functionality to invoke output actions for a background application. In this figure, the "M" key 3005 on the keyboard 3020 is held down as denoted by the overlapping crossing lines. The holding down of the "M" key 3005 causes the KEI engine to enter the MOD "M" operational mode. The KEI viewer 3010 invokes and updates its display to present the symbols and widgets for the MOD "M" operational mode. The symbols and widgets identify the output actions that may be invoked using the keyboard keys when the "M" key is held down.

In this figure, holding down the "M" key enables access to the output actions of the music player application. As seen from the display 3030, the music player application is not frontmost (e.g., the music player application is minimized or in the background). Nevertheless, while the "M" key is held down, the keys of the keyboard 3020 may be used to control the music player application by changing tracks, adjusting volume, or inserting and removing markers.

When the user releases the "M" key, the KEI engine reverts to the ABC operational mode since the text editor application 3040 is frontmost and there is no text selected within the text field. The user may at any time gain access to the output actions for the music player application by again holding down the "M" key.

In some embodiments, one or more MOD operational modes are defined to modify mouse or trackpad behavior. In some such embodiments, holding down a particular keyboard key allows mouse and trackpad movements to perform different output actions instead of traditional on-screen pointer movements. For example, a frontmost application may include a leftmost scroll area and a rightmost scroll area. When the "Z" key is held down beyond a specified duration and touch movements are issued on a trackpad, the touch movements perform scrolling within the leftmost scroll area and when the "X" key is held down beyond the specified duration and touch movements are issued on the trackpad, the touch movements perform scrolling within the rightmost scroll area. Additionally, the mouse or trackpad buttons can be used to invoke different output actions in these MOD operational modes. Similarly, some mouse input devices include a touch sensitive area where the touch sensitive area can be used to invoke different output actions in these MOD operational modes.

E. FLAG

The FLAG pseudo-operational mode provides access to preexisting output actions that are ordinarily accessed by holding at least one flag key while tapping another key of the keyboard. For example, the cut, copy, and paste commands are ordinarily invoked by holding either the "ctrl" or "command" keys while tapping the "X" key to perform a cut, the "C" key to perform a copy, and the "V" key to perform a paste.

The KEI viewer displays symbols for the flag output actions that are available based on the frontmost application. To do so, the user holds down a particular flag key beyond a requisite time threshold and the corresponding output actions that can be invoked using the particular flag key are displayed on the KEI viewer. When the frontmost application changes, the flag output actions and corresponding symbols of the KEI viewer also change. Accordingly, in some embodiments, the symbols that are associated with each flag key are application specific.

Through the KEI viewer, the flag output actions are presented to the user so that the user does not have to memorize the key combinations required to invoke the flag output actions. The user does not have to refer to documentation to reveal the keys that invoke the output actions. Moreover, through repeated use, the keys that invoke the various flag output actions become ingrained in the users' muscle memory such that subsequent invocation can be performed more efficiently without reference to the KEI viewer. The KEI viewer provides an animated interactive view to illustrate the changing of the accessible flag output actions as different flag key combinations are held down.

The KEI system therefore allows a user to invoke preexisting flag based output actions without interfering with the regular invocation of such output actions. However, the KEI system enhances the flag functionality by allowing a user to visualize which output actions can be invoked with which flag key combination. In some embodiments, the user can adjust the time threshold for presenting the mapping of the flag output actions to the keyboard keys via the KEI viewer. For example, the user may adjust the time threshold to 0 ms such that when a flag key is pressed, the output actions that are associated with that flag key are immediately presented on the KEI viewer.

The following example identifies variations in flag output actions for different applications. When the frontmost application is a web browser and the user holds down the "ctrl" flag key, the KEI viewer displays a symbol to identify that the "B" key invokes an output action that accesses bookmarks of the web browser application. However, when the frontmost application is a text editor application and the user holds down the "ctrl" flag key, the KEI viewer displays a symbol to identify that the "B" key invokes an output action that bolds text.

As before, the different sets of symbols and/or widgets are identified from the KEI database using system state information, and one or more enhanced events that are generated by the KEI engine. The flag output actions are available from any of the ABC, SEL, and PRO operational modes by holding down any one or more flag keys.

Figure 31:
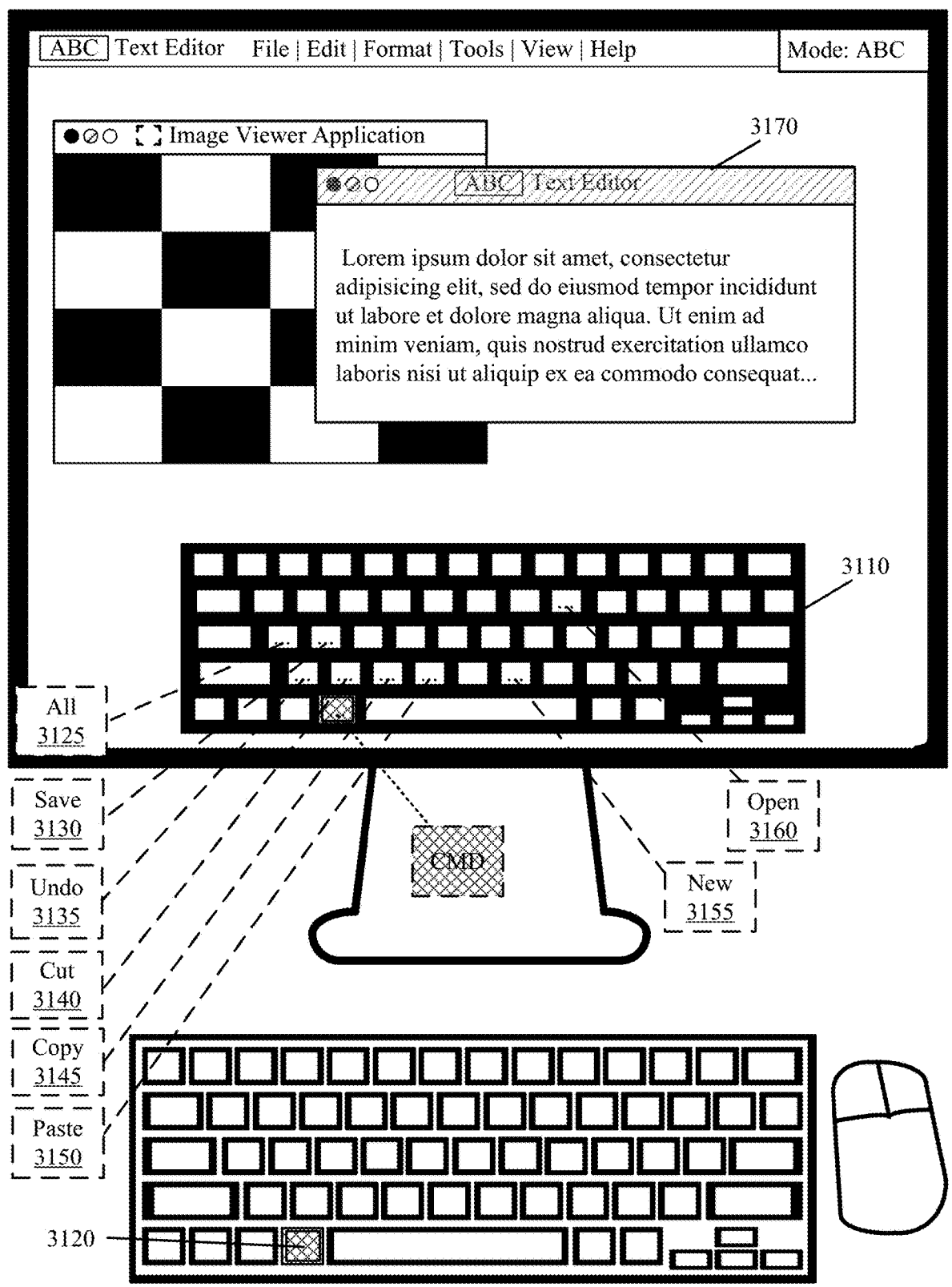
FIG. 31 illustrates the KEI viewer displaying symbols to identify flag output actions that are associated with the "command" key in accordance with some embodiments.

FIG. 31 illustrates the KEI viewer 3110 displaying symbols to identify flag output actions that are associated with the "command" key 3120 in accordance with some embodiments. As shown, the symbols 3125-3160 displayed over the graphical keys of the KEI viewer 3110 identify the mapping of the "command" flag key output actions to the keyboard keys when application 3170 is frontmost. For example, the output action associated with the "save" output action is invoked by holding down the "command" key and tapping the "S" key.

When the "alt" key is held, the KEI viewer displays symbols that identify the mapping of the "alt" flag output actions to the keyboard keys. When the "alt" key is released, the KEI viewer is dismissed or hidden from view. The KEI viewer also displays the mapping for when multiple flag keys are held down at the same time. When the "ctrl" key is held with the "alt" key, the KEI viewer displays symbols to identify the mapping of the "ctrl" and "alt" flag output actions to the keyboard keys. Similarly, the KEI viewer is dismissed or hidden from view when all flag keys are released.

F. REP

Figure 32:
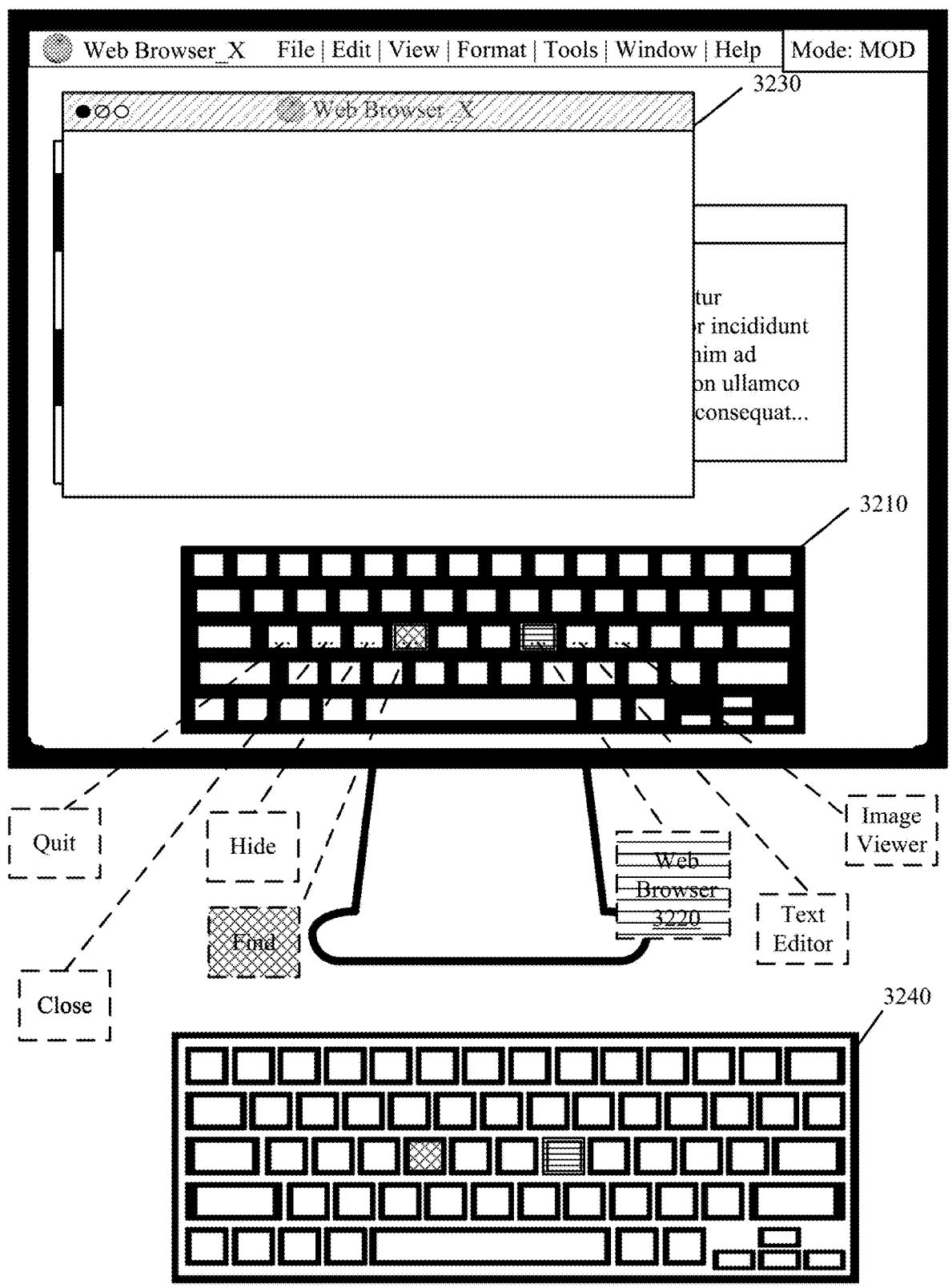
FIG. 32 illustrates using a hold of the "F" key to cause the KEI engine to enter the MOD "F" operational mode.
Figure 33:
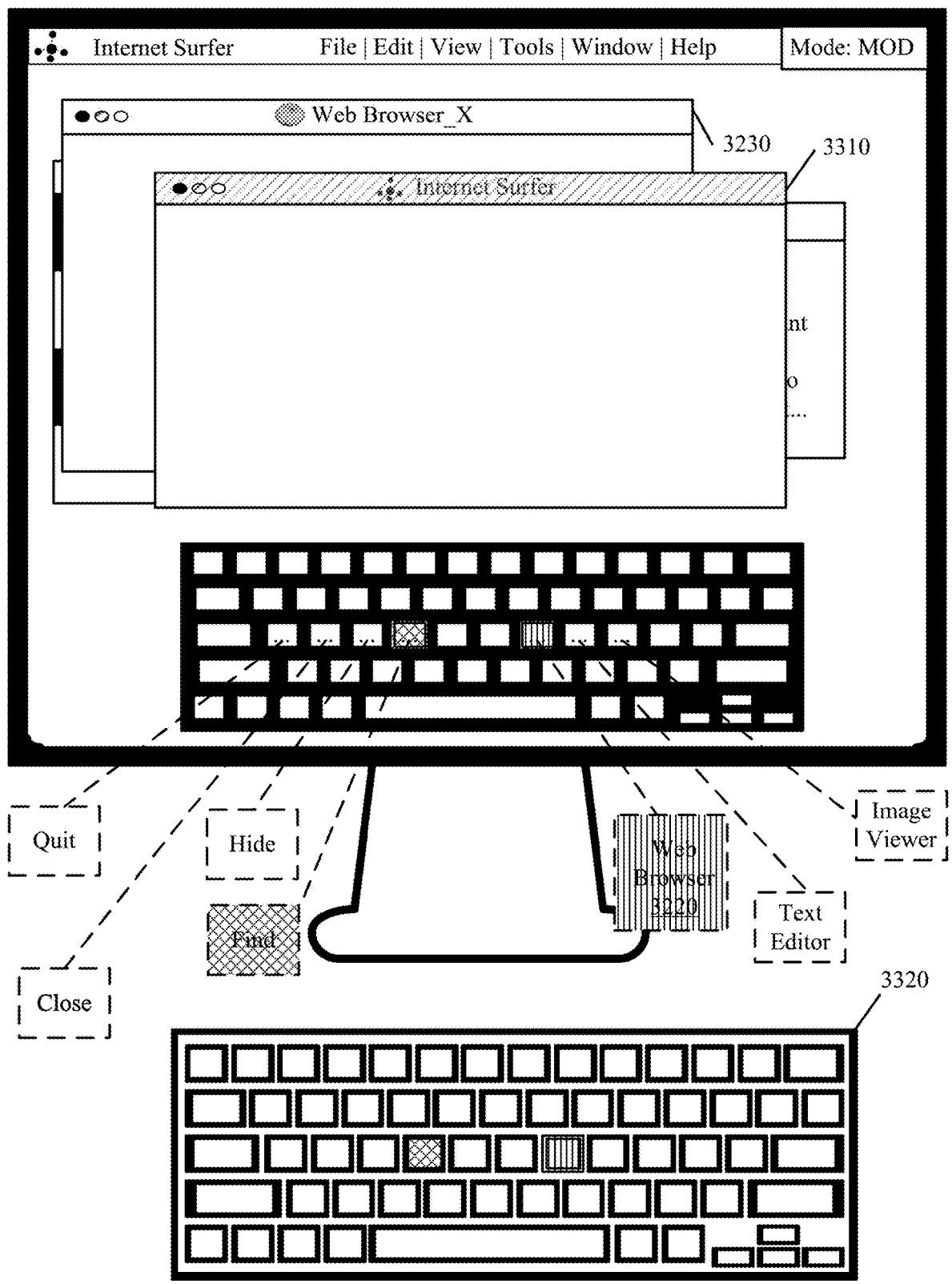
FIG. 33 illustrates the KEI engine launching a different web browser application when the "F" key is held down and the "J" key is tapped twice within a 200 ms duration.

FIGS. 32 and 33 illustrate use of the REP enhanced events to invoke different output actions through the same keyboard key in accordance with some embodiments. In FIG. 32, the user holds down the "F" key which causes the KEI engine to enter the MOD "F" operational mode. The KEI viewer 3210 displays symbols and widgets that are associated with the MOD "F" operational mode. Symbol 3220 identifies that the "J" key can be used to launch a web browser application. In this figure, the REP enhanced event may be used to launch two or more different web browser applications using the "J" key.

While continuing to hold down the "F" key, the user taps the "J" key one time and the KEI engine generates MOD_f_j and MOD_f_J enhanced events and a REP1_f_J enhanced event that are passed to the KEI database. In this example, the MOD_f_j and MOD_f_J enhanced events do not identify an output action in the KEI database and therefore the MOD_f_j and MOD_f_J enhanced events are ignored. However, the REP1_f_J enhanced event identifies and invokes a first output action that launches the "Web Browser_X" application 3230. The single tap of the "J" key is denoted by the horizontal lines on the keyboard 3240.

In FIG. 33, the KEI engine launches a different web browser application when the "F" key is held down and the "J" key is tapped twice within a 200 ms duration. In this instance, the KEI engine generates a REP2_f_J enhanced event and multiple MOD enhanced events that are passed to the KEI database. As in FIG. 32, the MOD enhanced events do not identify an output action and are therefore ignored. However, the REP2_f_J enhanced event identifies a second output action that launches the "Internet Surfer" application 3310. The double tap of the "J" key is denoted by the vertical lines on the keyboard 3320. In some embodiments, the taps can also be used to close or hide the applications when the corresponding applications have already been launched. In some embodiments, the web browser 3230 is Microsoft's Internet Explorer and the web browser 3310 is Mozilla's Firefox. As one skilled in the art would understand in light of the present description, any output action besides application launch output actions may be layered atop other output actions.

Furthermore, each tap can be used to invoke different output actions depending on whether the final tap is registered by holding the tapped key down or releasing the tapped key. For example, the KEI engine generates the REP2_f_J enhanced event when (i) the "F" key is held down, (ii) the "J" key is tapped twice, and (iii) the "J" key is released at the end of the second tap (a normal tap). As noted above, this enhanced event identifies and invokes the output action for launching the "Internet Surfer" application 3310. However, the KEI engine may generate the alternate REP2_f_j enhanced event where the "j" letter in the enhanced event is lower case based on a (i) the "F" key being held down, (ii) tapping the "J" key twice, but (iii) holding down the "J" key rather than completing the second tap. The REP2_f_j enhanced event may be used to invoke a different output action than the REP2_f_J enhanced event. In some embodiments, the REP2_f_j enhanced event invokes an output action that audibly identifies the "Internet Surfer" application 3310 so that the user is aware that a double tap (where the second tap is released) can be used to launch the "Internet Surfer" application 3310. More generally, when the user holds down a key, rather than completes the tap sequence by releasing the key, the KEI system audibly announces the output action that would result from a tap sequence of that key where the key is released at the completion of the tap sequence. This allows a non-visual way for a user to confirm a desired output action prior to actually invoking it. This is particularly useful for visually challenged users. In some embodiments, when a particular output action has not been previously utilized, or is very seldom utilized, an additional audible and/or visual confirmation step is presented before the actual invocation of the output action.

G. Scope Slider

Some embodiments provide a UI tool for the KEI viewer that modifies the scope of output action execution. In some embodiments, the UI tool changes the scope to provide access to only global output actions (i.e., global scope), global and application output actions (i.e., application scope), or global, application, and overlay output actions (i.e., overlay scope).

Figure 34:
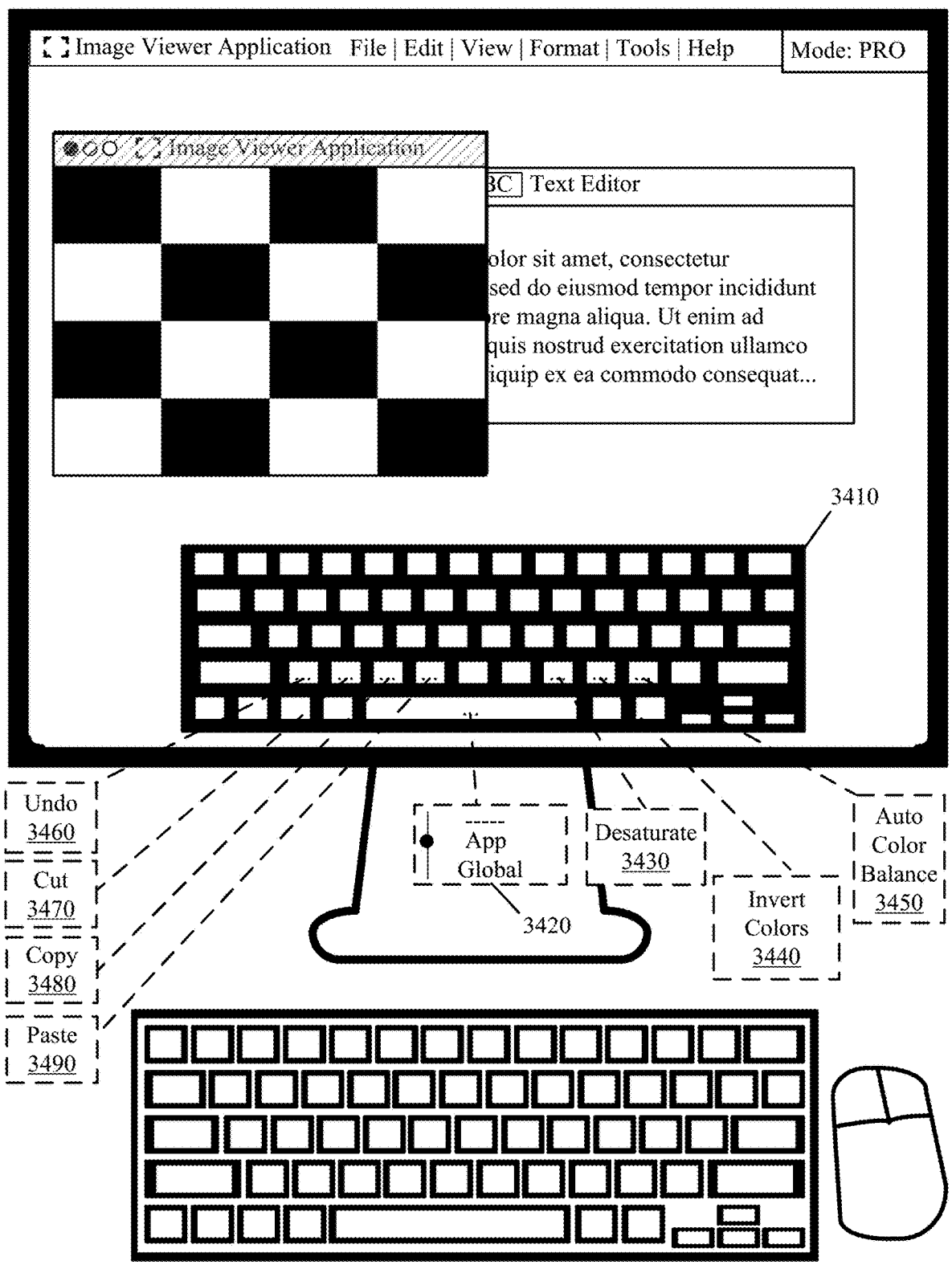
FIG. 34 illustrates a UI tool for modifying the scope of output action execution in accordance with some embodiments.

FIG. 34 illustrates the UI tool in accordance with some embodiments. The UI tool is displayed as a scope slider widget 3420 of the KEI viewer 3410. In FIG. 34, the widget 3420 is set to the application scope. Accordingly, the KEI viewer 3410 displays symbols for application scope output actions 3430, 3440, and 3450 and global scope output actions 3460, 3470, 3480, and 3490.

Figure 35:
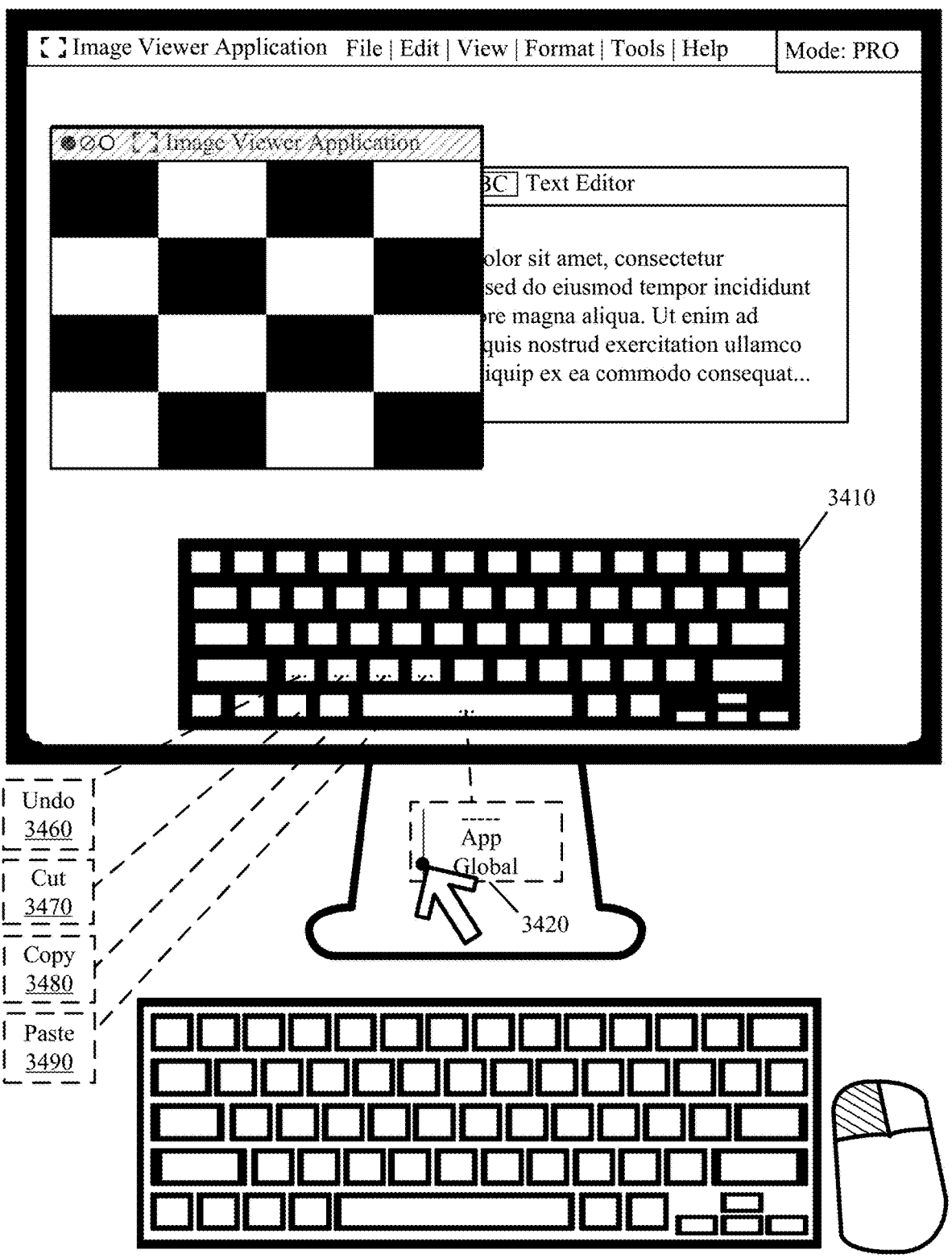
FIG. 35 illustrates the KEI viewer of FIG. 34 after changing the widget from the application scope to the global scope.

FIG. 35 illustrates the KEI viewer 3410 of FIG. 34 after changing the widget 3420 from the application scope to the global scope. The user changes scope by manipulating the slider to select one of the different scope options displayed on the widget 3420. By changing to the global scope, the KEI viewer 3410 hides the symbols for the application scope output actions 3430, 3440, and 3450 from the display. Accordingly, the KEI viewer 3410 displays only the symbols for the global scope output actions 3460, 3470, 3480, and 3490. Additionally, when dragging and dropping symbols or output actions to the KEI viewer as discussed below, the scope slider widget 3420 can be used to specify the functional scope from which those symbols or output actions are accessible.

IV. KEI Customizations

In some embodiments, the KEI system is user customizable. The customizations are made using the KEI viewer. More specifically, customizations are in some embodiments made by dragging and dropping symbols and widgets that identify particular output actions to and from the graphical keys of the KEI viewer.

Users, application developers, and system engineers can specify a particular keyboard key to invoke an output action by dragging and dropping a symbol or widget that identifies the output action to the graphical key of the KEI viewer that corresponds to the particular keyboard key. Once the symbol or widget is dropped to the graphical key, the KEI viewer sends the appropriate information to the KEI database to notify it of the changes. A corresponding output action for the symbol or widget is stored in the KEI database. The output action may be manually specified or provided by the user, may be included as part of the dragged and dropped symbol or widgets (i.e., a shortcut path that is associated with an icon), or may be automatically generated by the KEI system based on properties of the symbols or widgets (e.g., action handlers). The dragged symbol or widget may include a UI element that is used in the GUI to invoke the output action, an icon, a file, an object, a hyperlink, graphical slider, checkbox, button, or other graphical element (e.g., menu item) that is used to invoke the output action.

Users, application developers, and system engineers can remove an output action from a key by dragging and dropping the symbol that identifies the output action to a trash/delete icon on the desktop in some embodiments. Internally, the KEI system automatically deletes or disables the output action in the KEI database and removes the symbol from the viewer.

Furthermore, users, application developers, and system engineers can change the keyboard keys that are used to invoke certain output actions by repositioning the corresponding symbols and widgets over the graphical keys of the KEI viewer. Internally, the KEI engine changes which enhanced events identify the corresponding output actions in the KEI database.

In some embodiments, the KEI viewer provides a keyboard construction set functionality that is designed to create and edit symbols, widgets, and output actions for the KEI system. Such functionality allows users the ability to create custom symbols and widgets with custom functionality. In some other embodiments, the KEI viewer displays a second graphical display that includes a second set of graphical keys to which users can drag-and-drop symbols and widgets. In some such embodiments, the user can retain a particular KEI viewer display while adding, removing, and modifying the symbols and widgets of another display.

A. Files

In some embodiments, a file can be dragged and dropped to a graphical key of the KEI viewer. In so doing, the KEI viewer displays a symbol for the file over the graphical key as well as any associated zipper text (described below with reference to FIG. 57). Internally, the KEI generates an output action within the KEI database to open the file if not yet open or hide the file if the file is open in the frontmost application. Files include documents, spreadsheets, presentations, images, videos, audio files, other media files, and file folders as some examples.

Figure 36:
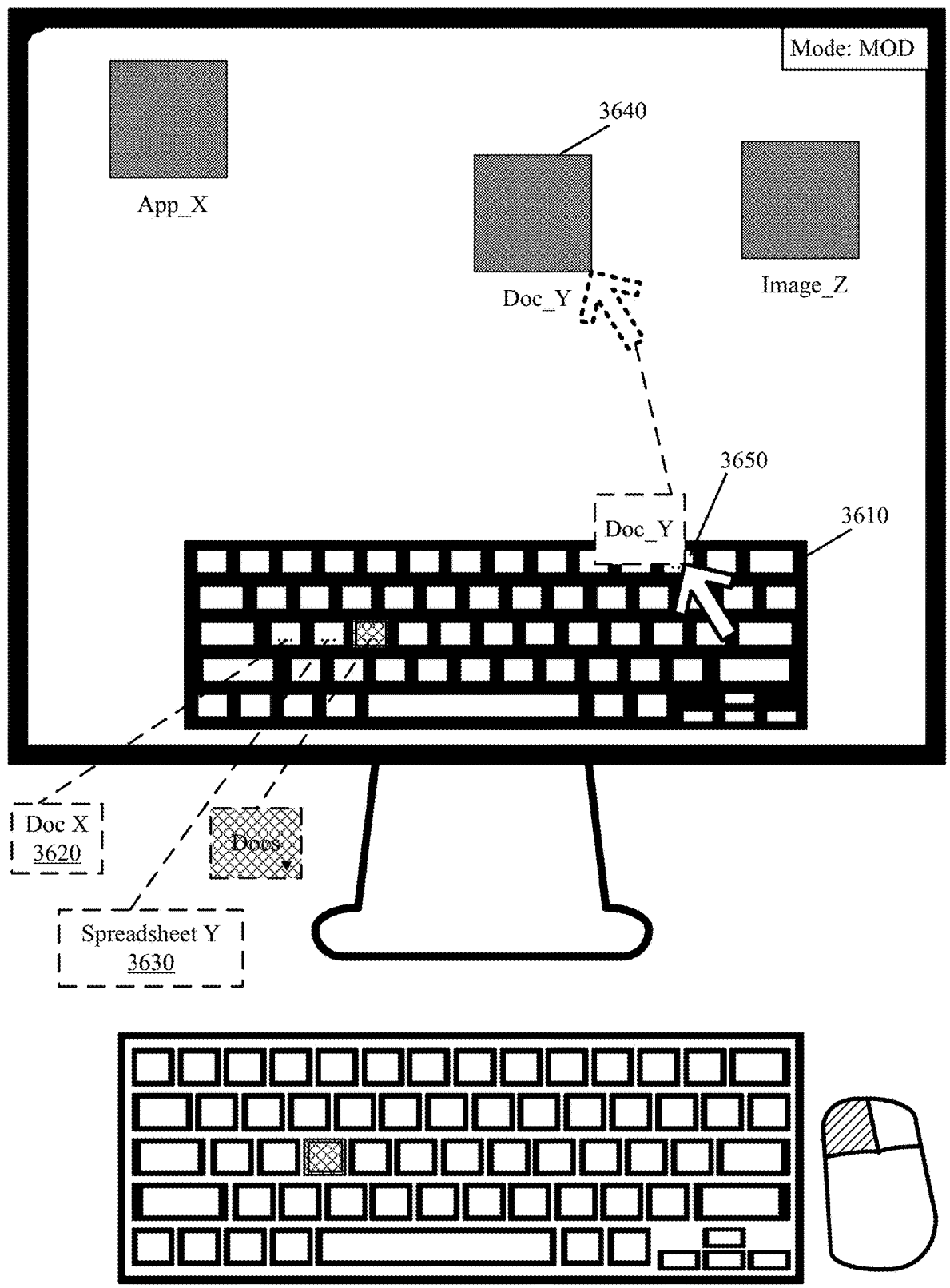
FIG. 36 illustrates dragging and dropping a document file to a graphical key of the KEI viewer in accordance with some embodiments.

FIG. 36 illustrates dragging and dropping a document file 3640 to a graphical key of the KEI viewer 3610 in accordance with some embodiments. In this figure, the user holds down the "D" key to enter the MOD "D" operational mode. The KEI viewer displays the symbols that are associated with the MOD "D" operational mode. The KEI viewer 3610 displays symbols 3620 and 3630 that identify output actions for other files that may be opened using keyboard keys that correspond to the graphical keys over which the symbols 3620 and 3630 are displayed.

The user clicks and drags the file 3640 from the GUI (e.g., desktop or folder view) to a graphical key of the KEI viewer 3610 and drops the file 3640 over the graphical key. In this figure, the user drops the file 3640 over the "-" graphical key 3650.

Figure 37:
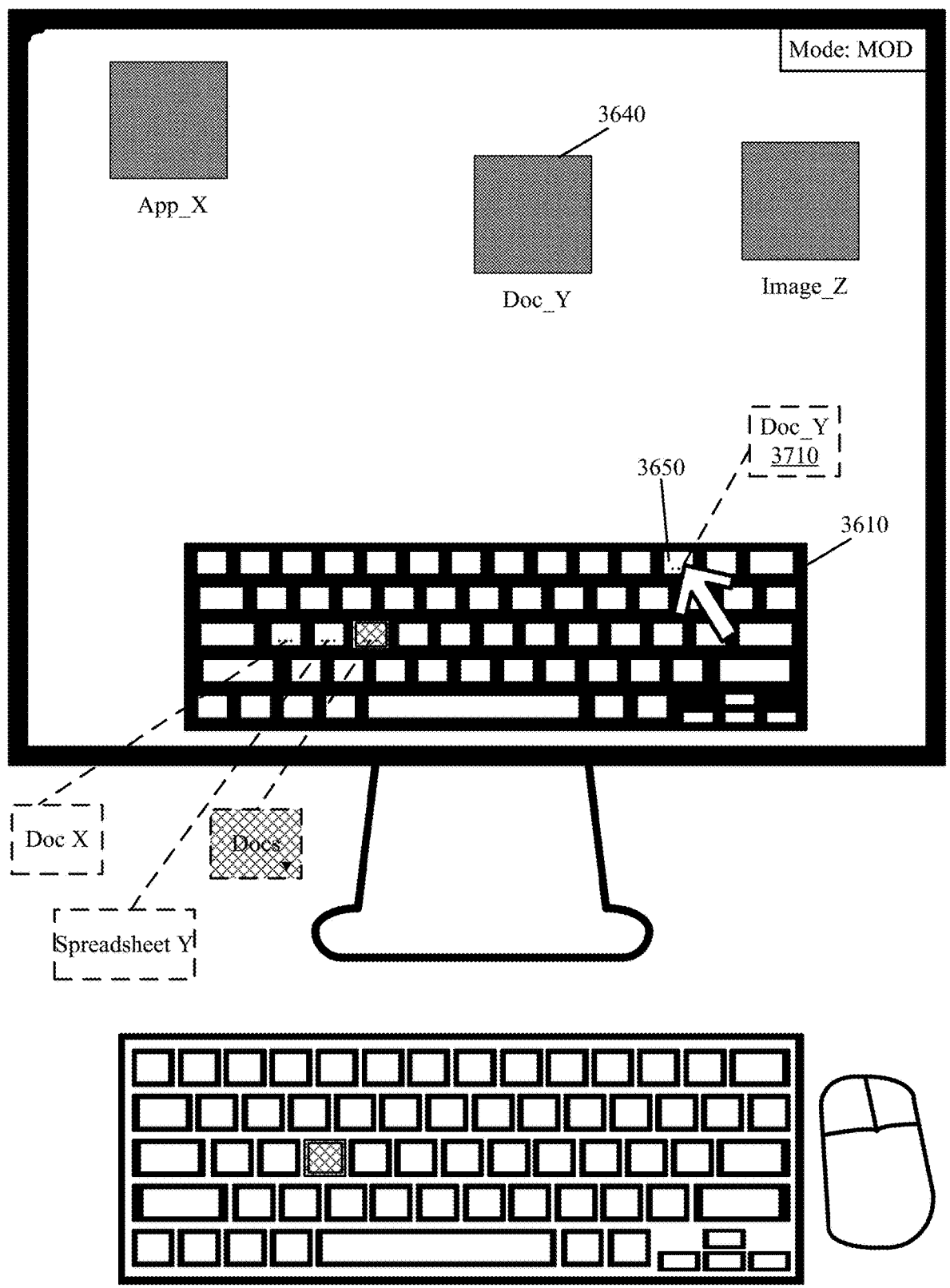
FIG. 37 illustrates the KEI viewer of FIG. 36 after the file is inserted into the KEI viewer in accordance with some embodiments.

FIG. 37 illustrates the KEI viewer 3610 of FIG. 36 after the file 3640 is inserted into the KEI viewer in accordance with some embodiments. As shown in FIG. 37, a symbol 3710 that identifies the file 3640 is displayed over the "-" graphical key 3650. Accordingly, the user can open the file 3640 at any time by holding the "D" keyboard key and tapping the "-" keyboard key or by clicking on the "-" key on the KEI viewer.

In some embodiments, a folder can be dragged and dropped to a particular graphical key such that contents of that folder become accessible when the keyboard key corresponding to the particular graphical key is pressed. A symbol is presented over the particular graphical key to indicate that the folder can be opened by tapping the keyboard key that corresponds to the particular graphical key. Items such as files, applications, or other folders can be added to the folder by dragging and dropping those items to the particular graphical key that displays the symbol for the mapped folder.

B. Applications

Figure 38:
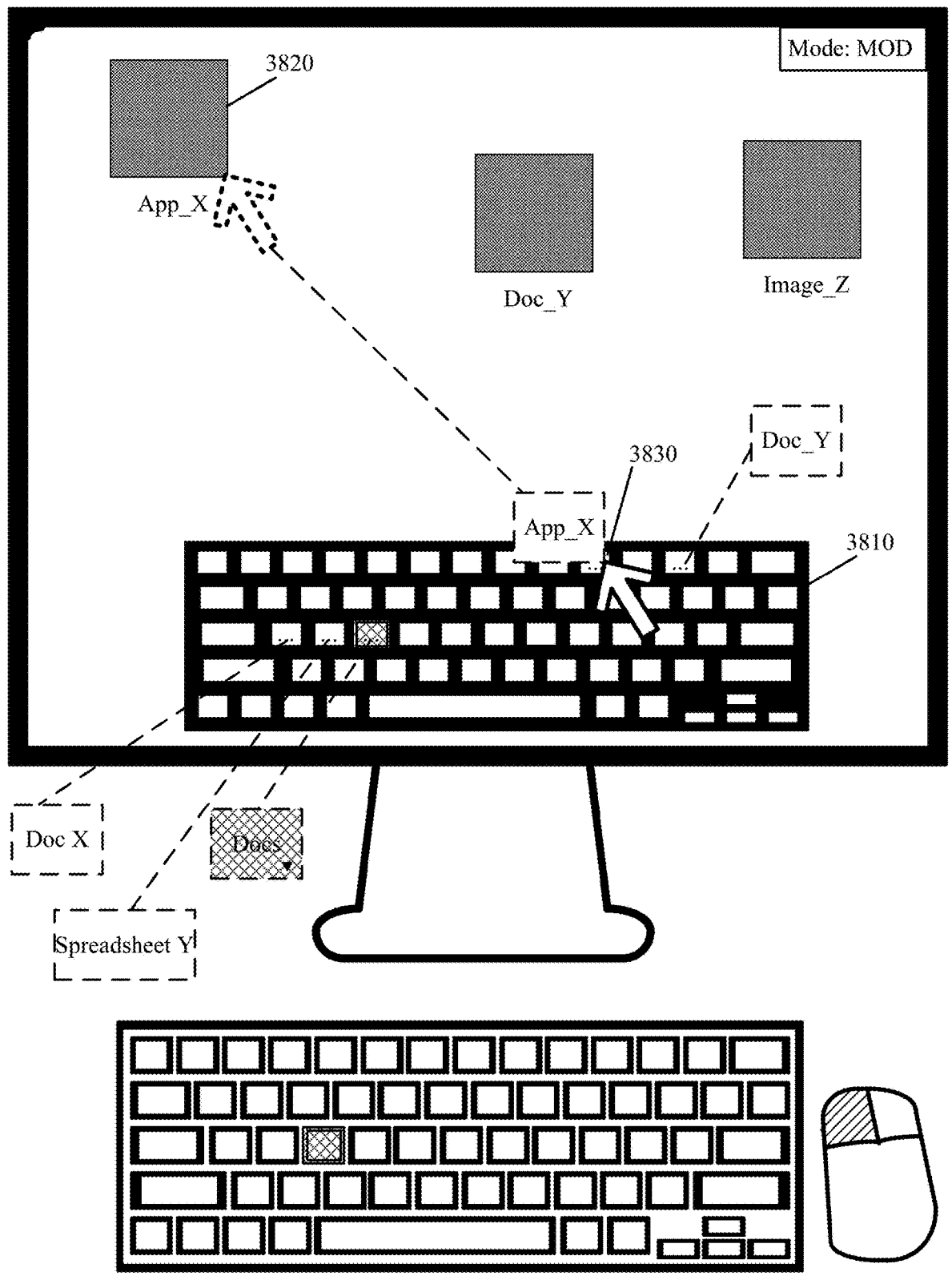
FIG. 38 illustrates dragging and dropping an application launch icon to a graphical key of the KEI viewer in accordance with some embodiments.

FIG. 38 illustrates dragging and dropping an application launch icon to a graphical key of the KEI viewer 3810 in accordance with some embodiments. As in FIGS. 36 and 37, the user holds down the "D" key to enter the MOD "D" operational mode. The KEI viewer displays the symbols that are associated with the MOD "D" operational mode.

Figure 39:
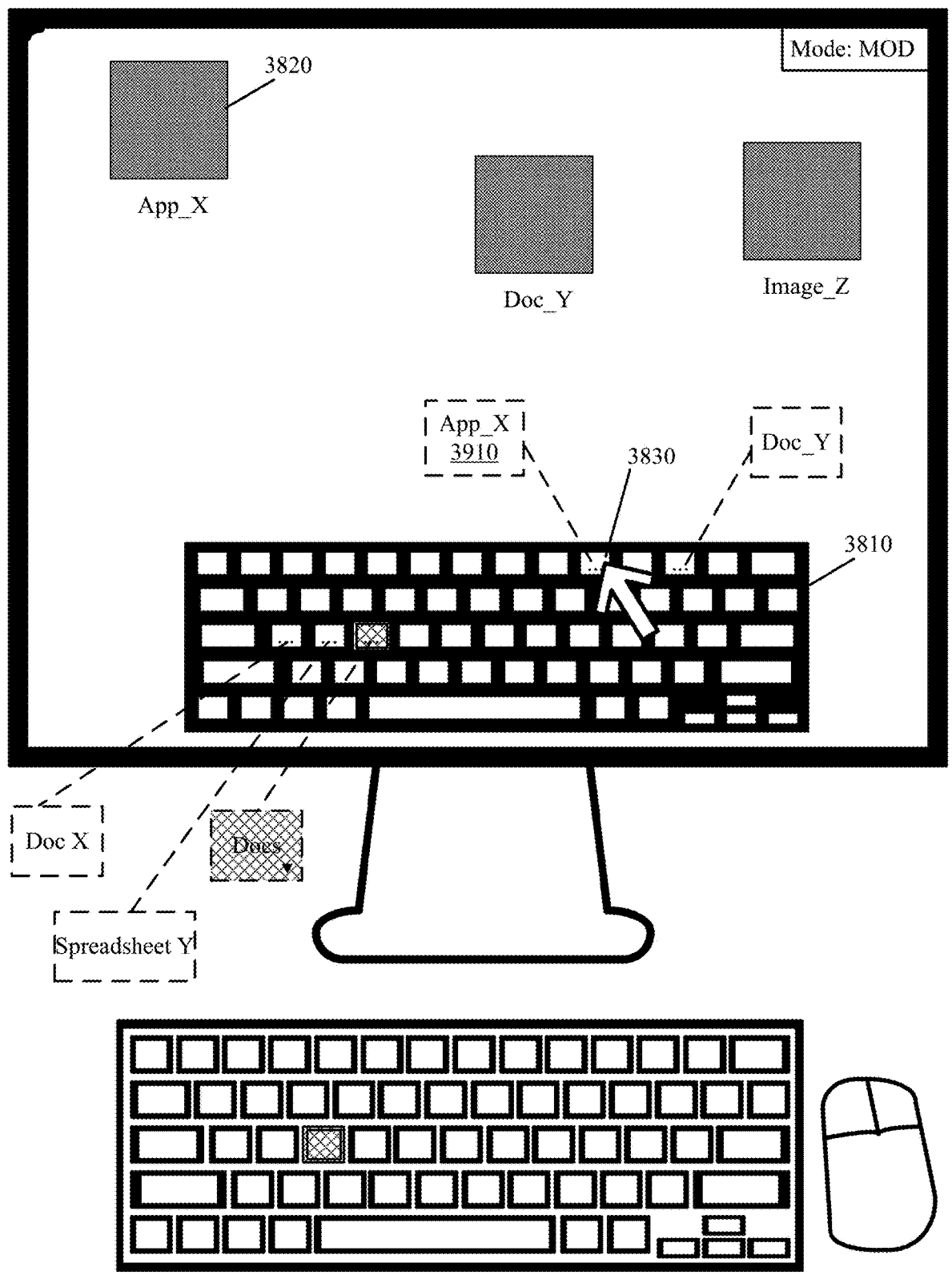
FIG. 39 illustrates the KEI viewer of FIG. 38 after the application launch icon is dragged and dropped to the "9" graphical key of the KEI viewer in accordance with some embodiments.

In this figure, the user drags and drops the application launch icon 3820 from the desktop to the "9" graphical key 3830 of the KEI viewer 3810. FIG. 39 illustrates the KEI viewer 3810 of FIG. 38 after the application launch icon 3820 is dragged and dropped to the "9" graphical key 3830 of the KEI viewer 3810 in accordance with some embodiments.

As shown in FIG. 39, a symbol 3910 for the application launch icon 3820 is displayed over the "9" graphical key 3830. The symbol 3910 identifies the application. The symbol 3910 indicates that a corresponding output action that is identified by the symbol 3910 exists in the KEI database. The output action launches the application when invoked or hides the application if the application is already frontmost. Accordingly, the user can launch the application at any time by holding the "D" key and tapping the "9" key of the keyboard or by clicking on the "9" key on the KEI viewer.

C. Swapping

Figure 40:
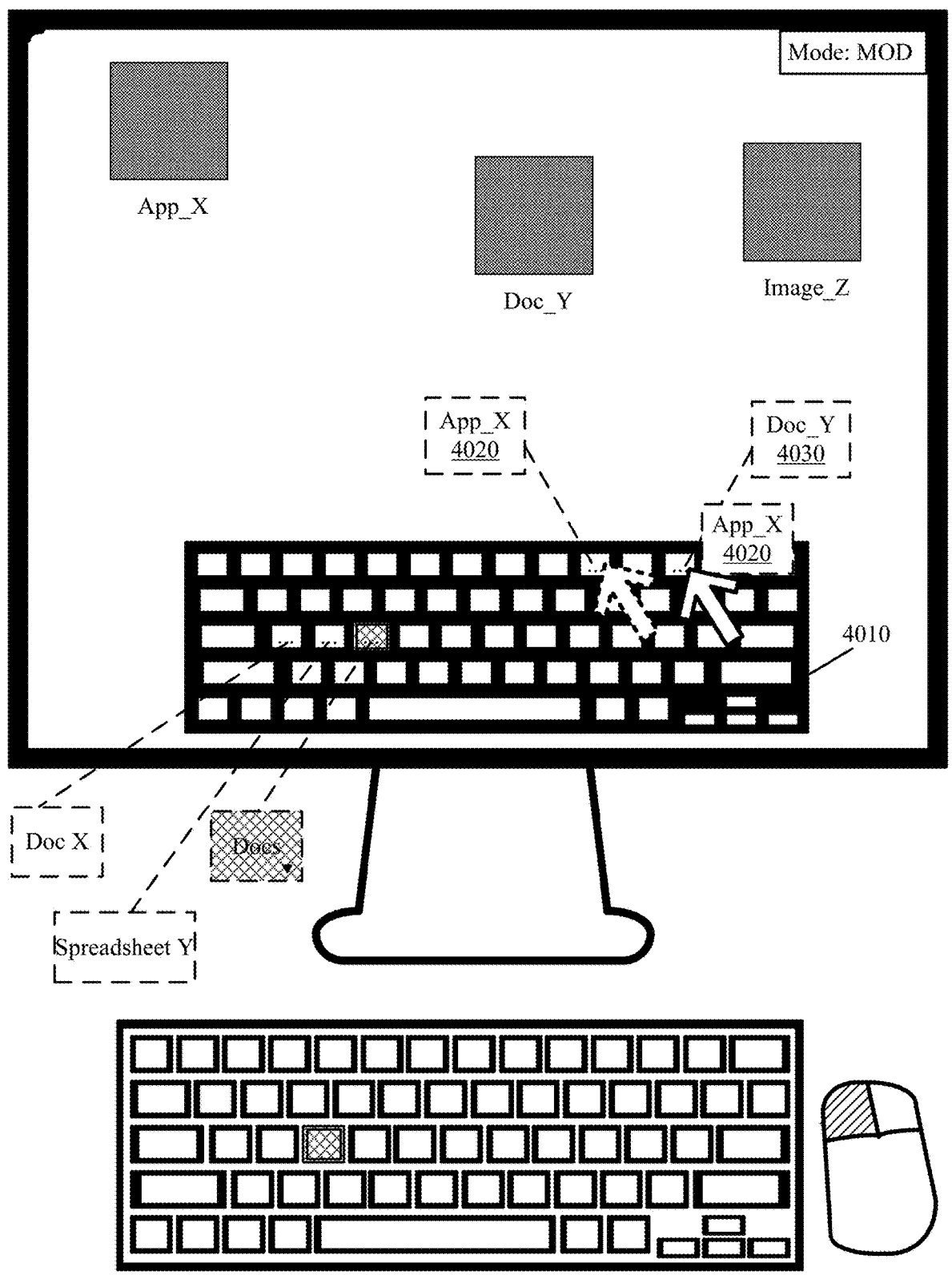
FIG. 40 illustrates moving locations of symbols in the KEI viewer in accordance with some embodiments.

In accordance with some embodiments, FIG. 40 illustrates moving locations of symbols in the KEI viewer 4010. In this figure, the user drags and drops the symbol 4020 for launching "App_X" over the symbol 4030 for opening "Doc_Y". In some embodiments, the KEI viewer 4010 swaps locations of the two symbols 4020 and 4030 when one symbol is dropped over the other symbol. This allows the user to easily configure the KEI viewer to suit their needs.

Figure 41:
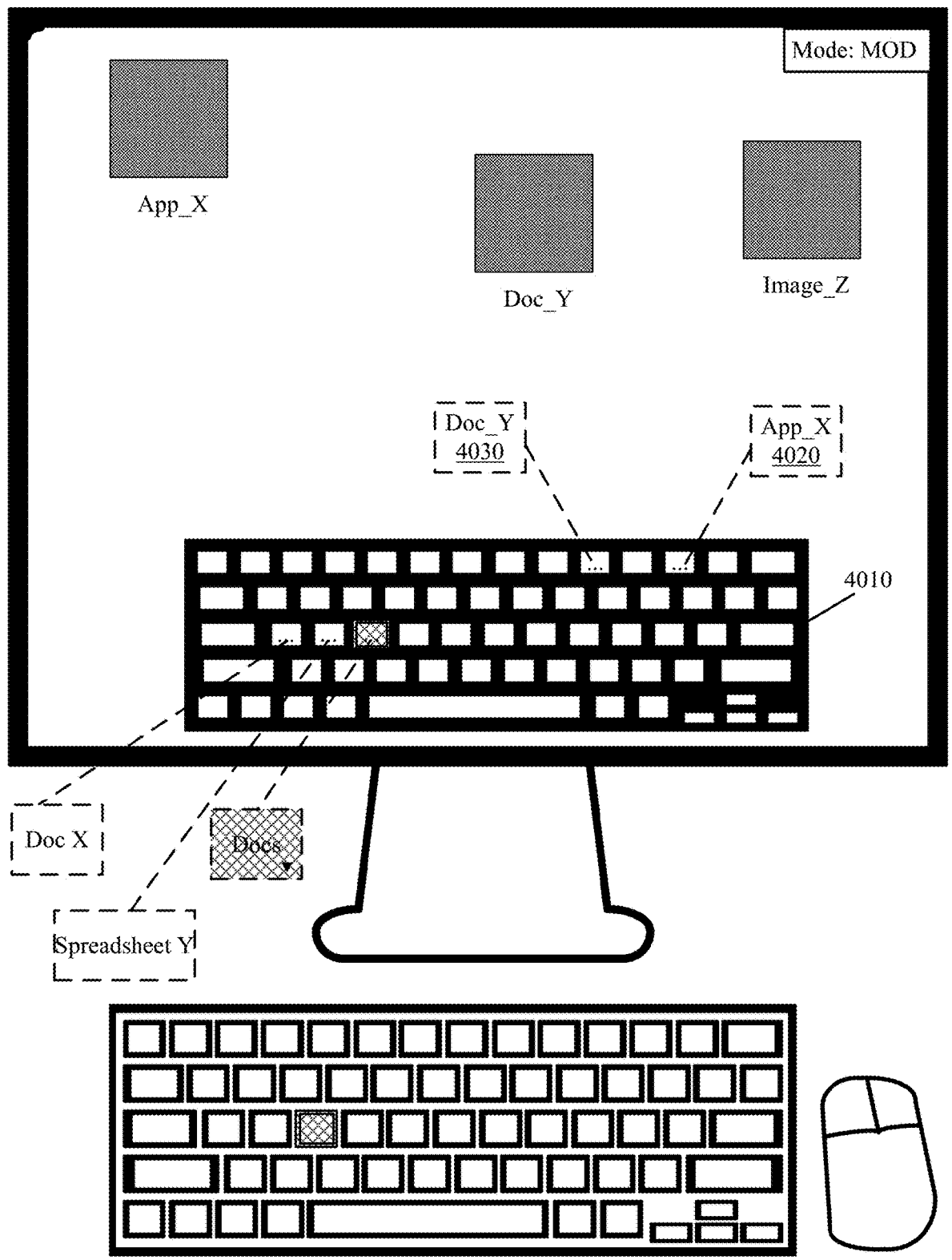
FIG. 41 illustrates the KEI viewer when swapping locations of symbols in accordance with some embodiments.

FIG. 41 illustrates the KEI viewer 4010 swapping locations of the symbols 4020 and 4030 after the symbol 4020 is dragged and dropped over the symbol 4030 in accordance with some embodiments. In so doing, the KEI engine changes how the corresponding output actions are accessed from the KEI database.

In some embodiments, the KEI viewer does not swap locations, but allows one symbol to be placed over another symbol. In some such embodiments, the output actions that are identified by the symbols are accessible using the REP enhanced events. In some other embodiments, the KEI viewer can combine output actions when a symbol is dropped on a key location which is already populated with an output action.

D. Multiple Insertion

Figure 42:
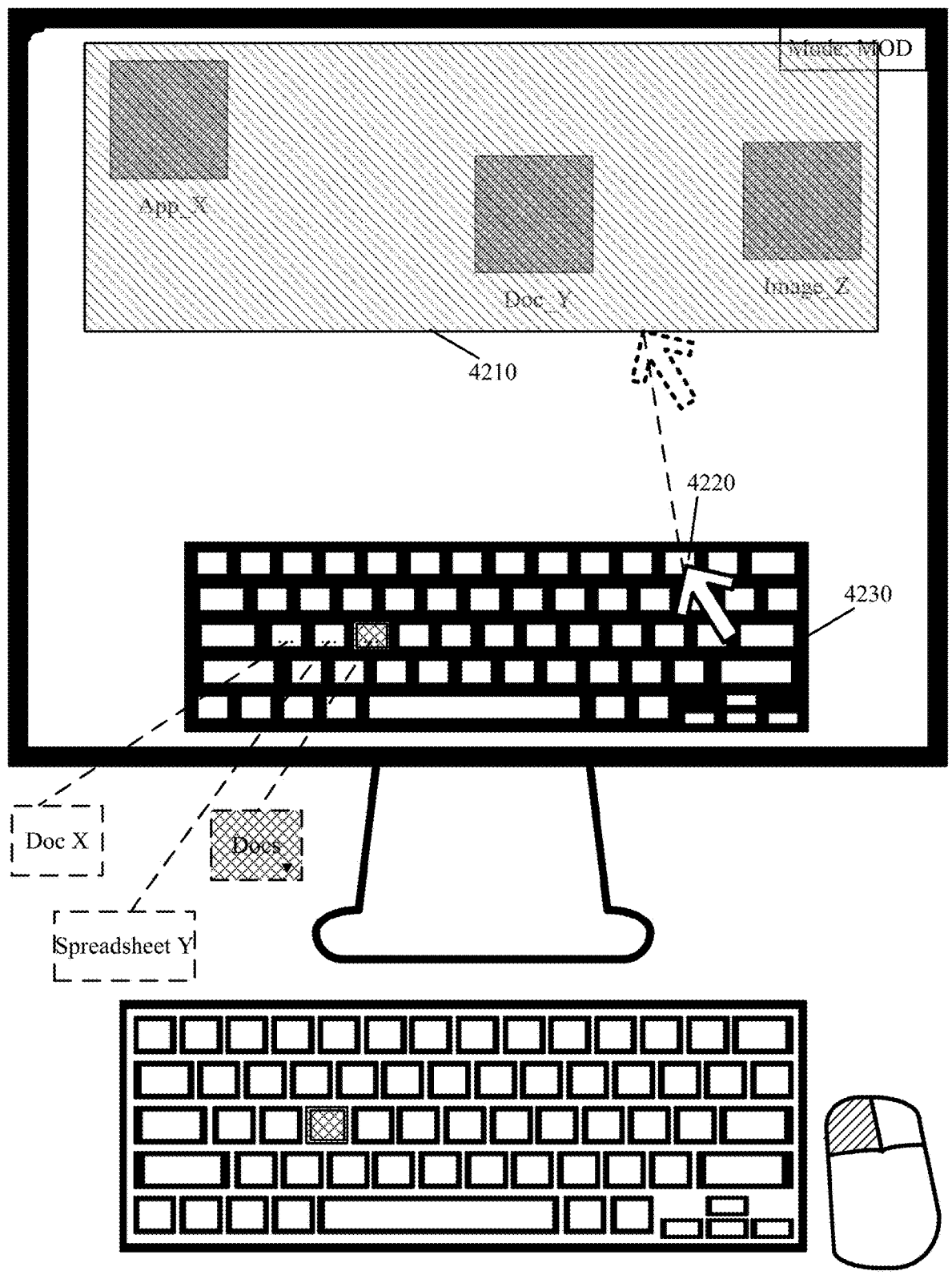
FIG. 42 illustrates dragging and dropping multiple UI elements to a graphical key of the KEI viewer in accordance with some embodiments.

FIG. 42 illustrates dragging and dropping multiple UI elements 4210 to a graphical key 4220 of the KEI viewer 4230 in accordance with some embodiments. In this figure, a group of UI elements 4210 is selected using the mouse. The group of UI elements 4210 includes files and application launch icons. The group of UI elements 4210 is dragged and dropped over graphical key 4220 of the KEI viewer 4230.

Figure 43:
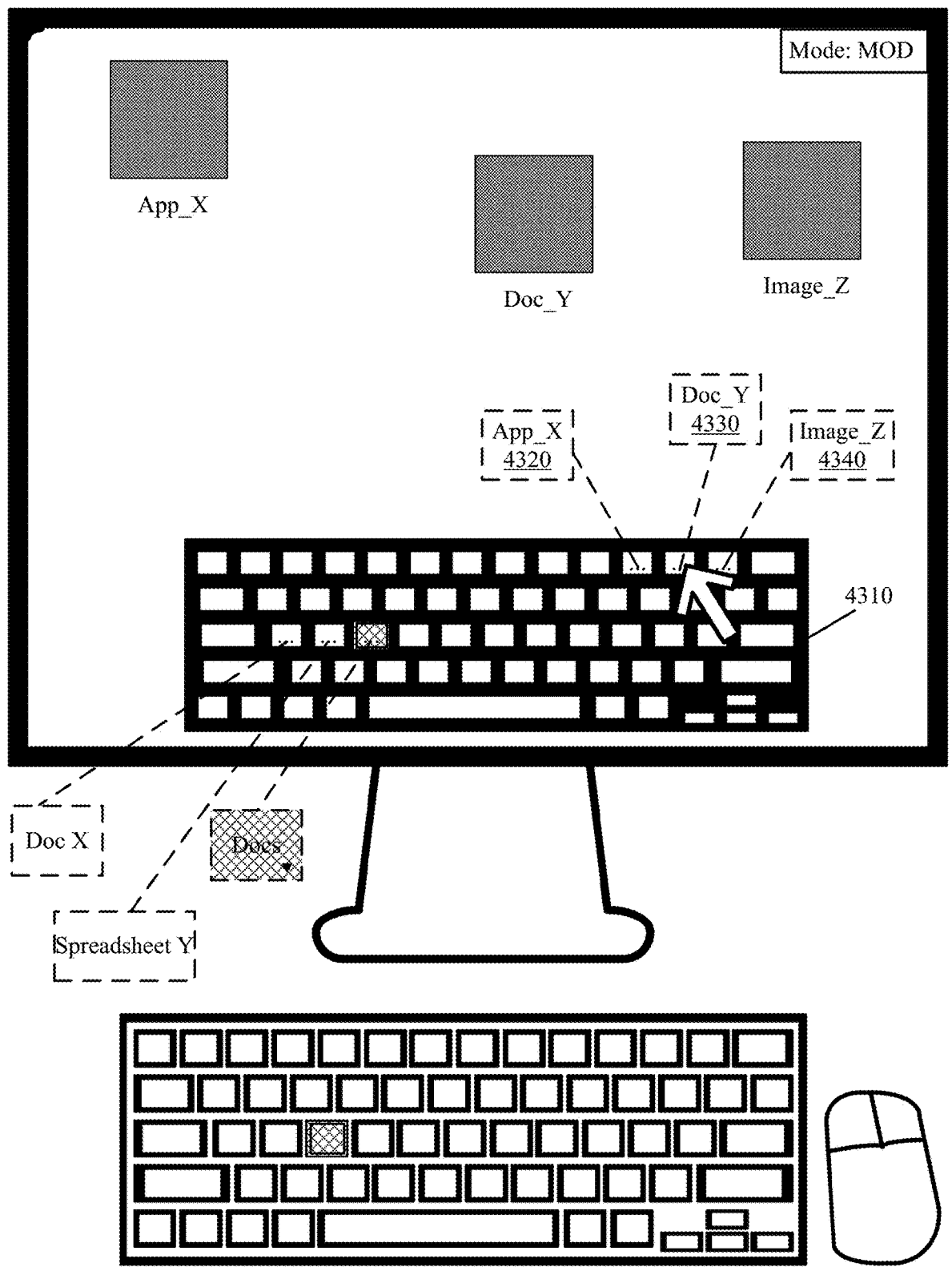
FIG. 43 illustrates the KEI viewer generating symbols for each of three UI elements within the group of UI elements.

As shown in FIG. 43, the KEI viewer 4310 generates symbols 4320, 4330, and 4340 for each of the three UI elements within the group of UI elements 4210. The symbols 4320, 4330, and 4340 are displayed over adjacent graphical keys of the KEI viewer 4310 that were previously not displaying any symbols or widgets. Each output action that is associated with each of the symbols 4320, 4330, and 4340 is then independently invocable by tapping the keyboard key that corresponds to the graphical key over which the symbol is displayed.

In some embodiments, a single symbol is generated for the group of UI elements 4210. In some such embodiments, tapping the keyboard key that corresponds to the graphical key over which the symbol is displayed simultaneously invokes the output actions for all three UI elements in the group. In some other embodiments, the output action of each UI element in the group 4210 may be invoked by different successive taps of the keyboard key that corresponds to the graphical key over which the symbol is displayed. Internally, the KEI uses a REP1 enhanced event to invoke the output action for the first UI element, a REP2 enhanced event to invoke the output action for the second UI element, and a REP3 enhanced event to invoke the output action for the third UI element.

E. Text

In some embodiments, an output action can be created to paste a block of text. To create such an output action within the KEI, the user drags and drops the block of text over a graphical key of the KEI viewer. The KEI viewer generates a symbol over the graphical key to identify the block of text. Internally, the KEI engine generates an output action in the KEI database that stores the block of text. When the output action is invoked, a block of text is pasted at the insertion point of the frontmost application.

In this manner, commonly used text phrases can be accessed from the keyboard keys. Such functionality enhances traditional copy and paste functionality by providing access to multiple blocks of text and by providing visual representations over the graphical keys of the KEI viewer to identify which block of text is accessible from which key of the keyboard.

Figure 44:
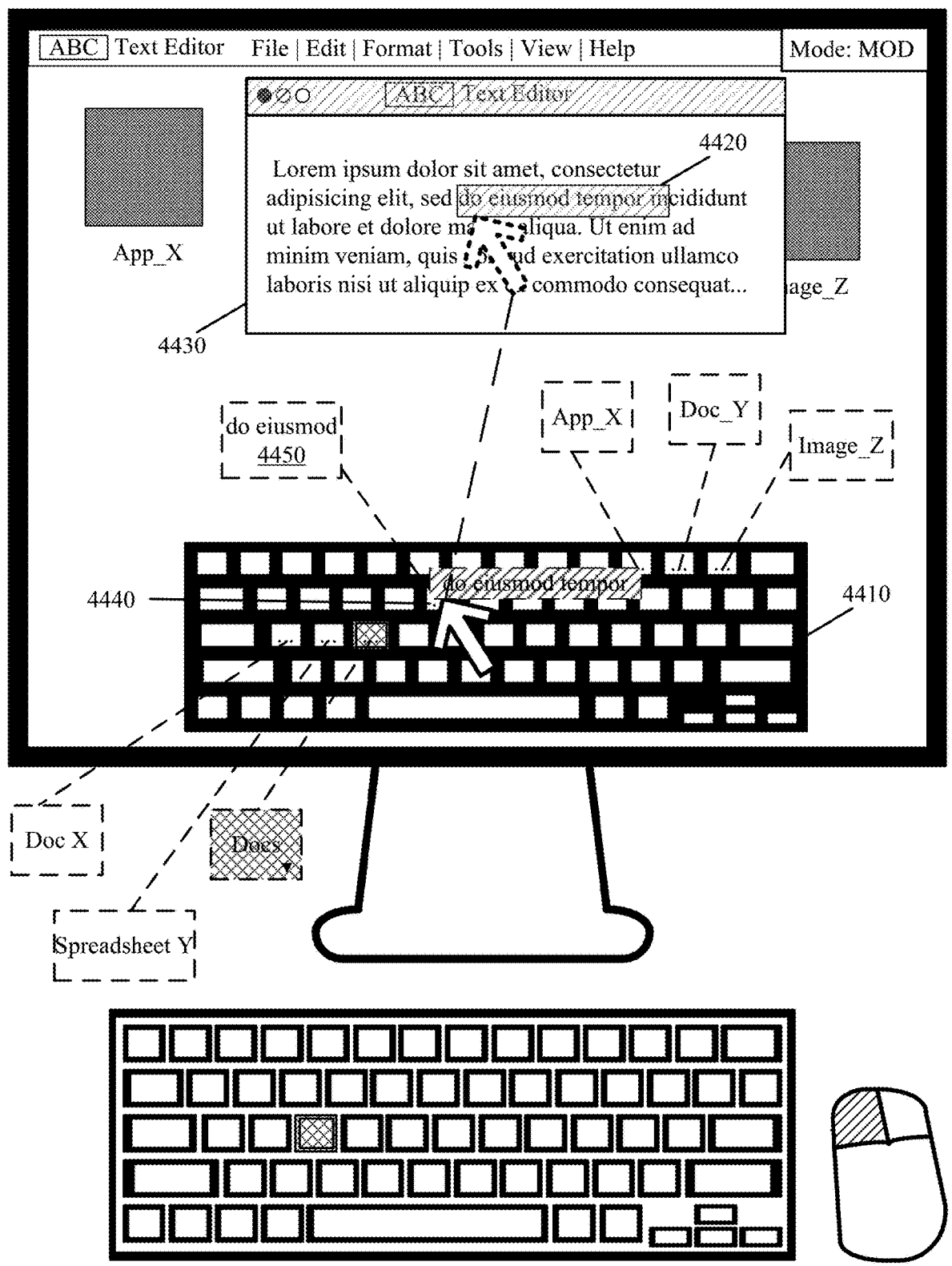
FIG. 44 illustrates dragging and dropping a selected block of text to a graphical key of the KEI viewer in accordance with some embodiments.

FIG. 44 illustrates dragging and dropping a selected block of text 4420 to a graphical key 4440 of the KEI viewer 4410 in accordance with some embodiments. The user selects a block of text 4420 from a document that is open in application 4430. Next, the user holds down the "D" key to enter the MOD "D" operational mode. The KEI viewer displays the symbols associated with the MOD "D" operational mode. While holding down the "D" key, the block of text 4420 is dragged and dropped over graphical key 4440 of the KEI viewer 4410.

When the block of text 4420 is dropped over the graphical key 4440, the KEI viewer 4410 generates symbol 4450 over the graphical key 4440 to identify the block of text 4420. In some embodiments, the symbol 4450 is an icon. In some embodiments, the symbol 4450 scrolls the text of the block of text 4420 across the graphical key 4440 so that the user can see the block of text that can be pasted using the keyboard key that corresponds to the graphical key 4440.

F. Output Actions Based on Remote Data

In some embodiments, users can populate the KEI viewer with output actions that are derived from data that is presented in various applications. Such data may include hyperlinks from web content, formulas from spreadsheet or accounting applications, email addresses, etc. Users can drag-and-drop such data from the various applications to the graphical keys of the KEI viewer. In so doing, the corresponding output actions that are associated with the dragged and dropped data can be invoked using keyboard keys that correspond to the graphical keys over which the data was dragged and dropped to originally. As one example, users can drag-and-drop frequently used hyperlinks to graphical keys of the KEI viewer when a web browsing application is frontmost so that the hyperlinks can be directly accessed with keyboard key presses rather than dragging a mouse pointer to each on-screen hyperlink before clicking on it to invoke it. This is particularly useful for allowing a user to easily access frequently utilized web sites.

When a particular piece of data is dropped over a graphical key of the KEI viewer, the KEI viewer generates a symbol to represent the data or the output action that is performed by the data. For a dragged and dropped hyperlink, the KEI viewer may generate a symbol that displays the favicon or other icon or graphical representation associated with the hyperlink. The generated symbol, mapping of the symbol to a graphical key, corresponding output action, and mapping of the output action to a keyboard key are stored to the KEI database in a manner that allows subsequent access to the symbol, output action, and mapping when the data is next presented within the application. A unique identifier may be used for storing and retrieving the user specified symbol, output action, and mapping. The unique identifier may be associated with a symbol convention such that the user specified symbol, output action, and mapping overrides a default symbol, output action, and mapping for that symbol convention. In this manner, users can customize the KEI system symbol conventions and the customizations are stored in the KEI database. When the customized symbol convention is next referenced, the KEI system displays the default symbols and widgets of the symbol convention. Next, the KEI system checks the KEI database to determine whether any customizations have been made to that symbol convention by using the symbol convention identifier. When a customization is found, the KEI system overlays the customization thereby altering any symbols, widgets, mappings, and/or output actions of the symbol convention.

G. Menu UI Elements

When interacting with an application, users often waste time navigating through menus trying to remember the location of a menu item UI element in order to invoke a desired output action. To remedy this situation, some embodiments provide drag-and-drop insertion of menu item UI elements into the KEI viewer. Consequently, the output action for the menu item UI element can be invoked using a particular keyboard key. This is particularly useful when the output action will be frequently used.

Figure 45:
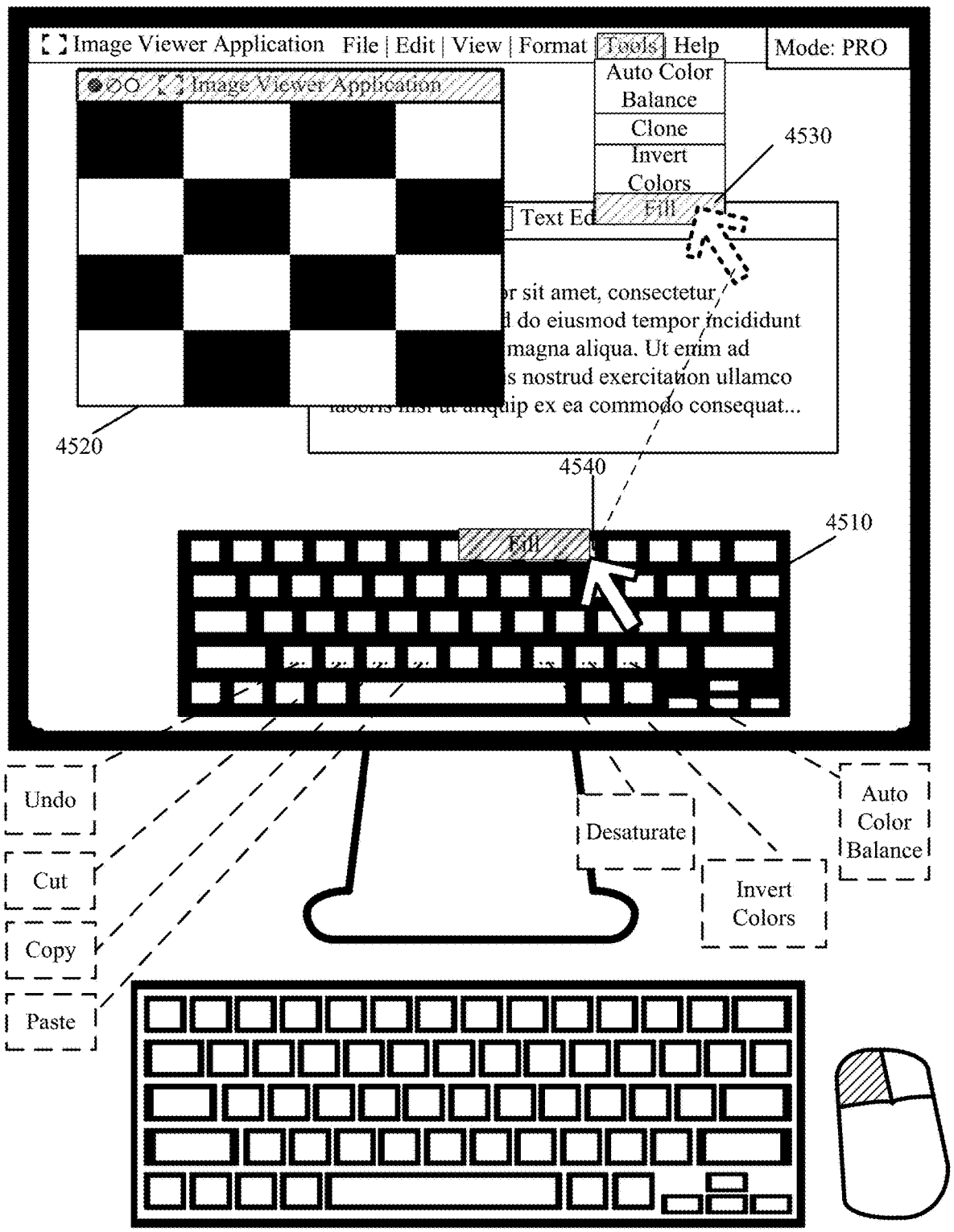
FIG. 45 illustrates dragging and dropping a menu item UI element to a graphical key of the KEI viewer in accordance with some embodiments.

FIG. 45 illustrates dragging and dropping a menu item UI element 4530 to a graphical key 4540 of the KEI viewer 4510 in accordance with some embodiments. A menu of the application 4520 is expanded by clicking the pointer on the top menu bar item. The disclosed menu UI item element 4530 is dragged and dropped from the expanded menu to the graphical key 4540 of the KEI viewer 4510.

Figure 46:
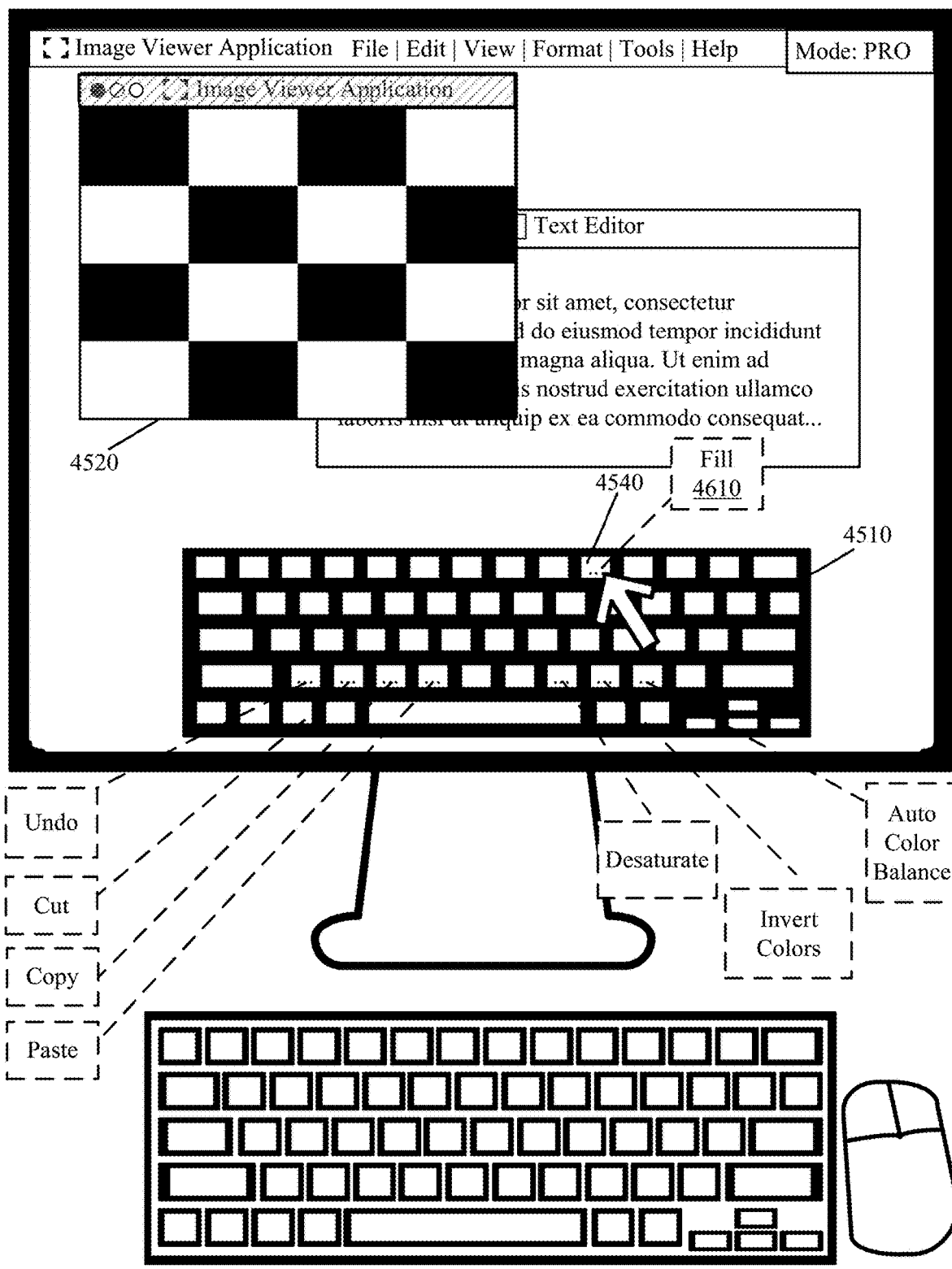
FIG. 46 illustrates the KEI viewer of FIG. 45 after the menu item UI element is dropped over the graphical key in accordance with some embodiments.

FIG. 46 illustrates the KEI viewer 4510 of FIG. 45 after the menu item UI element 4530 is dropped over the graphical key 4540 in accordance with some embodiments. The KEI viewer 4510 generates a symbol 4610 over the graphical key 4540. The symbol 4610 identifies the output action for the menu item UI element 4530. The output action includes code for invoking the output action that is associated with the menu item UI element 4530. In some embodiments, the code is identified from the properties that are associated with the menu item UI element 4530 to directly invoke the output action. In some other embodiments, the code includes a shortcut key combination to indirectly invoke the output action. Other means may be also used to invoke the output action. In this figure, the user can invoke the output action of the menu item UI element 4530 by tapping the "9" keyboard key when the PRO operational mode is active and the application 4520 is frontmost.

UI elements such as menu items can be dragged and dropped to any context of the KEI viewer SEL, PRO, or MOD operational modes. For example, rather than drop the menu item UI element 4530 to the PRO operational mode, the user can first specify a MOD operational mode by pressing and holding one or more keyboard keys beyond the time threshold, and then drag-and-drop the menu UI element 4530 to a graphical key of the KEI viewer for that selected operational mode.

i. Containing UI Element Expansion

Some embodiments of the KEI engine provide a containing UI element expansion function to expand each group or all containing UI elements of the frontmost application. A containing UI element includes a UI element that provides access to other UI elements when it is invoked. Some such containing UI elements include menus, drop down boxes, ribbons, expandable buttons, lists, tables, etc. When a containing UI element is expanded, the user is able to quickly visualize each of the accessible UI elements therein. For example, when a menu is expanded, the user is able to visualize each of the menu item UI elements of that menu in order to invoke a particular menu item UI element using the mouse or keyboard, or if desired, drag-and-drop the particular menu item UI element to a graphical key of the KEI viewer.

Figure 47:
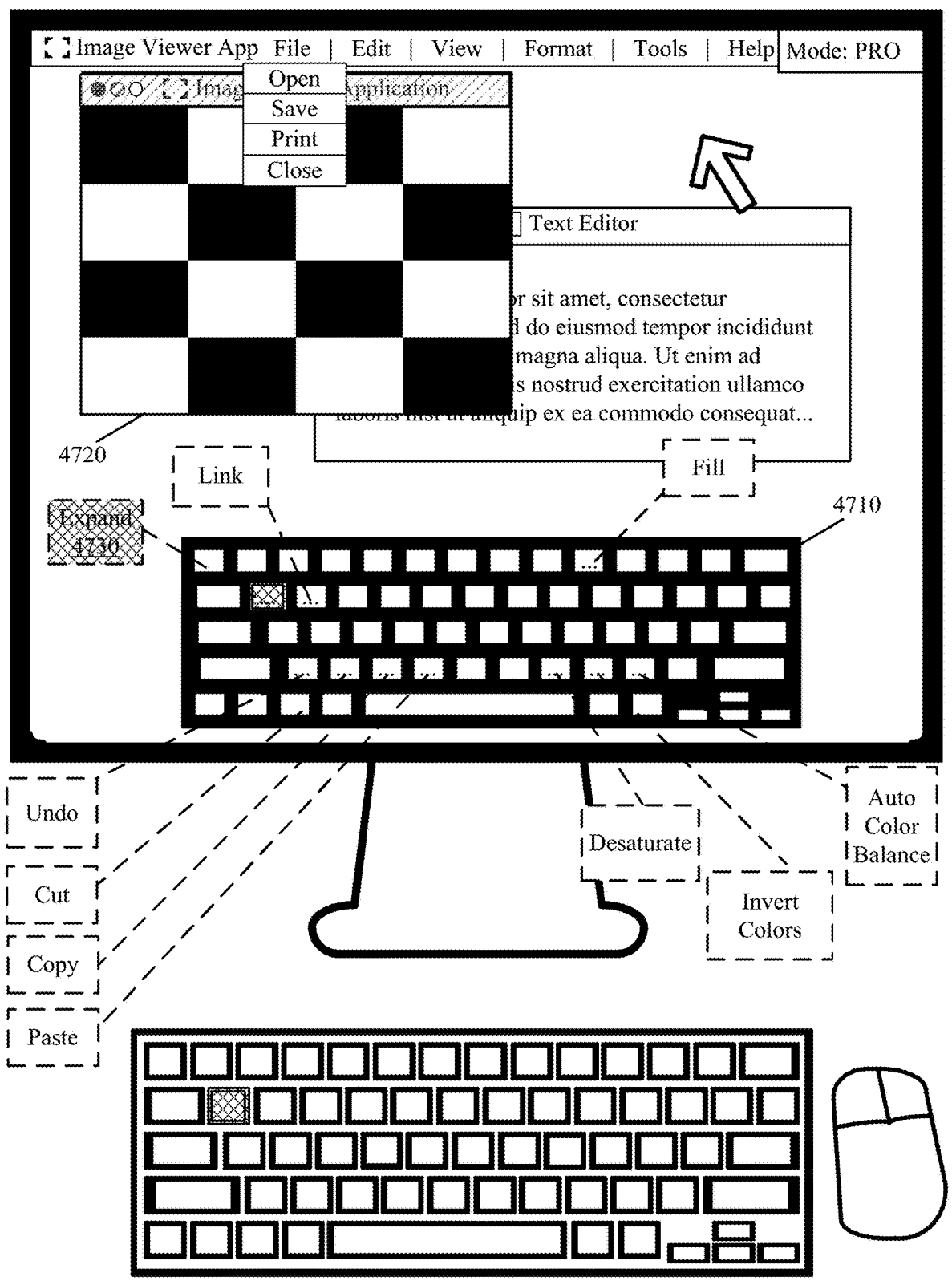
FIG. 47 illustrates the containing UI element expansion function of the KEI engine in accordance with some embodiments.

FIG. 47 illustrates the containing UI element expansion function of the KEI engine in accordance with some embodiments. Specifically, FIG. 47 illustrates application of the containing UI element expansion function to a menu. The KEI viewer 4710 displays the symbol 4730 for the containing UI element expansion function over the "Q" graphical key of the KEI viewer 4710. Accordingly, the user invokes the containing UI element expansion function by holding the "Q" key on the keyboard. When the "Q" key is pressed, the KEI engine expands a menu of the frontmost application 4720 to display the arrangement of UI elements within the expanded menu. The mouse or arrow keys may be used to bring a particular menu frontmost and highlight elements within a menu.

Figure 48:
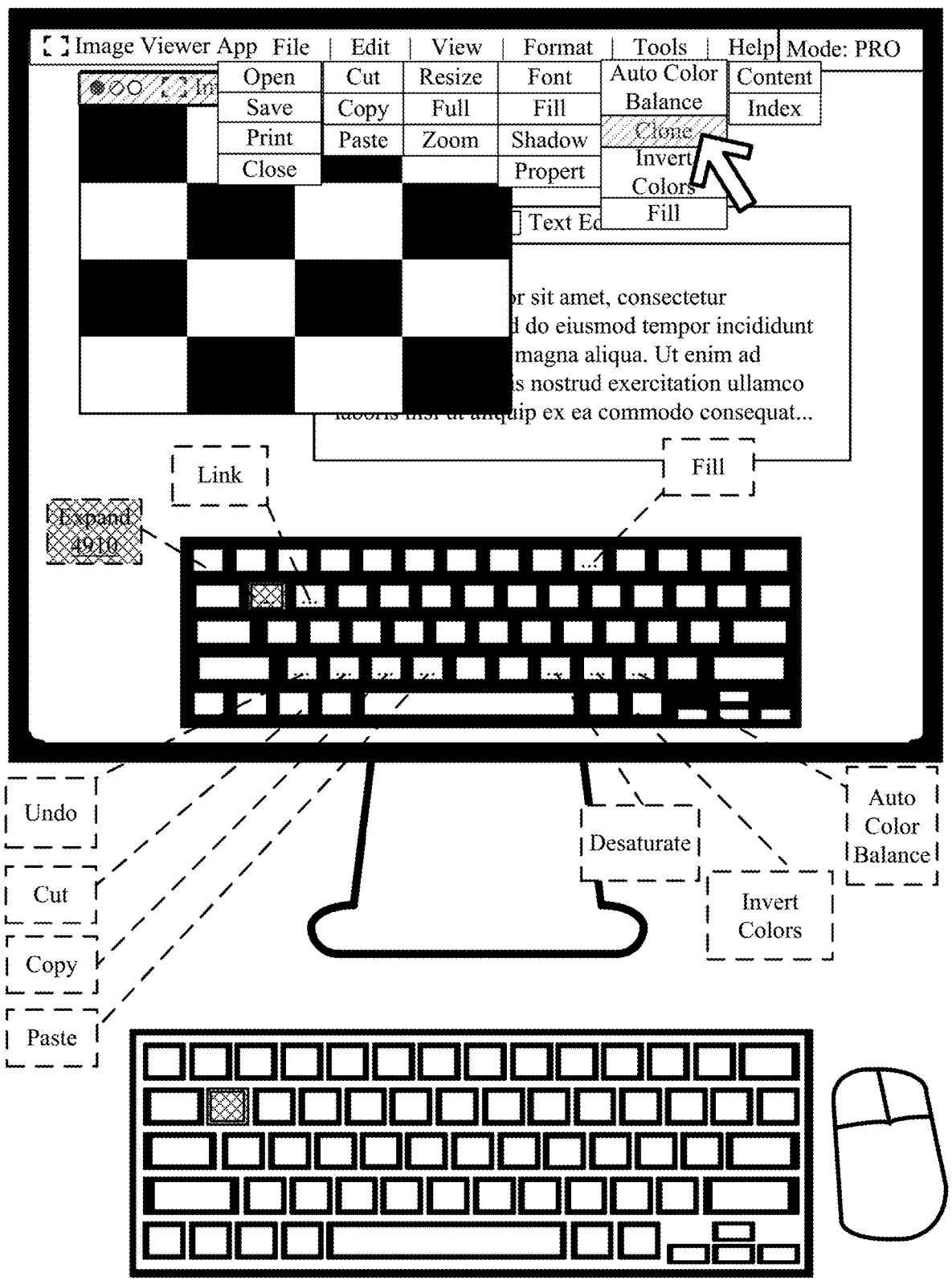
FIG. 48 illustrates an alternate containing UI element expansion function whereby invoking the containing UI element expansion function expands all current menus of the frontmost application simultaneously.

FIG. 48 illustrates an alternate containing UI element expansion function 4910 whereby invoking the containing UI element expansion function 4910 expands all current menus of the frontmost application simultaneously. Accordingly, the containing UI element expansion functionality facilitates presenting a hierarchically organized view of many UI elements simultaneously. As one skilled in the art would understand in light of the present description, the expansion functionality is operable to any expandable UI element of an application and is not restricted to expanding menus. For example, the function may expand drop down boxes, ribbons, expandable buttons, lists, tables, etc.

H. Linking

Figure 49:
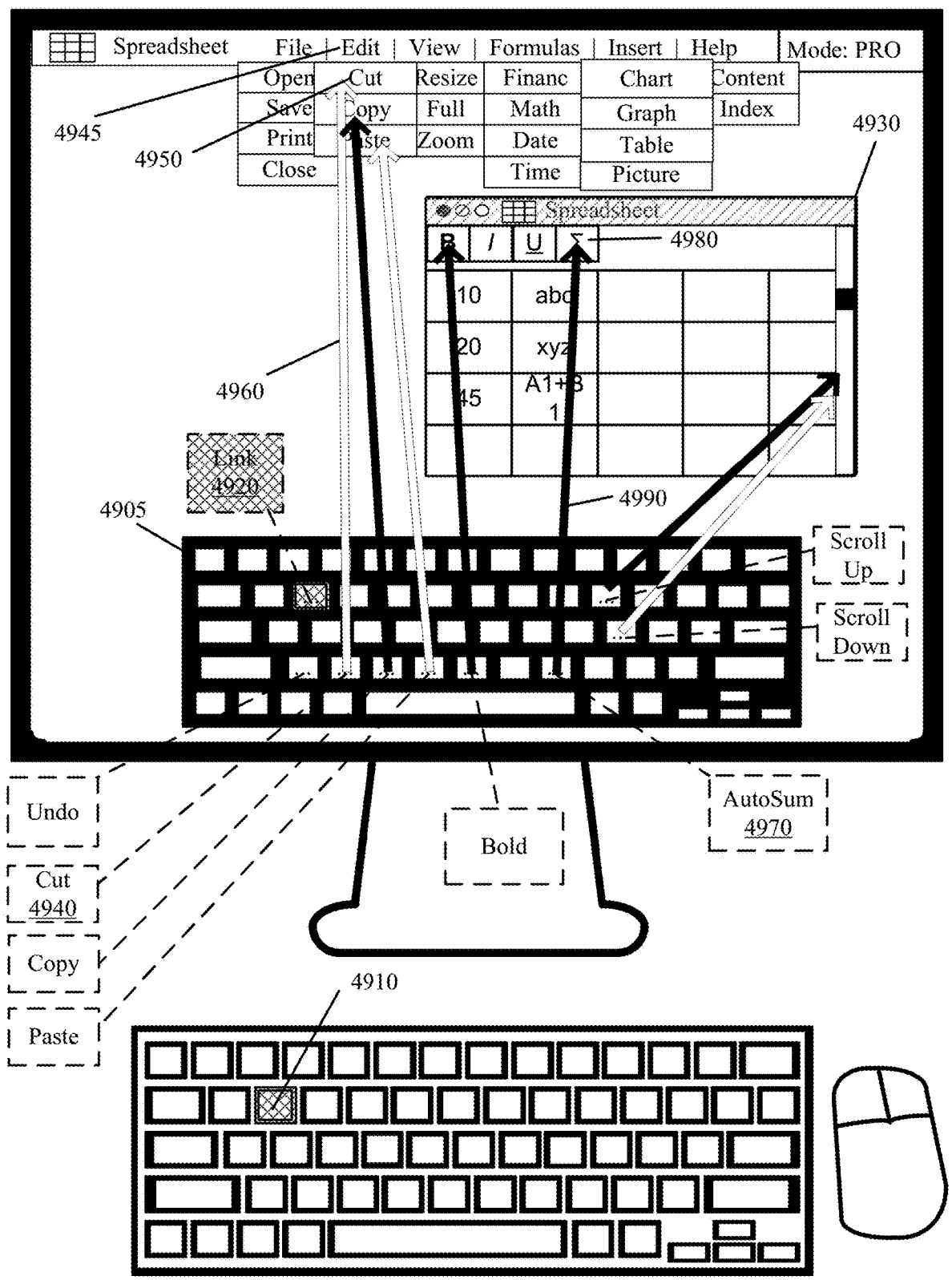
FIG. 49 illustrates the linking function in accordance with some embodiments.

Some embodiments of the KEI system provide a graphic linking function that graphically links symbols of the KEI viewer to UI elements from a frontmost application. Such UI elements include icons, menu items, hyperlinks, buttons, expandable elements such as menus, and any elements that the user can click with a mouse pointer. In some embodiments, the graphic linking function operates in conjunction with a menu expansion function (i.e., containing UI element expansion function) to illustrate which menu item UI elements are linked to the symbols of the KEI viewer. FIG. 49 illustrates the linking function in accordance with some embodiments.

In this figure, the user invokes the linking function by holding the keyboard key 4910 that corresponds to the graphical key of the KEI viewer 4905 over which the linking symbol 4920 is displayed. When invoked, the KEI engine expands one or more of the menubar items (e.g., menubar item 4945) of the frontmost application 4930. In this figure, the KEI engine expands all of the menubar items of the frontmost application 4930, though in some other embodiments the KEI engine may expand a single menubar item. Next, a linking arrow is displayed between a UI element in the expanded menus of the frontmost application 4930 and a symbol of the KEI viewer 4905 that identifies an output action that is the same output action that can be invoked using the UI element.

In this figure, symbol 4940 identifies an output action that is the same output action that can be invoked using the menu item UI element 4950. Accordingly, a linking arrow 4960 is displayed between the symbol 4940 and the menu item UI element 4950. Similarly, symbol 4970 identifies an output action that is the same output action that can be invoked using the icon UI element 4980. Accordingly, a linking arrow 4990 is displayed between the symbol 4970 and the icon 4980. When a single menubar item is expanded, the linking arrows are presented from the KEI viewer to the currently expanded menu. As the user expands different menus, the linking arrows change to illustrate links between the KEI viewer and different UI elements of the different expanded menus.

To perform the linking, the KEI engine obtains a screen position of the UI element relative to the screen position of the application. The KEI engine then generates a graphical indicator (e.g., linking arrow) from the location of the matching symbol of the KEI viewer to the relative screen position of the UI element in the application.

In FIG. 49, the linking arrows are displayed from the symbols of the KEI viewer to the UI elements. In some other embodiments, a linking arrow is displayed from a particular UI element to the corresponding symbol within the KEI viewer. In some such embodiments, the KEI viewer may display an additional or alternate graphical representation of the KEI viewer to show the context that contains the symbol for the particular UI element.

Figure 50:
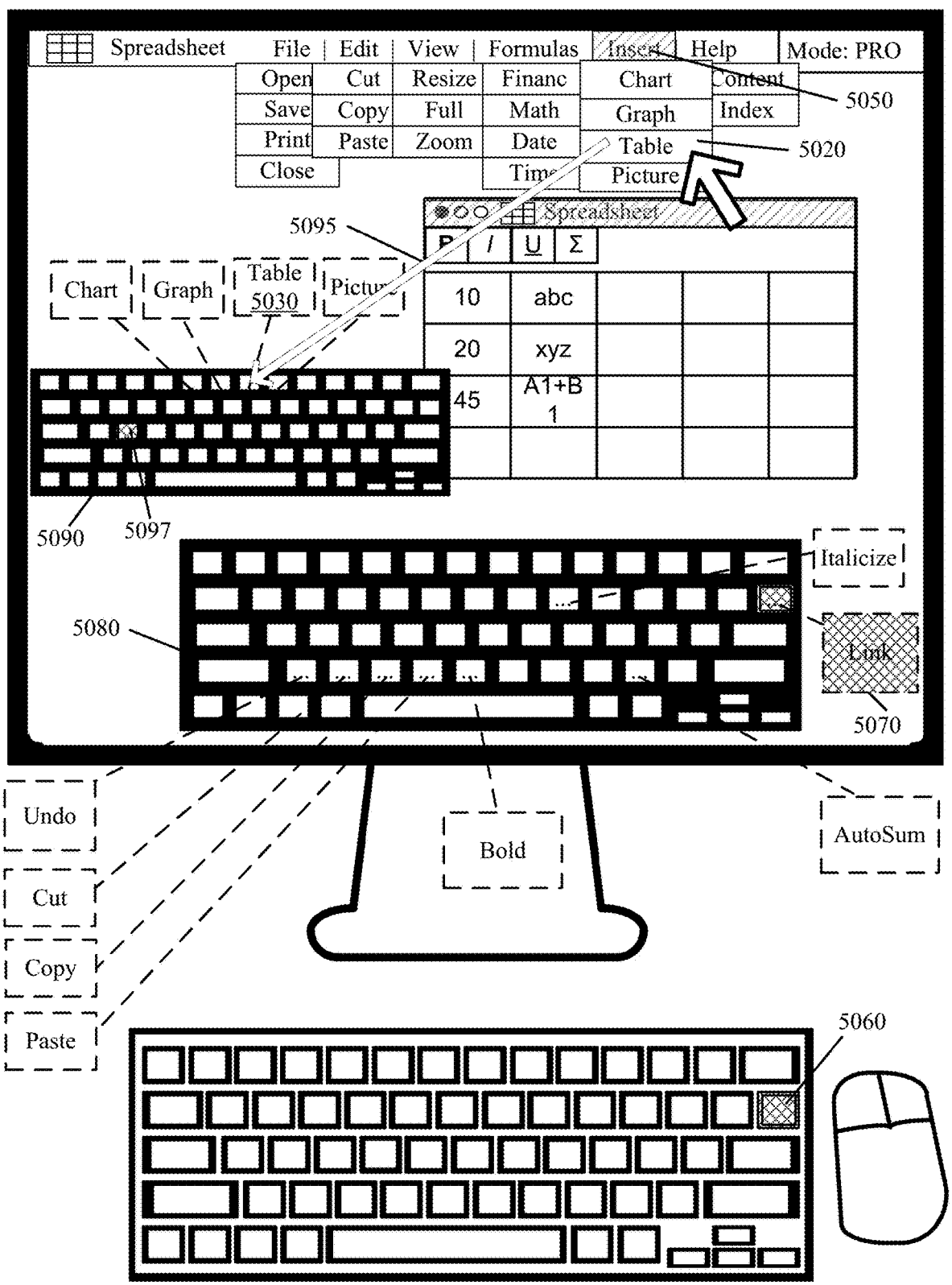
FIG. 50 illustrates the linking function with a linking arrow that is displayed from a particular UI element to a symbol on an alternate KEI viewer display in accordance with some embodiments.

FIG. 50 illustrates the linking function with a linking arrow 5095 that is displayed from a particular UI element 5020 to a symbol 5030 on an alternate KEI viewer display 5090 in accordance with some embodiments. In this figure, the user expands menubar item 5050 and highlights the menu item UI element 5020 in the expanded menu 5050 using the mouse. When the menu item UI element 5020 is highlighted, the user invokes the linking function by holding the keyboard key 5060 that corresponds to the graphical key of the KEI viewer over which the menu linking representation 5070 is displayed. The user may also invoke the linking function by performing multiple oscillating movements of the mouse pointer over the menu item, or by leaving the pointer over the menu item for a period of time according to the preferences available in some embodiments.

The KEI system displays an additional or alternate graphical representation 5090 in a context that contains the symbol 5030 that corresponds to the highlighted menu item UI element 5020. Next, a linking arrow 5095 is displayed from the menu item UI element 5020 to the symbol 5030 that is displayed over the additional or auxiliary KEI viewer 5090. In this manner, the user does not lose the current functionality of the main KEI viewer and the user is still able to identify the keyboard keys that invoke the output action for the menu item UI element 5020. Specifically, the auxiliary KEI viewer display 5090 indicates the operations needed to access the symbol 5030. In this figure, the "S" graphical key 5097 is highlighted to indicate that the MOD "S" operational mode can be used to access the symbol 5030 and the output action that is identified by the symbol 5030. Additionally, in some embodiments, the name of the context may be displayed in the title bar or elsewhere in the alternate KEI viewer. As the user hovers the mouse pointer over various UI elements, the KEI system updates the linking arrow display to identify an existing link between a currently highlighted UI element and a corresponding symbol for the highlighted UI element on the KEI viewer if such a link exists.

In some embodiments, the KEI engine color codes, outlines, or in some way differentiates the KEI viewer symbols and the UI elements to identify the correspondence between the two. The color coding, outlining and differentiating may be used in conjunction with the linking arrows or instead of the linking arrows. Other graphical means of indicating similarity such as circling, highlighting, or utilizing animation techniques can be employed in some embodiments.

Figure 51:
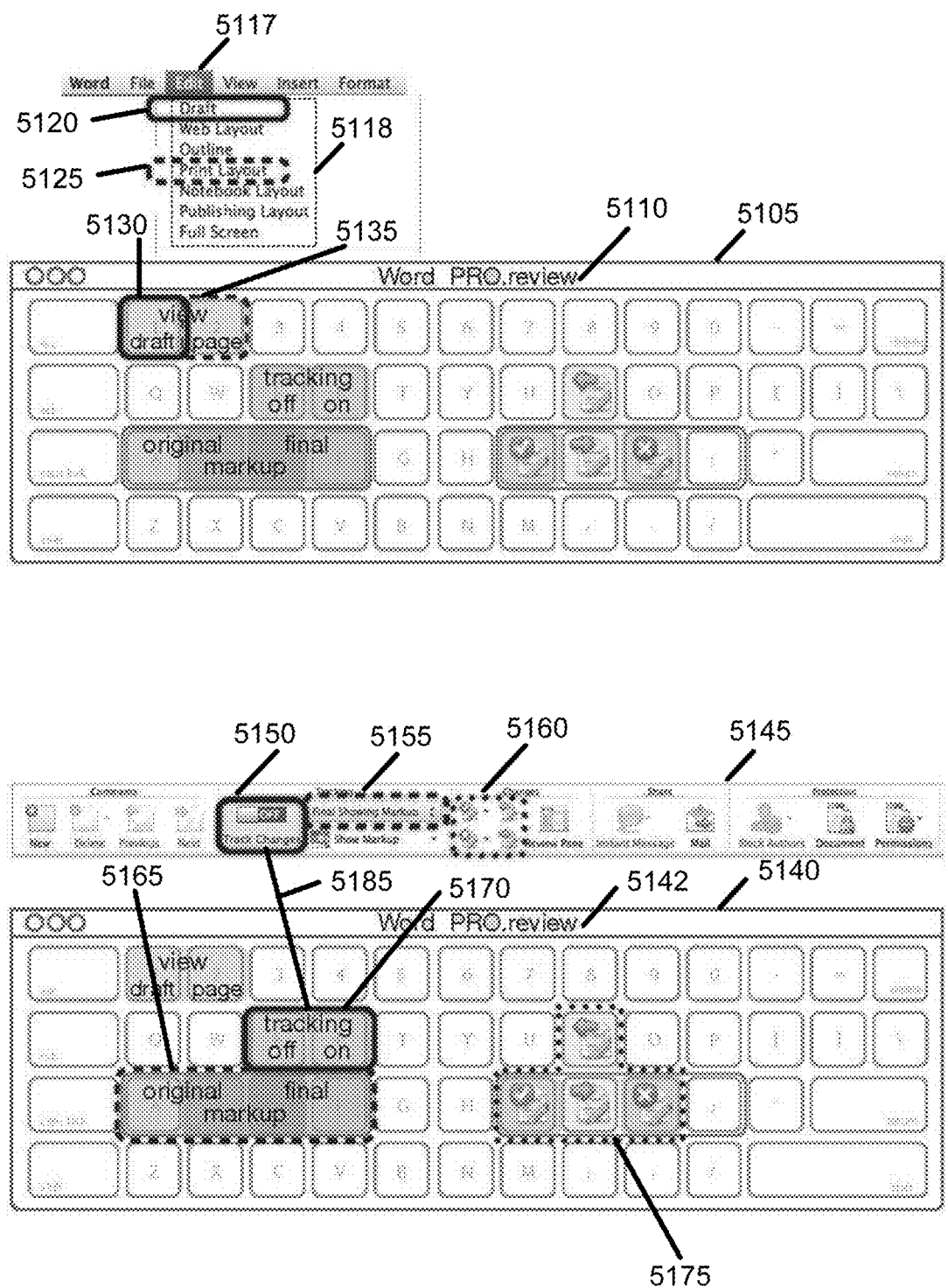
FIG. 51 illustrates an embodiment that identifies correspondences by outlining menu items with and without linking lines.

FIG. 51 illustrates an embodiment that identifies correspondences by outlining menu items without linking lines. The auxiliary KEI viewer 5105 displays a particular context 5110 in a floating window. This auxiliary KEI viewer 5105 may include an auxiliary KEI viewer such as the one presented in FIG. 50 (see 5090). A menubar item 5117, has been clicked, so it is disclosing its menu items 5118. Two of the menu items 5120 and 5125 contain KEI equivalents in a particular context 5110, so they are outlined in a specific fashion. The matching symbols 5130 and 5135 of the auxiliary KEI viewer 5105 are outlined in a similar fashion so that the user may discern which menu item corresponds with which key.

Additionally, FIG. 51 illustrates an embodiment that identifies correspondences by outlining UI elements contained in a ribbon UI element 5145 and an auxiliary KEI viewer 5140 with a single link line 5185. Within the ribbon 5145, particular widgets 5150, menus 5155, and groups of UI elements 5160 contain matching assignments in the auxiliary KEI viewer context 5142, so they are outlined in a specific fashion. The sets of symbols which identify equivalent output actions 5165, 5170, and 5175 are outlined in a corresponding fashion.

In some embodiments, when the user hovers the pointer over a particular UI element 5150, a single link line 5185 is shown. If the user then moves the pointer so that it hovers over a different UI element 5160, then the single link line would reposition one endpoint to the outline of the UI element under the pointer 5160, and the other endpoint to the outline of the corresponding set of symbols 5175.

If the user positions the pointer precisely on a particular UI element within the group 5160, the single link line repositions the endpoints more precisely to the specific UI element within the group and the matching specific symbol within the set of symbols 5175. A similar repositioning of the single link line occurs if the user clicks the menu UI element 5155 and then hovers the pointer over a disclosed menu item with a matching symbol within the set of symbols 5165.

When the user hovers over a widget, menu or group that contains within it multiple items with match symbols, that set of matching symbols may not necessarily be a contiguous grouping of keys. Such discontiguous sets may outline separately, but in a similar outline fashion. In embodiments that display a link line, the single link line may instead be a one-to-many set of lines, all with a shared endpoint at the UI element, and distinct endpoints at the various corresponding matching symbols on the KEI viewer.

As one skilled in the art would realize in light of the present disclosure, many permutations exist that would, for instance, outline or highlight only a single UI element at a time, or highlight only after a certain gesture is performed by the user, or employ transparency or animation to highlight in sequence. Such permutations are envisioned embodiments of the present disclosure.

I. MOD Sublayers

In some embodiments, certain symbols that are displayed by the KEI viewer provide access to different hierarchical layers of symbols and widgets. In some such embodiments, one or more symbols within a first KEI viewer layer provide access to one or more sublayers. Each sublayer includes one or more symbols or widgets that identify one or more output actions that can be invoked using the keyboard keys that correspond to the graphical keys over which the symbols or widgets are displayed. The hierarchical layers allow users to organize symbols, widgets, and the corresponding output actions into different layers where each layer can provide access to zero or more sublayers.

Figure 52:
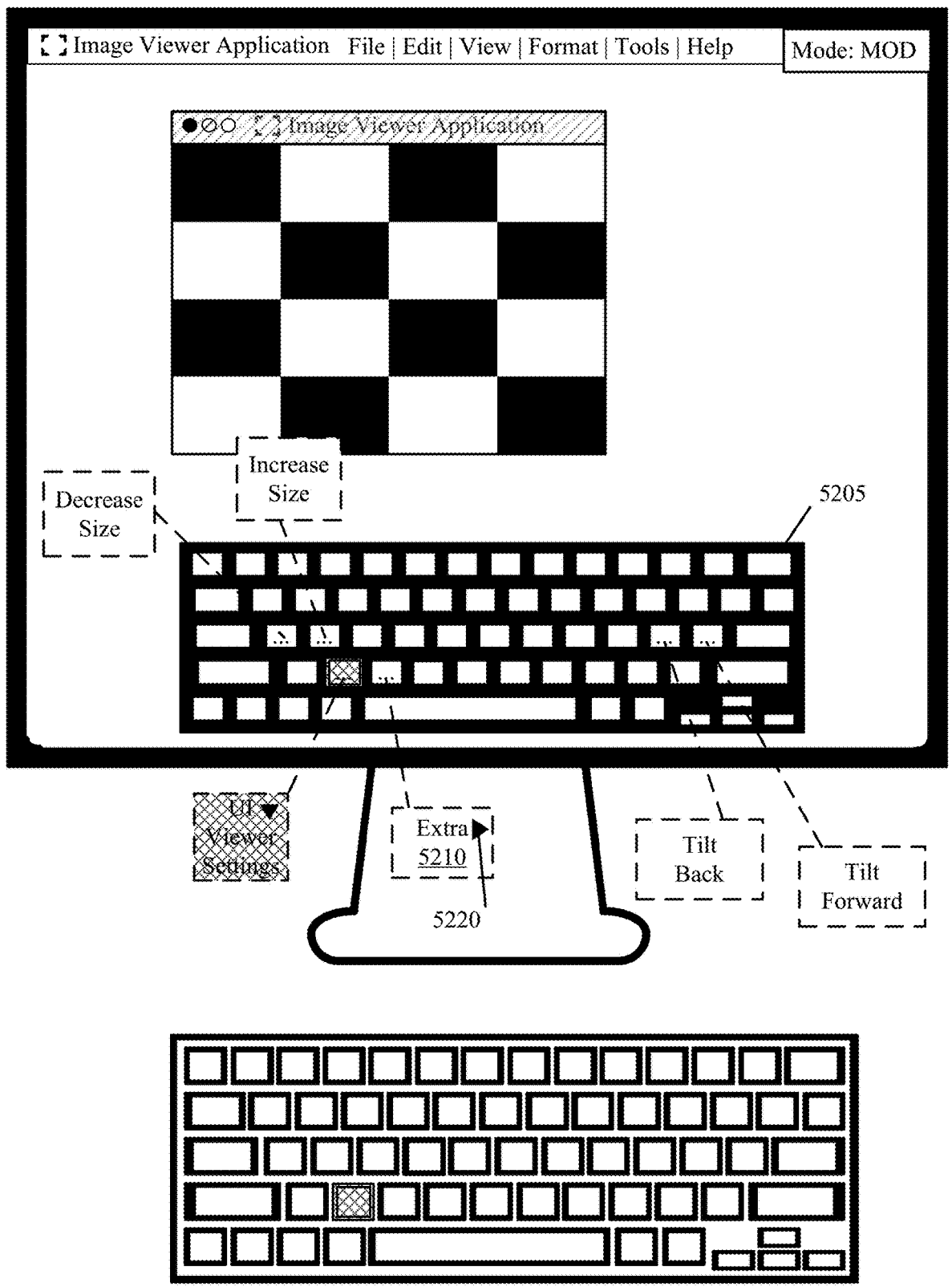
FIG. 52 illustrates using a hold of the "X" key of the keyboard to enter the MOD "X" operational mode.
Figure 53:
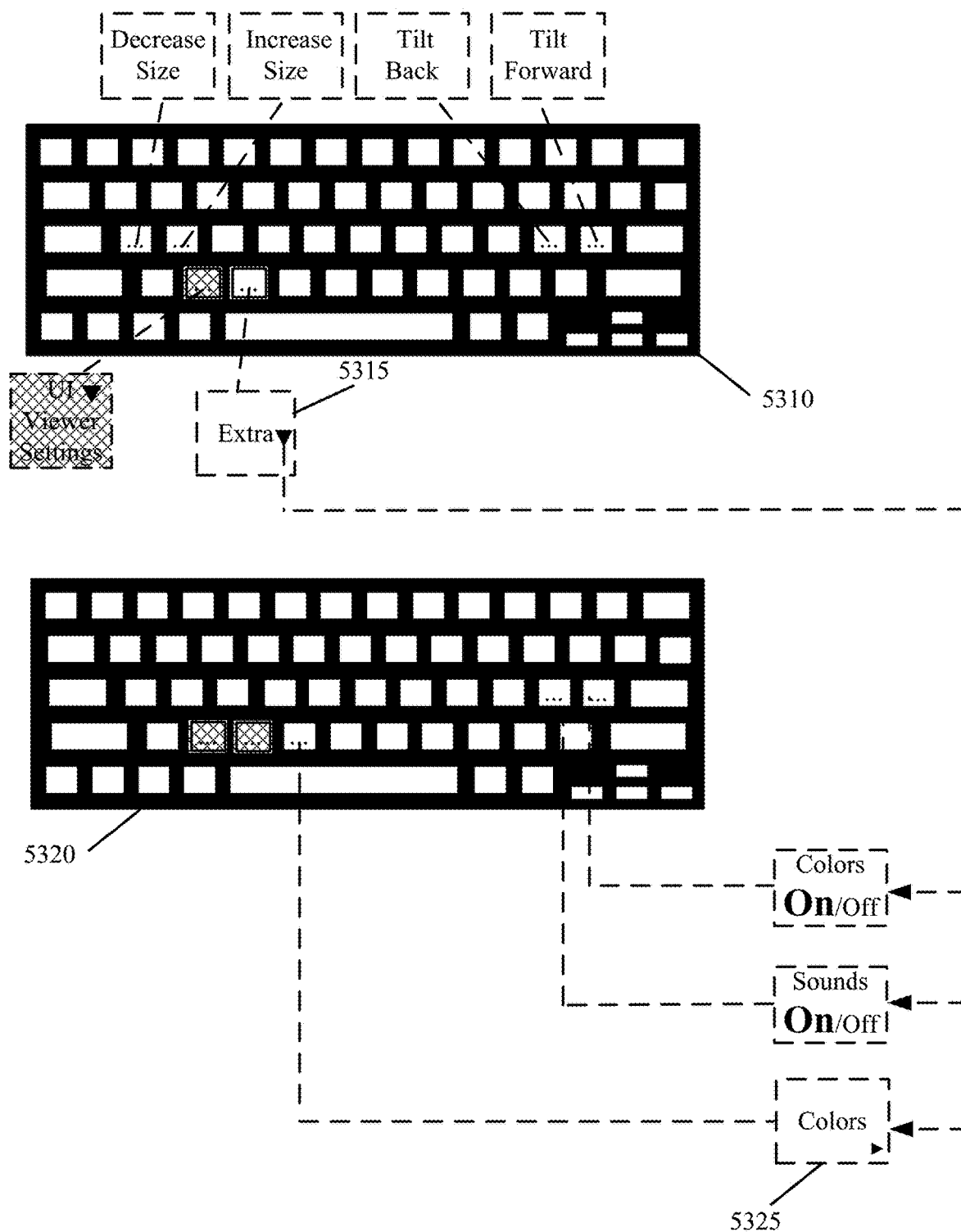
FIG. 53 illustrates accessing a sublayer in accordance with some embodiments.

FIGS. 52 and 53 illustrate navigating KEI viewer layers in accordance with some embodiments. In FIG. 52, the user holds the "X" key of the keyboard to enter the MOD "X" operational mode. In the MOD "X" operational mode, the KEI viewer displays symbols for adjusting the appearance of the KEI viewer 5205.

As shown, symbol 5210 includes a "disclosure triangle" 5220. The disclosure triangle 5220 indicates that a sublayer is accessible by holding the keyboard key (i.e., the "C" key) that corresponds to the graphical key of the KEI viewer 5205 over which the symbol 5210 is displayed.

FIG. 53 illustrates accessing the sublayer in accordance with some embodiments. As shown, the sublayer 5320 is accessed by holding down the "C" key 5315 while continuing to hold down the "X" key. Holding down the "X" key provided access to the topmost layer 5310 and holding down the "C" key 5315 provides access to a sublayer that is accessible from the topmost layer 5310.

5320 illustrates the symbols and widgets that are displayed over the graphical keys of the KEI viewer when in the sublayer 5320. As shown, the symbols and widgets that are displayed over the graphical keys have changed. Specifically, in the topmost layer 5310, the ";" key could be used to invoke the output action for tilting the KEI viewer down. In the second layer 5320, the ";" key is used to invoke the output action for turning sounds on or off. Internally, the KEI engine generates different enhanced events to invoke the different output actions. For example, to invoke the output action that is associated with the "S" key in the first layer 5310, the KEI engine generates the enhanced event:

$$MOD\_x\_S \quad (30)$$

To invoke the output action that is associated with the "S" key in the sublayer 5320, the KEI engine generates the enhanced event:

$$MOD\_x\_c\_S \quad (31)$$

As shown, symbol 5325 within the second layer 5320 also includes a disclosure triangle. Accordingly, the user is able to access another sublayer from the sublayer 5320. The user does so by holding down the keyboard key (i.e., the "V" key) that corresponds to the graphical key over which the representation 5325 is displayed while holding down the previous set of keyboard keys that provided access to the sublayer 5320 (i.e., "X" key and the "C" key). In the second sublayer, different symbols and widgets are again displayed over some of the graphical keys of the KEI viewer. The user can return to the first sublayer 5320 at any time by releasing the key corresponding to the representation 5325 (i.e., the "C" key).

J. Auto-Generation

Figure 54:
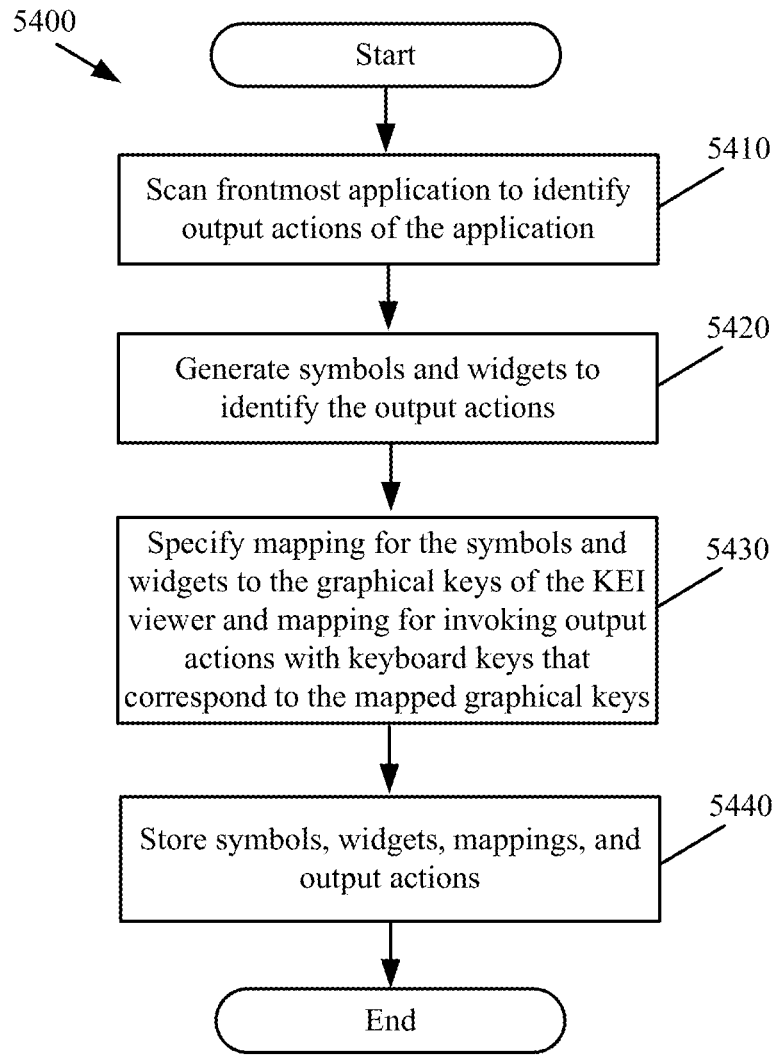
FIG. 54 presents a process performed by the KEI system to automatically populate the KEI database with symbols, widgets, output actions, and mappings for a newly installed application in accordance with some embodiments.

In some embodiments, the KEI system automatically generates symbols and widgets and the mapping of the output actions to the keyboard keys for a newly installed application. FIG. 54 presents a process 5400 performed by the KEI system to automatically populate the KEI database with symbols, widgets, output actions, and mappings for a newly installed application in accordance with some embodiments.

The process scans (at 5410) the application to identify output actions of the application. In some embodiments, the KEI system identifies the output actions from function calls or API calls that are used by the application or from event handlers of the application. The process generates (at 5420) a set of symbols and widgets to represent the scanned output actions on the graphical keys of the KEI viewer. These symbols and widgets can mirror the icons or text used in the application to identify the output actions. Next, the process specifies (5430) a mapping for the symbols and widgets to the graphical keys of the KEI viewer and a mapping for the output actions to be invoked by keys of the keyboard that correspond to the graphical keys over which the symbols and widgets are displayed. The process generates (at 5440) the entries within the KEI database to store the symbols, widgets, mappings, and output actions and the process ends. In some embodiments, the KEI system first monitors user activity within the newly installed application in order to later generate symbols, widgets, mappings, and output actions for frequently utilized output actions.

K. KEI Viewer

Figure 55:
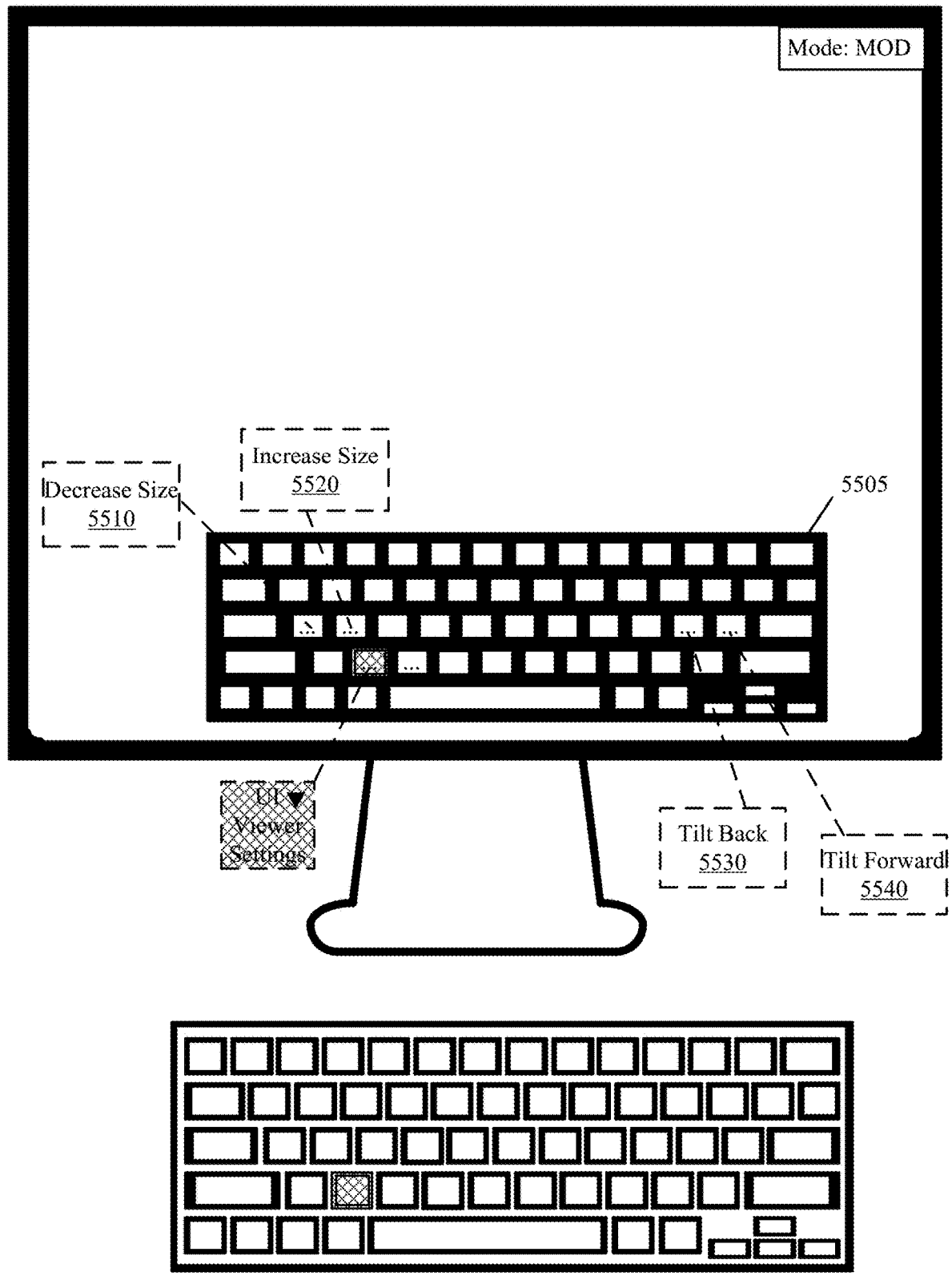
FIG. 55 illustrates a set of KEI viewer symbols that identify output actions that adjust the appearance of the KEI viewer when the MOD "X" operational mode is specified in accordance with some embodiments.

In some embodiments, the properties for the KEI viewer are user adjustable. FIG. 55 illustrates a set of KEI viewer symbols that identify output actions that adjust the appearance of the KEI viewer 5505 when the MOD "X" operational mode is specified in accordance with some embodiments.

The KEI viewer 5505 displays symbols 5510-5540. The symbols 5510-5540 identify output actions for increasing and decreasing the size of the KEI viewer 5505 and tilting the KEI viewer 5505 forward or backward. The output actions identified by the symbols of FIG. 55 are an exemplary set of KEI viewer adjustable settings. Other adjustable settings may be used in addition to or instead of the above described settings to adjust the look of the KEI viewer. For example, other adjustable settings may be used to change the color or transparency of the KEI viewer.

Figure 56:
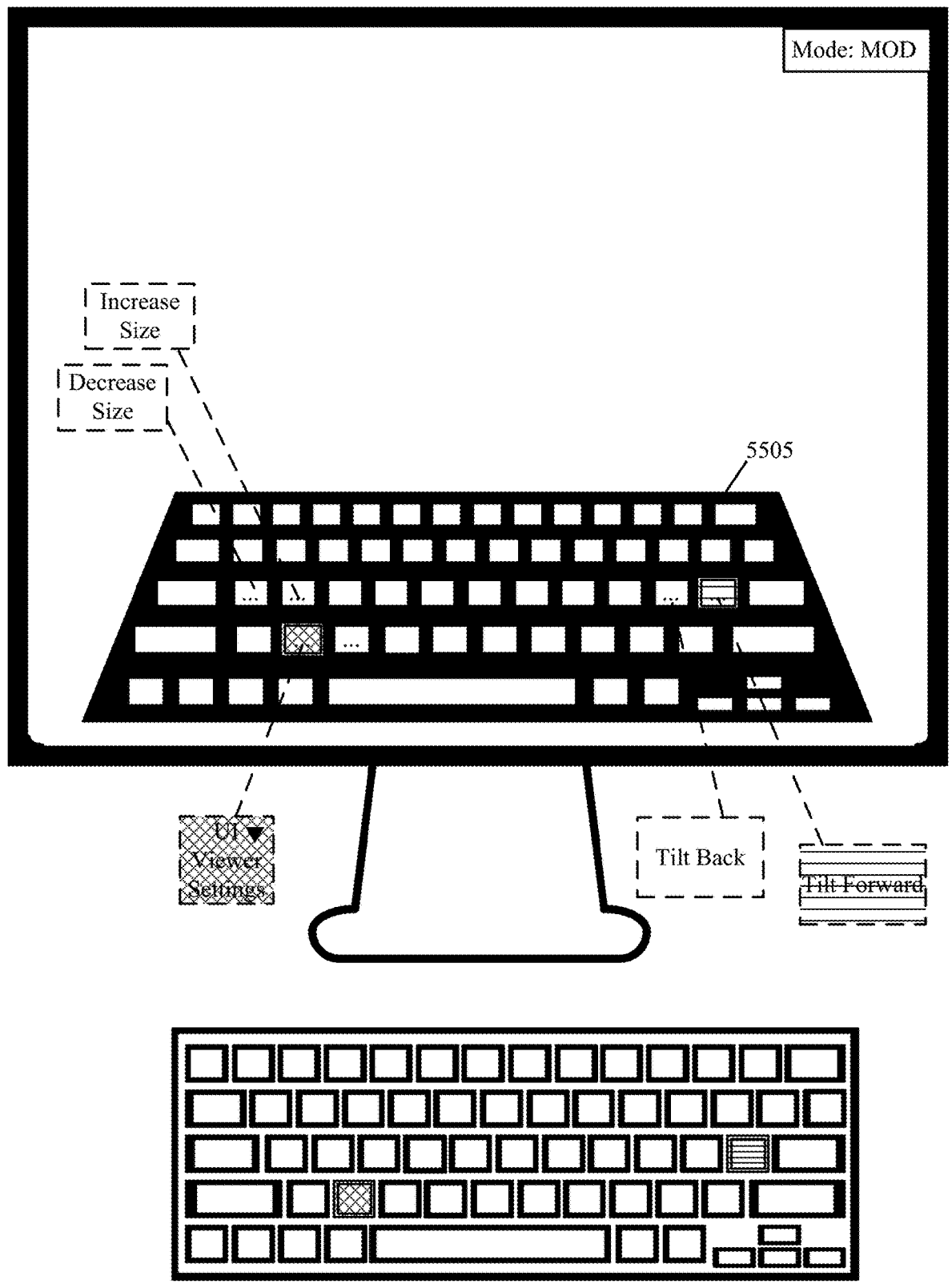
FIG. 56 illustrates the KEI viewer after it is tilted back in accordance with some embodiments.
Figure 57:
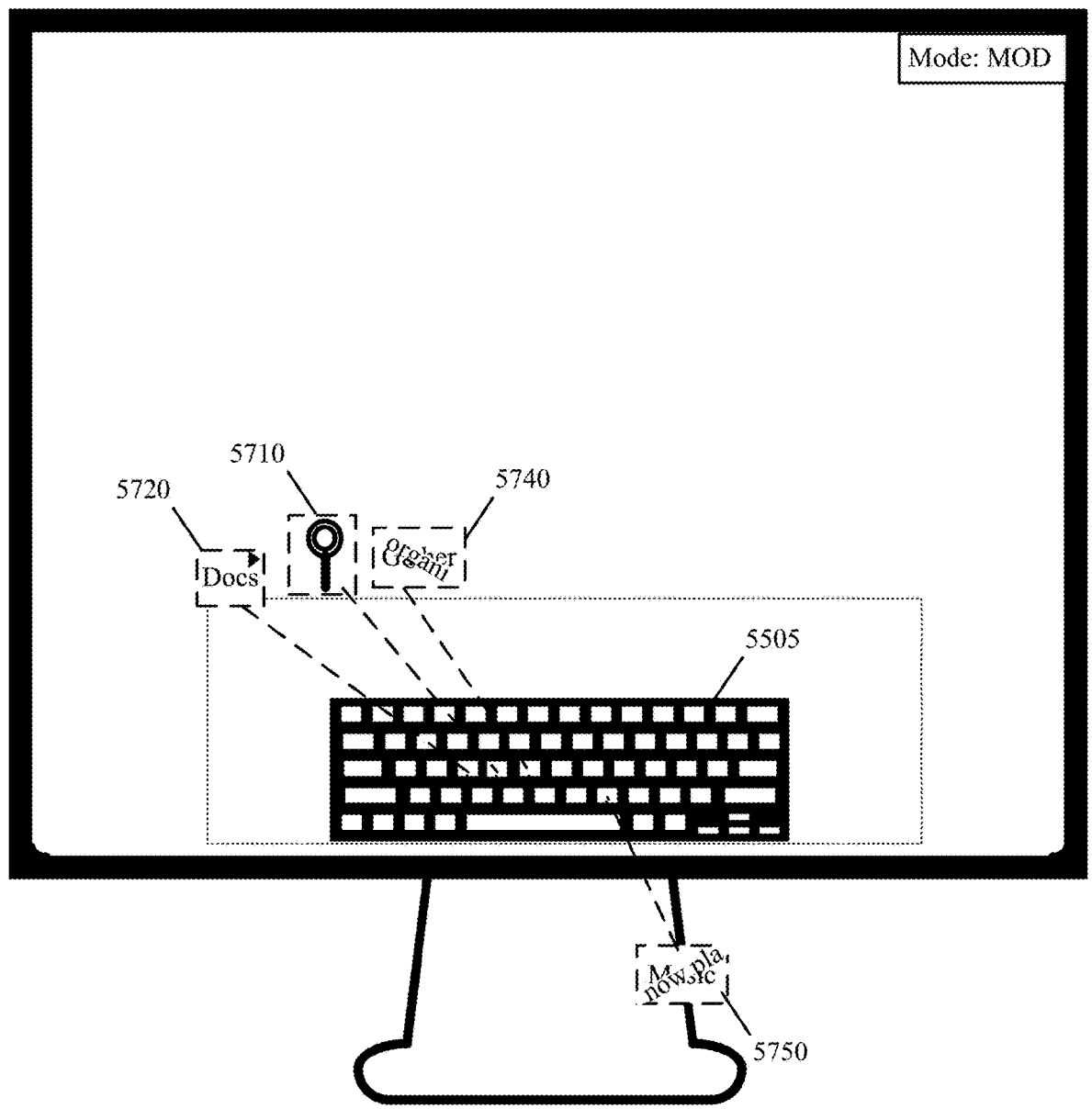
FIG. 57 illustrates the display of symbols over some of the graphical keys of the KEI viewer after the KEI viewer is decreased in size.

FIG. 56 illustrates the KEI viewer 5505 after it is tilted back in accordance with some embodiments. FIG. 57 illustrates the display of symbols over some of the graphical keys of the KEI viewer 5505 after the KEI viewer 5505 is decreased in size.

When decreasing the size of the KEI viewer 5505, the KEI viewer 5505 is provided less screen space with which to display the symbols and widgets. To compensate, the KEI viewer 5505 decreases the amount of information that is displayed in the symbols and widgets. As shown in FIG. 57, symbol 5710 displays an icon with no text and symbol 5720 displays an abbreviated amount of text (e.g., "Docs" instead of "Documents").

To make better use of the available space, some embodiments of the KEI viewer 5505 display "zipper" text within a symbol or graphical key of the KEI viewer. The zipper text provides a textual description that scrolls across the symbol or graphical key. For example, symbols 5740 and 5750 display zipper text. The textual description may be used to identify the output actions that may be invoked using the keyboard key that corresponds to the graphical key over which the symbol is displayed. For example, the zipper text for symbol 5740 scrolls the text "organize screen" so that the user can identify the organize screen output action.

Figure 58:
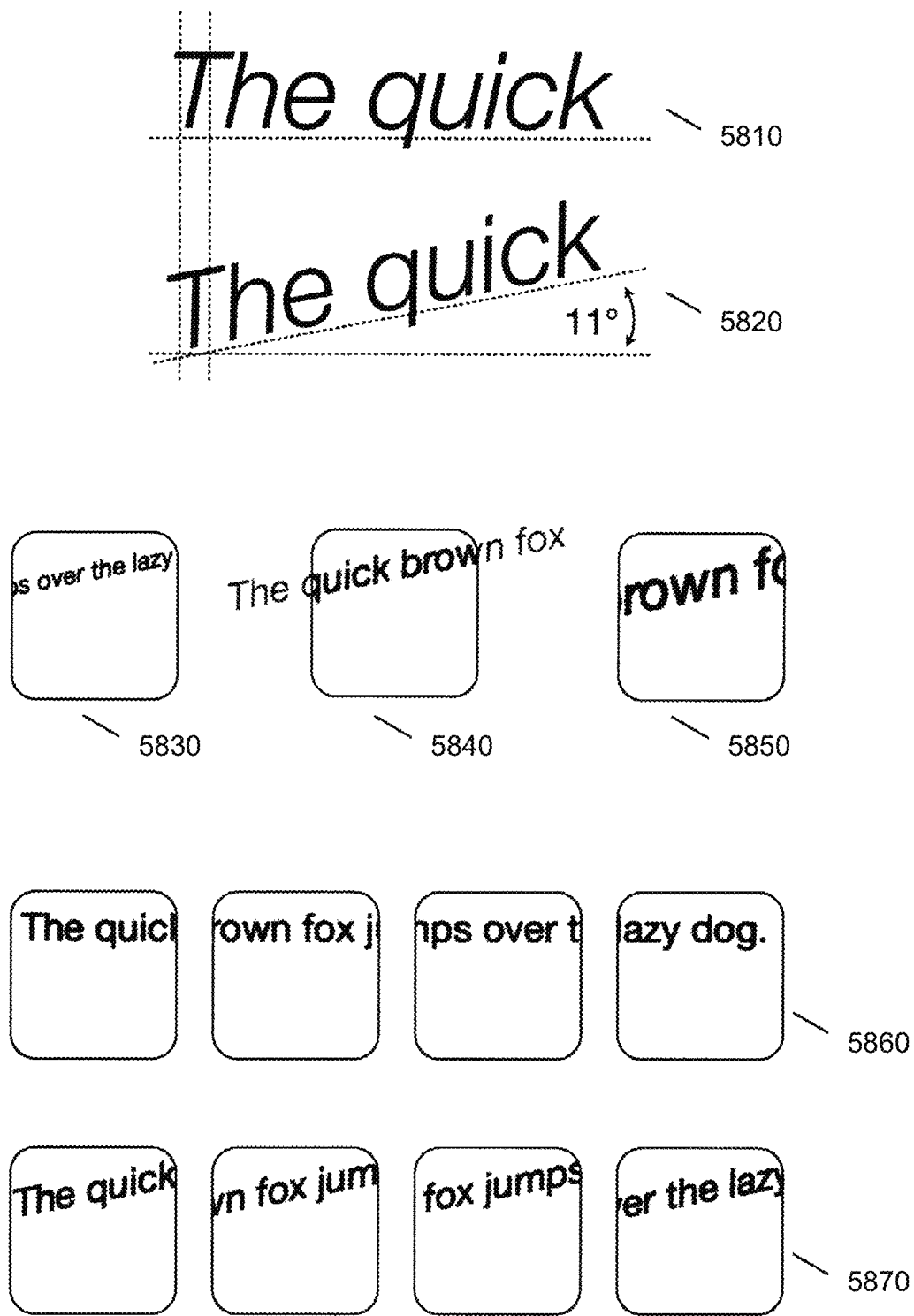
FIG. 58 provides various illustrations for the presentation of zipper text in a graphical key or symbol of the KEI viewer in accordance with some embodiments.

FIG. 58 provides various illustrations for the presentation of zipper text in a graphical key or symbol of the KEI viewer in accordance with some embodiments. 5810 illustrates normal text and 5820 illustrates zipper text that is positioned at an angle. The zipper text is angled so that the vertical element of an italicized character is maintained at a 90 degree angle. This angling provides a means for differentiating zipper text of one symbol from zipper text of a neighboring symbol. For example, text that is scrolled horizontally at 5860 is difficult to differentiate between neighboring symbols. This is because the human eye is trained to view continuous or aligned text as a single message even though each symbol or graphical key may be displaying different text. Therefore by scrolling the same text at an angle at 5870, the zipper text within each symbol becomes clearly distinguishable from the neighboring symbols and the human eye easily identifies the demarcation between the different text. Moreover, the angling of the text provides a greater area with which to display each character of the zipper text. Therefore, even when the symbol or graphical key is very small as in the symbol 5850, the zipper text can be maintained at a relatively larger font to allow for easy readability.

In some embodiments, zipper text can include any number of characters. A phrase that is too long to display over a single symbol is scrolled in continuous parts across the symbol. As shown at 5830-5850, the symbol or graphical key of the KEI viewer is used to mask the zipper text such that only the text that appears within the boundaries of a symbol or graphical key is displayed. As the zipper text scrolls, the entire text is displayed. In some embodiments, the zipper text displays user notes, title of a currently playing audio track, or other descriptive information.

Figure 59:
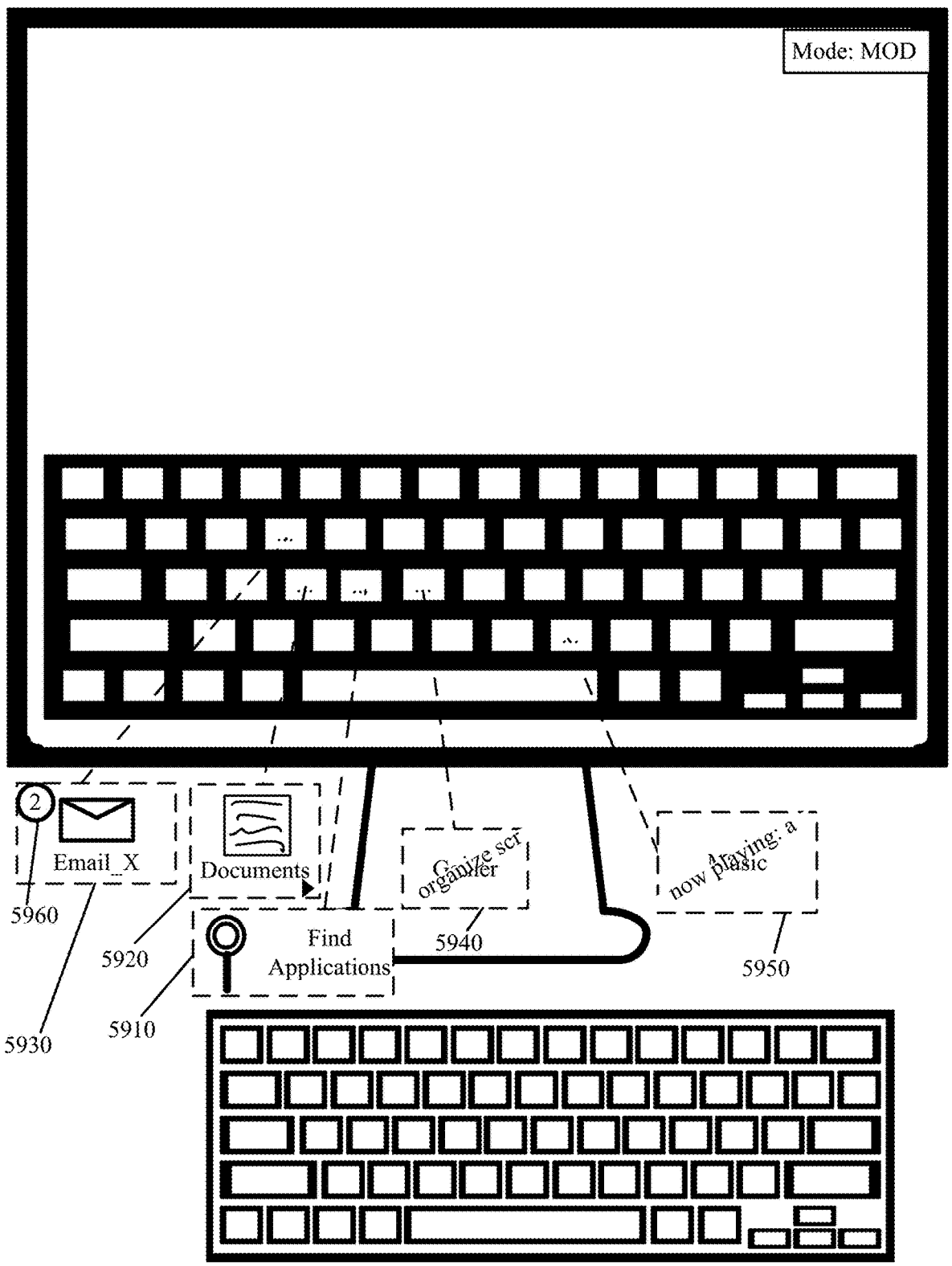
FIG. 59 illustrates the KEI viewer providing additional information for the symbols when the size of the KEI viewer is increased in accordance with some embodiments.

When increasing the size of the KEI viewer, the KEI viewer is provided more screen space with which to display the symbols and widgets. FIG. 59 illustrates the KEI viewer providing additional information for the symbols when the size of the KEI viewer is increased in accordance with some embodiments.

In this figure, the KEI viewer displays symbols 5910-5950 over some of the graphical keys of the KEI viewer. Symbol 5910 includes text and an icon, whereas the corresponding symbol 5710 in FIG. 57 includes only an icon.

Symbol 5920 includes an icon and a complete textual description, whereas the corresponding symbol 5720 in FIG. 57 includes only the abbreviated textual description.

In some embodiments, a symbol includes a badge. A badge is displayed over the symbol and provides status information in some embodiments. For example, symbol 5930 includes badge 5960 that identifies a number of unread emails. A badge may also be used to notify a user of updates to an application, or changes to a website.

In some embodiments, different representations for the same symbols and widgets may be stored for different sizes and resolutions of the KEI viewer. When the size or resolution of the KEI viewer becomes too small, certain graphics, text, or widgets are hidden. For example, badge 5960 is hidden when the graphical keys become smaller than a specified size.

L. Symbol & Widget Properties

Figure 60:
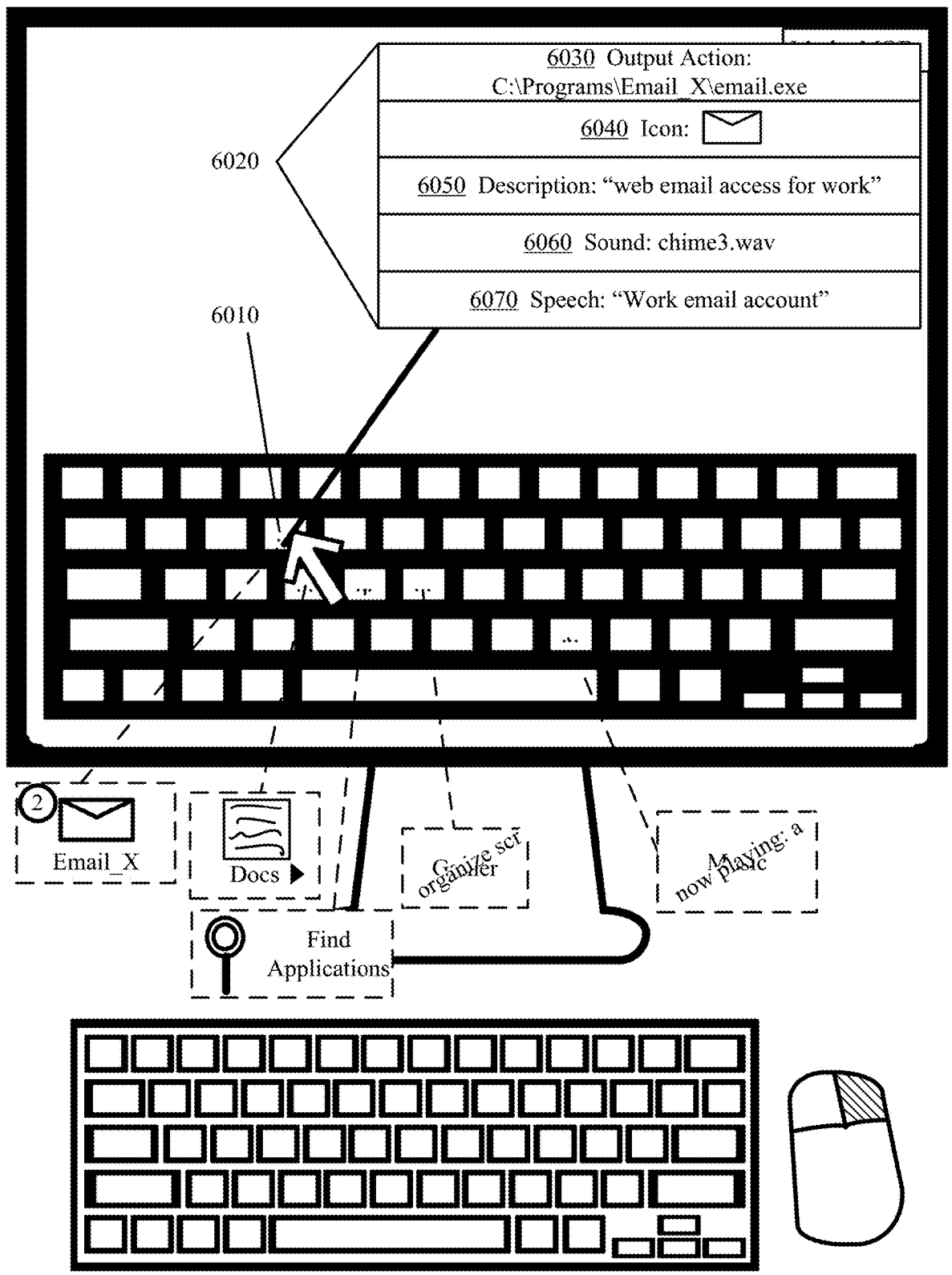
FIG. 60 illustrates modifying properties of a symbol in accordance with some embodiments.

Some embodiments provide functions for modifying properties of the symbols and widgets that are displayed over some or all of the graphical keys of the KEI viewer. FIG. 60 illustrates modifying properties of a symbol in accordance with some embodiments. To modify the properties of the symbol 6010, the user performs a right mouse click at the symbol 6010. In some embodiments, the right mouse click invokes the properties window 6020 for the symbol 6010.

The user modifies the symbol properties through the properties window 6020. As shown, the user can (i) alter the command, instructions, scripts, speech, etc. for invoking the output action 6030 that is associated with the symbol 6010, (ii) change the icon 6040 that is displayed within the symbol 6010, and (iii) change the zipper text 6050 that scrolls across the symbol 6010.

In some embodiments, audible notifications are associated with some or all of the symbols and widgets. The audible notifications alert the user when the output action that is associated with a particular symbol is invoked. The symbol window 6020 includes an adjustable property 6060 for modifying the sound that is played when invoking the output action that is associated with the symbol 6010. In some embodiments, the audible notifications provide an audible description of the symbol. In some embodiments, the KEI viewer includes a text-to-speech feature that audibly communicates the description 6070 to the user. In some embodiments, the description 6070 is audibly communicated when the user holds the keyboard key that corresponds to the graphical key over which the symbol 6010 is displayed. In some embodiments, the description 6070 is also audibly communicated when the mouse pointer hovers over the symbol 6010.

M. KEI Remote Access

The KEI customizations allow users to develop a custom KEI configuration that best suits each user's preferences. Through repeated use of the custom KEI configuration, the muscle memory of the user develops relative to the customizations for their particular configuration. Therefore, users become accustomed to being able to invoke certain output actions using various customized key presses, taps, and holds. To carry over a custom KEI configuration to a different computing system or to allow different users who share a particular computing system access to their own custom KEI configuration, some embodiments store the database that is associated with each KEI configuration in the "cloud".

In some embodiments, the cloud includes one or more host servers that remotely store, update, and send KEI configurations to user computer system or devices irrespective of where the computer system is located. The host servers are accessed through a network such as the Internet, intranet, extranet, Wifi, cellular, or any other known network. In some embodiments, each KEI configuration is associated with a particular username and password. By logging into the KEI application or a website associated with the KEI application using the particular username and password, the user can access their KEI configuration from any network enabled computer system.

Figure 61:
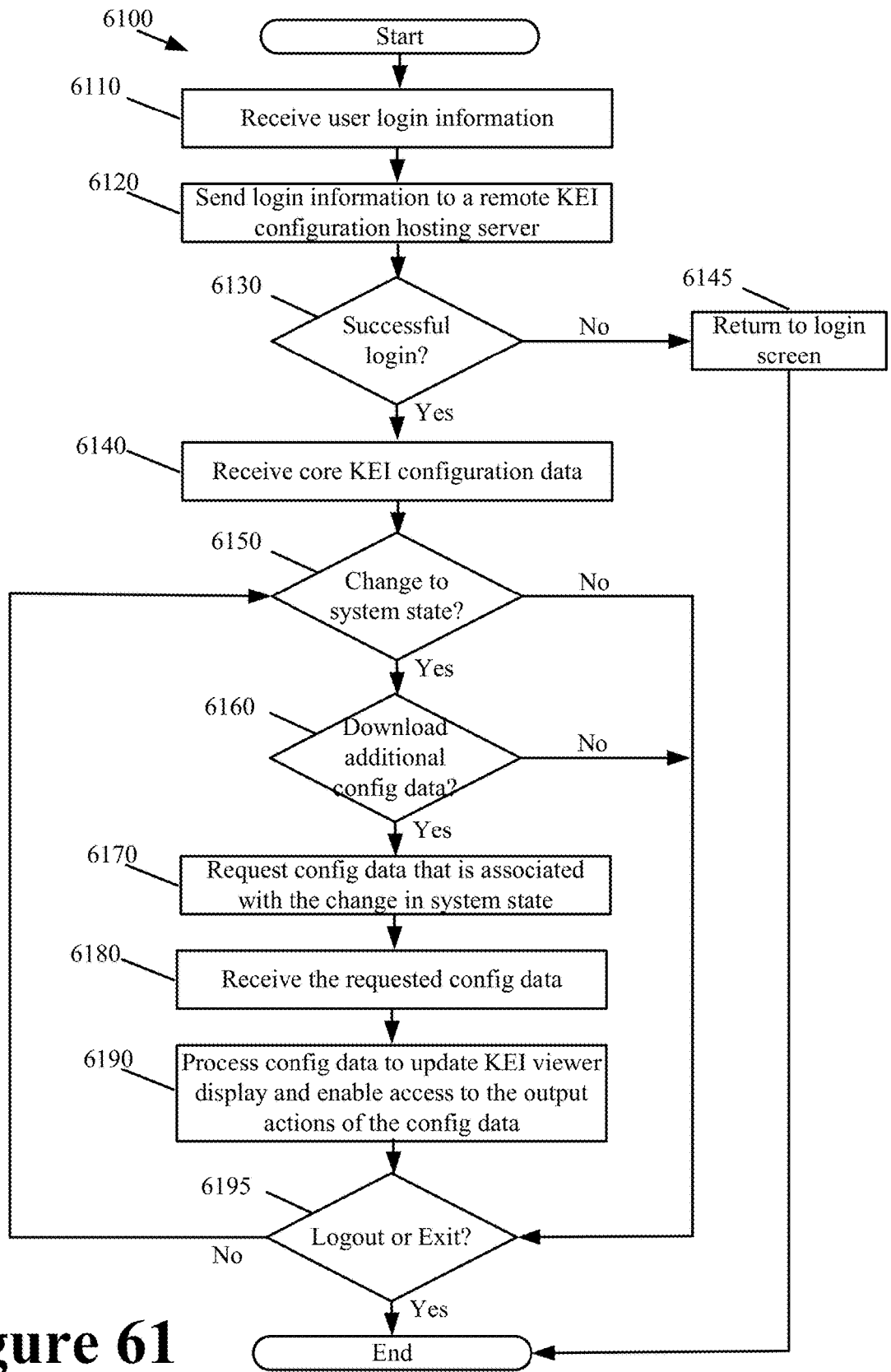
FIG. 61 presents a process performed by the KEI application to remotely access a KEI configuration from the cloud in accordance with some embodiments.

FIG. 61 presents a process 6100 performed by the KEI application to remotely access a KEI configuration from the cloud in accordance with some embodiments. The process 6100 begins when the KEI application is first started or when a user logs in to the KEI application. In some embodiments, the user accesses the KEI application login screen by pressing a particular set of keys (e.g., "ctrl-alt-L"). In some such embodiments, a dialog window is presented on-screen and the user can enter the username and password to the dialog window. In some other embodiments, the user accesses a particular website through a browser application through which the user can enter the login username and password.

The process receives (at 6110) the user login information. The login information may include a username and password or other login information (e.g., unique identifier). The process sends (at 6120) the login information to a remote KEI configuration hosting server that processes the login information to identify a KEI configuration. The process determines (at 6130) whether the login was successful, and if so it receives (at 6140) configuration data from the server. When an incorrect username and password combination is issued or when a KEI configuration does not exist for the user login information, the process may provide an error message or return (at 6145) to the login screen and the process ends.

In some embodiments, the returned configuration data may include an initial subset of the user KEI configuration. For instance, the initial subset includes the symbols, widgets, mapping of the symbols and widgets to the graphical keys, and output actions for globally accessible operations (e.g., the various MOD operational modes). The initial subset may optionally include the symbols, widgets, mapping of the symbols and widgets to the graphical keys, and output actions for a particular frontmost application when there is a frontmost application. By limiting the KEI data to this subset, the amount of information that is passed over the network is minimized. In so doing, the KEI is initialized and begins operation more quickly. In some embodiments, the returned configuration data is encrypted and the configuration data is decrypted at the local machine.

The other configuration data may be transferred on-demand as it is needed. Accordingly, the process determines (at 6150) whether there is a change to the system state (i.e., change to the frontmost application, change to the key focus of the frontmost application, etc.). When no change is detected, the process checks (at 6195) for a logout or exit event. Otherwise, the process identifies (at 6160) whether the change requires additional configuration data to be downloaded from the server. For example, closing a frontmost application to return to the desktop does not require additional configuration data to be downloaded. Accordingly, the process checks (at 6195) for a logout or exit event. However, when changing from a first frontmost application to a second frontmost application, the KEI requires the configuration data that stores the symbols, widgets, mapping, and output actions for the second application to be downloaded from the server. When the change requires additional configuration data, the process requests (at 6170) the server to send the additional configuration data that is associated with the username and password and the change in system state. The process receives (at 6180) the requested configuration data. The sending and receiving of the request occurs immediately following the launching of a new application such that the appropriate KEI data is available for the new application as soon as possible. In some embodiments, a list of frequently used applications are included in the initial configuration data, so that there is no delay when they are later launched.

The configuration data is processed (at 6190) to update the KEI viewer display and enable access to the output actions. The process ends (at 6195) when the KEI application is exited or when the user logs out. Otherwise, the process continues to detect (at 6150) additional changes in the system state.

In some embodiments, the KEI system stores a temporary copy of the downloaded configuration data on the local machine. Any user customizations to the configuration are stored to the temporary copy. The temporary copy is then synchronized with the configuration data on the server at various times such as when the KEI system is exited or the user logs out from the KEI system. In this manner, customizations made on the local machine are stored to the server so that they may be accessible from other machines to which the user's configuration data is downloaded.

V. KEI System Enhancements

A. Assistive Operation

Figure 62:
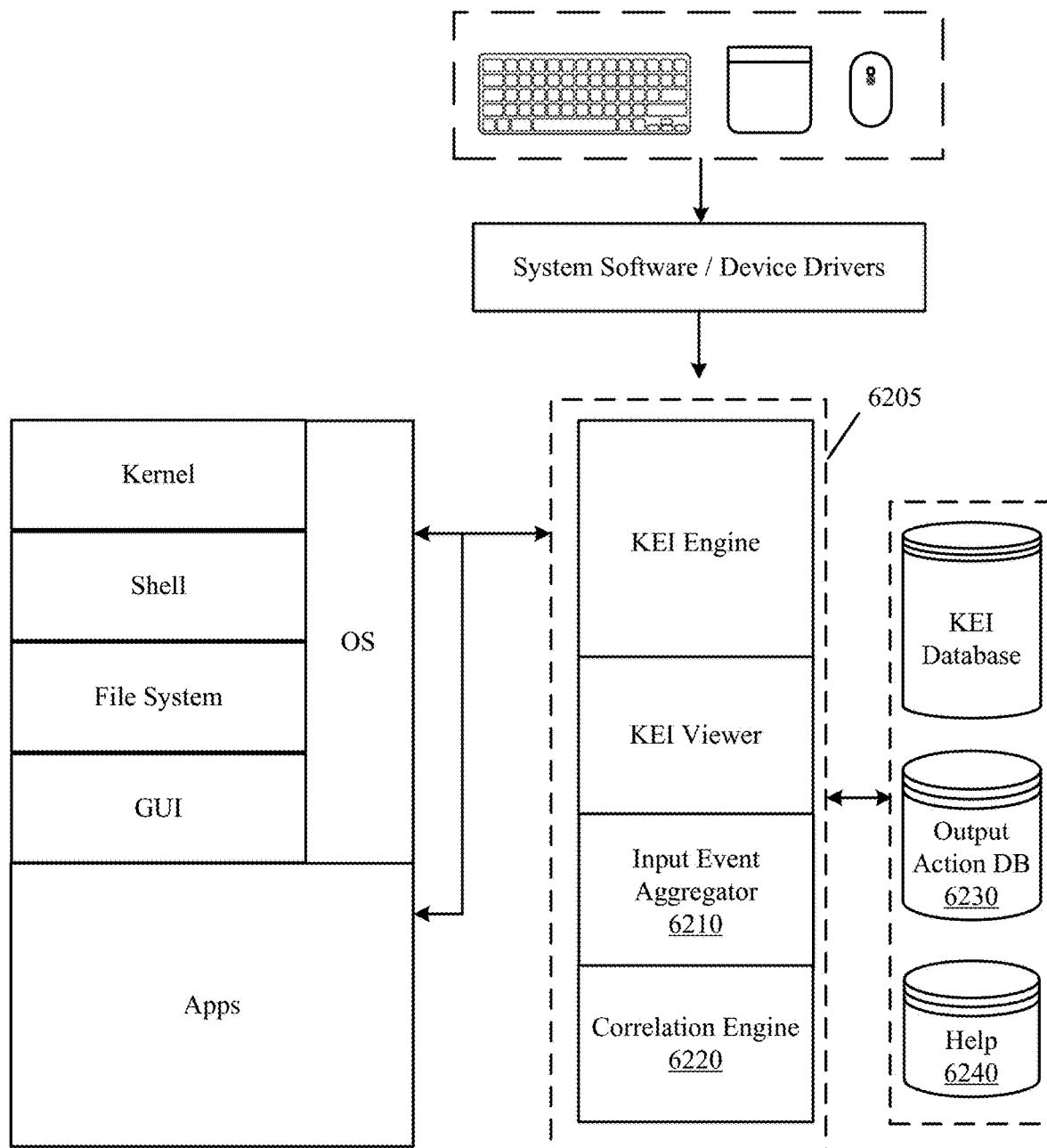
FIG. 62 conceptually illustrates the KEI system enhanced with an input event aggregator, correlation engine, output action database, and help tool database.
Figure 63:
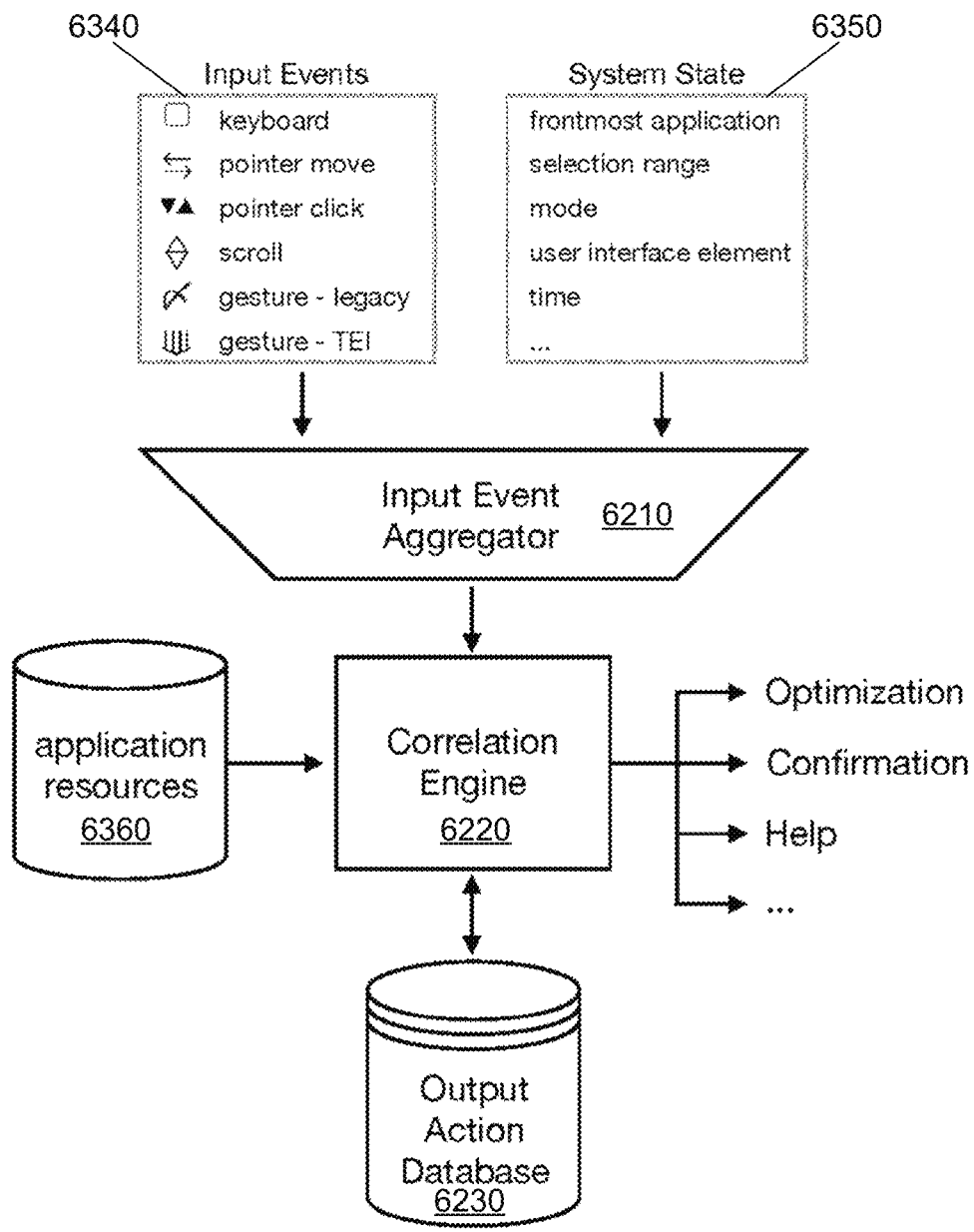
FIG. 63 illustrates how the input event aggregator, correlation engine, output action database process input events, system state information, and application resources to facilitate assistive operation of the KEI system.

In some embodiments, the KEI system can be enhanced with various optional components that provide assistive operations to the KEI system. FIG. 62 conceptually illustrates the KEI system 6205 enhanced with an input event aggregator 6210, correlation engine 6220, output action database 6230, and help tool database 6240. FIG. 63 illustrates how the input event aggregator 6210, the correlation engine 6220, and the output action database 6230 process input events 6340, system state information 6350, and application resources 6360 to facilitate assistive operation of the KEI system.

Various input events 6340 obtained from the KEI system are passed to the input event aggregator 6210, along with other relevant system state information 6350. The input event aggregator 6210 parses this data and creates a buffered list for the correlation engine 6220 to process. In conjunction the data from various application resources 6360, the correlation engine 6220 provides new information to the output action database 6230. At appropriate times, the correlation engine 6220 also queries the output action database 6230 to provide the data for various optimization operations, as well as confirmation prerequisites and help requests.

The input event aggregator 6210 is a non-intrusive user activity collection component of the KEI system that continually runs in the background. The input event aggregator 6210 parses this input data to create a buffered list for the correlation engine 6220 to process and store as records in the output action database 6230.

The correlation engine 6220 processes the aggregated data in conjunction with various application resources 6360 to provide data for operations such as the assistive operation of the KEI system. More specifically, the processing determines the number of times different output actions are invoked, the means with which the output actions are invoked, and the timing related to the invocation of the output actions. This processing reveals usage patterns, behavioral patterns, and user preferences when the user uses the KEI system or computer system. From this information, the correlation engine 6220 identifies various optimization operations and provides confirmation prerequisites and help requests, as well as other assistive features that are described below in greater detail.

One method of assistive operation is to automatically monitor key press behavior of the user and to adjust responsiveness of the KEI system in response. Automatically adjusting the responsiveness of the KEI system will result in fewer unintended actions and a more enjoyable user experience. This is specifically the case when the KEI system is attempting to decipher whether a key press and momentary hold is intended to be registered as invoking a MOD operational mode or simply a key tap for text insertion in the ABC operational mode. As another example, if the user intends to move the cursor to the beginning of the current line of text, in some embodiments the user holds down the "A" key to enter the "a-alpha" MOD mode, taps the "H" key to move the cursor, and then releases the "A" key to exit MOD mode. In this example however, the user did not hold the "A" key beyond the minimum duration (i.e., time threshold) to enter MOD mode, and therefore MOD mode was never invoked. Instead, the "A" and "H" characters were interpreted as text input and accordingly, "ah" was typed. At this point, the user realizes the mistake and taps delete twice to delete the "ah" characters, and then proceeds to invoke the MOD command properly by holding the "A" key beyond the time threshold. The correlation engine 6220 in conjunction with the input event aggregator 6210 utilizes pattern recognition and other widely known AI technology, equates the "A" and "H" characters, the intervening delete characters, and the subsequent "A" and "H" characters in a different mode, as an indication that this particular user intended to enter MOD mode faster than the existing setting allowed. Therefore, the KEI system decreases the time threshold, for instance from 300 ms to 290 ms, or by the amount that would have correctly interpreted the above example, and then waits to ascertain if this biasing results in fewer unintended mode mismatches.

If the biasing of the time threshold gets too short, the KEI engine may recognize the opposite unintended action. For instance, if the user intended to type "tr" by tapping the "T" key and then tapping the "R" key, but instead happened to hold the "T" key down beyond the time threshold. In some embodiments, this invokes the "t-time" MOD mode, which announces the current time. The subsequent tapping of the "R" key invokes the timestamp function, which types the current date and time at the current cursor position. Since this was not the desired outcome, the user deletes the timestamp text entry, and then proceeds to type "tr" as they intended. Similar to the previous example, the correlation engine 6220 recognizes this unintended input and subsequent correction, and may bias the time threshold to be longer, for instance from 300 ms to 310 ms, or by an amount that would have yielded the intended result the first time. With further such detection by the KEI system, finer and finer bias amounts may be utilized to fine-tune this setting.

Some embodiments enable the user to manually set the time threshold, and also view the history of any automatically biased setting adjustments. Some embodiments track this setting for each key individually, so that, for instance, frequently used MOD modes may be entered more quickly than other less-frequently used MOD modes. Furthermore, each user account keeps track of such settings independently to accommodate the typing style of each user. Also, a "guest" mode is available in some embodiments, which allows others to use the system without affecting previously acceptable settings. The frequency and timing characteristics of MOD use are, in some embodiments, interpreted by the correlation engine (as described with reference to FIG. 62) and used for password and other security purposes.

FIGS. 64 and 65 list exemplary data in a buffered list that is produced based on the parsing of the aggregated data by the input event aggregator 6210 in accordance with some embodiments. FIG. 64 represents various input events that cause the computer to switch to a text editor application, type a word, select that word and make it bold, and then resume typing. FIG. 65 lists different input events that cause the computer to perform the exact same operations, but in a manner that requires a fraction of the time and fine motor skills required by the actions in FIG. 64.

As can be seen at the end of the elapsed time (eT) column 6405 of FIGS. 64 and 65, the input events represented in FIG. 64 took 18.41 seconds, and were performed with traditional pointer-based output action invocation. In FIG. 65, a MOD operational mode of the KEI system was used to invoke the same output action in about a quarter of the time at 4.81 seconds. While a savings of 13.6 seconds is not much in isolation, when multiplied by the likely thousands of similar user actions, a significant savings of time and effort can be precisely documented by the KEI system.

Such unambiguous data is processed and presented by the correlation engine 6220 to users from time to time in an attempt to convince the user that some potential habit changes might be justified in terms of how they are performing frequently performed tasks. Some users may want to see concrete data which shows exactly where the most efficiency can be gained for the least amount of effort or change. As such, the correlation engine 6220 carefully analyzes user input events and correlates them along with timing information to their resulting output actions and accumulates and re-analyzes this data over time.

As shown in line 1 of FIG. 64, the input event aggregator 6210 parses system state information to identify that the "Finder" application is frontmost and is showing a "Home" folder window. Line 2 shows that pointer movement input events were received, the first of which was time-stamped at a zero reference time. As the pointer is moved by the user from a random location, successive pointer movements are aggregated, so that by the time the pointer is clicked in line 3, the cumulative pointer movement is calculated at 6.2 inches, based on a known screen resolution. Also, based on the change in time from the first pointer movement to the mouse-down event, it can be seen in the cumulation time (cT) column 6410, that it took the user 1.03 seconds to move the pointer to the location of the text editor application in the dock application launcher window.

In line 5, an alphanumeric key is pressed, which causes the character to be inserted into the text field. Of note is a time differential of 2.10 seconds from the time of the pointer click (in line 3) to the first key press, which may be seen in the pause time (pT) column 6420. This time might be attributed to the user moving the right hand (in the case of a right-handed user) from the pointing device (e.g., mouse, trackpad, touch screen, pen-based tablet) to the keyboard. In the following line 6, another alpha-numeric key is typed, and in this case (based on past typing habits of the user or other detected means) it can be ascertained that this key was typed with the right hand, which confirms that the user has moved the right hand from the pointing device back to the keyboard.

The tracking and timing of user hand position switching is an important component of the KEI system's assistive operation, since this repositioning represents not only a large component of time inefficiency and frustration, but it may also contribute to repetitive stress injuries. Also, when operating on or with a touchscreen device, there may be further considerations that further benefit from limited hand repositioning. As such, the correlation engine's hand/device tracking also recognizes that many operations may be efficiently operated with one hand on the keyboard and the other on the pointing or touch device, both hands on the pointing or touch device, or a single hand on the pointing or touch device. This is particularly true in applications that only require occasional text entry such as web browsing, games or graphics applications. Also, some touch operations are actually more efficient than keyboard invocation when the device incorporates a Touch Enhanced Interface (TEI) system, which is why the correlation engine 6220 includes these actions in its optimization calculations.

After a third character is typed (in line 7), pointer movements are again detected (at line 9), which causes the accumulation of key inputs to be delineated. The typing time for the third character is 0.48 seconds as shown in line 7. It can also be seen (on line 8) that there was a time differential of 1.31 seconds before the first pointer movement occurred, which can be attributed to the user again moving the right hand to the pointer device. After 2.39 seconds, a mouse-down is detected (at line 10), and further pointer movement continues while the mouse remains depressed—which is commonly referred to as a mouse "drag" operation. Of course, depending on the device, this may be a different physical motion, for example, a trackpad which may require a three finger press and hold to register a mouse-down event. For the sake of clarity in this explanation, "mouse" down/up/click references are meant to include such alternate device-dependent physical movements.

At line 12, a corresponding mouse-up is detected, which ends the drag operation. At this point, it is also detected that the KEI system has gone into the SEL mode, which indicates that the drag operation has caused a range of characters to be selected. This can be seen in line 12 by the "SEL" designation in the "mode" column 6430.

After a very slight pause of 0.16 seconds, which can be seen in line 13, pointer movements are again detected, and the first of these is time-stamped in line 14. Pointer movements are coalesced as the pointer moves to the menu bar where the mouse-down event of line 15 is received. Based on system state information, the input event aggregator 6210 identifies that the "Format" menu drops down, disclosing its menu items. Additional input events and system state information reveal that the pointer moves down to the "Font" menu to disclose the corresponding submenu. The pointer is then moved to the "Bold" menu item which receives the mouse-up event at line 19. From the aggregated data, it can be seen (in line 19), that the process of navigating this hierarchical menu took 5.23 seconds in this case.

After a very slight delay, the user once again moved the pointer, in this case back into the text edit document window, just after the last character of the previously typed word. A click is issued at this point to de-select the text, which is recognized by the KEI system, which switches the active mode to "ABC" as shown in the "mode" column 6430 of line 22. It can also be seen that the pointer moved 5.6 inches (line 21) and this operation took 1.92 seconds (line 22). At this point the user resumes typing, with the first keystroke timestamp (at line 24) indicating that it took 2.19 seconds for the user to move the right hand from the pointing device to the keyboard, and reorient the fingers on the home keys.

It should be pointed out that the input event aggregator 6210 does not collect or log alphanumeric key information, as it may contain sensitive information such as passwords.

This alphanumeric data is not relevant to the correlation engine 6220. The correlation engine 6220 does not care about what the user is doing, but rather how the user is doing it. FIGS. 64 and 65 only list alphanumeric information for the sake of clarity, especially in regard to determining hand/device placement shifts.

As previously mentioned, FIG. 65 produces the same actual results, but does so with input events that are quite different. Line 1 shows the same starting state as the previous figure. In line 2, the "F" key is held down which causes the KEI system to enter the MOD mode and display the "Finder" set of symbols on the KEI viewer. The user presses the slash key (at line 3), which in this case corresponds with the text edit application, and that application is launched, or goes frontmost if it is already running. At line 5, the three characters of text input begins.

At line 9, the "J" key is held, which selects the current word using KEI system functionality, and upon releasing the key, the KEI system enters the SEL mode since text is now selected. If the KEI viewer is activated, it can be seen that tapping the "B" key will cause the current selection to change to a bold font, which is done on line 11. Lastly, the "L" key is held, which releases the selection as is shown in line 14, at which point typing can resume, as shown on line 15.

The input event aggregator 6210 in FIG. 65 did not have much data to coalesce, as most operations did not require successive inputs actions. Nonetheless, the input event aggregator 6210 passes these actions to the correlation engine 6220, which will add them to the output action database 6230.

Much of the operation of a computing device involves making selections, whether it consists of characters in a text field, graphic elements in a drawing, or files in a folder. For example, the correlation engine 6220 can process the aggregated data in FIG. 64 to identify that the user spent 14.8 seconds making a selection and performing a single operation on it, whereas in FIG. 65, the same operation took 3.39 seconds. A running total of elapsed times can be seen to the right of the "mode" column 6430. This calculation illustrates the ability of the correlation engine 6220 to correlate time spent making a selection with the later operations on that selection. This correlated time may also include hand positioning time, as shown in FIG. 64, and it may also include time to de-select a selection if returning to, for example, a typing mode which requires that any selected characters must be deselected.

In addition, as noted in line 13 of FIG. 64, other operations may occur after a selection is made which do not impact the selection or the selected items. For instance, if the user switches to the Mail application at line 13, and five minutes later returns the text editor to frontmost, the selected characters will still be selected, ready for any subsequent output actions that may modify them. The correlation engine 6220 tracks such out-of-context input events, and does not include times or pointer inches for such operations.

In fact, the correlation engine 6220 must track multiple contexts at the same time, so that when, for example, two windows of the text editor application are open, each of which may or may not contain selected characters, the correlation engine 6220 still properly assigns time and other information associated with the relevant context.

Similarly, as noted in line 20 of FIG. 64, multiple operations may occur on the same selection. In order to make proper correlations of selections to output actions, the input event aggregator 6210 tracks the context in which output actions occur, as can be seen by the columns for "application", "document" and "focus". Additionally, the correlation engine 6220 gathers information on each output action, such as whether it acts on the selection or not, and stores this information in the output action database 6230.

Lastly, with reference to FIGS. 64 and 65, it should be noted that these figures have been simplified for the sake of clarity, by, for example, combining mouse-up and mouse-down to a mouse click, or combining key ups and key downs. As one skilled in the art would realize in light of the present disclosure, these events would necessarily be separately accommodated. Furthermore, there could be more or less aggregated data, and alternative techniques of acquiring, processing and storing such data, which would fulfill essentially the same purpose, and would therefore be regarded as another embodiment of the present invention.

In some embodiments, the correlation engine 6220 may request data from various application resources such as scripting definition files, NIBs, defaults XML property lists, registry database, etc. In some embodiments, especially when integrated into system software, further means of monitoring running application objects, such as undo stacks, could also be sources of valuable data. If available, this and other system data enables the correlation engine 6220 to make further analysis within a context possible, and can, for example, provide the location of certain user interface elements so that highlighting and link lines to a KEI viewer and other assistive information can be presented to the user.

Figure 66:
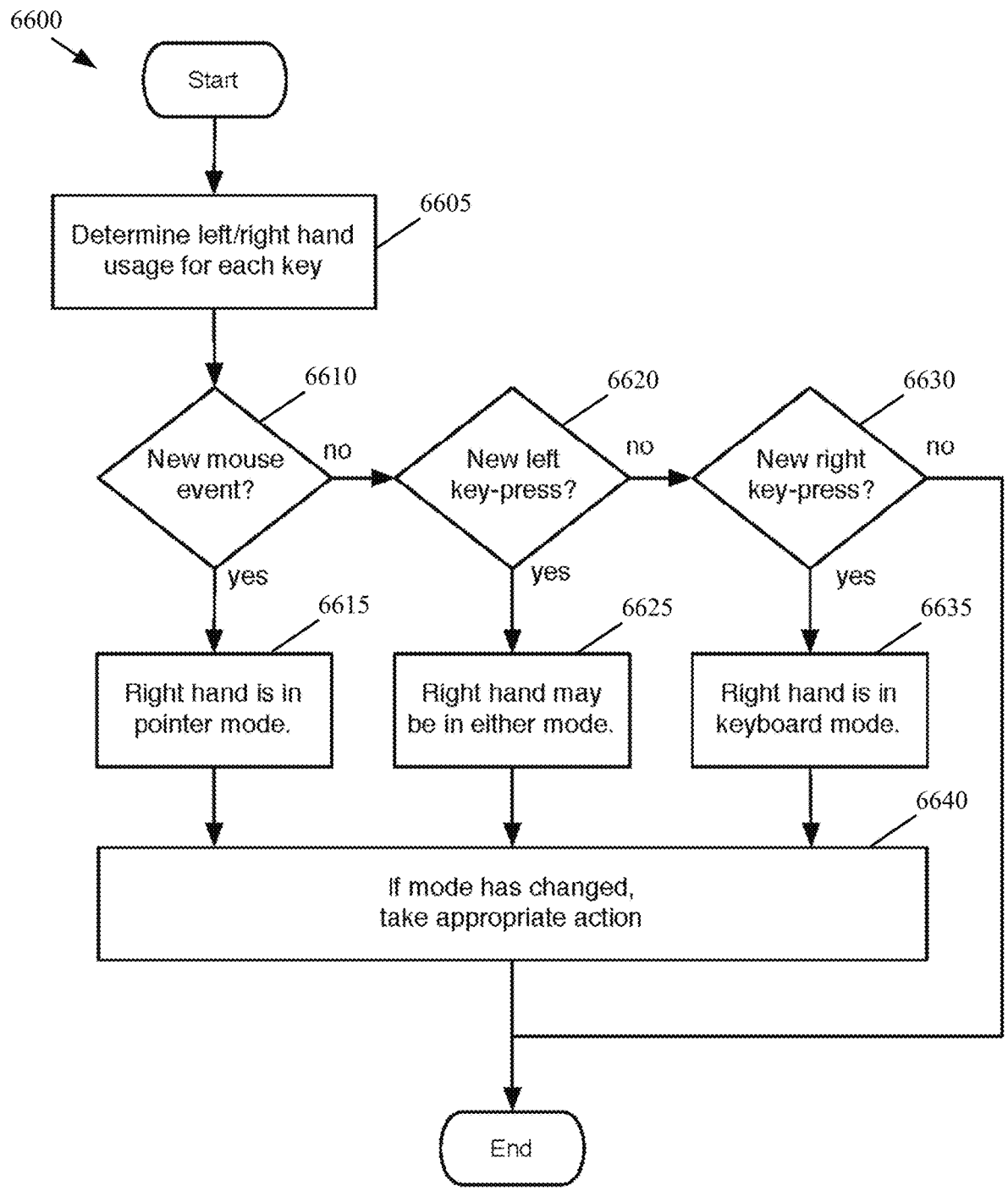
FIG. 66 presents a process performed by the KEI engine to determine that a user hand repositioning has taken place.

FIG. 66 presents a process 6600 performed by the KEI engine to determine that a user hand repositioning has taken place. The process 6600 starts by determining (at 6605) whether the left or the right hand is normally used in the pressing of the keys of the key-based input device. More specifically, in some embodiments, a table which enumerates every key of the key-based input device contains a designation for the hand and finger that is normally used to depress that key. This table may be created when the KEI system initializes, so that it remains available for each key-press as the KEI engine operates. The table may be initialized to values that represent standard touch-typing finger assignments wherein the fingers normally return to a "home" position and deviate from that position as little as possible. The table may contain other data if the user has changed the preferred designations, or if the key-based input device contains touch or other sensors which allow some degree of finger and/or hand tracking detection.

It should be noted that in preferred embodiments, the user may set a preference which designates the pointing device to be on the right side or the left side of the key-based input device. To clarify the description that follows, it will be assumed that the user has selected the "right" option, and is therefore using the right hand to operate the pointing device.

Next, the KEI engine waits for an input event and determines (at 6610) if the event is a mouse event such as a mouse move or mouse down. As previously described, a mouse event may actually originate from a different device such as a trackpad. If the event is a mouse event, it can be determined (at 6615) that the right hand is in pointer mode.

If the new event is not a mouse event, the process next determines (at 6620) if the event is a key event, and if so the table previously discussed is consulted to determine if the specific key has been designated as a left-hand key. If so, a determination (at 6625) is made that the right hand may be in either pointer or keyboard mode.

If the new event was not a mouse event or a left key-press, the process next determines (at 6630) if the new event was a key event where the specific key has been designated as a right-hand key. If so, a determination (at 6635) is made that the right hand is in the keyboard mode.

If the new event was not identified at steps 6610 6620 or 6630, then the event was some type of event that may not have any bearing on the hand use determination, and the process ends. For events that have made a hand-use determination (at 6615, 6625, and 6635), the process next determines (at 6640) if the hand-use mode has changed or is the same as the existing hand-use mode. If the mode has not changed then no additional action may be required. Likewise if the previous determination was that the right hand could be in either mode (see 6625). If the mode has changed, however, then other actions may take place as described below, such as using the time of the new event to delineate the time required for the hand repositioning, and adding such time to the appropriate computations in the input event aggregator.

It should be noted that one skilled in the art could identify other permutations of the above described process to accomplish adequate keyboard/pointer hand positioning detection, and such permutations are envisioned in the current invention. Also, an entirely different process may be employed depending on the environment on which the KEI system is running. For example, if the KEI viewer is being utilized on a touch screen device, the hand repositioning detection would utilize a mathematical model of palm/hand/finger geometry, including non-touch hover data, to determine which hand is responsible for which touches.

FIG. 67 is a representation of some of the internal data that might be utilized in the output action database of some embodiments and might be presented by the correlation engine 6220 through an interface to the user. From the top listing 6710, it can be seen that the "align left" output action was invoked 591 times since the KEI system began aggregating such data. Furthermore, the total time the user expended in invoking this output action was 26 minutes. On the same line, it can be seen that the database contains other information that may not be necessary to present to the user in some embodiments, such as the scope of applicability, etc. Listed below is another output action "add row above", which was invoked 428 times, and "borders-outside" which was invoked 381 times. Below is data for two more applications 6720 and 6730, each of which display similar data representations.

The lower listings "A" 6740 and "B" 6750 disclose further detail about one particular output action. Specifically, these are enumerations of output action equivalencies for a specified output action. In other words, input events that would trigger the same output action, regardless of which modality the user happened to utilize in the actual invocation.

Listing "A" 6740 shows the equivalencies for the "Align Left" command in a spreadsheet format. There are seven different ways to invoke this output action. For example, if the space bar is held down and the "S" key is tapped, the KEI system invokes the output action, just as if the user clicks on the "align left" button in the format bar, just as if the user selects "Align Left" from the "Text" submenu of the "Format" menu of the menu bar. It can be seen that in this case the user utilized the menu command only two times, and it took an average of 5.2 seconds to invoke the command. It can also be seen that using the KEI system the same command invocation took place 342 times, in an average of 0.42 seconds each.

The output action database 6230 stores other information for each of these equivalent ways of invoking this one particular command, such as whether there should be spoken confirmation of the command, or if the particular command requires some form of confirmation. Such confirmation may be set to occur always, never, or various permutations based on available data, such as if that particular command was used less than two times in the past two months. Furthermore, the confirmation may accept a variety of inputs, such as speech recognition (e.g. say "delete all data" to complete this operation), or multi-step randomized dialog boxes as disclosed elsewhere in the present disclosure.

The database 6230 may also contain information on when the output action was "undone" or otherwise reversed or ignored, which could factor into the confirmation process. Information that allows these capabilities is stored in the output action database 6230 or accessed from various application resources, and may be presented to the user in a variety of ways. Other information, which may have originated from various application resources, is also stored in the database, which uses a relational model in some embodiments. Such information would, for example, provide the location of user interface elements for highlighting, as mentioned previously. As noted with reference to the previous figure, this is not a complete listing of every type of data stored in the output action database 6230, but in the interest of clarity, some items, such as applications containing multiple focus contexts with selections, are not shown.

With data from the input event aggregator 6210 and various application resources 6360, the correlation engine 6220 continually updates the output action database 6230 so that it can effectively and precisely assist the user. For example, the correlation engine 6220 can ignore pointer data that is not followed by a click; accept and understand the relevance of key events acting as modifiers during a pointer click, move or drag operation; delineate alphanumeric key events with other keys (e.g. space, tab, return, delete, arrow keys, function keys); distinguish keys that are pressed in combination with traditional flag keys (e.g. command, option, control, shift); etc. As one skilled in the art would realize in light of the present disclosure, there are other permutations of capabilities that would utilize the data acquired using the methods herein disclosed, and such embodiments would not depart from the scope and objects of the present invention.

As mentioned previously with reference to FIGS. 64 and 65, range selections are correlated with output actions that later modify them, and the time required to make these selections is quantified. In order to increase the accuracy of these time measurements, some embodiments delineate selection activities by actions that did not have any bearing on the final selection range that received output actions. For example, if a selection was made of characters 5 to 10, then of characters 5 to 15, then of characters 5 to 20, the intermediate actions may be included in the selection time calculation, because one edge of the selection remained constant. If both range components changed at the same time, a new time calculation may be utilized, since previous selection activity has become irrelevant. Such selection range modification coalescing prior to correlation with output actions can increase the accuracy of optimization operations.

Some examples of optimization operations include, at a base level, reporting that could be expected of a relational database, such as rankings by criteria such as invocation count, time/date, time saving potential, pointer inches traveled, pre searching time, post undo count, etc. Such data is presented in a user-friendly interactive manner, and may include graphs in some embodiments. Also, since this data contains no user content whatsoever, in some embodiments it is made available to the application developer, who can glean important information such as feature use statistics and patterns, areas of user confusion and deliberation, operations that are mistakenly invoked, events leading up to errors (rather than just crash reports), etc.

In some embodiments, the aggregated input events correlated with their output actions are stored along with the content or document that is being produced in the file's meta-data or extended attributes file system. This allows the data to "travel" with a document to other systems, and also simplifies implementation of some confirmation prerequisites such as assessing levels of user effort expended in the document's creation, or file deletion prevention, as previously disclosed.

In normal computer use, one or more output actions may be invoked in the same order, and such a string of actions may occur periodically. For example, if a user operates a menu using a series of clicks (rather than the traditional dragging), the correlation engine 6220 must combine these separate input events that result in one output action. As another example, if the user types "delete" 42 times in succession to delete a sentence, or the user types the right arrow key 57 times to move the insertion bar to the end of the current line, the correlation engine 6220 is able to identify other operations, or combinations or operations, that would accomplish the same end result far more efficiently.

Similarly, if a user often selects text and then changes the font to bold and then italic, the correlation engine 6220 identifies this pattern, and some optimization operations may present a single symbol that encompasses all actions to the side of the KEI viewer, which the user may decide to drag into a particular KEI viewer context so that it can be subsequently invoked with a single key tap. Optimization correlations can also occur within the KEI system. For example, in the SEL mode, if the user presses "Command-C" to copy the selected text, it will be pointed out to the user that the Command key is unnecessary, and simply pressing the "C" key will copy the selected text to the clipboard.

The correlation engine 6220 is also able to correlate output actions that are not exact matches, so that relevant correspondences can be made in various optimization operations. For example, launching and switching applications is something that the user does often, and there are many output actions that the user may utilize to do so. The user may switch to an application by simply clicking on one of the application's windows, if it is visible, or by clicking the application icon in the dock, or clicking the icon for one of the application's documents inside a folder, or using a switcher shortcut or a document shortcut, or a window consolidation utility which shows depictions of all open windows, using a KEI key, a TEI gesture, a "Start" menu, a taskbar, etc. Each of these input events may invoke a different output action. To correspond these disparate output actions, the KEI system monitors changes to the frontmost application, document and focus, and notifies the correlation engine 6220 to look back and determine what input events immediately preceded any switching that took place. The relevant correlation information is entered into the output action database 6230 for future optimization operations.

Another example of non-exact output action correlation is illustrated in some embodiments which may be aware of system-wide shortcuts such as double clicking on a word to select the word, rather than clicking at the start of a word and dragging to the end of a word. This is facilitated through the integration with the KEI system, and its ability to track changes to the current selection. The correlation engine works backwards, as in the previous example, to deduce what input events propagated this selection change. Other such integration with the KEI system includes tracking the current active mode, such as ABC, SEL, PRO, and MOD, as well as UI element locations, which allows the correlation engine to know when the user is, for instance, sliding around the dock or menu bar, looking for a particular item.

Especially at times when one or both hands are already on a touch device, it may be more expedient for the user to take advantage of gestures such as pinch, zoom, rotate, etc. The correlation engine 6220 employs various application resources to seek out any gestures that may have relevance within the current active context. By correlating gesture input events in this way, traditional gestures gain a much needed feature of discoverability when various optimization operations are performed. When the TEI system is also employed, gesture correlation is even more relevant, as the output action vocabulary is many times more expansive, and textual input is also possible In order to accurately track input events for a particular user, an output action database 6230 is created for each user account. Moreover, guest users may be accommodated by a preference setting. In addition to not correlating any input events to the output action database 6230, the KEI system may also disable certain output action mappings and other settings that would be unfamiliar to the guest user. Furthermore, if the correlation engine 6220 detects a series of uncharacteristic input events or patterns, it may assume that someone other than the user account owner is using the computer, such as a child or unauthorized person. In addition to disallowing entries to the output action database 6230, the correlation engine 6220 may proceed with a variety of actions, such as requesting account authentication. Such detection could come under heightened scrutiny when, for instance, typing a password and the timing of the normal key invocations substantially differs from past history. Such detection can be done without the correlation engine 6220 gaining access to any password characters, since it is the timing of the character input rather than the characters themselves that is being analyzed. If the characters are correct, the additional scrutiny of their timing is only then subsequently analyzed, so the correctness of the characters has already been verified before the correlation engine 6220 considers character timing, while having no knowledge of the actual characters involved. Some embodiments provide for varying degrees of timing discrepancy allowances in relation to previously accepted response timings. The total number and consistency of previously accepted response timings is also considered in terms of allowable timing discrepancy thresholds in some embodiments.

In some embodiments, the correlation engine 6220 presents processed and formatted information from the output actions database 6230 is an interactive list that is displayed in a separate window adjacent or separate from the KEI viewer. The interactions provided in the window allow a user to sort the list based on a number of different factors such as frequency of invocation, output action being invoked, timing, etc. Through this sorting functionality, the user can view a history of invoked output actions and manually identify efficiencies and inefficiencies in the use of the computer system or device.

In some embodiments, the correlation engine 6220 analyzes the aggregated data to connect a user with other users performing the same tasks or functions. For example, the correlation engine 6220 determines from the aggregated data that the user spends a majority of their time using a particular application. The correlation engine 6220 can then suggest or connect the user to social networking websites, user groups, product websites, or help forums where the user can interact with others who use the same particular application. Users can ask each other for solutions to common problems, advice on how to perform a task, or share their work product with other users that use the same application.

As noted above, the correlation engine 6220 may process the aggregated data to provide additional confirmations to assist the user in the operation of the computer system or KEI system. Such confirmation avoids unintended consequences.

Figure 68:
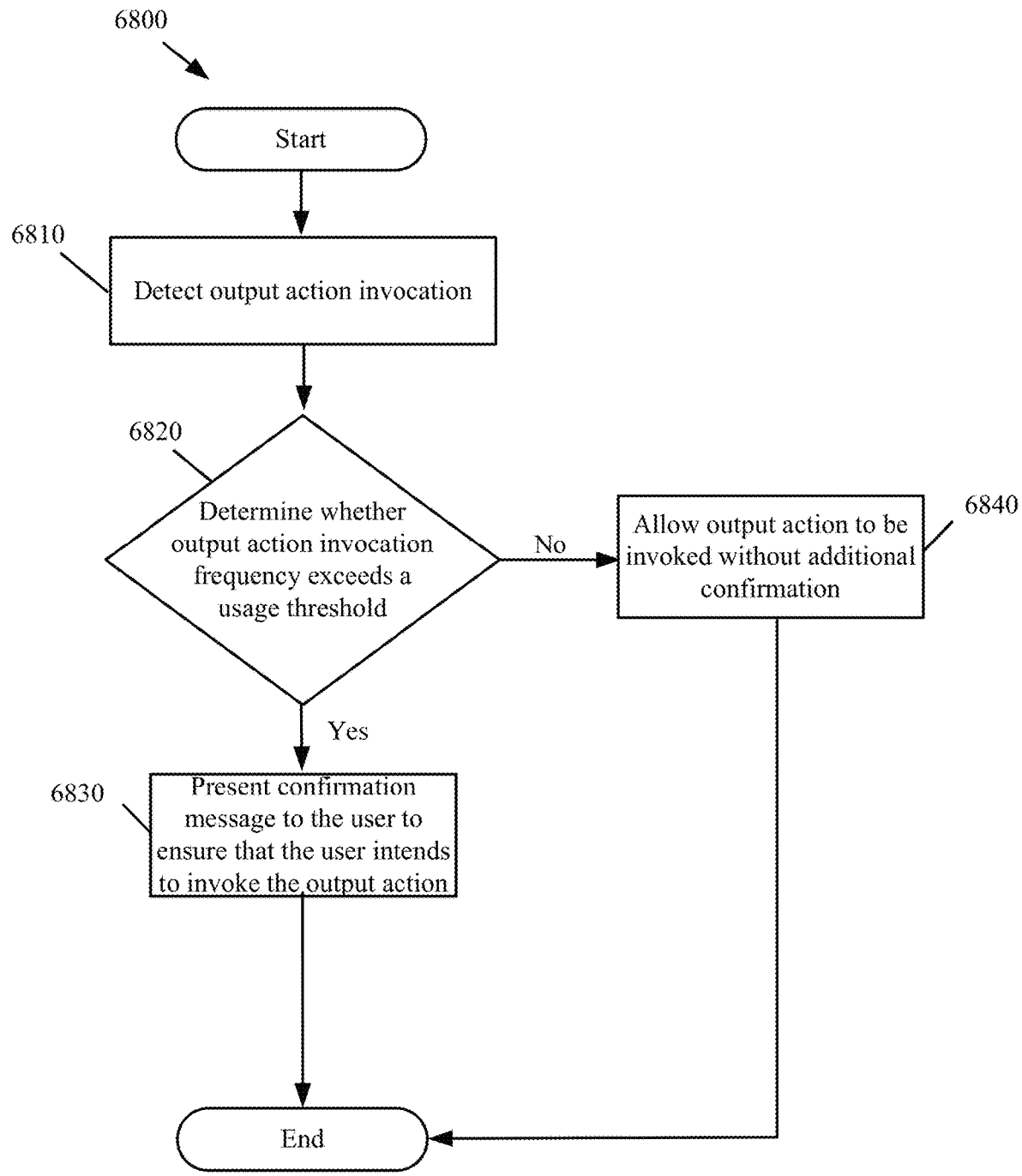
FIG. 68 presents a process for performing output action confirmation in accordance with some embodiments.

FIG. 68 presents a process 6800 for performing output action confirmation in accordance with some embodiments. The process 6800 is performed by the correlation engine 6220 and begins upon detecting (at 6810) that an output action is being invoked. Prior to invoking the output action, the process determines (at 6820) whether the frequency with which the output action has been invoked in the past exceeds a usage threshold (i.e., some specified number of invocation within a specified time interval). The correlation engine can maintain a log within the output action database as to the number of times each output action has been invoked and the frequency with which an output action has been invoked in the past in order to perform the determination at 6820. An output action that is being invoked for the first time or is one that is infrequently invoked does not exceed the usage threshold. In such cases, the process presents (at 6830) a confirmation message to the user to ensure that the user intends to invoke that output action. Otherwise, the output action being invoked is one that is frequently invoked and exceeds the usage threshold. In such cases, the process allows (at 6840) the output action to be invoked without additional confirmation and the process ends.

In many instances, users habitually close a dialog box without reading the displayed message. In some embodiments, the correlation engine provides confirmation to ensure that unintended consequences such as data in a document is not lost by an unintentional close or quit event. Specifically, when a quit or close event is issued in relation to an open document, the correlation engine 6220 analyzes previous user activity within the document to determine whether additional user confirmation is required to avoid the inadvertent closure of the document.

Figure 69:
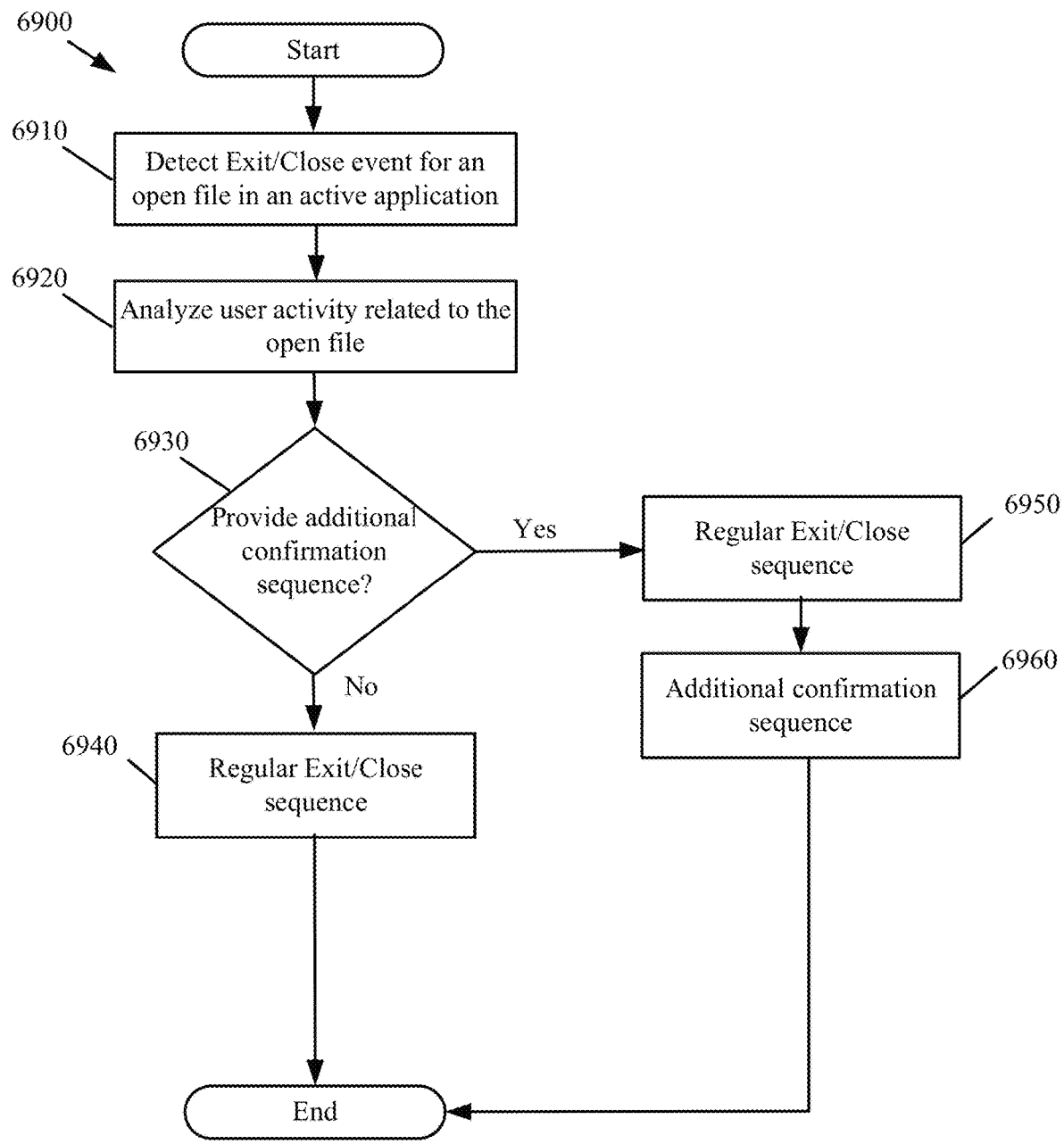
FIG. 69 presents a process for performing command confirmation in accordance with some embodiments.

FIG. 69 presents a process 6900 for performing exit/close confirmation in accordance with some embodiments. The process 6900 begins upon detecting (at 6910) an exit or close event for an open file of an application with unsaved changes. The process analyzes (at 6920) the user activity that is related to the open file. In some embodiments, the correlation engine 6220 stores the user activity to the extended attributes of the file so that it can be analyzed during the exit event, close event, or other input event. The user activity includes the user activity since the last save event. In some embodiments, the user activity includes the number of key presses, mouse clicks and drags, how many output actions were invoked, etc.

The process compares the user activity to an activity threshold in order to determine (at 6930) whether an additional confirmation sequence should be presented to the user. The activity threshold may be a time value, a number of key strokes, or a combination of both. The activity threshold identifies an acceptable amount of data that can be inadvertently lost. When the activity threshold is not exceeded, then the unsaved user activity falls within the acceptable amount of data that can be inadvertently lost and the regular exit or close sequence occurs (at 6940) before the process ends. When the activity threshold is met or exceeded, then the unsaved user activity is beyond the acceptable amount of data that can be inadvertently lost. Accordingly, the process performs (at 6950) the regular exit or close sequence and also performs (at 6960) the additional confirmation sequence.

In some embodiments, the activity threshold is defined based on the unsaved user activity relative to the total user activity. For example, when the total user activity is 100 inserted characters and the user activity since the last save event is 97 inserted characters, then the majority of the user activity has not been saved and an additional confirmation sequence should be presented to the user to ensure that the activity is not unintentionally lost. As another example, when the total user activity is 10,000 inserted characters and the user activity since the last save event is 97 inserted characters, then a small percentage of the user activity has not been saved and the process can determine that an additional confirmation sequence is not needed.

The additional confirmation sequence is used to ensure the proper user selection. The additional confirmation sequence performed by some embodiments utilizes nonstandard or randomly placed messaging and UI elements in order to obtain user confirmation. In some embodiments, different inputs are required to respond to the additional confirmation sequence. For example, instead of the "enter" key to select an "ok" or "yes" button, the user taps the "A" key to accept and the "D" key to decline.

FIG. 70 illustrates an example of a confirmation sequence in accordance with some embodiments. At 7010, a mouse click is used to exit the application. A standard confirmation dialog box is presented at 7020 to determine whether the user wishes to close the application without saving changes to the current file. By habit or in haste, a user may select either the "yes" or "no" button or may simply hit the "enter" key to invoke a default action in the dialog box. To avoid an unintended result of, for instance, hastily clicking the "no" button, the confirmation UI element 7040 of some embodiments is presented at 7030 using nonstandard messaging and buttons. In some embodiments, the confirmation UI element 7040 is placed at a different screen location, the messaging has been altered, the button locations have moved, and different key taps are needed to interact with the buttons. These factors cause the user to read the contents of the confirmation UI element 7040 and corresponding buttons before making a selection.

In some embodiments, the correlation engine 6220 stores the changes to a temporary file when the user confirms to close a document without saving the changes. The temporary file is stored for a duration of time to allow the user to retrieve the changes at a later time if needed. In this manner, the KEI system provides enhanced undo capabilities for different applications which supersede closing or quitting the application.

B. Help Tool

In many instances, the help files that are provided by applications are overloaded with information thus making it difficult to find information about a particular UI element, operation, or task at hand. Furthermore, these help files cannot be annotated with user comments. It is often easier to perform an internet search for an application specific help topic in order to find various solutions used by others to perform a function or solve an issue.

To alleviate many of these issues, some embodiments provide a KEI help tool. In some embodiments, the KEI help tool is invoked by holding down the "?" keyboard key beyond a particular time threshold. In some embodiments, the KEI help tool is an application that runs in conjunction with the KEI system. In some other embodiments, the KEI help tool is invoked in a particular MOD operational mode of the KEI system that includes various symbols, widgets, and output actions for accessing KEI help tool functionality. For example, the MOD "?" operational mode.

Figure 71:
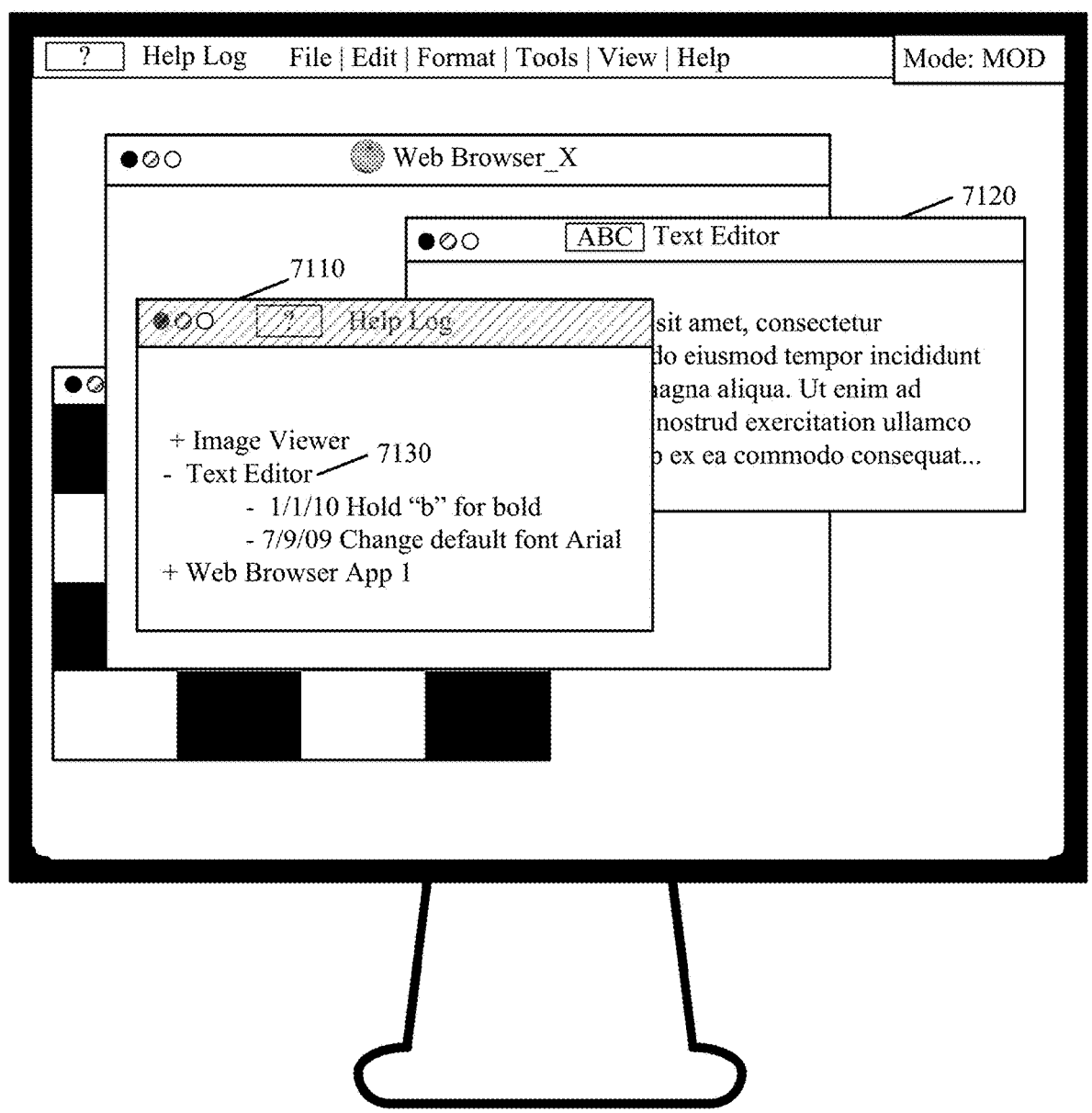
FIG. 71 illustrates the KEI help tool in accordance with some embodiments.

FIG. 71 illustrates the KEI help tool 7110 in accordance with some embodiments. The KEI help tool 7110 provides a user populated log with entries for each application. In some embodiments, the data for the KEI help log is stored to the help database 6240 of FIG. 62.

When invoked, the KEI help tool 7110 identifies the frontmost application 7120 and opens the KEI help tool 7110 to the entries 7130 related to the frontmost application 7120. In some embodiments, the KEI help tool 7110 identifies various contexts (e.g., windows, toolbars, menus, palettes, etc.) within the frontmost application 7120 in order to open the KEI help tool 7110 to entries that are specific to the context with key focus. For example, when invoking the KEI help tool 7110 while a particular menu is expanded, the KEI help tool 7110 can identify entries that are associated with the expanded menu.

The user can populate the KEI help tool 7110 with solutions, features, or notes that are understandable to the user and particular to the user's activity. The user may drag-and-drop images, UI elements, or other objects into the help tool with annotated comments. In this manner, the user populates the help log with matters of specific interest. Help information for other applications or contexts are accessible by expanding the entries related to the other applications or the other contexts when they have focus.

In some embodiments, the KEI help tool 7110 allows a user to capture within the help log an error message or status as it occurs. When an error message is presented, the user can invoke the KEI help tool 7110. The KEI help tool 7110 provides various capture tools that can be used to take an image of the error message or area of the screen and automatically create an entry at the appropriate location within the help tool. The capture tools may incorporate a separate KEI application or utilize a preexisting application or OS service on the user device that is launched when the KEI help tool is activated.

Figure 72:
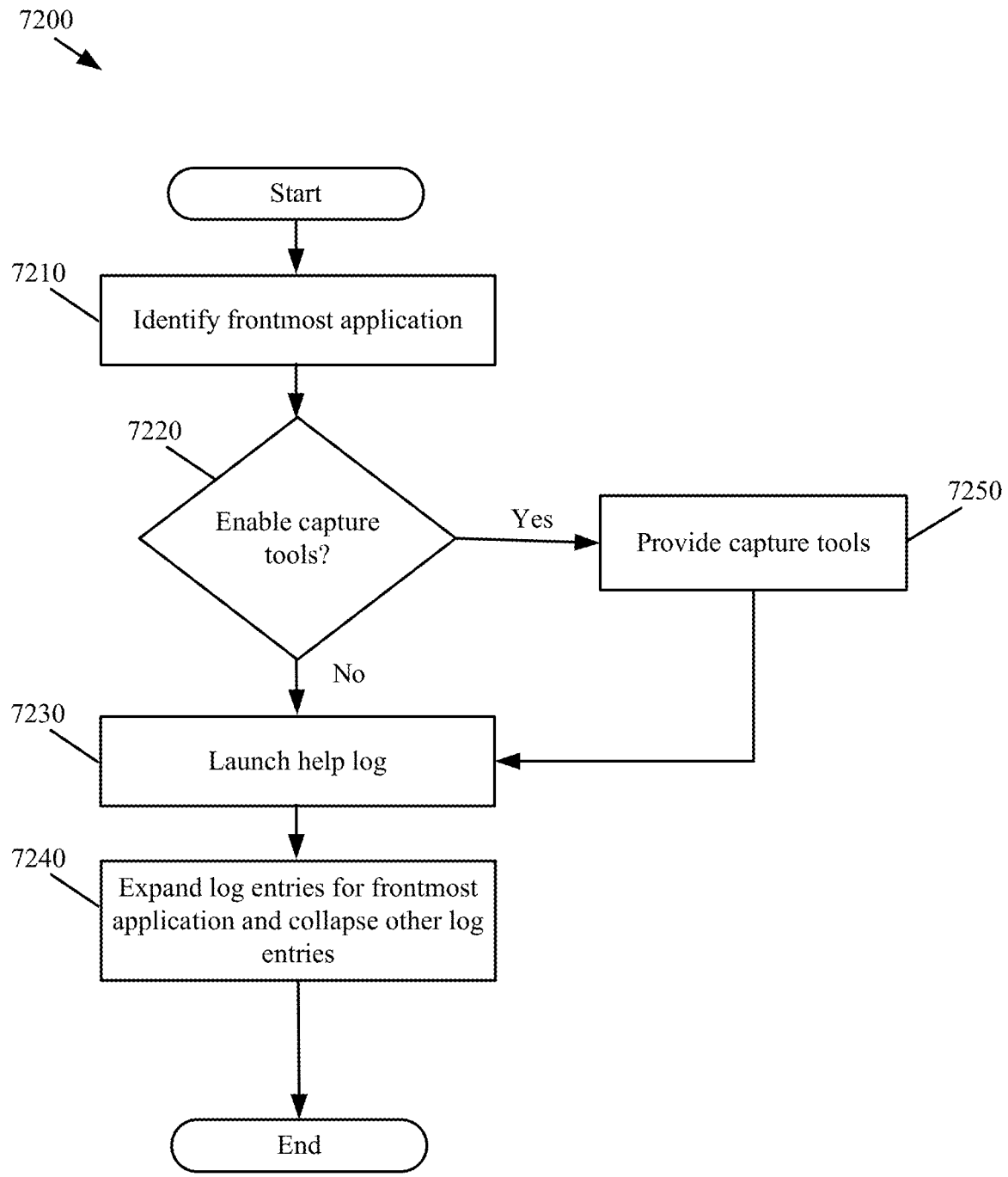
FIG. 72 presents a process for invoking the KEI help tool in accordance with some embodiments.

FIG. 72 presents a process 7200 for invoking the KEI help tool in accordance with some embodiments. The process 7200 begins when the KEI help tool is invoked by the user. The process identifies (at 7210) the frontmost application or context within the frontmost application and determines (at 7220) whether to enable the capture tools. In some embodiments, a prompt is provided to the user inquiring whether to enable the capture tools. In some other embodiments, the KEI help tool automatically provides the capture tools when launched or when another keyboard key is pressed to enable to capture tools.

When the capture tools are disabled, the process launches (at 7230) the help log and expands (at 7240) the log entries for the frontmost application while collapsing entries for other applications in some embodiments. When the capture tools are enabled, the process provides (at 7250) the capture tools to the user, launches (at 7230) the help log, and expands (at 7240) the log entries for the frontmost application.

In some embodiments, the KEI help tool references entries from other KEI help tools of other users. The cross referencing allows a user to see solutions other users discovered or implemented for a particular facet of an application without searching. In some embodiments, the cross referencing occurs across entries of a particular application. The cross referencing creates a dynamically changing help community that is accessible by any user.

In some embodiments, the KEI system automatically inserts various information into the KEI help tool. This information may include statistical information about the user's activity within a given application. For example, the statistical information may inform the user as to the number of times an output action in a particular application is performed. This information can be further enhanced to inform the user about alternative or more efficient means by which to perform the same output action. For example, a preexisting or proposed keyboard shortcut for invoking frequently used output actions can be presented to the user. For example, if the user visits a web site multiple times every day, and types in that URL or performs a search each time to arrive at the site, or uses the mouse each time to invoke a bookmark and then clicks series of hyperlinks, the KEI help system would propose, based on most frequent use, a MOD key that would allow the user to perform that same activity more efficiently. Such automatically generated proposals may include actions that incorporate multiple output actions. Additionally, the KEI help tool can be used to inform the user as to entries in the notifications queue which identify frequently accessed output actions for which a mapping has not previously been provided in the KEI system.

Figure 73:
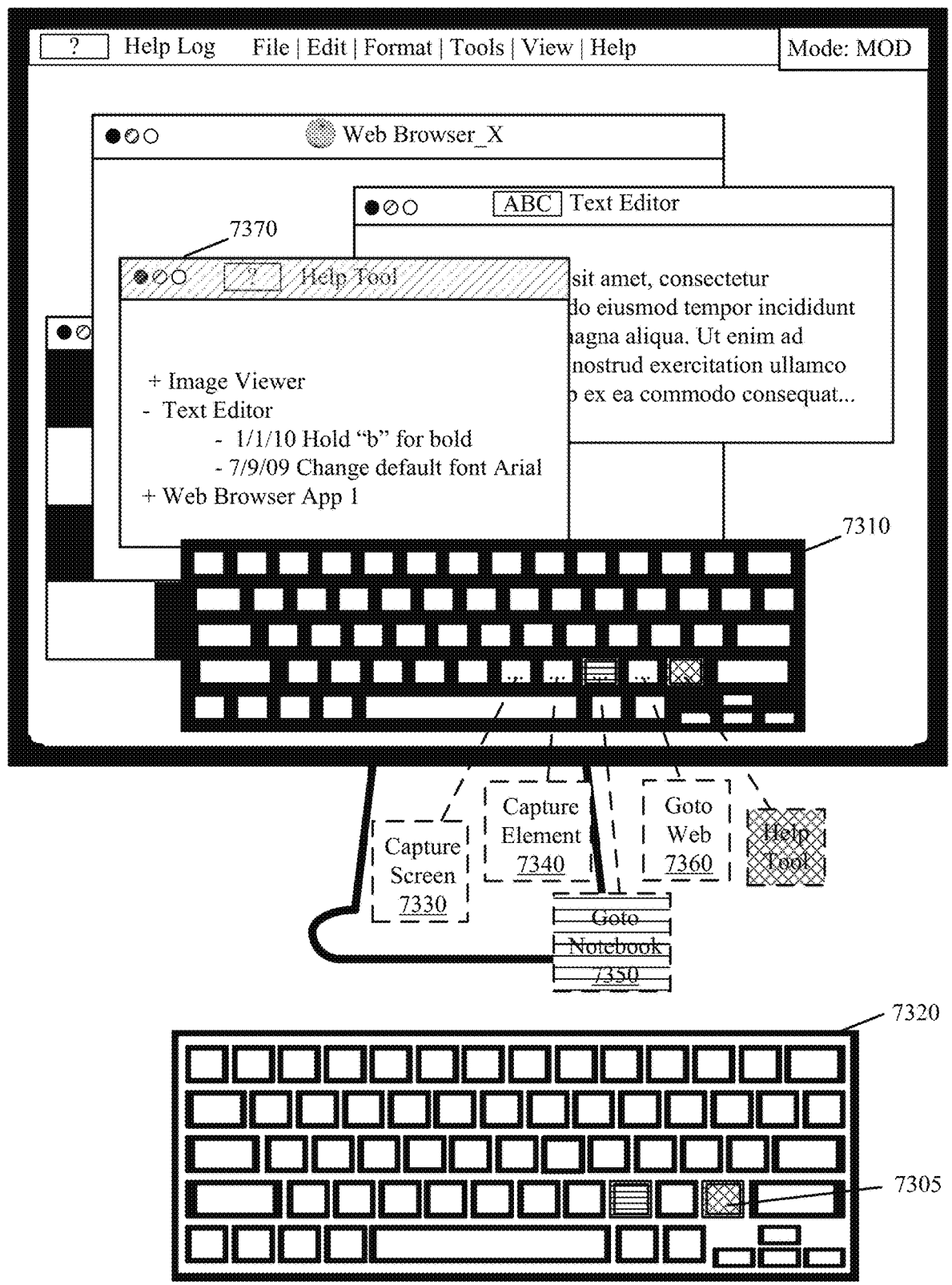
FIG. 73 illustrates the KEI help tool as a MOD operational mode of the KEI in accordance with some embodiments.

As noted above, the KEI help tool may be invoked from a particular MOD operational mode of the KEI. FIG. 73 illustrates the KEI help tool as a MOD operational mode of the KEI in accordance with some embodiments. In this figure, the "?" key 7305 on the keyboard 7320 is held down as denoted by the overlapping crossing lines. The holding down of the "?" key 7305 causes the KEI engine to enter the MOD "?" operational mode which enables access to the KEI help tool functionality. The KEI viewer 7310 updates its display to present the symbols 7330-7360 for the KEI help tool functions. The functions include, as examples, performing a screen capture (identified by symbol 7330), performing an element capture (identified by symbol 7340), opening the help tool notebook 7370 (identified by symbol 7350), and launching a web browser that performs an internet search based on the frontmost application and the state of the frontmost application, and any identified error messages (identified by symbol 7360).

VI. Computer System

Many of the above-described processes and modules are implemented as software processes that are specified as a set of instructions recorded on non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computer system are meant in their broadest sense, and may include any electronic device with a processor that executes instructions stored on computer-readable media or that are obtained remotely over a network connection. Examples of computer-readable media include, but are not limited to, CD-ROMs, flash drives, RAM chips, hard drives, EPROMs, etc. Further, wherever a server, computer, or computer system is identified as a component of the embodied invention, it is understood that the server, computer, or computer system may be a single physical machine, or a cluster of multiple physical machines performing related functions, virtualized machines co-resident on a single physical machine, or various combinations of the above.

Figure 74:
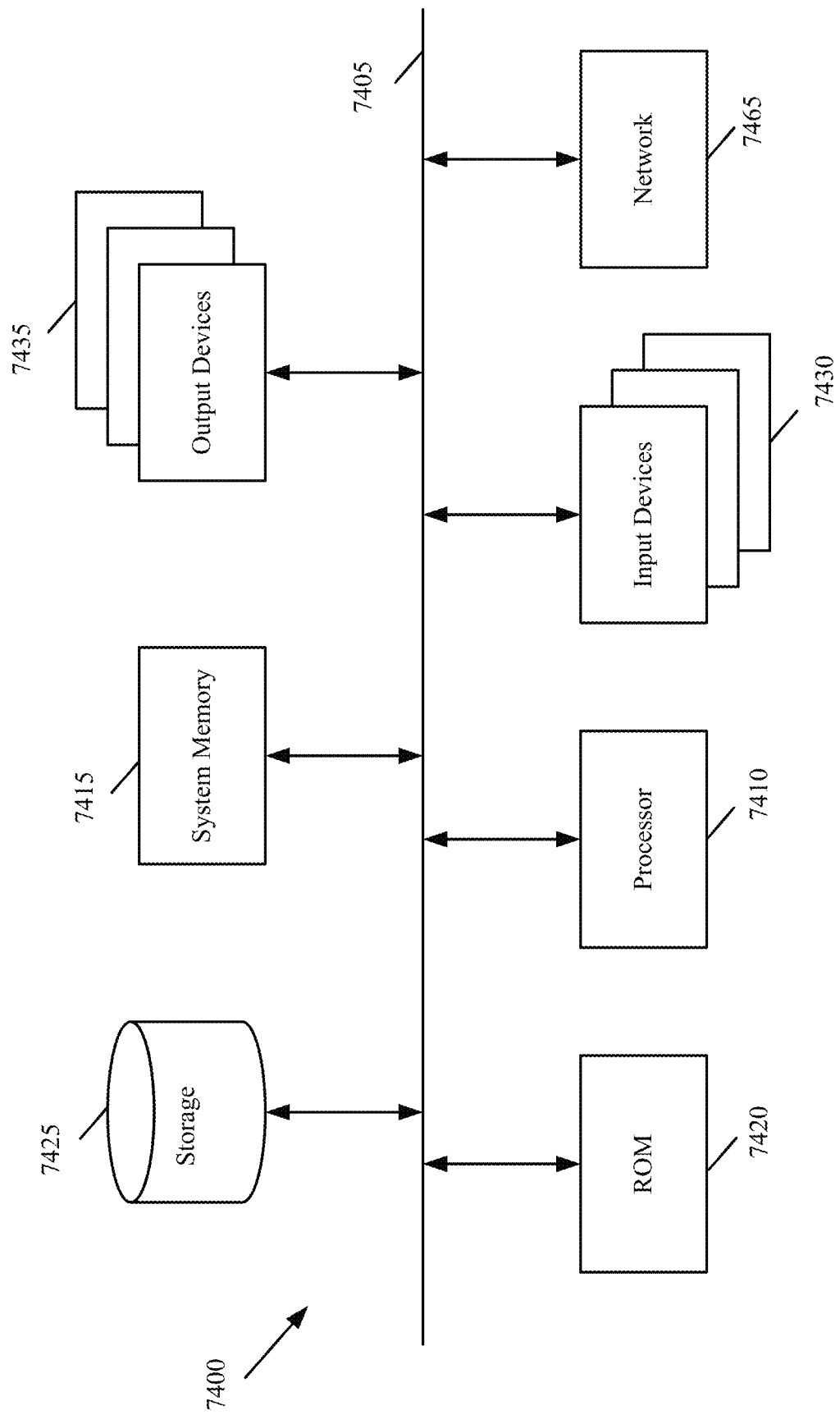
FIG. 74 illustrates a computer system with which some embodiments are implemented.

FIG. 74 illustrates a computer system with which some embodiments are implemented. Such a computer system includes various types of computer-readable mediums and interfaces for various other types of computer-readable mediums that implement the various processes, modules, viewers, and engines described above (e.g., KEI engine, KEI viewer, input interceptor, input processing engine, etc.). Computer system 7400 includes a bus 7405, a processor 7410, a system memory 7415, a read-only memory 7420, a permanent storage device 7425, input devices 7430, and output devices 7435.

The bus 7405 collectively represents all system, peripheral, and chipset buses that communicatively connect the numerous internal devices of the computer system 7400. For instance, the bus 7405 communicatively connects the processor 7410 with the read-only memory 7420, the system memory 7415, and the permanent storage device 7425. From these various memory units, the processor 7410 retrieves instructions to execute and data to process in order to execute the processes of the invention. The processor 7410 is a processing device such as a central processing unit, integrated circuit, graphical processing unit, etc.

The read-only-memory (ROM) 7420 stores static data and instructions that are needed by the processor 7410 and other modules of the computer system. The permanent storage device 7425, on the other hand, is a read-and-write memory device. This device is a non-volatile memory unit that stores instructions and data even when the computer system 7400 is off. Some embodiments of the invention use a mass-storage device (such as a magnetic or optical disk and its corresponding disk drive) as the permanent storage device 7425.

Other embodiments use a removable storage device (such as a flash drive) as the permanent storage device. Like the permanent storage device 7425, the system memory 7415 is a read-and-write memory device. However, unlike the storage device 7425, the system memory is a volatile read-and-write memory, such as random access memory (RAM). The system memory stores some of the instructions and data that the processor needs at runtime. In some embodiments, the processes are stored in the system memory 7415, the permanent storage device 7425, and/or the read-only memory 7420.

The bus 7405 also connects to the input and output devices 7430 and 7435. The input devices enable the user to communicate information and select commands to the computer system. The input devices 7430 include any of a capacitive touchscreen, resistive touchscreen, any other touchscreen technology, a trackpad that is part of the computing system 7400 or attached as a peripheral, a set of touch sensitive buttons or touch sensitive keys that are used to provide inputs to the computing system 7400, or any other touch sensing hardware that detects multiple touches and that is coupled to the computing system 7400 or is attached as a peripheral. The input devices 7430 also include alphanumeric keypads (including physical keyboards and touchscreen keyboards), pointing devices (also called "cursor control devices"). The input devices 7430 also include audio input devices (e.g., microphones, MIDI musical instruments, etc.). The output devices 7435 display images generated by the computer system. For instance, these devices display the KEI. The output devices include printers and display devices, such as cathode ray tubes (CRT) or liquid crystal displays (LCD).

Finally, as shown in FIG. 74, bus 7405 also couples computer 7400 to a network 7465 through a network adapter (not shown). In this manner, the computer can be a part of a network of computers (such as a local area network ("LAN"), a wide area network ("WAN"), or an Intranet, or a network of networks, such as the Internet. For example, the computer 7400 may be coupled to a web server (network 7465) so that a web browser executing on the computer 7400 can interact with the web server as a user interacts with a GUI that operates in the web browser.

As mentioned above, the computer system 7400 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method comprising:
   detecting a key down event associated with a first alphanumeric key of a plurality of alphanumeric keys, wherein each alphanumeric key of the plurality of alphanumeric keys is associated with a different character or number and is different than one or more specialized flag keys;
   starting a duration timer in response to detecting the key down event, the duration timer generating a timer fired event after a particular duration;
   awaiting further key events or timer events without providing character insertion output in response to the key down event;
   outputting a character associated with the first alphanumeric key in response to detecting a key up event associated with the first alphanumeric key before detecting the timer fired event;
   remapping text insertion operations of a first set of the plurality of alphanumeric keys to a first set of output actions, that do not involve text insertion, in response to detecting the key down event associated with the first alphanumeric key and the timer fired event, wherein the first set of alphanumeric keys are different alphanumeric keys than the first alphanumeric key; and
   executing a particular output action of the first set of output actions in response to a key event associated with a second alphanumeric key of the plurality of alphanumeric keys while said remapping is active based on the key down event associated with the first alphanumeric key and the timer fired event.

2. The method of claim 1, wherein said outputting comprises outputting a character associated with the first alphanumeric key and a character associated with the second alphanumeric key in response to detecting a key down event associated with the second alphanumeric key before detecting the timer fired event.

3. The method of claim 1 further comprising outputting two characters associated with the first and second alphanumeric keys in response to detecting a key up event associated with the first alphanumeric key followed by a key down event associated with the second alphanumeric key before detecting the timer fired event.

4. The method of claim 1 further comprising stopping said duration timer in response to detecting another key event associated with the first alphanumeric key or the second alphanumeric key.

5. The method of claim 1 further comprising detecting a key event associated with the second alphanumeric key after detecting the timer fired event.

6. The method of claim 5 further comprising generating a system message, in place of outputting a different character associated with the second alphanumeric key, wherein the system message identifies a new operational mode, the first alphanumeric key, and the second alphanumeric key.

7. The method of claim 6, wherein the particular output action is mapped to the system message identification of the second operational mode, the first alphanumeric key, and the second alphanumeric key.

8. The method of claim 1 further comprising receiving key events from at least one of a touch or touchscreen based input device or a mechanical input device comprising the plurality of alphanumeric keys, wherein the key events comprise key down events upon touching or activating an alphanumeric key, and key up events upon releasing or deactivating an alphanumeric key.

9. The method of claim 1 further comprising changing text insertion operations of a different second set of the plurality of alphanumeric keys to a different second set of output actions that do not involve text insertion in response to detecting the key down event associated with the first alphanumeric key, the timer fired event, and detecting a key down event associated with a third alphanumeric key of the plurality of keys.

10. A computer system comprising:
an input device comprising a plurality of alphanumeric keys, each alphanumeric key of the plurality of alphanumeric keys generating at least a key down event in response to activation of the alphanumeric key, and a key up event in response to deactivation of the alphanumeric key after a previous activation; and
a controller modifying input from the input device to the computer system based on a duration timer which is started with generation of a first key down event from activation of a first alphanumeric key, wherein the controller modifies the input by:
  (i) suppressing input of at least one character corresponding to the first alphanumeric key in response to the first key down event;
  (ii) providing a first input to the computer system in response to a key up event from deactivation of the first alphanumeric key or a key down event from activation of a second alphanumeric key being received before the duration timer reaches a threshold value, wherein the first input comprises a first identifier identifying a text insertion operational mode of the computer system and a first value of the first alphanumeric key; and
  (iii) providing a different second input to the computer system in response to the duration timer reaching the threshold value prior to receiving a key up event from deactivation of the first alphanumeric key or a key down event from activation of the second alphanumeric key, wherein the second input comprises a different second identifier identifying a different operational mode of the computer system, that does not involve text insertion, and the first value of the first alphanumeric key.

11. The computer system of claim 10, wherein providing the first input comprises switching the computer system to the text insertion operational mode before text insertion of the at least one character corresponding to the first alphanumeric key.

12. The computer system of claim 11, wherein providing the second input comprises switching the computer system from the text insertion operational mode to the different operational mode and enabling access to two or more actions using a set of the plurality of alphanumeric keys with text insertion operations that are remapped to executing the two or more actions based on input from the controller provided in response to the duration timer reaching the threshold value, prior to receiving a key up event from deactivation of the first alphanumeric key.

13. The computer system of claim 10 further comprising a display presenting the at least one character in response to the first input.

14. The computer system of claim 13 further comprising a processor executing a command that modifies state of an application or an operating system parameter of the computer system in response to the second input.

15. The computer system of claim 10, wherein providing the second input to the computer system comprises providing a first message when the duration timer reaches the threshold value prior to the controller receiving a key up event from deactivation of the first alphanumeric key, and providing a second message when the duration timer reaches the threshold value, prior to the controller receiving a key up event from deactivation of the first alphanumeric key, and the controller subsequently receiving a key down event from activation of a second alphanumeric key, wherein the first message identifies a particular operational mode from a plurality of operational modes of the computer system and the at least one character corresponding to the first alphanumeric key, and wherein the second message identifies the particular operational mode, the at least one character corresponding to the first alphanumeric key, and a different character corresponding to the second alphanumeric key.

16. A method comprising:
detecting a key down event associated with a first alphanumeric key of a plurality of alphanumeric keys of an input device;
starting a duration timer in response to detecting the key down event;
changing from a text insertion first operational mode to a different second operational mode that does not involve text insertion without outputting any associated character in response to the duration timer reaching a threshold value before detecting another key event;
presenting a graphical keyboard on a display, the graphical keyboard comprising a plurality of graphical keys corresponding to the plurality of alphanumeric keys of the input device;
detecting dragging of a user interface (UI) element onto a particular graphical key of the graphical keyboard that corresponds to a second alphanumeric key of the plurality of alphanumeric keys while the second operational mode is active in response to the key down event associated with the first alphanumeric key; and
mapping (i) invocation of an action associated with the UI element via activation of the second alphanumeric key corresponding to the particular graphical key when the second operational mode is active in response to the key down event associated with the first alphanumeric key, and (ii) entry of a character associated with the second alphanumeric key via activation of the second alphanumeric key when the first operational mode is active.

17. The method of claim 16 further comprising executing the action after said detecting the key down event and starting the duration timer, and further in response to changing the operational mode and detecting a second key event associated with a second alphanumeric key corresponding to the particular graphical key.

18. The method of claim 16 further comprising outputting a character after said detecting a key down event and starting the duration timer, and further in response to detecting a key up event associated with the first alphanumeric key prior to the duration timer reaching the threshold.

* * * * *